United States Patent [19]
Kobayashi

[11] Patent Number: 5,868,642
[45] Date of Patent: Feb. 9, 1999

[54] RIGHT/LEFT DRIVING TORQUE DISTRIBUTING DEVICE FOR VEHICLE

[75] Inventor: Toshio Kobayashi, Tokyo, Japan

[73] Assignee: Fuji Jukogyo Kabushiki Kaisha, Tokyo, Japan

[21] Appl. No.: 936,800

[22] Filed: Sep. 24, 1997

[30] Foreign Application Priority Data

| Sep. 26, 1996 | [JP] | Japan | 8-254951 |
| Oct. 1, 1996 | [JP] | Japan | 8-260954 |
| Oct. 24, 1996 | [JP] | Japan | 8-282432 |
| Oct. 28, 1996 | [JP] | Japan | 8-285507 |
| Dec. 4, 1996 | [JP] | Japan | 8-324374 |
| Dec. 4, 1996 | [JP] | Japan | 8-324375 |

[51] Int. Cl.$^6$ ............................................... F16H 48/22
[52] U.S. Cl. ....................................................... 475/203
[58] Field of Search .............................. 475/18, 198, 202, 475/203

[56] References Cited

U.S. PATENT DOCUMENTS 3,027,780  4/1962  Storer, Jr. et al. ........................ 475/18
4,973,296  11/1990  Shibahata ................................ 475/203

*Primary Examiner*—Dirk Wright
*Attorney, Agent, or Firm*—Beveridge, DeGrandi, Weilacher & Young, L.L.P.

[57] ABSTRACT

A right/left driving torque distributing device for distributing the output driving torque of a power unit mounted on a vehicle to a pair of lateral drive shafts coaxially extended in opposite directions and connected to a right wheel and a left wheel, respectively, of the vehicle. A differential gear mechanism for distributing an output driving torque of the power unit is transmitted to the pair of lateral drive shafts. First, second and third gears are coaxially arranged with their axes aligned with the axis of the differential gear mechanism. First, second and third clutch gears are coaxially arranged on a clutch axis extending in parallel to the axis of the differential gear mechanism. The first and the second clutch gear are interlocked by a first clutch, and the first and the third clutch gear are interlocked by a second clutch. The first and the second clutch are arranged coaxially with their axis aligned with the clutch axis and are united together in a single unit.

39 Claims, 71 Drawing Sheets

FROM RIGHT / LEFT DRIVING
TORQUE DISTRIBUTION CONTROLLER

TO FIRST PRESSURE CHAMBER

RIGHT/LEFT DRIVING TORQUE DISTRIBUTING DEVICE FOR VEHICLE

BACKGROUND OF THE INVENTION

1. Field of the Invention

The present invention relates to a right/left driving torque distributing device for a vehicle, such as an automobile, and, more specifically, to a right/left driving torque distributing device for a vehicle, capable of varying driving torque distribution ratio in which driving torque is distributed to a right driving wheel and a left driving wheel of the vehicle.

2. Description of the Related Art

Various right/left driving torque distributing devices for vehicles have been developed and put to practical uses in recent years to secure traction and to improve traveling stability when vehicles travel rugged roads. A recently proposed right/left driving torque distributing device is capable of positively controlling driving torque distribution ratio in which driving torque is distributed to right and left wheels to improve the turning performance of a vehicle.

A prior art right/left driving torque distributing device disclosed in JP-A No. 5-77653 comprises a differential gear unit employing a double-pinion planetary gear mechanism having a differential gear case, a ring gear formed on the inner circumference of the differential gear case, a second output shaft, a sun gear mounted on the second output shaft, a first output shaft and a planet carrier mounted on the first output shaft, and a driving torque transmission control mechanism for controlling driving torque distribution ratio in which driving torque is distributed to right and left wheels, combined with the differential gear unit.

The driving torque transmission control mechanism comprises speed change mechanisms associated respectively with the first and the second output shaft to vary the respective rotating speeds of the first and the second output shaft, auxiliary driving torque transmitting members which operate at rotating speeds controlled by the speed changing mechanisms and different from those of the first and the second output shaft, respectively, and a hydraulic multiple-disk clutch for regulating driving torque distribution to the right and the left wheel.

The differential gear unit, and the friction disk units of the multiple-disk clutch mechanism are contained in a differential gear case. The piston unit of the multiple-disk clutch mechanism is disposed outside the differential gear case.

Since the prior art right/left driving torque distributing device disclosed in JP-A No. 5-77653 comprises the differential gear case with the ring gear formed on the inner circumference thereof, the friction disk units provided with drive friction disks and driven friction disks in an alternate arrangement and disposed in a left and a right portion of the differential gear case, respectively, the double-pinion planetary gear mechanism disposed in a central portion of the hydraulic multiple-disk clutch, the auxiliary driving torque transmitting members disposed outside the differential gear case and driven for rotation at rotating speeds controlled by the speed changing mechanism and different from those of the first and the second output shaft respectively for driving the right and the left wheel, and a speed changing mechanism for changing the respective rotating speed of the right and the left output shafts, and those components are arranged in a straight arrangement, the right/left driving torque distributing device has a relatively large lateral size.

Accordingly, the length of each of the drive shafts extended between the output shafts, and the right and the left wheel for rotatively driving the right and the left wheel for rotation is inevitably relatively short and the angle of bend of constant-velocity joints attached to the opposite ends of each drive shaft is inevitably large. Consequently, strength and transmission efficiency of the constant-velocity joints are reduced, and there is the possibility that the constant-velocity joints vibrate and generate noise.

Since the auxiliary driving torque transmitting members for distributing driving torque to the right and the left wheel are disposed on the opposite sides of the differential gear case, the right/left driving torque distributing device is relatively large, has a relatively complicated construction, needs an increased number of component parts, has an increased mass and requires high manufacturing cost.

Since there is a limit to the maximum outside diameter of the friction disks of the hydraulic multiple-disk clutch, the number of the friction disks must be increased greatly or the pressure receiving area of the piston must be increased to increase the torque transmission capacity of the hydraulic multiple-disk clutch. Therefore, the right/left driving torque distributing device designed for use in combination with a high-power automotive engine requiring a large torque transmission capacity is inevitably large, has a large mass and requires a high cost.

Since the left planetary gear and the left piston, the differential gear and the hydraulic multiple-disk clutch contained in the differential gear case, and the right planetary gear and the right piston are assembled in three separate blocks, it is difficult to lubricate those components properly.

A right/left driving torque distributing device employing a double-pinion planetary gear mechanism, disclosed in JP-A No. 5-345535 has a driving torque transmission control mechanism for controlling driving torque distribution ratio in which a driving torque is distributed to the right and the left wheel of a vehicle, interposed between a pair of drive shafts for rotatively driving the right and the left wheel. The driving torque transmission control mechanism comprises a speed augmenting/reducing mechanism having, in combination, a speed augmenting mechanism which increases the rotating speed of one of the pair of drive shafts to an increased rotating speed and drives a first intermediate shaft for rotation at the increased rotating speed, and a speed reducing mechanism which reduces the rotating speed of the same one of the pair of drive shafts to a reduced rotating speed and drives a second intermediate shaft at the reduced rotating speed, a first variable-capacity torque transmitting means, and a second variable-capacity torque transmitting means. The first and the second variable-capacity torque transmitting means are disposed contiguously and united together. Each of the first and the second variable-capacity torque transmitting means comprises an electronically controlled hydraulic multiple-disk clutch.

In the right/left driving torque distributing device, the driving torque transmission control mechanism, the three-pinion speed augmenting/reducing mechanism, and the two hydraulic multiple-disk clutches are arranged in a laterally straight arrangement. Therefore, the right/left driving torque distributing device has a relatively large lateral size and has the same problems as those of the foregoing prior art right/left driving torque distributing device.

Input driving torque applied to the differential gear is distributed properly to the right and the left output shaft of the differential gear by the agency of the speed augmenting/reducing mechanism and the hydraulic multiple-disk clutches. The driving torque distribution ratio in which the input driving torque is distributed to the right and the left output shaft of the differential gear can be controlled by properly varying torques transmitted by the multiple-disk clutches.

Since the double-pinion differential gear mechanism has a large ring gear, large pinions, small pinions and the sun gear, the ring gear must be supported in bearings disposed asymmetrically with respect to the ring gear because there are restrictions on a housing space in the ring gear. Therefore, the bearings are loaded differently, which is disadvantageous in respect of durability, reliability and gear noise.

The differential gear case of this prior art right/left driving torque distributing device needs at least five highly rigid walls. Therefore, the right/left driving torque distributing device has a complicated construction, needs a high manufacturing cost, has a large mass, and is disadvantageous in the balance of lubrication, loss resulting from the stirring action of the multiple-disk clutches and such. Moreover, since the case of the right/left driving torque distributing device is divided into complex divisions, the case has many joining surfaces to be provided with oil seals to prevent the leakage of the lubricating oil, which is disadvantageous in reliability and manufacturing cost, and is able to employ only a few currently produced parts.

A right/left driving torque distributing device disclosed in JP-A No. 1-182127 comprises an input shaft, a differential gear case driven for rotation by the input shaft, pinion shafts fixed to the inner surface of the differential gear case opposite to each other, a pair of differential pinions (bevel gears) mounted on the pinion shafts, respectively, and a pair of side gears engaged with the differential pinions.

Hydraulic multiple-disk clutches are mounted on an intermediate shaft at positions on the side of a right wheel and on the side of a left wheel, respectively, a left output shaft and a right output shaft are coupled with the intermediate shaft by the hydraulic multiple-disk clutches, respectively. Driving torque distribution ratio in which driving torque is distributed to the right and the left wheel is varied according to the traveling condition of the vehicle.

Since this prior art right/left driving torque distributing device distributes driving torque to the right and the left wheel through the hydraulic multiple-disk clutches disposed separately on the intermediate shaft on the side of the right wheel and on the side of the left wheel, respectively, the prior art right/left driving torque distributing device has an increased lateral size and needs an increased number of parts.

SUMMARY OF THE INVENTION

A right/left driving torque distributing device in accordance with the present invention for a vehicle has a differential gear mechanism for distributing the output driving torque of a power unit included in the vehicle to a pair of coaxial drive shafts, and first, second and third clutch gears supported for individual rotation about a second axis parallel to the axes of the pair of drive shafts. A first clutch means is interposed between the first and the second clutch gear, and a second clutch means is interposed between the first and the third clutch gear. The first and the second clutch means are formed integrally and coaxially with the second axis.

In the right/left driving torque distributing device in accordance with the present invention, the first and the second clutch means are disposed coaxially with the second axis different from the respective axes of the pair of drive shafts and the axis of the differential gear mechanism. Therefore, the interval between the pair of drive shafts along the axes of the pair of drive shafts can be reduced.

First, second and third gears coaxial with the pair of drive shafts and the differential gear mechanism are in engagement with the first, the second and the third clutch gear, respectively. Right/left driving torque distributing devices according to different aspect of the present invention differ from each other in the arrangement of the first, the second and the third gear.

In a right/left driving torque distributing device according to a first aspect of the present invention, the first gear rotates together with one of the pair of drive shafts, and the second and the third gear rotate together with the other drive shaft.

The first gear is in engagement with the first clutch gear to drive the first clutch gear for rotation at a reference rotating speed when the pair of drive shafts rotate at the same rotating speed.

The second gear is in engagement with the second clutch gear to drive the second clutch gear for rotation at a rotating speed higher than the reference rotating speed when the pair of drive shafts rotate at the same rotating speed.

The third gear is in engagement with the third clutch gear to drive the third clutch gear for rotation at a rotating speed lower than the reference rotating speed when the pair of drive shafts rotate at the same rotating speed.

In a right/left driving torque distributing device according to a second aspect of the present invention, the first gear rotates together with a member of the differential gear mechanism, driven for rotation by the power unit, usually, a differential gear case, and the second and the third gear rotate together with one of the pair of drive shafts.

The first gear is in engagement with the first clutch gear to drive the first clutch gear for rotation at a reference rotating speed when the pair of drive shafts rotate at the same rotating speed.

The second gear is in engagement with the second clutch gear to drive the second clutch gear for rotation at a rotating speed different from the reference rotating speed when the pair of drive shafts rotate at the same rotating speed.

The third gear is in engagement with the third clutch gear to drive the third clutch gear for rotation at a rotating speed different from the reference rotating speed when the pair of drive shafts rotate at the same rotating speed.

Preferably, the gear ratio G1 between the first gear and the first clutch gear, the gear ratio G2 between the second gear and the second clutch gear, and the gear ratio G3 between the third gear and the third clutch gear meet an expression: $G2>G1>G3$.

Preferably, the gear ratio G1 between the first gear and the first clutch gear, the gear ratio G2 between the second gear and the second clutch gear, and the gear ratio G3 between the third gear and the third clutch gear meet an expression: $G2/G1=G1/G3$.

In a right/left driving torque distributing device according to a third aspect of the present invention, the first gear rotates together with a member of the differential gear mechanism, driven for rotation by the power unit, usually, a differential gear case, the second gear rotates together with one of the pair of drive shafts, and the third gear rotates together with the other drive shaft.

The first gear is in engagement with the first clutch gear to drive the first clutch gear for rotation at a reference rotating speed when the pair of drive shafts rotate at the same rotating speed.

The second gear is in engagement with the second clutch gear to drive the second clutch gear for rotation at a rotating speed different from the reference rotating speed when the pair of drive shafts rotate at the same rotating speed.

The third gear is in engagement with the third clutch gear to drive the third clutch gear for rotation at a rotating speed different from the reference rotating speed when the pair of drive shafts rotate at the same rotating speed.

Preferably, the gear ratio G2 between the second gear and the second clutch gear and the gear ratio G3 between the third gear and the third clutch gear meet an expression: G2=G3.

Preferably, the first gear and the first clutch are disposed on the side of one of the pair of drive shafts, and the second gear, the second clutch gear, the third gear and the third clutch gear are disposed on the side of the other drive shaft.

The first, the second and the third gear, and the first, the second and the third clutch gear may be disposed on the side of one of the pair of drive shafts.

The second gear and the second clutch gear may be disposed on the side of one of the pair of drive shafts, and the third gear and the third clutch gear may be disposed on the side of the other drive shaft.

The differential gear mechanism is a compound planetary gear mechanism comprising a differential gear case driven for rotation by the power unit, a first sun gear formed integrally with the differential gear case, a first pinion in engagement with the first sun gear, a second pinion formed integrally with the first pinion, a second sun gear in engagement with the second pinion, a planet pin rotatably supporting the first and the second pinion, and a planet carrier supporting the planet pin. The planet carrier drives one of the pair of drive shafts for rotation, and the second sun gear drives the other drive shaft for rotation.

A thrust resulting from the engagement of the first sun gear and the first pinion and acting along the axis of the planet pin, and a thrust resulting from the engagement of the second sun gear and the second pinion and acting along the axis of the planet pin may be used as a first differential limiting means for limiting a differential action between the planet carrier and the second sun gear, and a friction against the motion of the first pinion engaged with the first sun gear relative to the planet pin, and a friction against the motion of the second pinion engaged with the second sun gear relative to the planet pin may be used as a second differential limiting means for limiting differential action between the planet carrier and the second sun gear.

The differential gear mechanism has a differential gear case driven for rotation by the power unit, a pinion shaft which rotates together with the differential gear case, a pair of pinions rotatably supported on the pinion shaft and a pair of side gears engaged with the pair of pinions, respectively, the pair of side gears drive the pair of drive shafts for rotation, respectively, and a differential limiting means for limiting differential action between the pair of side gears is interposed between the differential gear case and the pair of side gears.

The right/left driving torque distributing device may further comprise a clutch control means for controlling the respective torque transmitting capacities of the first and the second clutch means according to the traveling condition of the vehicle and the condition of the surface of a road on which the vehicle is traveling.

There may be a predetermined torque transmitting capacity difference between the torque transmitting capacity of the first clutch means and that of the second clutch means.

The clutch mechanism may be a hydraulic multiple-disk clutch.

The clutch mechanism may be an electromagnetic clutch.

The clutch mechanism may be a variable-capacity coupling.

In the right/left driving torque distributing device of the present invention for a vehicle, one of the pair of drive shafts can be driven for rotation at a rotating speed higher than that of the other drive shaft by controlling the operation of the first and the second clutch means. One of the pair of drive shafts can transmit a torque higher than that can be transmitted by the other drive shaft.

Accordingly, one of the pair of wheels of the vehicle provided with the right/left driving torque distributing device of the present invention can be driven for rotation at a rotating speed higher than that of the other wheel, and a torque higher that transmitted to one of the pair of wheels can be transmitted to the other wheel, which improves the turning performance of the vehicle remarkably.

In the right/left driving torque distributing device of the present invention, the first and the second clutch means are formed in a single unit coaxially with a second axis parallel to the axes of the pair of drive shafts and the differential gear mechanism.

Accordingly, the pair of drive shafts can be disposed at a short axial interval. Consequently, the pair of wheels can be connected to the pair of drive shafts by sufficiently long axle shafts, respectively, and the angles of bend of the constant-velocity joints attached to the opposite ends of the axle shafts can be reduced.

Interference between the right/left driving torque distributing device, and the suspensions or the exhaust system can be prevented, sufficient spaces can be secured around the right/left driving torque distributing device, which facilitates work for mounting the right/left driving torque distributing device on the vehicle and maintenance work.

The right/left driving torque distributing device has a relatively small number of component parts, is relatively small and lightweight, and can be manufactured at a relatively low manufacturing cost.

The right/left driving torque distributing device of the present invention is compatible with an automobile provided with a conventional right/left driving torque distributing device.

DESCRIPTION OF THE PREFERRED EMBODIMENTS

Right/left driving torque distributing devices in preferred embodiments according to the present invention will be described with reference to the accompanying drawings.

Right/left driving torque distributing devices in first, second and third embodiments according to the present invention correspond to those stated in claims 1, 2 and 3, respectively. Right/left driving torque distributing devices in fourth to sixth embodiments according to the present invention are modifications of the right/left driving torque distributing devices in the first, second and third embodiments, respectively.

First Embodiment

A right/left driving torque distributing device in a first embodiment according to the present invention will be described with reference to FIGS. 1 to 22.

Figure 1:
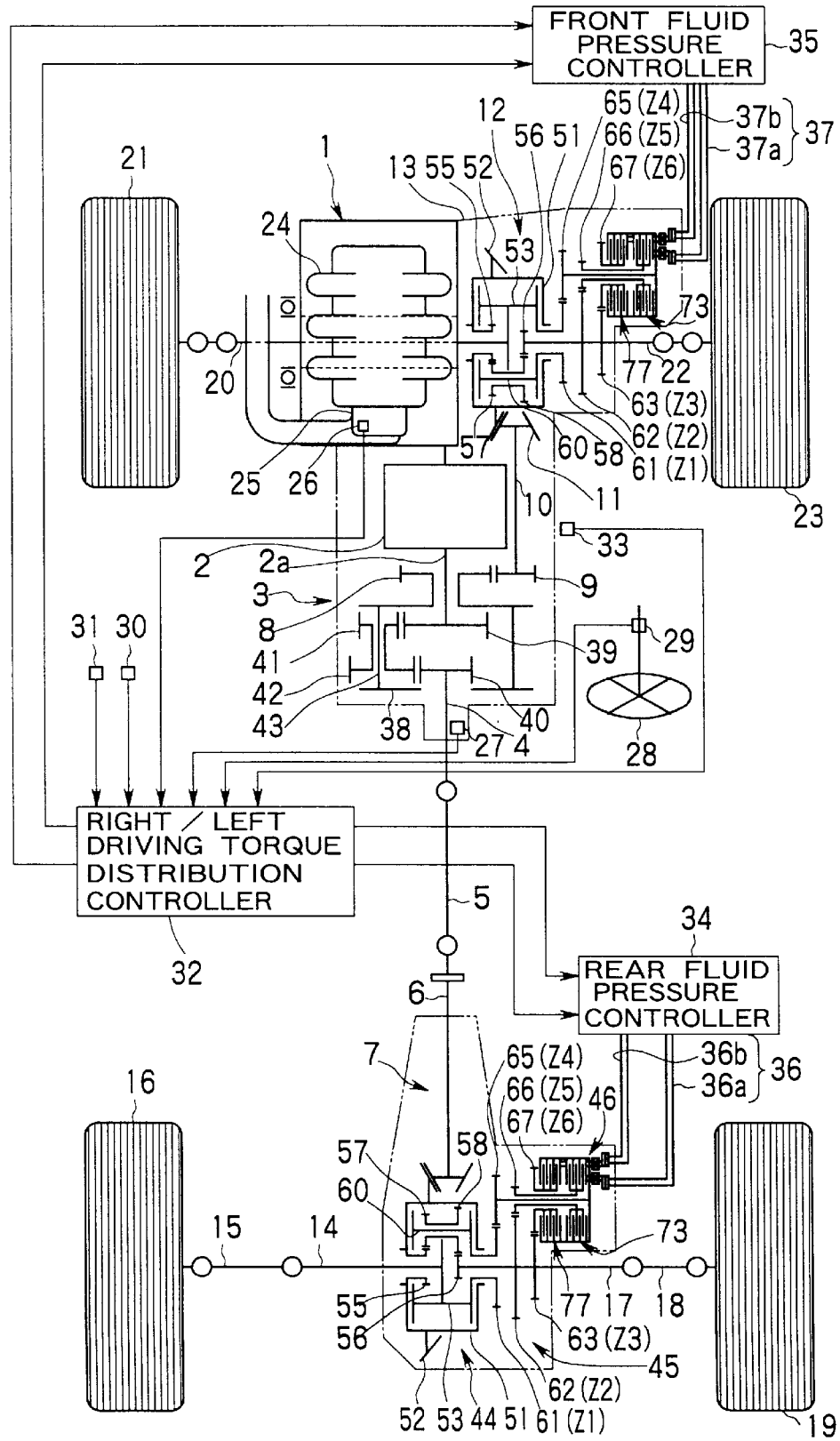
FIG. 1 is a diagrammatic view of a power transmission system for a four-wheel drive automobile, including a right/left driving torque distributing device in a first embodiment according to the present invention.

In a power transmission system shown in FIG. 1, the output driving torque of an engine 1 disposed in a front section of a vehicle is applied to an input member of an automatic transmission 2 disposed behind the engine 1. The automatic transmission changes an input rotating speed to an output rotating speed, and transmits the driving torque of the output rotating speed through an output shaft 2a to a center differential gear 3.

The output driving torque of the automatic transmission 2 is transmitted through a rear drive shaft 4, a propeller shaft 5 and a drive pinion 6 to a rear right/left driving torque distributing device 7 in a first embodiment according to the present invention, and to a front right/left driving torque distributing device 12 substantially identical with the rear right/left driving torque distributing device 7 through a transfer drive gear 8, a transfer driven gear 9, a front drive shaft 10 and a drive pinion 11.

The automatic transmission 2, the center differential gear 3 and the front right/left driving torque distributing device 12 are contained in a case 13.

The driving torque transmitted to the rear right/left driving torque distributing device 7 is transmitted through a left drive shaft 14 and a left axle shaft 15 to a rear left wheel 16, and through a right drive shaft 17 and a right axle shaft 18 to a rear right wheel 19.

The driving torque transmitted to the front right/left driving torque distributing device 12 is transmitted through a left drive shaft 20 to the front left wheel 21 and through a right drive shaft 22 to a front right wheel 23.

A throttle opening sensor 26 for measuring the throttle opening of a throttle valve, not shown, is mounted on a throttle body 25 connected to an intake manifold 24 for the engine 1. A traveling speed sensor 27 for measuring the rotating speed of the rear drive shaft 4 is mounted on the case 13.

A steering angle sensor 29 for measuring steering angle θ is mounted on a steering column supporting a steering wheel 28. A longitudinal acceleration sensor 30 measures longitudinal acceleration, i.e., acceleration along the longitudinal axis of the vehicle. A lateral acceleration sensor 31 measures lateral acceleration, i.e., acceleration along the lateral axis of the vehicle.

The sensors 26, 27, 29, 30 and 31 are connected to a right/left driving torque distribution controller 32. A gear position signal provided by a control unit 33, such as a transmission control unit (TCU) or an engine control unit (ECU), is given to the right/left driving torque distribution controller 32.

The right/left driving torque distribution controller 32 determines the traveling condition of the vehicle and the surface condition of the road on the basis of input signals given thereto, determines an optimum driving torque distribution ratio in which the driving torque is to be distributed by the rear right/left driving torque distributing device 7, gives a control signal to a rear fluid pressure controller 34, determines an optimum driving torque distribution ratio in which the driving torque is to be distributed by the front right/left driving torque distributing device 12, and gives a control signal to a front fluid pressure controller 35.

The rear fluid pressure controller 34 and the front fluid pressure controller 35 are substantially the same in construction and receive signals from the right/left driving torque distribution controller 32. The rear fluid pressure controller 34 controls the pressure of a working fluid supplied through a pair of fluid pipes 36, i.e., a first fluid pipe 36a and a second fluid pipe 36b, to the rear right/left driving torque distributing device 7. The front fluid pressure controller 35 controls the pressure of a working fluid supplied through a pair of fluid pipes 37 (37a and 37b) to the front right/left driving torque distributing device 12.

The center differential gear 3 is disposed in a rear portion of the case 13. The output shaft 2a of the automatic transmission 2 is inserted rotatably in a front portion of a carrier 38 included in the center differential gear 3, and the rear drive shaft 4 is inserted rotatably in a rear portion of the carrier 38.

A first sun gear 39 of a relatively great diameter is formed in a rear end portion of the output shaft 2a of the automatic transmission 2, and a second sun gear 40 of a relatively small diameter is formed in a front end portion of the rear drive shaft 4. The first sun gear 39 and the second sun gear 40 are contained in the carrier 38.

The first sun gear 39 and a first pinion 41 of a relatively small diameter are engaged to constitute a first gear train, and the second sun gear 40 and a second pinion 42 of a relatively great diameter are engaged to constitute a second gear train.

The first pinion 41 and the second pinion 42 are integrated into a double gear. a plurality of double gears, for example, three double gears, each of the first pinion 41 and the second pinion 42 are supported rotatably on planet pins 43 fixed to the carrier 38.

The transfer drive gear 8 is joined to the front end of the carrier 38 to transfer driving torque to the front wheels 21 and 23.

The driving torque of the output shaft 2a of the automatic transmission 2 is transmitted to the first sun gear 39 and is transmitted through the second sun gear 40 to the rear drive shaft 4. The driving torque is transmitted also through the carrier 38, the transfer drive gear 8 and a transfer driven gear 9 to the front drive shaft 10. Thus, the center differential gear 3 is a compound planetary gear mechanism.

A desired differential function of the center differential gear 3 of a compound planetary gear type is determined by properly determining the number of teeth of the first sun gear 39, the second sun gear 40, the first pinions 41 arranged around the first sun gear 39, and the second pinions 42 arranged around the second sun gear 40.

A desired front-to-rear torque distribution ratio of the center differential gear 3, such as a reference front-to-rear torque distribution ratio of 50:50 or an unequal front-to-rear torque distribution ratio for unequally distributing the torque to the rear right/left driving torque distributing device 7 and the front right/left driving torque distributing device 12, can be determined by properly determining the respective radii of the working pitch circles of the first sun gear 39, the second sun gear 40, the first pinion 41 and the second pinion 42.

If the sun gears 39 and 40, and the pinions 41 and 42 are helical gears and the helix angle of the gears 39 and 41 of the first gear train and that of the gears 40 and 42 of the second gear train are different from each other, a thrust acts on each set of the first pinion 41 and the second pinion 42, a frictional resistance acts on the end surface of either the first pinion 41 or the second pinion 42, and a composite force of a load radially acting on the first pinion 41 and the second pinion 42, and a tangential load acting on the first pinion 41 and the second pinion 42 acts on the circumference of each planet pin 43 to exert a frictional resistance against the rotation of the first pinion 41 and the second pinion 42. These frictional resistances produce a differential limiting torque proportional to an input torque.

Figure 3:
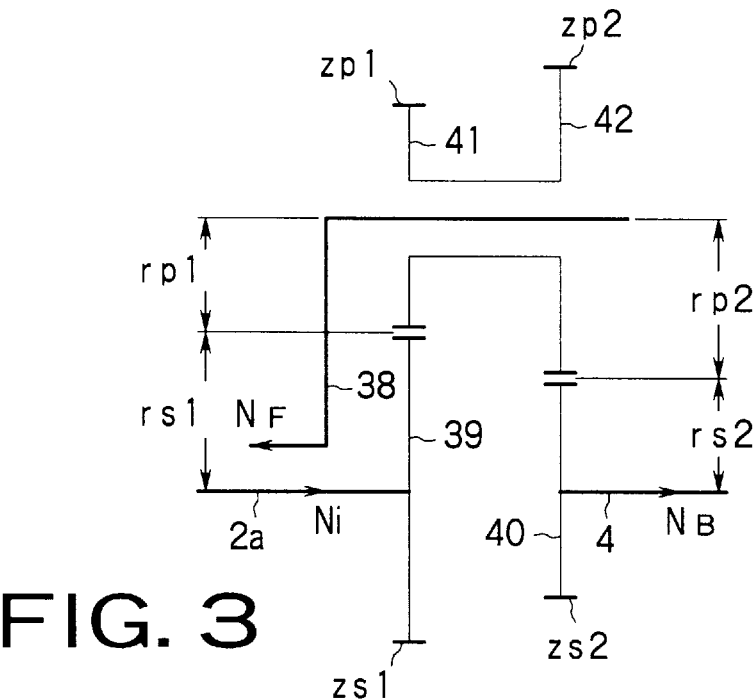
FIG. 3 is a diagrammatic view of assistance in explaining a differential function of a center differential gear included in the power transmission system shown in FIG. 1.

The differential function of the center differential gear 3 will be described with reference to FIGS. 3, 4 and 5.

Figure 4:
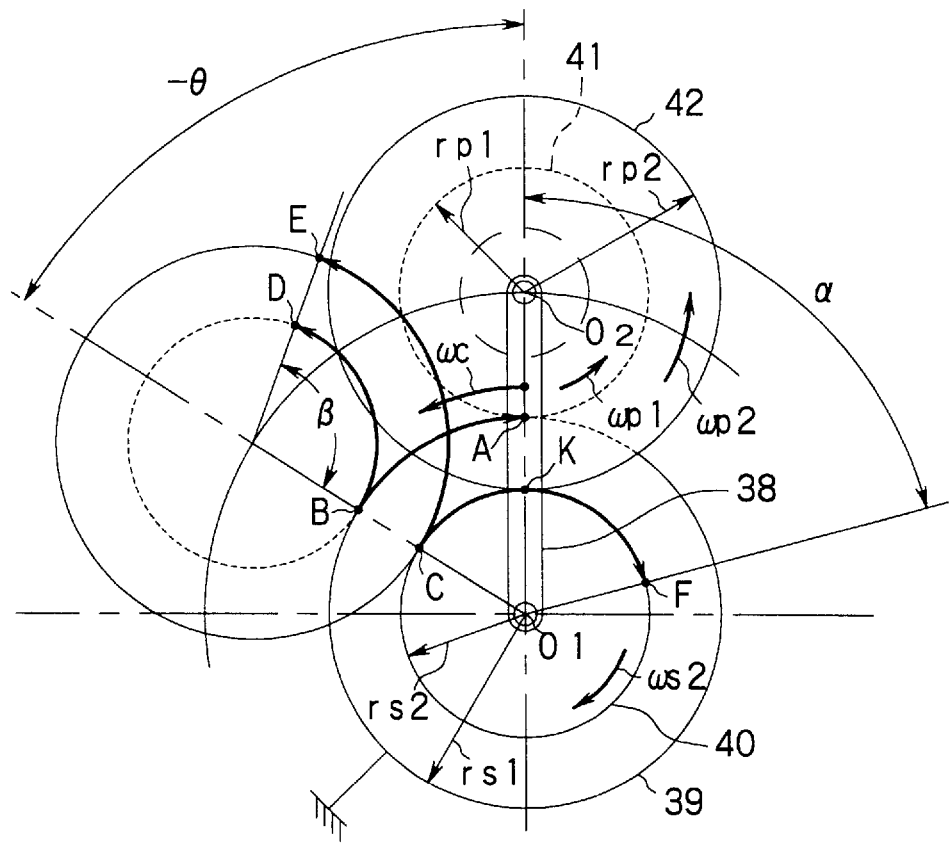
FIG. 4 is a diagrammatic view of assistance in explaining an operation of the center differential gear shown in FIG. 3 when a first sun gear included in the center differential gear is fixed.

Suppose that the first sun gear 39 is fixed as shown in FIG. 4. Then, on a circle of a radius rs2, $$(Arc\ KF) = (Arc\ CF) - (Arc\ CK) \quad (1)$$

Figure 5:
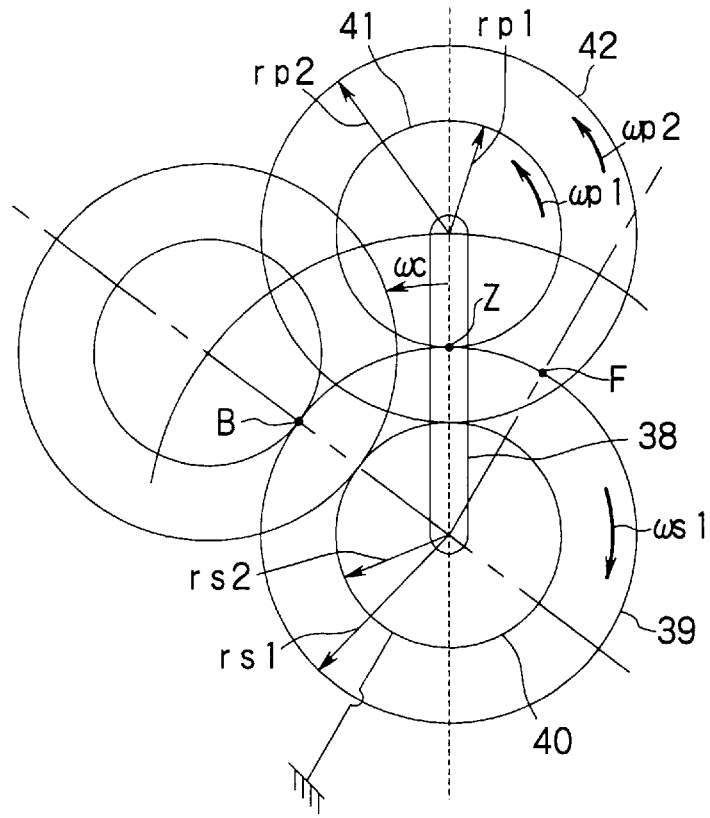
FIG. 5 is a diagrammatic view of assistance in explaining an operation of the center differential gear shown in FIG. 3 when a second sun gear included in the center differential gear is fixed.

Suppose that the second sun gear 40 is fixed as shown in FIG. 5. Then, on a circle of a radius rs1, $$(Arc\ ZF) = (Arc\ BF) - (Arc\ BZ) \quad (2)$$

Suppose that the first sun gear 39 and the second sun gear 40 rotate at angular velocities $\omega s1$ and $\omega s2$, respectively, and have working pitch circle of radii rs1 and rs2, respectively, the first pinion 41 and the second pinion 42 rotate at angular velocities $\omega p1$ and $\omega p2$, respectively, and have working pitch circles of radii rp1 and rp2, and the carrier 38 rotate at angular velocity $\omega c$. Then, from Expressions (1) and (2), $$\omega s2 \cdot rs2 = -\omega p2 \cdot rp2 + \omega c \cdot rs2 \quad (3)$$

$$\omega s1 \cdot rs1 = -\omega p1 \cdot rp1 + \omega c \cdot rs1 \quad (4)$$

The first pinion 41 and the second pinion 42 are united together and hence $\omega p1 = \omega p2$. Rearranging Expressions (3) and (4), $$\omega c(rs2 - rs1 \cdot rp2/rp1)$$

$$= \omega s2 \cdot rs2 - \omega s1 \cdot rs1 \cdot rp2/rp1 \quad (5)$$

Substituting the angular velocity $\omega s1$ of the first sun gear 39 by input rotating speed Ni, i.e., the rotating speed of the output shaft 2a of the automatic transmission 2, the angular velocity $\omega c$ of the carrier 38 by a front output rotating speed NF, the angular velocity $\omega s2$ of the second sun gear 40 by a rear output rotating speed NR, and the radii rs1, rs2, rp1 and rp2 of the working pitch circles of the first sun gear 39, the second sun gear 40, the first pinion 41 and the second pinion 42 by the numbers Zs1, Zs2, Zp1 and Zp2 of teeth of the same gears 39, 40, 41 and 42, we obtain, $$NF(Zs2-Zs1 \cdot Zp2/Zp1)$$

$$=NR \cdot Zs2-Ni \cdot Zs1 \cdot Zp2/Zp1 \qquad (5')$$

Suppose that Zp1=24, Zp2=24, Zs1=30 and Zs2=15. Then,

NR+NF=2Ni

If Ni≠0, NR>Ni>NF or NF>Ni>NR, the respective directions of rotation of the carrier 38 and the rear drive shaft 4 are the same, and the center differential gear 3 exercises a differential function.

An equal-ratio torque distribution function of the center differential gear 3 will be described with reference to FIGS. 6, 7, 8 and 9.

$$Ti=TF+TR \qquad (6)$$

$$rs1+rp1=rs2+rp2 \qquad (7)$$

where Ti is input torque to the first sun gear 39, TF is front wheel driving torque distributed to the carrier 38, TR is rear wheel driving torque distributed to the second sun gear 40, rs1, rs2, rp1 and rp2 are the radii of the working pitch circles of the first sun gear 39, the second sun gear 40, the first pinion 41 and the second pinion 42, respectively.

Tangential load P on the point of engagement of the first sun gear 39 and the first pinion 41 is equal to the sum of tangential load P1 on the carrier 38 and tangential load P2 on the point of engagement of the second sun gear 40 and the second pinion 42. Therefore, $$P=Ti/rs1$$

$$P1=TF/(rs1+rp1)$$

$$P2=TR/rs2$$

$$Ti/rs1=TF/(rs1+rp1)+TR/rs2 \qquad (8)$$

Substituting Expressions (6) and (7) into Expression (8), $$TF=Ti(1-rp1 \cdot rs2/rs1 \cdot rp2) \qquad (9)$$

$$TR=Ti(rp1 \cdot rs2/rs1 \cdot rp2) \qquad (10)$$

It is known from Expressions (9) and (10) that the magnitudes of front wheel driving torque TF and rear wheel driving torque TR, and hence the front-to-rear torque distribution ratio TF/TR can optionally be determined by selectively determining the respective radii of the working pitch circles of the first sun gear 39, the second sun gear 40, the first pinion 41 and the second pinion 42.

Substituting the radii rs1, rs2, rp1 and rp2 of the working pitch circles by the numbers Zs1=30, Zs2=15, Zp1=24 and Zp2=24 of teeth, we obtain, TF=0.5Ti TR=0.5Ti Thus, the front-to-rear torque distribution ratio is TF/TR= 50/50, and the input torque Ti is distributed equally to the front right/left driving torque distributing device 12 and the rear right/left driving torque distributing device 7.

Differential limiting function will be described hereinafter. Suppose that the first sun gear 39, the second sun gear 40, the first pinion 41 and the second pinion 42 are helical gears, the first pinion 41 and the second pinion 42 have different helix angles, respectively, and the helix angles are determined so that the first sun gear 39 and the second sun gear 40 exert thrusts on the first pinion 41 and the second pinion 42, respectively, in the same direction in parallel to the axis of the planet pin 43. Consequently, the end surface of either the first pinion 41 or the second pinion 42 is pressed against an end wall of the carrier 38 and a frictional resistance acts against the rotation of the first pinion 41 and the second pinion 42, and a composite force of a load radially acting on the first pinion 41 and the second pinion 42, and a tangential load acting on the first pinion 41 and the second pinion 42 acts on the circumference of each planet pin 43 to exert a frictional resistance against the rotation of the first pinion 41 and the second pinion 42. These frictional resistances produce a differential limiting torque proportional to the input torque Ti.

The rotating direction of the first pinion 41 and the second pinion 42 is dependent on the relation between the front output rotating speed NF and the rear output rotating speed NR, and the magnitude of the differential limiting torque varies with the variation of the rotating direction of the first pinion 41 and the second pinion 42. Accordingly, power distribution to the front wheels and the rear wheels is controlled automatically according to the magnitude of the differential limiting torque, when NF>NR, in which the vehicle is turning and the front wheels are slipping or when NF<NR, in which the rear wheels are slipping.

Figure 6:
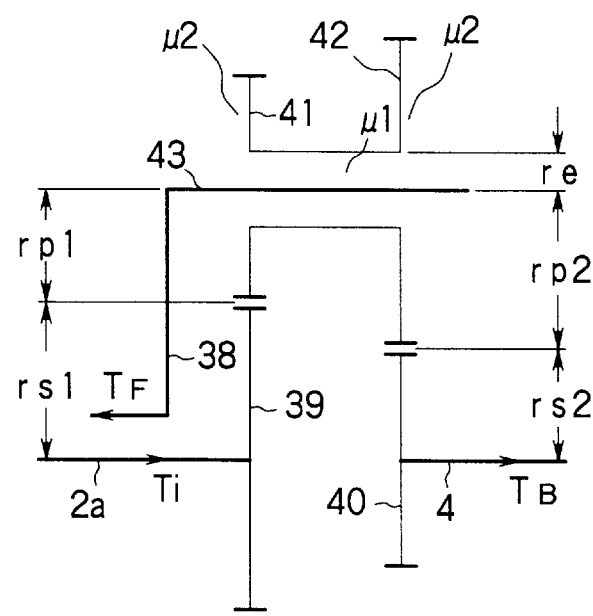
FIG. 6 is a diagrammatic view of assistance in explaining a power distributing function and a differential limiting function of the center differential gear shown in FIG. 3.
Figure 7:
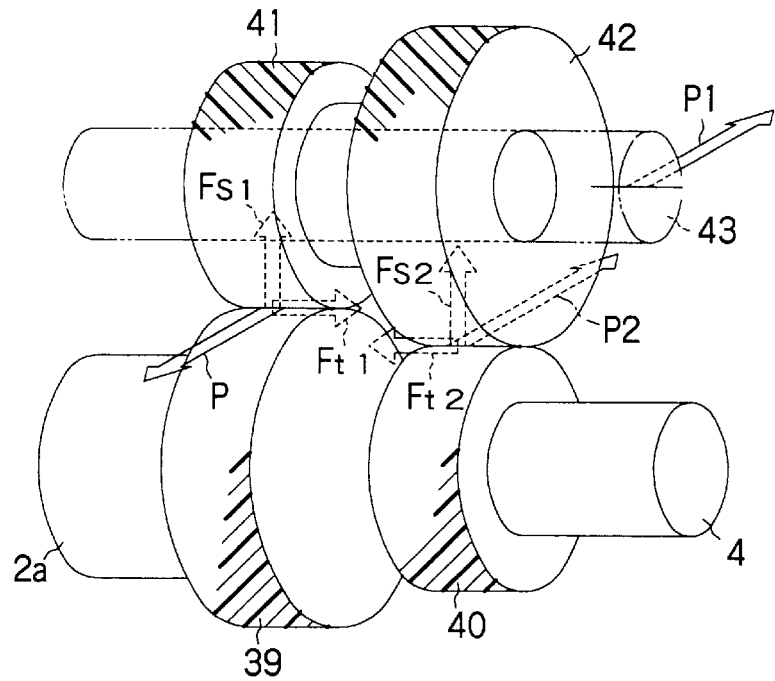
FIG. 7 is a schematic perspective view of assistance in explaining loads on gears included in the center differential gear shown in FIG. 3.
Figure 8:
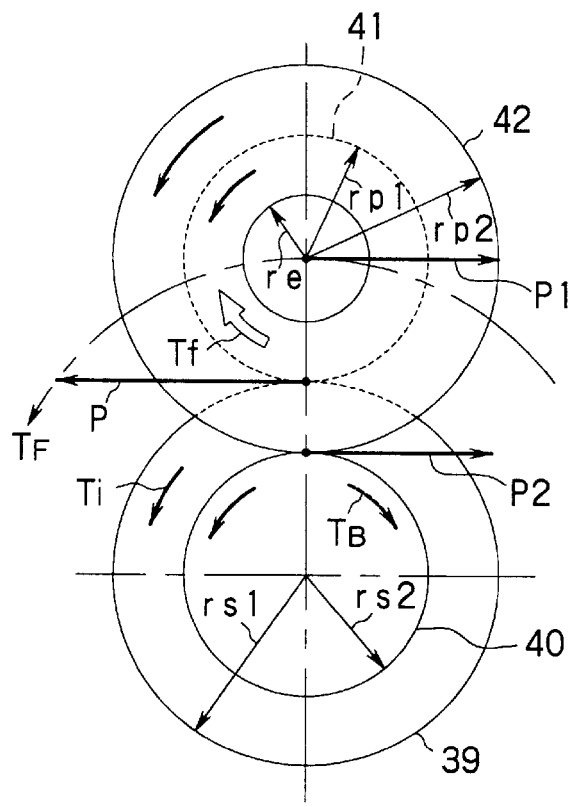
FIG. 8 is a schematic side view of assistance in explaining an operation of the center differential gear shown in FIG. 3 when the rotating speed of an element on the side of the front wheels is higher than that of an element on the side of the rear wheels.

A state where NF>NR will be described with reference to FIGS. 6, 7 and 8. If the input torque Ti turns the first sun gear 39 counterclockwise as shown in FIG. 8, the first pinion 41 and the second pinion 42 rotate in the same direction, and the second sun gear 40 and the carrier 38 rotates in the same direction. Consequently, a frictional torque Tf acts on the pinions 41 and 42 against the rotation of the pinions 41 and 42.

Suppose that the foregoing torques are effective, the sun gears 39 and 40 and the pinions 41 and 42 have working pitch circles of the foregoing radii, respectively, tangential load P acts on the tooth surfaces of the first sun gear 39 and the first pinion 41 forming the first gear train, the first pinion 41 applies radial load Fs1 to the planet pin 43, thrust Ft1 acts on the first pinion 41, tangential load P2 acts on the tooth surfaces of the second sun gear 40 and the second pinion 42 forming the second gear train, the second pinion 42 applies radial load Fs2 on the planet pin 43 and thrust Fs2 acts on the second pinion 42.

Suppose that friction coefficient between the circumference of the planet pin 43 and the pinions 41 and 42 is $\mu 1$, friction coefficient between the end surfaces of the pinions 41 and 42 and the carrier 38 is $\mu 2$, frictional torque against the rotation of the pinions 41 and 42 is Tf, the radius of the planet pin 43, i.e., the radii of the bores of the pinions 41 and 42, is Re, the radius of an end surface of the first pinion 41 or the second pinion 42 in frictional contact with the carrier 38 is rd, the number of sets each of the pinions 41 and 42 is n, the first pinion 41 has module m1, helix angle $\beta 1$ and pressure angle $\alpha 1$, and the second pinion has module m2, helix angle $\beta 2$ and pressure angle $\alpha 2$.

Then, $Fs1=P \cdot \tan \alpha 1/\cos \beta 1$ $Ft1=P \cdot \tan \beta 1$ and hence composite force Np acting on the planet pin 43 is expressed by:

$$Np1=(p^2+Fs1^2)^{1/2}$$

$$=P\{1+(\tan \alpha 1/\cos \beta 1)^2\}^{1/2} \qquad (11)$$

Similarly, $Fs2=P2 \cdot \tan \alpha 2/\cos \beta 2$ $Ft2=P2 \cdot \tan \beta 2$ and hence composite force Np2 acting on the planet pin 43 is expressed by:

$$Np2=(p2^2+Fs2^2)^{1/2}$$

$$=P2\{1+(\tan\alpha 2/\cos\beta 2)^2\}^{1/2} \tag{12}$$

Effective thrust (Ft, i.e., the sum of thrusts acting on the pinions 41 and 42, is expressed by:

$$\Delta Ft=Fs2-Ft1$$

$$=P2\cdot\tan\beta 2-P\cdot\tan\beta 1 \tag{13}$$

Accordingly, frictional torque Tf is expressed by:

$$Tf=\mu 1\cdot re\cdot(Np1+Np2)$$

$$+\Delta Ft\cdot\mu 2\cdot n\cdot\tfrac{2}{3}\cdot\{(rd^3-re^3)/(rd^2-re^2)\} \tag{14}$$

Torque balance between the first pinion 41 and the second pinion 42 is expressed by:

$$Tf+P\cdot rp1=P2\cdot rp2 \tag{15}$$

Adding the effect of frictional torque Tf to Expression (10), we obtain, $$TR=Ti(rp1\cdot rs2/rs1\cdot rp2)+Tf\cdot rs2/rp2 \tag{16}$$

When the respective radii rs1, rs2, rp1 and rp2 of the working pitch circles of the sun gears 39 and 40 and the pinions 41 and 42 in Expression (16) are substituted by the numbers Zs1=30, Zs2=15, Zp1=24 and Zp2=24 of teeth of the same gears 39, 40, 41 and 42, $$TR=0.5Ti+0.625Tf \tag{17}$$

Since Ti=TF+TR, $$TF=Ti(1-rp1\cdot rs2/rs1\cdot rp2)-Ti\cdot rs2/rp2 \tag{18}$$

When the respective radii rs1, rs2, rp1 and rp2 of the working pitch circles of the sun gears 39 and 40 and the pinions 41 and 42 in Expression (18) are substituted by the numbers Zs1=30, Zs2=15, Zp1=24 and Zp2=24 of teeth of the same gears 39, 40, 41 and 42, $$TF=0.5Ti-0.625Tf \tag{19}$$

If $\mu 1=0$ and $\mu 2=0$, Tf=0 and TF=TR=0.5Ti, which is the same torque distribution as equal-ratio torque distribution in the reference front-to-rear torque distribution ratio of 50:50.

Under this condition, differential limiting torque Tf(rs2/rp2) proportional to the frictional torque Tf is generated. The front-to-rear torque distribution ratio, i.e., TF/TR, is changed so that the rear wheel driving torque TR is greater than the front wheel driving torque TF by an amount corresponding to the differential limiting torque. The composite forces Np1 and Np2 which produces the frictional torque Tf, and the effective thrust ΔFt are proportional to the input torque Ti. Therefore, the center differential gear 3 has an input-torque-proportional differential limiting function.

The effective thrust ΔFt is dependent on the difference between the respective helix angles β1 and β2 of the first pinion 41 and the second pinion 42. The friction coefficient $\mu 1$ can be changed by using needle bearings or bushings for supporting the pinions 41 and 42 on the planet pin 43. Thus, the differential limiting torque, as well as the frictional torque Tf, can be selectively determined.

Figure 9:
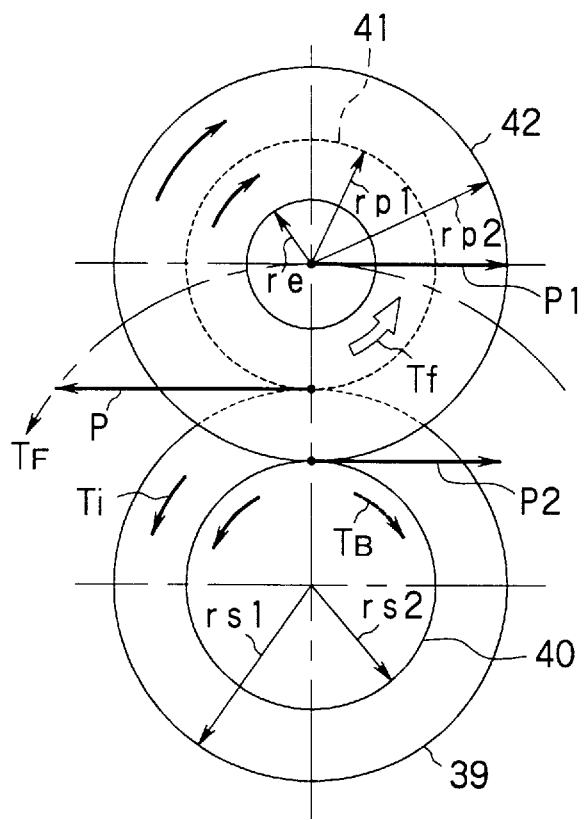
FIG. 9 is schematic side view of assistance in explaining an operation of the center differential gear shown in FIG. 3 when the rotating speed of the element on the side of the front wheels is lower than that of the element on the side of the rear wheels.

A state where NR>NF will be described hereinafter. Referring to FIG. 9, the first sun gear 39 rotates counterclockwise, the first pinion 41 and the second pinion 42 rotate clockwise as they revolve around the sun gears 39 and 40, and frictional torque Tf acts counterclockwise on the pinions 41 and 42. Therefore, torque balance with respect to the first pinion 41 and the second pinion 42 is expressed by:

$$Tf+P2\cdot rs2=P\cdot rp1 \tag{20}$$

Therefore, front wheel driving torque TF and rear wheel driving torque TR are expressed by:

$$TF=Ti(1\cdot rp1\cdot rs2/rs1\cdot rs2)+Tf\cdot rs2/rp2 \tag{21}$$

$$TF=0.5Ti+0.625Tf \tag{22}$$

$$TR=Ti(rp1rs2/rs1\cdot rs2)-Tf\cdot rs2/rp2 \tag{23}$$

$$TR=0.5Ti-0.625Tf \tag{24}$$

Under this condition, the differential limiting torque is equal to Tf(rs2/rp2). The front-to-rear torque distribution ratio, i.e., TF/TR, is changed so that the rear wheel driving torque TR is smaller than the front wheel driving torque TF by an amount corresponding to the differential limiting torque.

Figure 2:
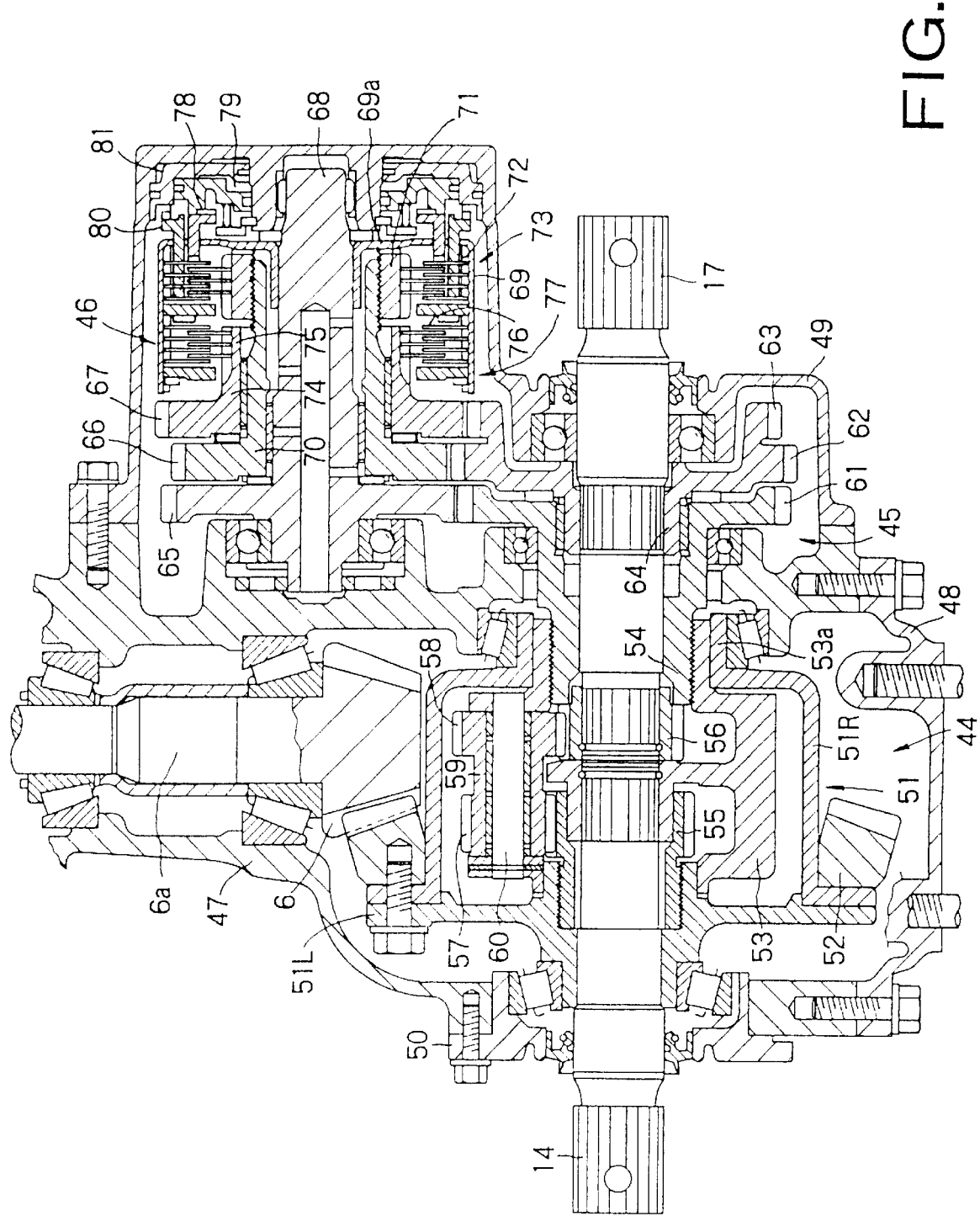
FIG. 2 is an enlarged sectional view of a rear right/left driving force distributing device included in the power transmission system shown in FIG. 1.

The rear right/left driving torque distributing device 7 will be described in detail with reference to FIG. 2.

The rear right/left driving torque distributing device 7 comprises, as principal units, a differential limiting mechanism 44, a gear mechanism 45, and a clutch mechanism 46. The drive pinion 6 for driving the rear right/left driving torque distributing device 7, and the differential limiting mechanism 44 are contained in a differential gear case 47. The clutch mechanism 46 is combined with the gear mechanism 45 joined to a side surface of the differential gear case 47. A cover 48 is attached to the rear end of the differential gear case 47, and the gear mechanism 45 and the clutch mechanism 46 are covered with a cover 49.

A shaft 6a formed integrally with the drive pinion 6 is connected to the propeller shaft 5 and is supported in bearings for rotation on the differential gear case 47.

First, the differential limiting mechanism 44 will be described.

The left drive shaft 14 is extended rotatably through a left side retainer 50 attached to the differential gear case 47, and the right drive shaft 17 is extended rotatably and coaxially with the left drive shaft 14 through a right portion of the differential gear case 47.

A left differential gear case 51L is mounted rotatably on the left drive shaft 14, and the left drive shaft 14 and the left differential gear case 51L are supported for rotation in a bearing on the left side retainer 50.

A right differential gear case 51R and a crown gear 52 engaged with the drive pinion 6 coaxially combined with each other are fixedly joined to the left differential gear case 51L. A right portion of the right differential gear case 51R is put rotatably on a cylindrical boss 53a formed on the right side wall of a carrier 53 and is supported in bearings on the differential gear case 47.

A shaft 54 formed integrally with a first gear 61 included in the gear mechanism 45 is inserted in and splined to the cylindrical boss 53a of the carrier 53. The right drive shaft 17 is fitted rotatably in the bore of the shaft 54.

The right differential gear case 51R, the joint of the carrier 53 and the shaft 54, and the right drive shaft 17 are supported rotatably on the differential gear case 47. A differential gear case 51 consisting of the left differential gear case 51L and the right differential gear case 51R, and fixedly holding the crown gear 52 is supported for rotation within the differential gear case 47.

The carrier 53 is rotatably supported in the differential gear case 51, the left drive shaft 14 and the right drive shaft 17 are inserted in the carrier 53, and the carrier 53 is coupled with the inner end of the left drive shaft 14 by splines.

In the differential gear case 51, a first sun gear 55 of a relatively great diameter is splined to a portion of the left differential gear case 51L in which the left drive shaft 14 is inserted, a second sun gear 56 of a relatively small diameter is splined to an inner end portion of the right drive shaft 17, a first pinion 57 of a relatively small diameter is engaged with the first sun gear 55 to form a first gear train, and a second pinion 58 of a relatively large diameter is engaged with the second sun bear 56 to form a second gear train.

The first pinion 57 and the second pinion 58 are combined integrally in a compound pinion member 59. A plurality of compound pinion members 59, for example, three compound pinion members 59, the same as the compound pinion member 59 are supported by bearings on planet pins 60 fixed to the carrier 53, respectively. Thrust washers are inserted between the opposite ends of each compound pinion member 59 and the side walls of the carrier 53, respectively, to bear thrusts.

The differential limiting mechanism 44 is a compound planetary gear type differential limiting mechanism which transmits a driving torque applied to the drive pinion 6 through the crown gear 52 and the differential gear case 51 to the first sun gear 55, from the first sun gear 55 through the second sun gear 55 to the right drive shaft 17, and from the first sun gear 55 through the carrier 53 to the left drive shaft 14.

The differential limiting mechanism 44, i.e., the compound planetary gear type differential limiting device, has a differential function effectuated by properly determining the numbers of teeth of the first sun gear 55, the second sun gear 56, and the first pinion 57 and the second pinion 58 of each of the plurality of compound pinion members 59 arranged around the sun gears 55 and 56.

The differential limiting mechanism 44 is provided with an equal-ratio torque distributing function to distribute equal torques to the right and the left wheel in a reference right-to-left torque distribution ratio of 50:50 by properly determining the respective radii of the working pitch circles of the sun gears 55 and 56 and the pinions 57 and 58.

The differential limiting mechanism 44 has a differential limiting function using, for example, helical gears of a helix angle as the first sun gear 55 and the first pinion 57 forming the first gear train, and helical gears of another helix angle as the second sun gear 56 and the second pinion 58 forming the second gear train so that a thrust acting on the first pinion 57 and a thrust acting on the second pinion 58 may not cancel each other, an effective thrust acts on each compound pinion member 59 to apply a frictional resistance to the end surface of either the first pinion 57 or the second pinion 58 of each compound pinion member 59, and applying a composite force of a load radially acting on the first pinion 57 and the second pinion 58 and a tangential load acting on the first pinion 57 and the second pinion 58 to the circumference of each planet pin 60 so that a frictional resistance acts against the rotation of the first pinion 57 and the second pinion 58. The differential limiting function provides a differential limiting torque proportional to an input torque to the differential limiting mechanism 44.

The construction and functions of the differential limiting mechanism 44 are substantially the same as those of the center differential gear 3 and hence the further description thereof will be omitted.

The gear mechanism 45 will be described hereinafter.

The first shaft 54 projects outside from the differential gear case 47 and is supported for rotation in a bearing on the differential gear case 47. A first gear 61, i.e., a reference clutch gear, is formed at an outer end of the first shaft 54.

A second gear 62 and a third gear 63 are formed integrally with a shaft 64, the shaft 64 is mounted on the right drive shaft 17 so that the second gear 62 and the third gear 63 are on the outer side, i.e., on the right-hand side, of the first gear 61, and the shaft 64 is coupled with the right drive shaft 17 by splines. The first gear 61, the second gear 62 and the third gear 63 are coaxial with each other. A fourth gear 65, a fifth gear 66 and a sixth gear 67, which are coaxial with each other, are engaged with the first gear 61, the second gear 62 and the third gear 63, respectively.

The gear mechanism 45 has a first gear train consisting of the first gear 61 and the fourth gear 65, a second gear train consisting of the second gear 62 and the fifth gear 66, and a third gear train consisting of the third gear 63 and the sixth gear 67.

The gear ratios of the first, the second and the third gear train are $z4/z1=0.9/1$, $z5/z2=0.9 \cdot 0.9/1$ and $z6/z3=1/1$, respectively, in which $z1$, $z2$, $z3$, $z4$, $z5$ and $z6$ are the numbers of teeth of the first gear 61, the second gear 62, the third gear 63, the fourth gear 65, the fifth gear 66 and the sixth gear 67, respectively. The gear ratios in decreasing order are 1/1 (the gear ratio of the third gear train), 0.9/1 (the gear ratio of the first gear train) and $0.9 \cdot 0.9/1$ (the gear ratio of the second gear train), and the step ratios between the gear ratios of the first gear train and the third gear train and between the second gear train and the first gear train are 0.9. The step ratios need not necessarily be 0.9.

The fourth gear 65, i.e., a first clutch gear, is formed integrally with a fourth shaft 68 at one end of the latter. The fourth shaft 68 has one end, i.e., the inner end, supported in a bearing on an outer surface of the differential gear case 47, and the other end, i.e., the outer end, rotatably supported on the cover 49. A cylindrical clutch drum 69 opening toward the fourth gear 65 is fixedly mounted on the outer end of the fourth shaft 68.

The fifth gear 66, i.e., a second clutch gear, is formed integrally with a fifth shaft 70 at an one end, i.e., the inner end, of the latter. The fifth shaft 70 is put on the fourth shaft 68 and extends to the bottom wall 69a of the clutch drum 69. A clutch hub 71 of a predetermined length is mounted on the other end, i.e., the outer end, of the fifth shaft 70. A plurality of friction disks 72 are mounted alternately on the clutch drum 69 and the clutch hub 71 to form a first hydraulic multiple-disk clutch 73.

The sixth gear 67, i.e., a third clutch gear, is formed integrally with a sixth shaft 74 at an one end, i.e., the inner end, of the latter. The sixth shaft 74 is put on the fifth shaft 70 and extends to the inner side surface of the innermost friction disk 72 of the first hydraulic multiple-disk clutch 73. A clutch hub 75 of a predetermined length is formed at the other end, i.e., the outer end, of the sixth shaft 74. A plurality of friction disks 76 are mounted alternately on the clutch drum 69 and the clutch hub 75 to form a second hydraulic multiple-disk clutch 77.

The first hydraulic multiple-disk clutch 73 is engaged and disengaged by operating a first piston 78 extended through the bottom wall 69a of the clutch drum 69 and fitted in a first pressure chamber 79. A working fluid of a variable pressure controlled by the right/left driving torque distribution controller 32 is supplied into the first pressure chamber 79 through the first fluid pipe 36a to operate the first piston 78.

Similarly, the second hydraulic multiple-disk clutch 77 is engaged and disengaged by operating a second piston 80 extended through the bottom wall 69a of the clutch drum 69 and fitted in a second pressure chamber 81. A working fluid of a variable pressure controlled by the right/left driving torque distribution controller 32 is supplied into the second pressure chamber 81 through the second fluid pipe 36b to operate the second piston 80.

The hydraulic multiple-disk clutches 73 and 77 are combined to construct the clutch mechanism 46. Since the gear mechanism 45 has the gear trains of the foregoing gear ratios, a major part of the driving torque is distributed to the left drive shaft 14 connected to the carrier 53 when the first hydraulic multiple-disk clutch 73 is engaged, and a major part of the driving torque is distributed to the right drive shaft 17 when the second hydraulic multiple-disk clutch 77 is engaged. The pressures of the working fluid for engaging the hydraulic multiple-disk clutches 73 and 77 are calculated by the right/left driving power distribution controller 32. The torque distribution ratio in which the driving torque is distributed to the left drive shaft 14 and the right drive shaft 17 is controlled by varying the pressure of the working fluid.

A driving torque distributing operation to be carried out by the cooperative actions of the gear mechanism 45 and the clutch mechanism 46 will be described. Suppose that a major part of the driving torque is to be distributed to the right drive shaft 17 with an intention to improve the left-turning performance of the vehicle. The following expression is valid with the second hydraulic multiple-disk clutch 77.

$$T1d(z4/z1)=Tk2 \qquad (25)$$

where Tad is driving torque transmitted from the carrier 53 to the first gear train, Tk2 is the output torque of the second hydraulic multiple-disk clutch 77 dependent on the pressure applied to the second pressure chamber 81, the coefficient of dynamic friction between the friction surfaces of the friction disks of the second hydraulic multiple-disk clutch 77 dependent on the relative rotating speed of the friction surfaces, i.e., the rotating speed of one of the adjacent friction surfaces relative to the other, the number of the friction surfaces equal to twice the number of the friction disks, and the effective radius of the friction disks.

The output torque Tk2 of the second hydraulic multiple-disk clutch 77 is transmitted through the third gear train to the right drive shaft 17. Therefore, a right wheel driving torque and a left wheel drive force are expressed by:

$$\text{Right wheel driving torque}=Tr+Tk2(z3/z6) \qquad (26)$$

$$\text{Left wheel driving torque}=T1-T1d=T1-Tk2\cdot(z1/z4) \qquad (27)$$

where Tr is the driving torque of the second sun gear 56 and T1 is the driving torque of the carrier 53.

Since the gear ratio z4/z1=0.9, and the gear ratio z6/z3=1/1,

Right wheel driving torque=Tr+Tk2
Left wheel driving torque=Ti−(Tk2/0.9)

Suppose that a major part of the driving torque is to be distributed to the left drive shaft 14 with an intention to improve the right-turning performance of the vehicle. The following expression is valid with the first hydraulic multiple-disk clutch 73.

$$Trd(z5/z2)=Tk1 \qquad (28)$$

where Trd is driving torque transmitted from the second sun gear 56 to the second gear train, and Tk1 is the output torque of the first hydraulic multiple-disk clutch 73 dependent on the pressure applied to the first pressure chamber 79, the coefficient of dynamic friction between the friction surfaces of the friction disks of the first hydraulic multiple-disk clutch 73 dependent on the relative rotating speed of the friction surfaces, i.e., the rotating speed of one of the adjacent friction surfaces relative to the other, the number of the friction surfaces equal to twice the number of the friction disks, and the effective radius of the friction disks.

The output torque Tk1 of the first hydraulic multiple-disk clutch 73 is transmitted through the first gear train. Therefore, driving torques distributed to the right wheel and the left wheel are expressed by:

$$\text{Left wheel driving torque}=T1+Tk1(z1/z4) \qquad (29)$$

$$\text{Right wheel driving torque}=Tr-Trd=Tr-Tk1(z2/z5) \qquad (30)$$

Since z4/z1=0.9 and z5/z2=0.9·0.9,
Left wheel driving torque=T1+Tk1
Right wheel driving torque=Tr−(Tk1/0.9·0.9)

The two hydraulic multiple-disk clutches 73 and 77 of the clutch mechanism 46 may be substituted by electromagnetic clutches or variable-capacity couplings. The respective torque transmission capacities of the hydraulic multiple-disk clutches 73 and 77 may be different from each other according to the gear ratios or the hydraulic multiple-disk clutches 73 and 77 may be different in size from each other.

The front right/left driving torque distributing device 12 receives a driving torque through the front drive shaft 10, a drive pinion 11 and a crown gear 52. The front right/left driving torque distributing device 12 is substantially the same in construction as the rear right/left driving torque distributing device 7 and hence the description thereof will be omitted.

Figure 10:
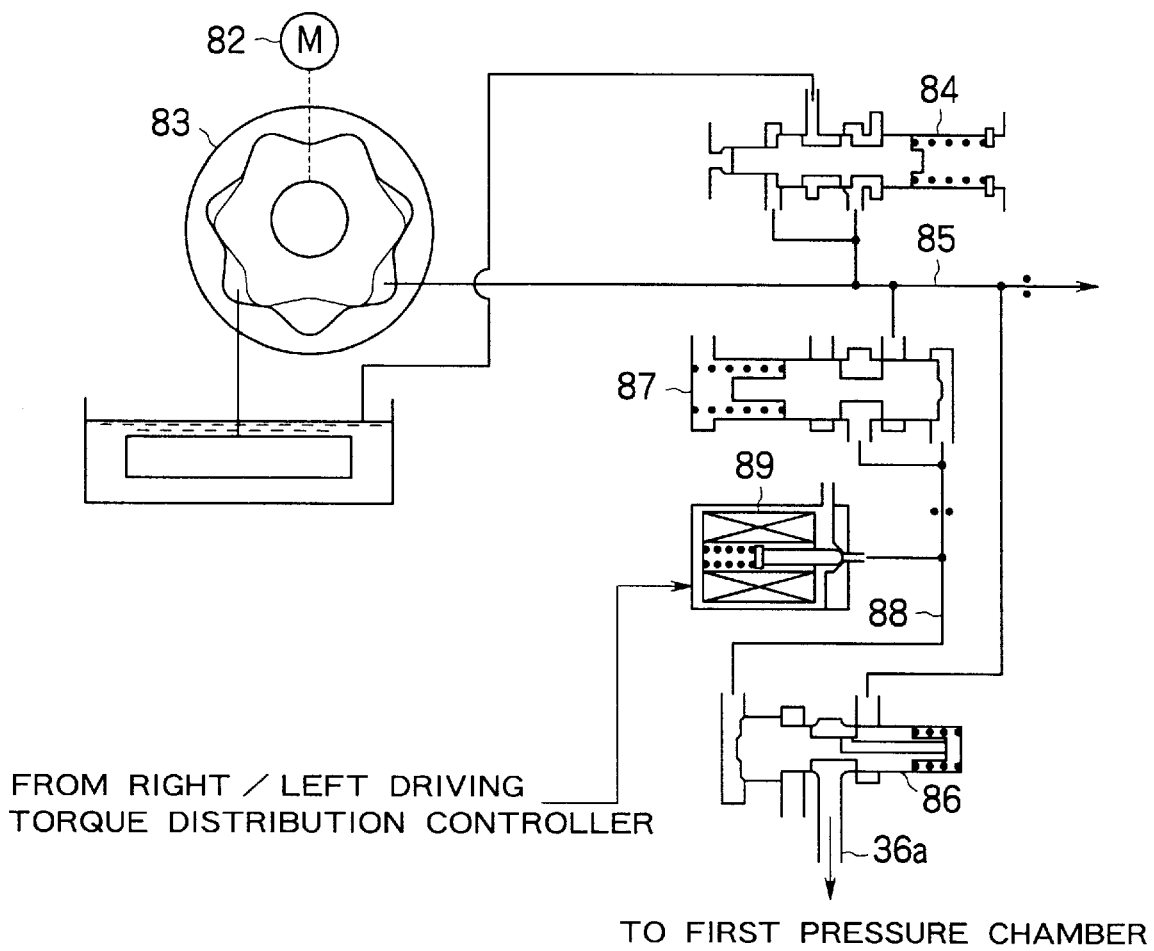
FIG. 10 is a typical view of a hydraulic control system shown in FIG. 1.

The rear fluid pressure controller 34 and the front fluid pressure controller 35 will be described with reference to FIG. 10. The rear fluid pressure controller 34 has a first hydraulic circuit for applying a control pressure through the first fluid pipe 36a to the first pressure chamber 79, and a second hydraulic circuit for applying a control pressure through the second fluid pipe 36b to the second pressure chamber 81. The front fluid pressure controller 35 is substantially the same in construction as the rear fluid pressure controller 34 and hence only the first hydraulic circuit of the rear fluid pressure controller 34, for applying a control pressure through the first fluid pipe 36a to the first pressure chamber 79 will be described.

The discharge pressure of an oil pump 83 driven by a motor 82 is controlled by a pressure regulator valve 84 to supply the working fluid at a predetermined line pressure and a lubricating pressure. A passage 85 for transmitting the working fluid is connected through a clutch control valve 86 and the first fluid pipe 36a to the first pressure chamber 79 of the first hydraulic multiple-disk clutch 73.

The passage 85 is connected through a pilot valve 87 and a passage 88 to a duty solenoid valve 89 and the control unit of the clutch control valve 86.

The right/left driving power distribution controller 32 gives a duty signal to the duty solenoid valve 89 to make the duty solenoid valve 89 produce a duty pressure. The clutch control valve 86 is operated by the duty pressure to control the working pressure of the first hydraulic multiple-disk clutch 73.

Figure 11:
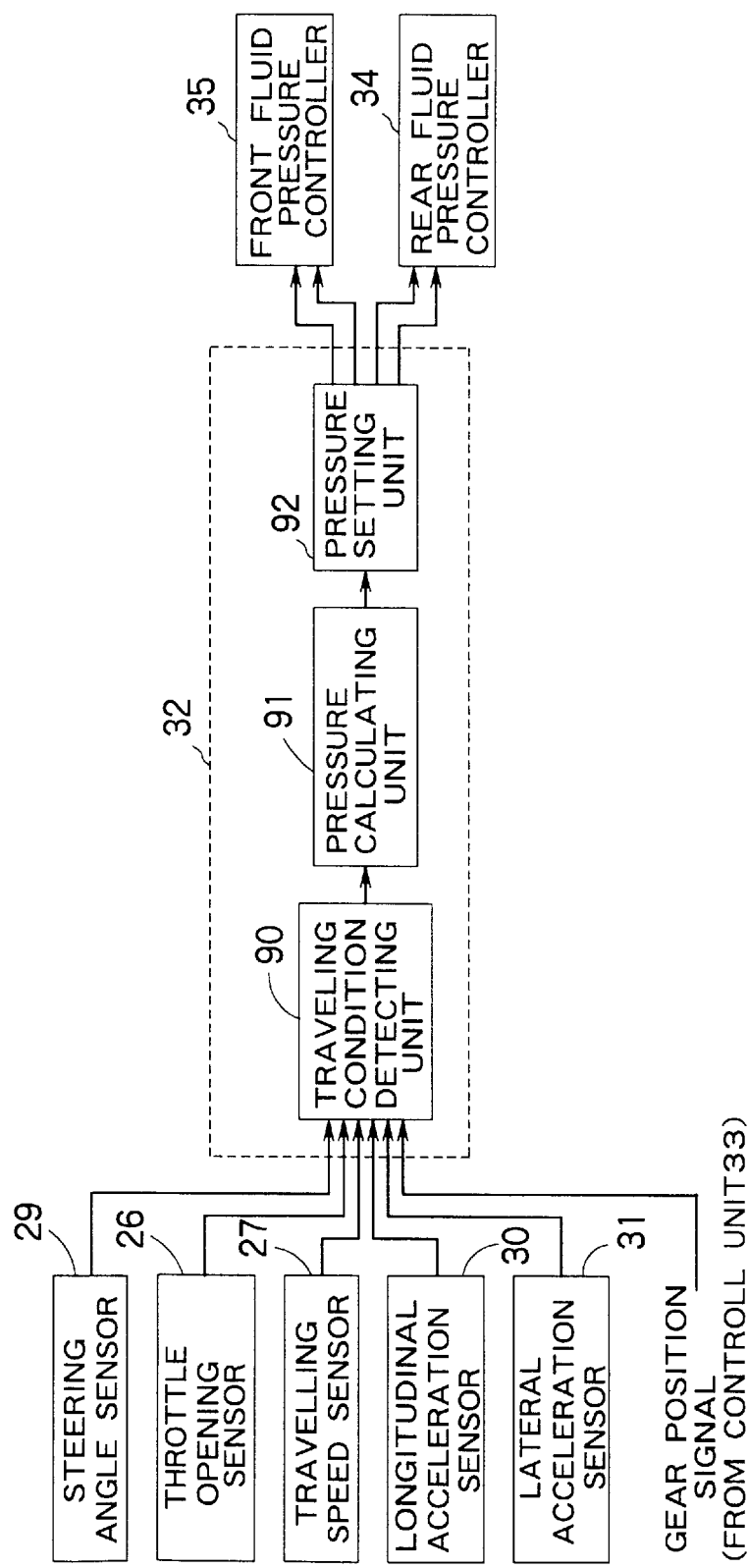
FIG. 11 is block diagram of a right/left driving torque distribution control system included in the right/left driving torque distributing device of the present invention.

As shown in FIG. 11, the right/left driving power distribution controller 32 comprises, as principal components, a traveling condition detecting unit 90, a pressure calculating unit 91 and a pressure setting unit 92. The right/left driving torque distribution controller 32 calculates an optimum driving torque distribution ratio in which the driving torque is to be distributed to the right and the left wheel on the basis of data indicating the surface condition of the road and the traveling condition of the vehicle, and gives control signals to the rear fluid pressure controller 34 and the front fluid pressure controller 35.

The traveling condition detecting unit 90 receives the output signals of the throttle opening sensor 26, the traveling speed sensor 27, the steering angle sensor 29, the longitudinal acceleration sensor 30 and the lateral acceleration sensor 31, and a gear ratio signal, determines the surface condition of the road, i.e., whether or not the road is slippery, and the traveling condition of the vehicle, i.e., high-speed traveling or low-speed traveling, traveling along a sharp curve or a gentle curve, high-load traveling or low-load traveling, whether or not the vehicle is being accelerated and whether or not the vehicle is slipping, by using maps stored beforehand in a storage device and formulas, and gives a control signal to the pressure calculating unit 91.

The pressure calculating unit 91 selects either the first hydraulic multiple-disk clutch 73 or the second hydraulic multiple-disk clutch 77 and calculates a pressure to be applied to the selected hydraulic multiple-disk clutch 73 or 77 on the basis of the signal received from the traveling condition detecting unit 90 by using maps stored beforehand in a storage device, and formulas and gives signals indicating the selected hydraulic multiple-disk clutch 73 or 77 and the results of calculation to the pressure setting unit 92.

The pressure setting unit 92 generates control signals on the basis of the signals received from the pressure calculating unit 91 and gives the control signals to the rear fluid pressure controller 34 and the front fluid pressure controller 35.

The output driving torque of the engine 1 is transmitted through the output shaft 2a of the automatic transmission 2 to the first sun gear 39 of the center differential gear 3.

The driving torque transmitted from the first sun gear 39 through the first pinion 41 to the second pinion 42 is distributed to the second sun gear 40 and the carrier 38 supporting the first pinion 41 and the second pinion 42. A driving torque distributed to the second sun gear 40 is transmitted through the rear drive shaft 4 to the rear right/left driving power distributing device 7, and a driving torque distributed to the carrier 38 is transmitted through the transfer drive gear 8, the transfer driven gear 9 and the front drive shaft 10 to the front right/left driving torque distributing device 12.

When the vehicle is traveling straight, i.e., NF=NR, the second sun gear 40 and the carrier 38 of the center differential gear 3 rotate in the same direction at the same rotating speed, and the first pinions 41 and the second pinions 42 do not make any planetary motion and revolve together with the carrier 38.

Since the first pinion 41 and the second pinion 42 revolve together with the carrier 38, any frictional torque does not act on either of the first pinion 41 and the second pinion 42. Consequently, the input torque Ti applied to the first sun gear 39 is distributed in an equal front-to-rear torque distribution ratio of 50:50 so that the front wheel driving torque TF, i.e., the torque of the carrier 38, is equal to the rear wheel driving torque TR, i.e., the torque of the second sun gear 40, if the gear geometry of the gears is determined so as to establish equal torque distribution or the input torque Ti is distributed in an unequal front-to-rear torque distribution ratio so that the front wheel driving torque TF and the rear wheel driving torque TR are unequal to each other if the gear geometry of the gears is determined so as to establish unequal torque distribution dependent on the gear geometry.

When the vehicle is turning with the front output rotating speed higher than the rear output rotating speed, i.e., NF>NR, or the front wheels slipping, the first pinions 41 and the second pinions 42 of the center differential gear 3 make a planetary motion for a differential motion. Consequently, the difference in rotating speed between the front wheels and the rear wheels during the turning of the vehicle is absorbed and the vehicle is able to turn smoothly.

As the first pinions 41 and the second pinion 42 make a planetary motion, a thrust acts on each set of the first pinion 41 and the second pinion 42 due to the difference in helix angle between the first pinion 41 and the second pinion 42, a frictional resistance acts on the end surface of either the first pinion 41 or the second pinion 42, and a composite force of a load radially acting on the first pinion 41 and the second pinion 42, and a tangential load acting on the first pinion 41 and the second pinion 42 acts on the circumference of each planet pin 43 to exert a frictional resistance against the rotation of the first pinion 41 and the second pinion 42. These frictional resistances produce a differential limiting torque.

Under such a condition, the differential limiting torque retards the rotation of the carrier 38, so that a major part of the input torque is distributed to the rear right/left driving torque distributing device 7. Consequently, the steering nature and the controllability of the vehicle during turning are improved, and the slip of the front wheels during straight traveling can be prevented.

When the rear wheels slip and NR>NF, the first pinions 41 and the second pinions 42 of the center differential gear 3 make a planetary motion due to the difference in rotating speed between the front wheels and the rear wheels, so that a frictional resistance is produced.

Under such a condition, a differential limiting torque promotes the rotation of the carrier 38, so that a major part of the input torque is distributed to the front right/left driving torque distributing device 12, so that the slip of the rear wheels is prevented.

Since the differential limiting torque of the center differential gear 3 is proportional to the input torque Ti, the differential limiting torque is proportional to the torques of the front and the rear wheels, and the differential limiting function is exercised always at fixed rate.

The driving torque distributed by the center differential gear 3 to the rear right/left driving torque distributing device 7 is transmitted through the propeller shaft 5 and the drive pinion 6 to the rear right/left driving torque distributing device 7, and the driving torque is transmitted through the crown gear 52 to the differential gear case 51.

The operation of the differential limiting mechanism 44 will be described hereafter. The driving torque applied to the differential gear case 51 rotates the first sun gear 55. Then, the driving torque is distributed through the first pinions 57 and the second pinions 58 to the second sun gear 56 and the carrier 53 supporting the first pinions 57 and the second pinions 58. The driving torque transmitted to the second sun gear 56 is transferred through the right drive shaft 17 to the rear right wheel 19. The driving torque transmitted to the carrier 53 is transferred through the left drive shaft 14 to the rear left wheel 16.

While the vehicle is traveling straight and the rotating speed NR of the rear right wheel 19 is equal to the rotating speed NL of the rear left wheel 16, the second sun gear 56 and the carrier 53 rotate in the same direction at the same rotating speed, and the first pinions 57 and the second pinions 58 do not make any planetary motion and revolve together with the carrier 53.

Since the first pinion 57 and the second pinion 58 revolve together with the carrier 53, any frictional torque does not act on either of the first pinion 57 and the second pinion 58. Consequently, the input torque applied to the first sun gear 55 is distributed in an equal right-to-left torque distribution ratio of 50:50 so that the right wheel driving torque, i.e., the torque of the second sun gear 56, is equal to the left wheel driving torque, i.e., the torque of the carrier 53, if the gear geometry of the gears is determined so as to establish equal torque distribution.

When the rear left wheel 16 is slipping and NL>NR, the first pinions 57 and the second pinions 58 make a planetary motion for a differential motion. Consequently, the difference in rotating speed between the rear right wheel 19 and the left rear wheel 16 during the turning of the vehicle is absorbed and the vehicle is able to turn smoothly.

As the first pinions 57 and the second pinions 58 make a planetary motion, a thrust acts on each set of the first pinion 57 and the second pinion 58 due to the difference in helix angle between the first pinion 57 and the second pinion 58, a frictional resistance acts on the end surface of either the first pinion 57 or the second pinion 58, and a composite force of a load radially acting on the first pinion 57 and the second pinion 58, and a tangential load acting on the first pinion 57 and the second pinion 58 acts on the circumference of each planet pin 60 to exert a frictional resistance against the rotation of the first pinion 57 and the second pinion 58. These frictional resistances produce a differential limiting torque.

Under such a condition, the differential limiting torque retards the rotation of the carrier 53, so that the ratio of the torque distributed to the rear right wheel 19 is increased and a major part of the input torque is distributed to the rear right wheel 19. Consequently, the slip of the rear left wheel 16 during straight traveling is prevented.

When the rear right wheel 19 slips and NR>NL, the first pinions 57 and the second pinions 58 make a planetary motion due to the difference in rotating speed between the rear right wheel 19 and the rear left wheel 16, so that a frictional resistance is produced.

Under such a condition, a differential limiting torque promotes the rotation of the carrier 53, so that the ratio of the torque distributed to the rear left wheel 19 is increased and a major part of the input torque is distributed to the rear left wheel 16. Consequently, the slip of the rear right wheel 19 is prevented.

Since the differential limiting torque of the differential gear mechanism of the rear right/left driving torque distributing device 7 is proportional to the input torque, the differential limiting torque is proportional to the torques of the rear right and the rear left wheel 16, and the differential limiting function is exercised always at a fixed rate.

The operation of the gear mechanism 45 and the clutch mechanism 46 will be described hereinafter. When the carrier 53, i.e., an output member for the left wheel, rotates, the first gear 61 formed integrally with the first shaft 54 integrally formed with the carrier 53 rotates. The fourth gear 65 is driven for rotation by the first gear 61, and the fourth shaft 68 and the clutch drum 69 rotate.

As the right drive shaft 17 rotates, the shaft 64 provided with the second gear 62 and the third gear 63 rotates. The second gear 62 drives the fifth gear 66 for rotation, so that the fifth shaft 70 and the clutch hub 71 rotate. The third gear 63 drives the sixth gear 67 for rotation, so that the sixth shaft 74 and the clutch hub 75 rotate.

In the rear fluid pressure controller 34, the motor 82 drives the oil pump 83, and the working fluid of a pressure regulated by the pressure regulator valve 84 is supplied to the duty solenoid valve 89 and the clutch control valve 86.

In the right/left driving torque distribution controller 32, the output signals of the throttle opening sensor 26, the traveling speed sensor 27, the steering angle sensor 29, the longitudinal acceleration sensor 30 and the lateral acceleration sensor 31, and the gear position signal are processed to calculate optimum driving torques to be distributed to the front right wheel 23, the front left wheel 21, the rear right wheel 19 and the rear left wheel 16.

When distributing a major part of the driving torque to the rear left wheel 16 while the vehicle is making a right turn, the right/left driving torque distribution controller 32 gives a signal requesting the supply of the working fluid of a set pressure determined by calculation to the first pressure chamber 79 to the rear fluid pressure controller 34.

Then, the working fluid of the set pressure is supplied through the fluid pipe 36a to the first pressure chamber 79, the first piston 78 is actuated to compress the friction disks of the first hydraulic multiple-disk clutch 73 at a set pressure. Consequently, the driving torque of the right drive shaft 17 is distributed through the second gear 62, the first hydraulic multiple-disk clutch 73 and the carrier 53 to the left drive shaft 14. When distributing a major part of the driving torque to the rear right wheel 19 while the vehicle is making a left turn, the right/left driving torque distribution controller 32 gives a signal requesting the supply of the working fluid of a set pressure determined by calculation to the second pressure chamber 81. Then, the working fluid of the set pressure is supplied through the fluid pipe 36b to the second pressure chamber 81, the second piston 80 is actuated to compress the friction disks of the second hydraulic multiple-disk clutch 77 at a set pressure. Consequently, the driving torque of the carrier 53 is distributed through the second hydraulic multiple-disk clutch 77 and the third gear 63 to the right drive shaft 17.

The driving torque distributed to the front right/left driving torque distributing device 12 by the center differential gear 3 is transmitted through the front drive shaft 10 and the drive pinion 11 to the front right/left driving torque distributing device 12. The driving torque is transmitted through the crown gear 52 to the differential gear case 51.

The front right/left driving torque distributing device 12, similarly to the rear right/left driving torque distributing device 7, exercises a differential function for the front wheels 21 and 23. When distributing a major part of the driving torque to the front left wheel 21 while the vehicle is making a right turn, the front fluid pressure controller 35 supplies the working fluid of a set pressure determined by calculation through the fluid pipe 37a to the first pressure chamber 79. When distributing a major part of the driving torque to the front right wheel 23 while the vehicle is making a left turn, the working fluid of a set pressure is supplied through the fluid pipe 37b to the second pressure chamber 81.

The right/left driving torque distributing device in the first embodiment has a relatively small lateral size, the universal joints joining the right and the left wheel to the right and the left axle can be disposed at a relatively small angle of bend, which is advantageous in respect of durability and reliability.

The right/left driving torque distributing device consists of a relatively small number of component parts, and many of the component parts may be those of conventional right/left driving torque distributing devices. The right/left driving torque distributing device has a compact construction and can be manufactured at a relatively low manufacturing cost.

Since the right/left driving torque distributing device has a compact construction and a relatively small lateral size, interference between the right/left driving torque distributing device, and the suspensions or the exhaust system can be prevented, sufficient spaces can be secured around the right/left driving torque distributing device, which facilitates work for mounting the right/left driving torque distributing device on the vehicle and maintenance work.

Since the right/left driving torque distributing device employs the driving torque distributing mechanism comprising the three gear trains, the driving torque distributing ratio can be properly determined according to the characteristics of the vehicle or desired performance of the vehicle by properly determining the gear ratios of the three gear trains.

The first and the second hydraulic multiple-disk clutch of the right/left driving torque distributing device can be controlled so that the slips between the drive friction disks and the driven friction disks of the first hydraulic multiple-disk clutch and between the drive friction disks and the driven friction disks of the second hydraulic multiple-disk clutch are equal to each other by determining the respective gear ratios of the three gear trains so as to meet a predetermined relation. Therefore, a range in which the same friction characteristics (the relation between speed and coefficient of dynamic friction) is usable can be used and highly accurate control can be achieved.

The first and the second hydraulic multiple-disk clutch of the right/left driving torque distributing device are united together in a single, compact, lightweight structure. The capacities of the first and the second hydraulic multiple-disk clutch may be different from each other, and either of the first and the second hydraulic multiple-disk clutch may be smaller than the other.

The right/left driving torque distributing device distributes the input driving torque directly to the two output members instead of distributing the input driving torque from the differential gear case by effectively using the frictional torques of the hydraulic multiple-disk clutches.

Since the differential limiting mechanism has the gear geometry (helix angles and pressure angles), and torque-sensitive differential limiting function using frictional forces acting on the pinions, the carrier and the planet pins, the right/left driving torque distributing device has both the differential limiting function and the positive right/left driving torque distributing function.

The center differential gear comprises a relatively small number of component parts, and is simple in construction, compact and lightweight. Therefore, the center differential gear can be easily manufactured and assembled and is advantageous in respect of the vibration and the noise generation of the power transmission system.

Both the center differential gear and the right/left driving torque distributing device are compact and lightweight, and can be easily united together to construct a compact, lightweight, integrated unit.

The number of teeth of the gears of the center differential gear may be determined so that the reference front-to-rear driving torque distribution ratio is 50:50. An input-torque-proportional differential limiting torque is distributed to the front wheels or the rear wheels according to the traveling condition of the vehicle and the surface condition of the road. Consequently, the slip of the vehicle can be prevented, traction can be secured, the skidding of the rear wheels can be prevented and the running performance of the vehicle can be improved. Furthermore, the posture of the vehicle can be easily controlled by operating the accelerator pedal and the vehicle respond satisfactorily to control operations, which enables enjoyable sporty driving of the vehicle.

Figure 12:
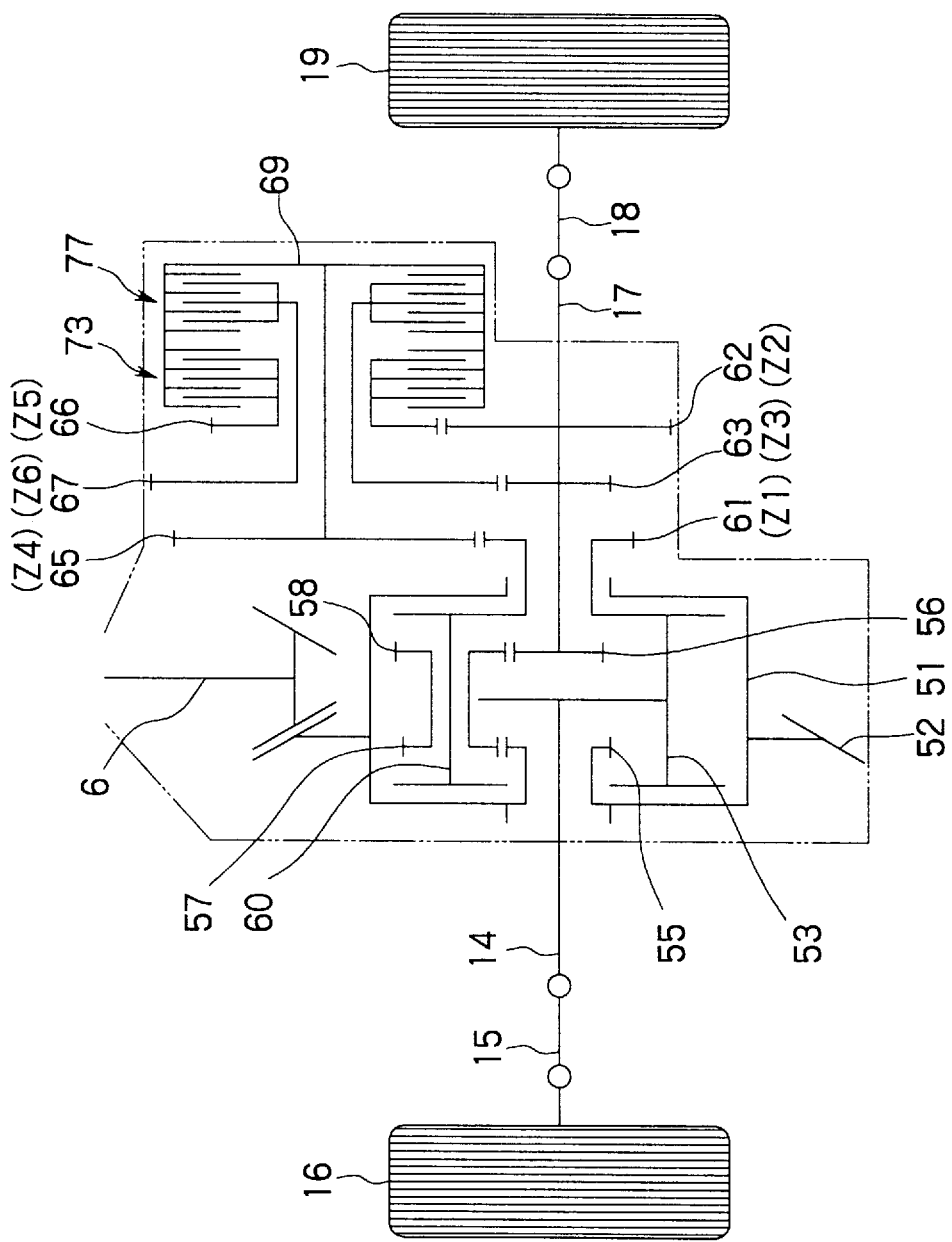
FIGS. 12 to 22 are enlarged diagrammatic views of rear differential gears in modifications of the right/left driving torque distributing device shown in FIG. 2.

FIG. 12 shows a right/left driving torque distributing device in a first modification of the rear right/left driving torque distributing device 7 in the first embodiment shown in FIG. 1, as applied to distributing driving torques to the rear right wheel 19 and the rear left wheel 16 of the vehicle. In the right/left driving torque distributing device of FIG. 12, a second gear and a third gear correspond to the third gear and the second gear, respectively, of the rear right/left driving torque distributing device 7 of FIG. 1, and has gear trains of gear ratios different from those of the gear trains of the rear right/left driving torque distributing device 7.

Referring to FIG. 12, the rear right/left driving torque distributing device has a first gear 61, a third gear 63 and a second gear 62 arranged from left to right, as viewed in FIG. 12, in that order. Therefore, a first hydraulic multiple-disk clutch 73 is associated with the gears, and a second hydraulic multiple-disk clutch is associated with the rear right wheel 19.

The gear ratio $z4/z1$ of a first gear train consisting of the first gear 61 and a fourth gear 65 is $1/0.9$, the gear ratio $z5/z2$ of a second gear train consisting of the second gear 62 and a fifth gear 66 is $1/1$ and the gear ratio $z6/z3$ of a third gear train consisting of the third gear 63 and a sixth gear 67 is $1/0.9 \cdot 0.9$. Therefore, the rotating speed of the fourth gear 65 is lower than that of the first gear 61, the respective rotating speeds of the second gear 62 and the fifth gear 66 are equal to each other, and the rotating speed of the sixth gear 67 is lower than the third gear 63.

While the vehicle is making a right turn and a major part of the input driving torque is to be distributed to the rear left wheel 16, the right/left driving torque distribution controller 32 gives a control signal to make the rear fluid pressure controller 34 supply the working fluid of a set pressure to the first hydraulic multiple-disk clutch 73 to engage the same.

While the vehicle is making a left turn and a major part of the input driving torque is to be distributed to the rear right wheel 19, the right/left driving torque distribution controller 32 gives a control signal to make the rear fluid pressure controller 34 supply the working fluid of a set pressure to the second hydraulic multiple-disk clutch 77 to engage the same.

Figure 13:
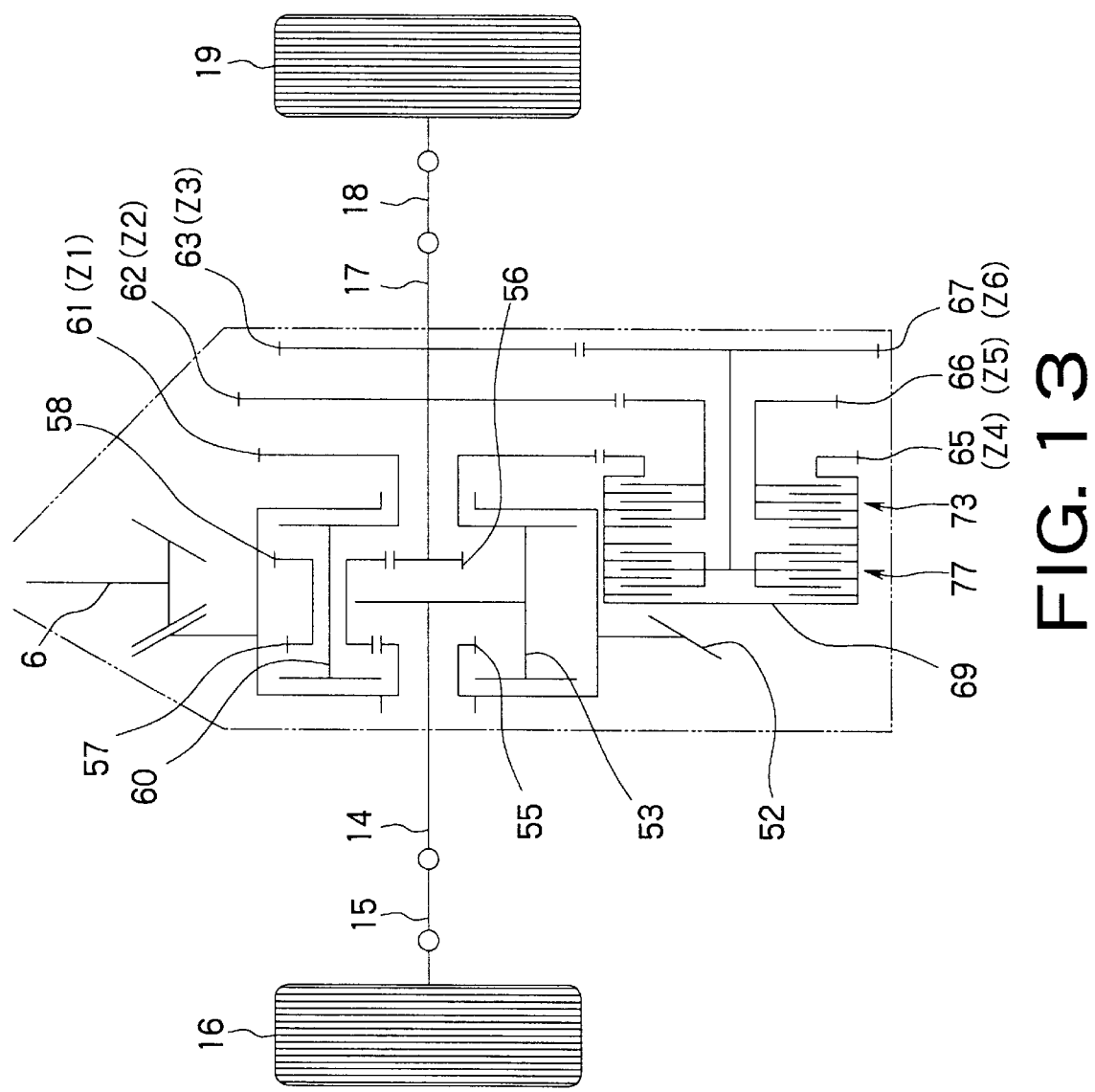

FIG. 13 shows a rear right/left driving torque distributing device in a second modification of the rear right/left driving torque distributing device 7 in the first embodiment shown in FIG. 1. In the rear right/left driving torque distributing device of FIG. 13, a clutch mechanism and a clutch drum corresponding to those of the rear right/left driving torque distributing device in the first modification shown in FIG. 12 and directed toward a differential limiting mechanism.

The rear right/left driving torque distributing device of FIG. 13 has a first hydraulic multiple-disk clutch 73 associated with a gear mechanism, and a second hydraulic multiple-disk clutch 77 formed integrally with the first hydraulic multiple-disk clutch 73 and associated with a differential limiting mechanism.

Figure 14:
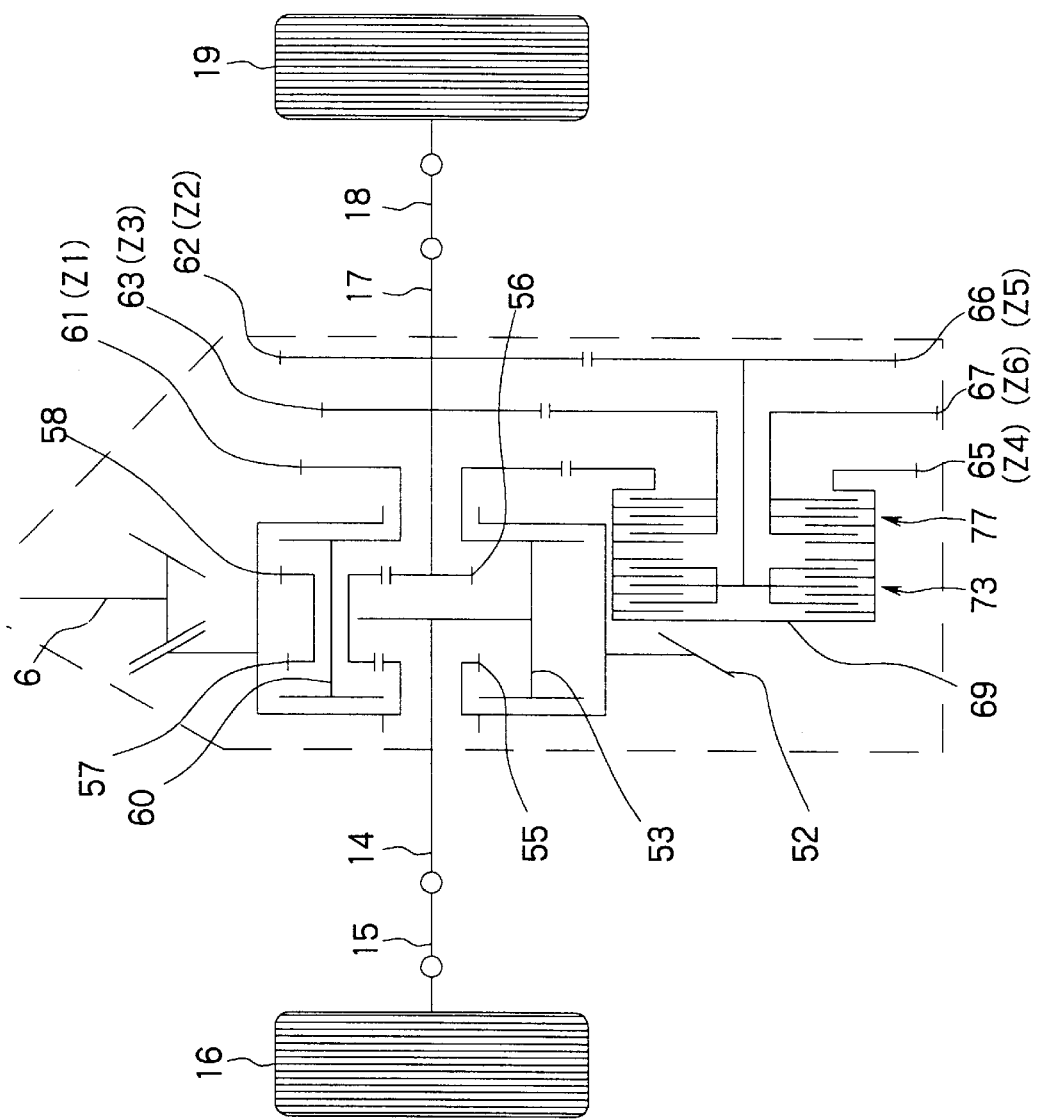

FIG. 14 shows a rear right/left driving torque distributing device in a third modification of the rear right/left driving torque distributing device in the first embodiment. The rear right/left driving torque distributing device of FIG. 14 has a first hydraulic multiple-disk clutch 73 associated with a differential limiting mechanism, and a second hydraulic multiple-disk clutch 77 associated with a gear mechanism.

This arrangement of the hydraulic multiple-disk clutches 73 and 77 enables the further reduction of the lateral size of the rear right/left driving torque distributing device.

Figure 15:
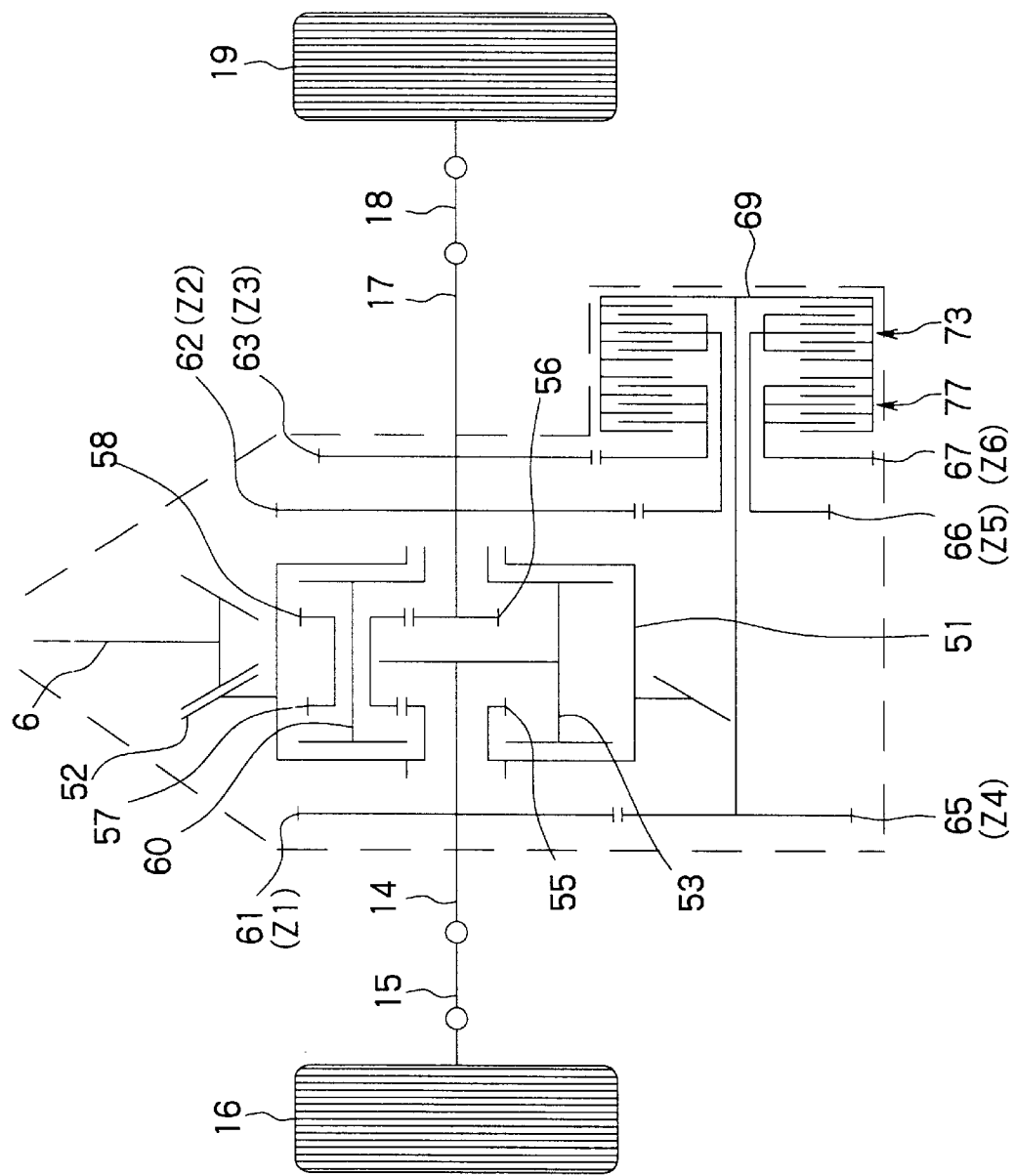

FIG. 15 shows a rear right/left driving torque distributing device in a fourth modification of the rear right/left driving torque distributing device in the first embodiment. In the rear right/left driving torque distributing device of FIG. 15, a first gear 61 is spaced from the second gear 62 and the third gear 63.

The first gear 61 is mounted on a left drive shaft 14, and the second gear 62 and the third gear 63 are mounted on a right drive shaft 17. The first gear 61, the second gear 62 and the third gear 63 are engages with a fourth gear 65, a fifth gear 66 and a sixth gear 67 to form first, second and third gear trains, respectively. A combination of two clutch mechanisms is interposed between the fourth gear 66 and the fifth gear 67, and the right wheel.

Figure 16:
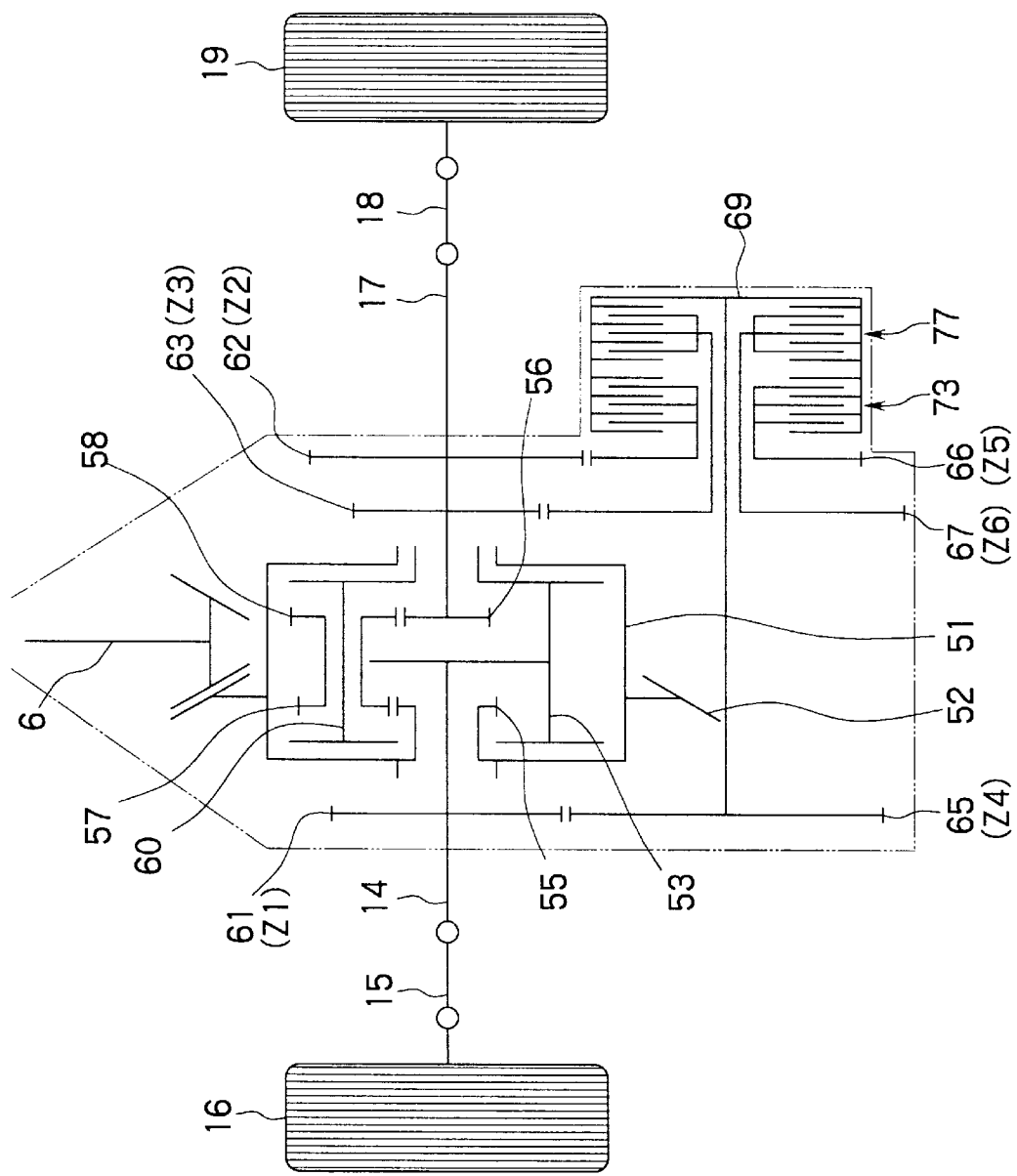

FIG. 16 shows a rear right/left driving torque distributing device in a fifth modification of the rear right/left driving torque distributing device in the first embodiment. In the rear right/left driving torque distributing device of FIG. 16, a first gear 61 is mounted on a left drive shaft 14, a second gear 62 and a third gear 63 are mounted on a right drive shaft 17, and the first gear 61, the second gear 62 and the third gear 63 are engaged with a fourth gear 65, a sixth gear 67 and a fifth gear 66, respectively, to form first, third and second gear trains, respectively. A combination of two clutch mechanisms is disposed between the fifth gear 67 and the fourth gear 66, and the right wheel.

Figure 17:
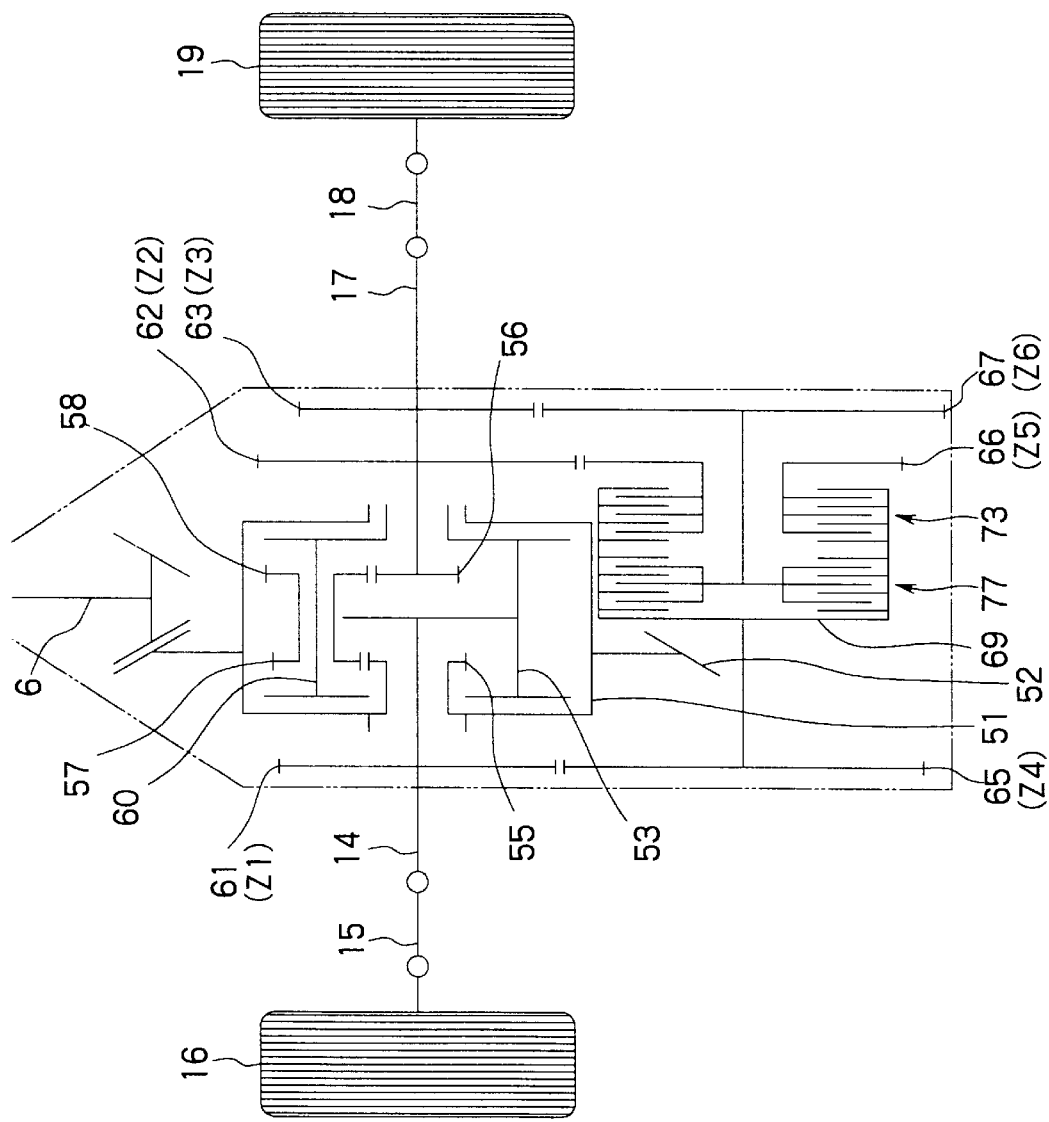

A rear right/left driving torque distributing device in a sixth modification of the rear right/left driving torque distributing device in the first embodiment, shown in FIG. 17 has a combination of two clutch mechanisms disposed between a fourth gear 65 and a fifth gear 66.

Figure 18:
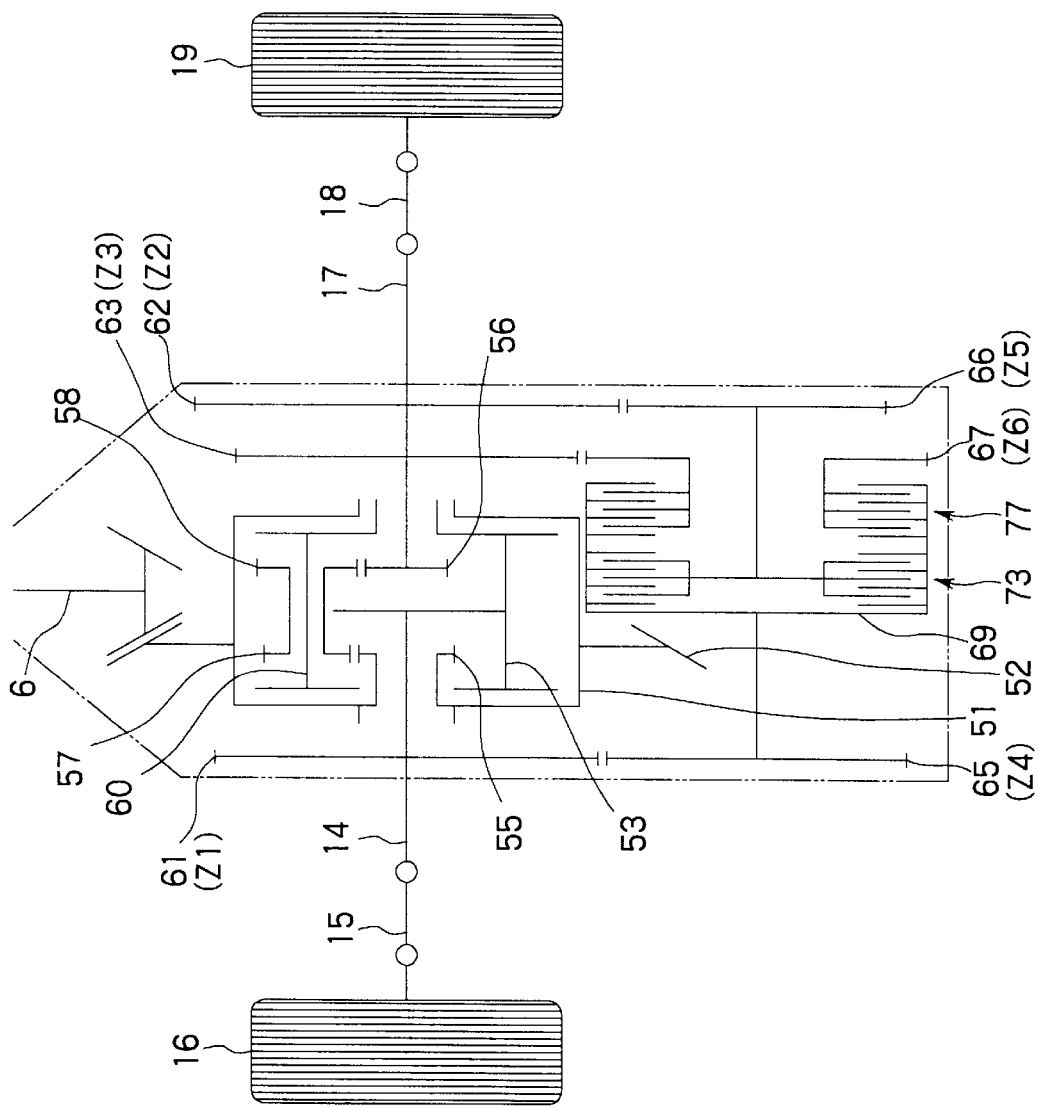

A rear right/left driving torque distributing device in a seventh modification of the rear right/left driving torque distributing device in the first embodiment, shown in FIG. 18 has a combination of two clutch mechanisms disposed between a fourth gear 65 and a sixth gear 67.

Figure 19:
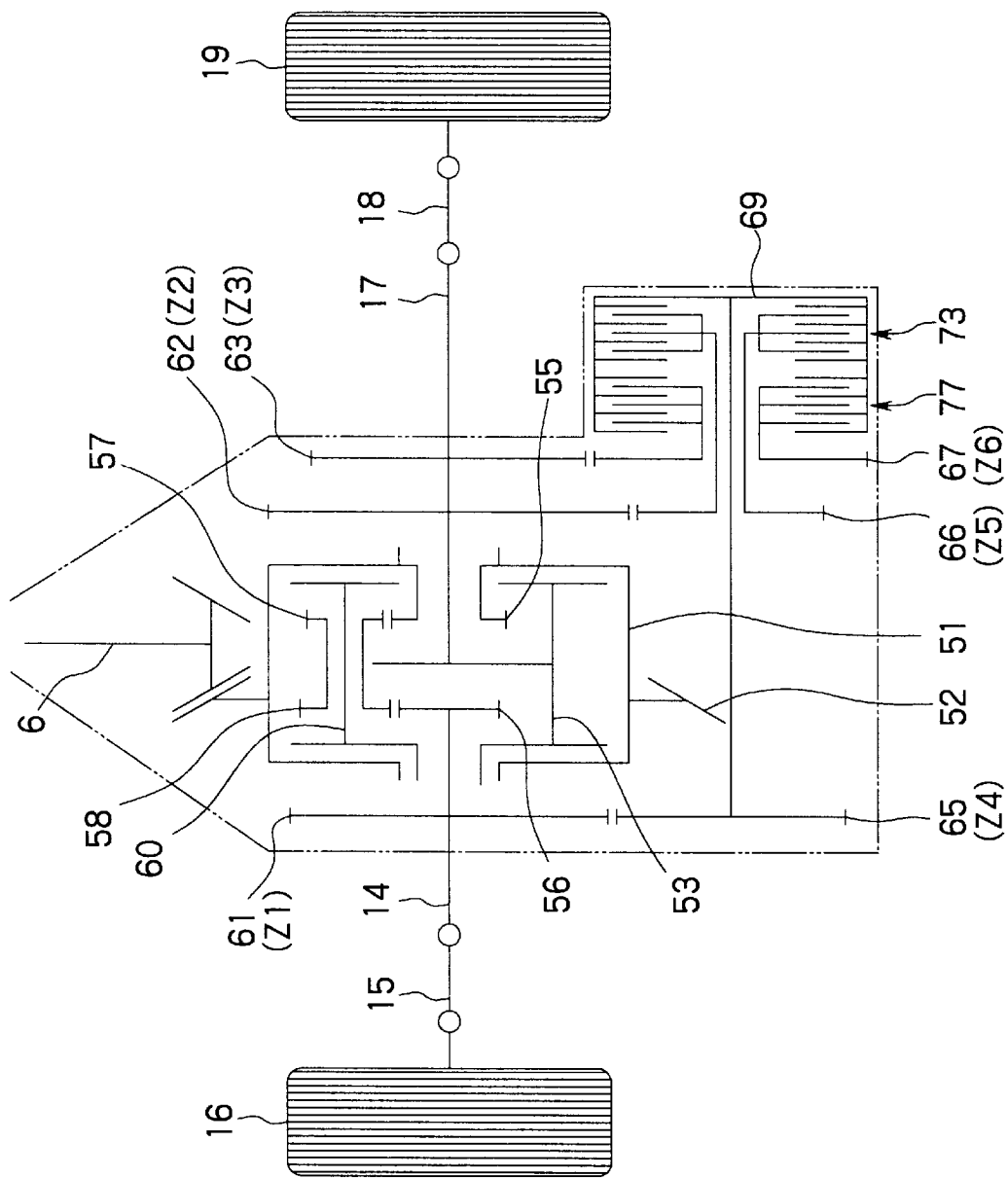

A rear right/left driving torque distributing device in an eighth modification of the rear right/left driving torque distributing device in the first embodiment, shown in FIG. 19 is reverse to the rear right/left driving torque distributing device shown in FIG. 15 in the connection of the output members thereof to the right and the left wheel.

A carrier 53 included in a differential limiting mechanism is connected to a right drive shaft 17, a second sun gear 56 is connected to a left drive shaft 14, a first gear 61 is mounted on the left drive shaft 14, and a second gear 62 and a third gear 63 are mounted on the right drive shaft 17.

The first gear 61, the second gear 62 and the third gear 63 are engaged with a fourth gear 65, a fifth gear 66 and a sixth gear 67 to form first, second and third gear trains, respectively. A combination of two clutch mechanisms is disposed between the fourth gear 66 and the fifth gear 67, and the right wheel.

Figure 20:
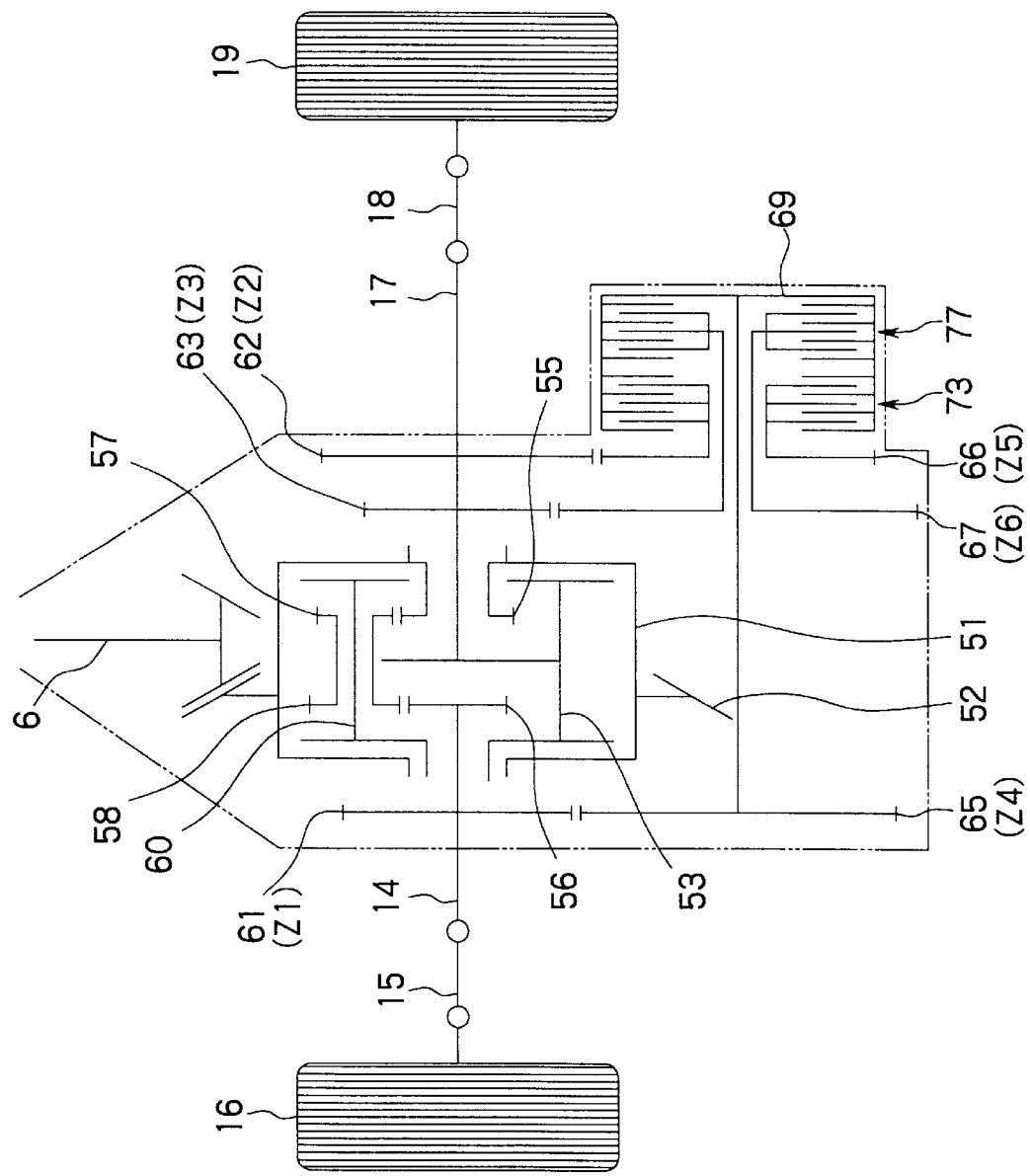

A rear right/left driving torque distributing device in a ninth modification of the rear right/left driving torque distributing device in the first embodiment, shown in FIG. 20 has a differential limiting mechanism including a carrier 53 connected to a right drive shaft 17, and a second sun gear 56 connected to the left drive shaft 14. A first gear 61 is mounted on the left drive shaft, and a third gear 63 and a second gear 62 are mounted on the right drive shaft 17.

The first gear 61, the third gear 63 and the second gear 62 are engaged with a fourth gear 65, a sixth gear 67 and a fifth gear 66 to form first, third and second gear trains, respectively. A combination of two clutch mechanisms is disposed between the firth gear 67 and the fourth gear 66, and the right wheel.

Figure 21:
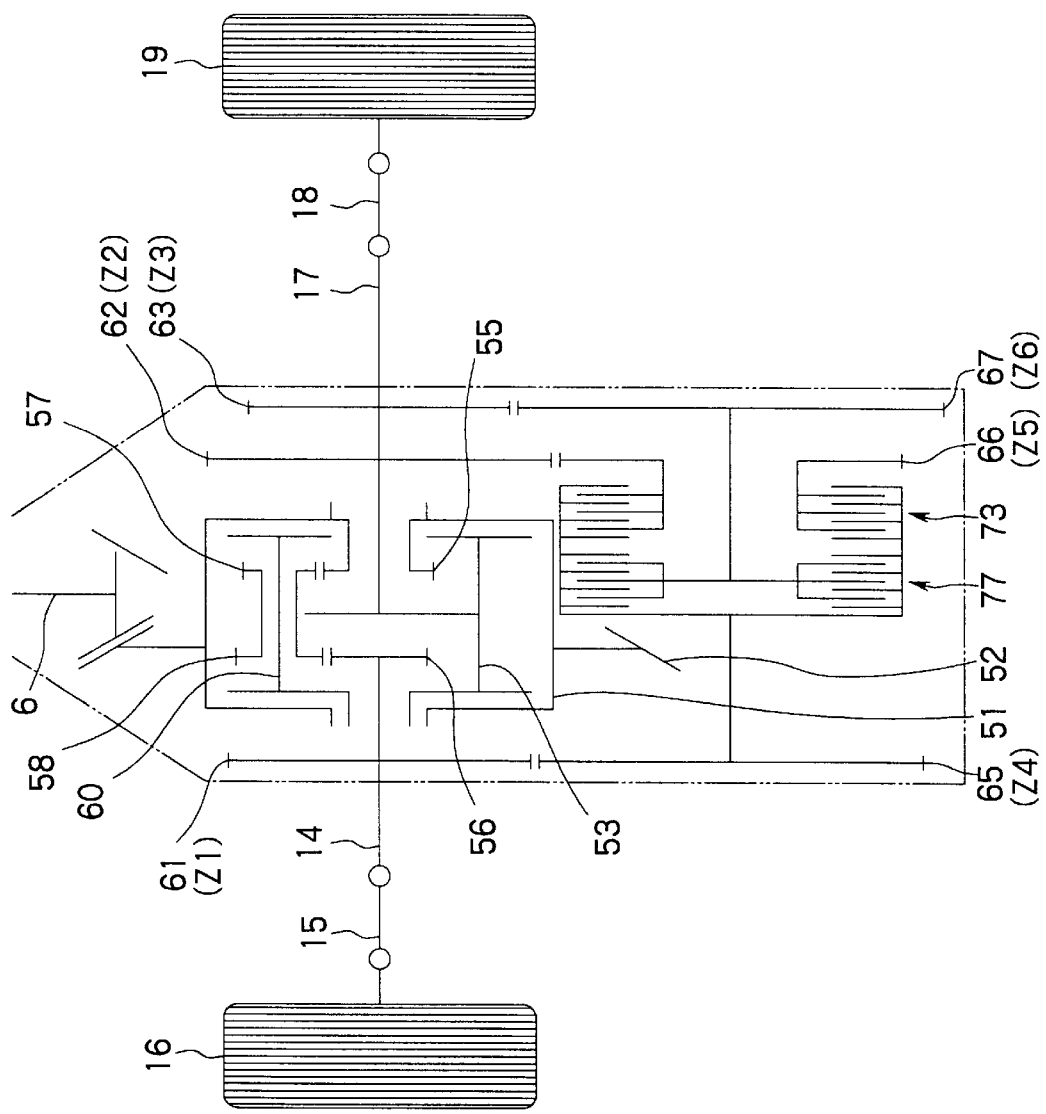
Figure 22:
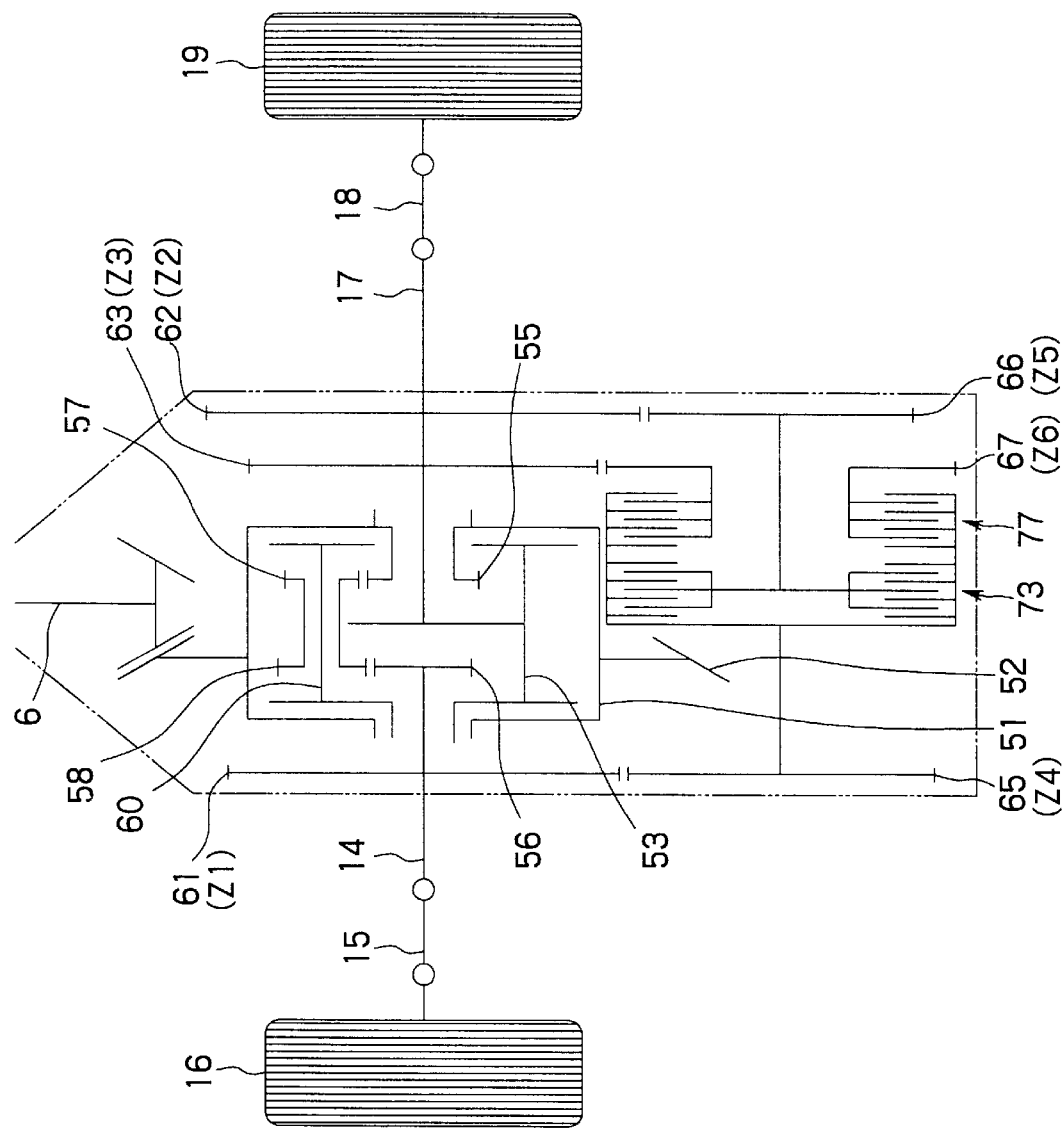

FIGS. 21 and 22 are enlarged diagrammatic views of a rear right/left driving torque distributing device in a seventh embodiment according to the present invention. The rear right/left driving torque distributing device in the seventh embodiment is formed by changing the clutch mechanisms of a rear right/left driving torque distributing device in a sixth embodiment according to the present invention.

A rear right/left driving torque distributing device in a tenth modification of the rear right/left driving torque distributing device in the first embodiment, shown in FIG. 21 has a combination of two clutch mechanisms disposed between a fourth gear 65 and a fifth gear 66.

A rear right/left driving torque distributing device in an eleventh modification of the rear right/left driving torque distributing device in the first embodiment, shown in FIG. 22 has a combination of two clutch mechanisms disposed between a fourth gear 65 and a sixth gear 67.

As is apparent from the configurations of the foregoing, modifications of the rear right/left driving torque distributing device in the first embodiment, the gear trains of the gear mechanism, and the clutch mechanism can be disposed at different positions in the different modifications, the gear ratios of the gear trains may be other than those referred to in the foregoing description, and the differential gear mechanism may be formed in a construction other than those shown and described above.

The right/left driving torque distributing device in the first embodiment is applicable also to front-engine front-drive vehicles and rear-engine rear-drive vehicles.

Four-wheel drive vehicles employing the right/left driving force distributing device of the present invention may be provided with a center differential gear other than that shown and described above.

Second Embodiment

A right/left driving torque distributing device in a second embodiment according to the present invention for a vehicle will be described hereinafter with reference to FIGS. 23 to 27.

Figure 23:
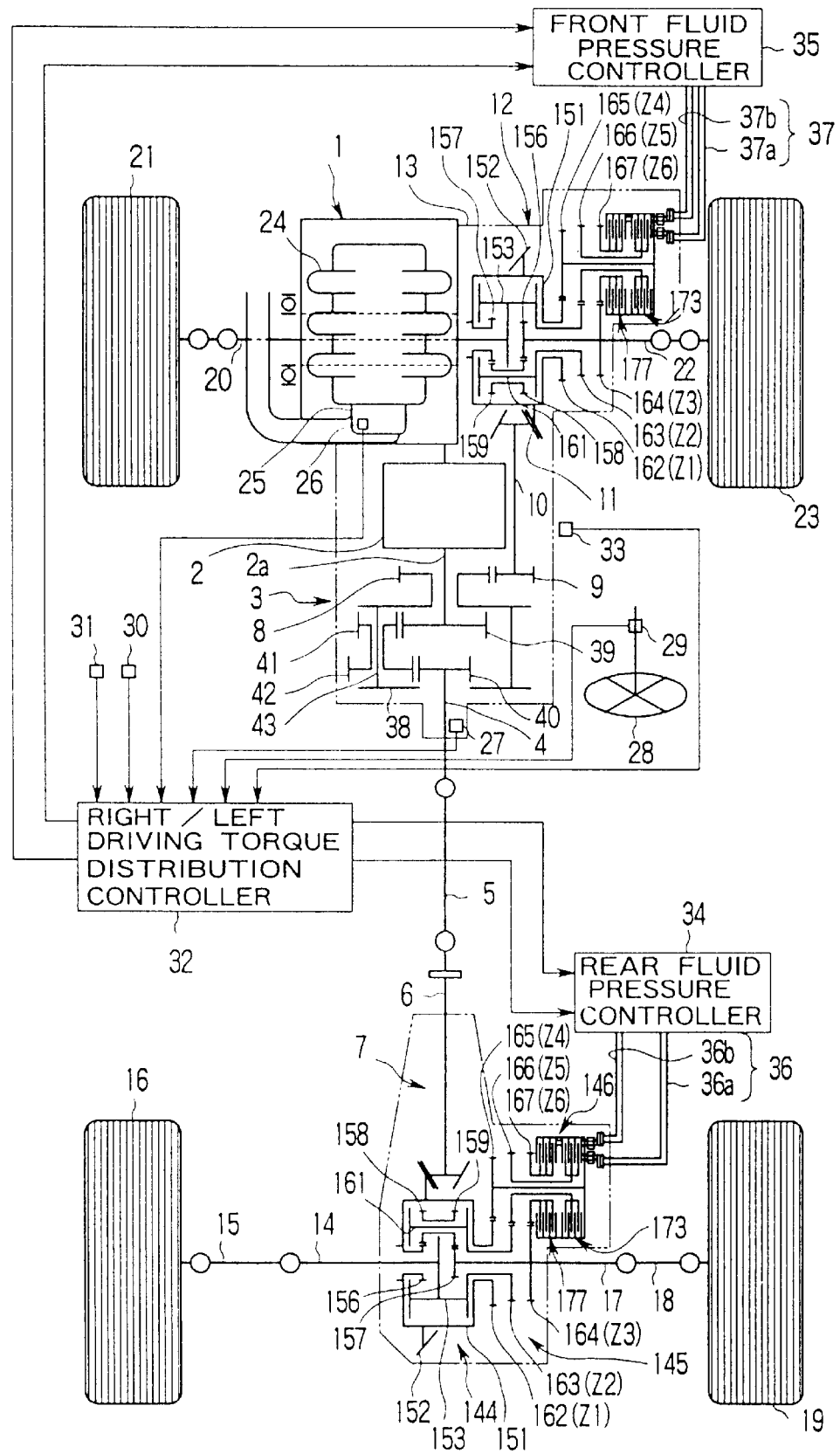
FIG. 23 is a diagrammatic view of a power transmission system for a four-wheel drive automobile, including a right/left driving torque distributing device in a second embodiment according to the present invention.

In a power transmission system shown in FIG. 23, the output driving torque of an engine 1 is transmitted through an automatic transmission 2 to a center differential gear 3. The center differential gear 3 distributes the driving torque through a rear drive shaft 4, a propeller shaft 5 and a drive pinion 6 to a rear right/left driving torque distributing device 7 in a second embodiment according to the present invention, and through a transfer drive gear 8, a transfer driven gear 9, a front drive shaft 10 and a drive pinion 11 to a front right/left driving torque distributing device 12 substantially identical with the rear right/left driving torque distributing device 7. The power transmission system including the center differential gear 3, the rear right/left driving torque distributing device 7 and the front right/left driving torque distributing device 12 is substantially the same in other respects as the power transmission system shown in FIG. 1 and hence the further description thereof will be omitted.

Figure 24:
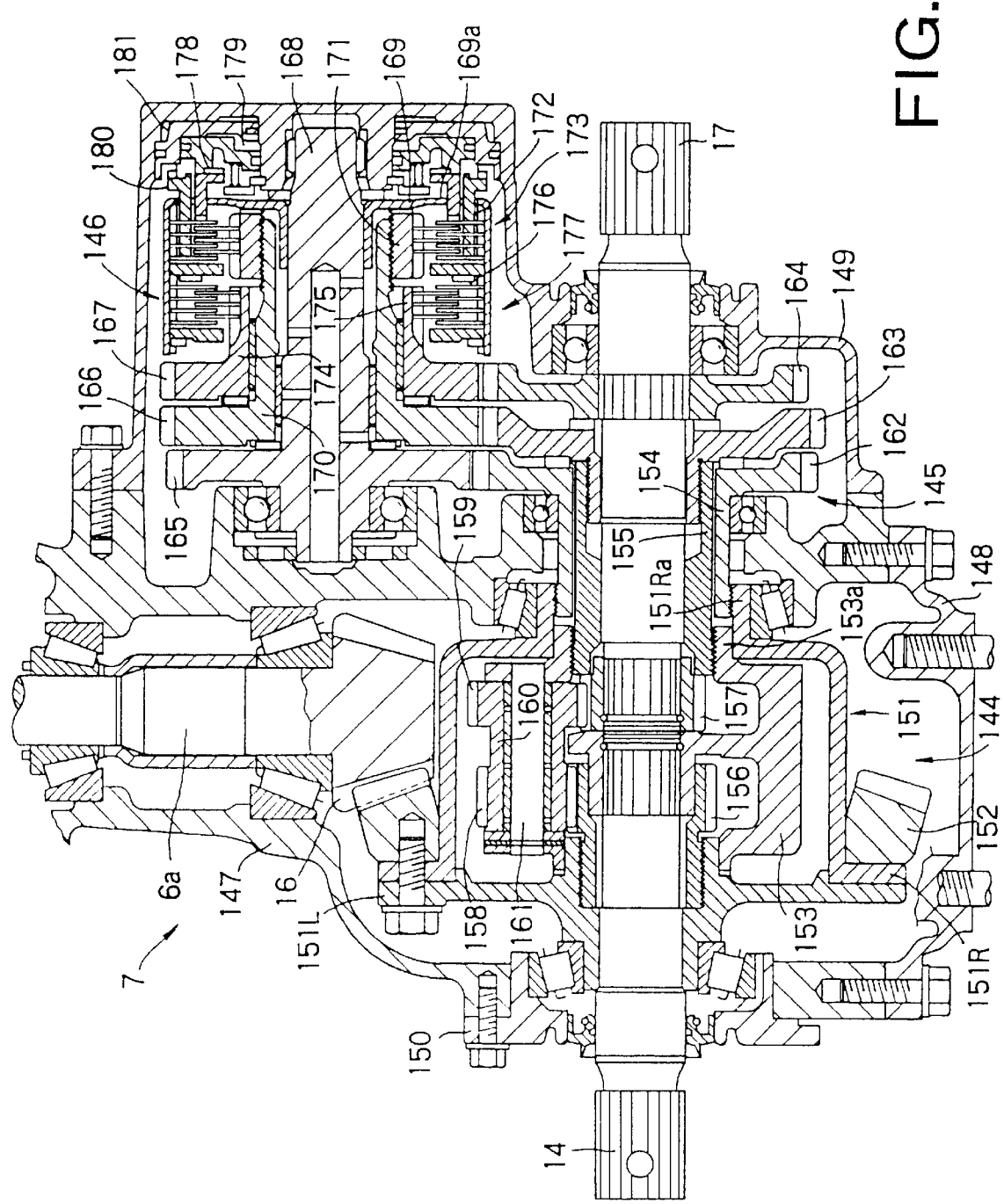
FIG. 24 is an enlarged sectional view of the rear right/left driving torque distributing device included in the power transmission system shown in FIG. 23.

The rear right/left driving torque distributing device 7 in a second embodiment according to the present invention will be described in detail with reference to FIG. 24.

The rear right/left driving torque distributing device 7 comprises, as principal components, a differential limiting mechanism 144, a gear mechanism 145, and a clutch mechanism 146. The drive pinion 6 for driving the rear right/left driving torque distributing device 7, and the differential limiting mechanism 144 are contained in a differential gear case 147. The clutch mechanism 146 is combined with the gear mechanism 145 joined to a side surface of the differential gear case 147. A cover 148 is attached to the rear end of the differential gear case 147, and the gear mechanism 145 and the clutch mechanism 146 are covered with a cover 149.

A shaft 6a formed integrally with the drive pinion 6 is connected to the propeller shaft 5 and is supported in bearings for rotation on the differential gear case 147.

First, the differential limiting mechanism 144 will be described.

The left drive shaft 14 is extended rotatably through a left side retainer 150 attached to the differential gear case 147, and the right drive shaft 17 is extended rotatably and coaxially with the left drive shaft 14 through a right portion of the differential gear case 147.

A left differential gear case 151L is mounted rotatably on the left drive shaft 14, and the left drive shaft 14 and the left differential gear case 151L are supported for rotation in a bearing on the left side retainer 150.

A right differential gear case 151R and a crown gear 152 engaged with the drive pinion 6 coaxially combined with each other are fixedly joined to the left differential gear case 151L. A cylindrical end portion 151Ra of the right differential gear case 151R is put rotatably on a cylindrical boss 153a formed on the right side wall of a carrier 153, is put on and coupled with a first shaft 154 included in the gear mechanism 145 and is supported in bearings on the differential gear case 147.

A second shaft 155 included in the gear mechanism 145 is inserted in and splined to the cylindrical boss 153a of the carrier 153. The right drive shaft 17 is fitted rotatably in the bore of the second shaft 155.

The joint of the right differential gear case 151R and the first shaft 154, the joint of the carrier 153 and the second shaft 155, and the right drive shaft 17 are rotatably supported on the differential gear case 147. A differential gear case 151 consisting of the left differential gear case 151L and the right differential gear case 151R, and fixedly holding the crown gear 152 is supported for rotation within the differential gear case 147.

The carrier 153 is rotatably supported in the differential gear case 151, the left drive shaft 14 and the right drive shaft 17 are inserted in the carrier 153, and the carrier 153 is coupled with the inner end of the left drive shaft 14 by splines.

In the differential gear case 151, a first sun gear 156 of a relatively great diameter is splined to a portion of the left differential gear case 151L in which the left drive shaft 14 is inserted, a second sun gear 157 of a relatively small diameter is splined to an inner end portion of the right drive shaft 17, a first pinion 158 of a relatively small diameter is engaged with the first sun gear 156 to form a first gear train, and a second pinion 159 of a relatively large diameter is engaged with the second sun bear 157 to form a second gear train.

The first pinion 158 and the second pinion 159 are combined integrally in a compound pinion member 160. A plurality of compound pinion members 160, for example, three compound pinion members 160, the same as the compound pinion member 160 are supported by bearings on planet pins 161 fixed to the carrier 153, respectively. Thrust washers are inserted between the opposite ends of each compound pinion member 160 and the side walls of the carrier 153, respectively, to bear thrusts.

The differential limiting mechanism 144 is a compound planetary gear type differential limiting mechanism which transmits a driving torque applied to the drive pinion 6 through the crown gear 152 and the differential gear case 151 to the first sun gear 156, from the carrier 153 to the left drive shaft 14.

The differential limiting mechanism 144, i.e., the compound planetary gear type differential limiting device, has a differential function effectuated by properly determining the numbers of teeth of the first sun gear 156, the second sun gear 157, and the first pinion 158 and the second pinion 159 of each of the plurality of compound pinion members 160 arranged around the sun gears 156 and 157.

The differential limiting mechanism 144 is provided with an equal-ratio torque distributing function to distribute equal torques to the right and the left wheel in a reference right-to-left torque distribution ratio of 50:50 by properly determining the respective radii of the working pitch circles of the sun gears 156 and 157 and the pinions 158 and 159.

The differential limiting mechanism 144 is provided with a differential limiting function by using, for example, helical gears of a helix angle as the first sun gear 156 and the first pinion 158 forming the first gear train, and helical gears of another helix angle as the second sun gear 157 and the second pinion 159 forming the second gear train so that a thrust acting on the first pinion 158 and a thrust acting on the second pinion 159 may not cancel each other, an effective thrust acts on each compound pinion member 160 to apply a frictional resistance to the end surface of either the first pinion 158 or the second pinion 159 of each compound pinion member 160, and applying a composite force of a load radially acting on the first pinion 158 and the second pinion 159 and a tangential load acting on the first pinion 158 and the second pinion 159 to the circumference of each planet pin 161 so that a frictional resistance acts against the rotation of the first pinion 158 and the second pinion 159. The differential limiting function provides a differential limiting torque proportional to an input torque to the differential limiting mechanism 144.

The construction and functions of the differential limiting mechanism 144 are substantially the same as those of the center differential gear 3 and hence the further description thereof will be omitted.

The gear mechanism 145 will be described hereinafter.

The first shaft 154 connected to the differential gear case 151 projects outside from the differential gear case 147 and is supported for rotation in a bearing on the differential gear case 147. A first gear 162 is formed at an outer end of the first shaft 154 opposite an end of the same connected to the carrier 153.

The second shaft 155 connected to the carrier 153 is rotatably fitted in the first shaft 154 and projects outside from the differential gear case 147. A second gear 163 is splined to an outer end of the second shaft 155 at a position on the outer side, i.e., the right side as viewed in FIG. 24, of the first gear 162.

A third gear 164 coupled with the right drive shaft 17 by splines is disposed on the outer side of the second gear 163.

The first gear 162, the second gear 163 and the third gear 164 are engaged with a fourth gear 165, a fifth gear 166 and a sixth gear 167 coaxially arranged along an axis parallel to the common axis of the first gear 162, the second gear 163 and the third gear 164, respectively.

The gear mechanism 145 has a first gear train consisting of the first gear 162 and the fourth gear 165, a second gear train consisting of the second gear 163 and the fifth gear 166, and a third gear train consisting of the third gear 164 and the sixth gear 167.

The gear ratios of the first, the second and the third gear train are z4/z1=0.9/1, z5/z2=0.9·0.9/1 and z6/z3=1/1, respectively, in which z1, z2, z3, z4, z5 and z6 are the numbers of teeth of the first gear 162, the second gear 163, the third gear 164, the fourth gear 165, the fifth gear 166 and the sixth gear 167, respectively. The rotating speed of the fourth gear 165 is higher than that of the first gear 162.

The fourth gear 165, i.e., a first clutch gear, is formed integrally with a fourth shaft 168 at one end of the latter. The fourth shaft 68 has one end, i.e., the inner end, supported in a bearing on an outer surface of the differential gear case 147, and the other end, i.e., the outer end, rotatably supported on the cover 149. A cylindrical clutch drum 69 opening toward the fourth gear 165 is fixedly mounted on the outer end of the fourth shaft 168.

The fifth gear 166, i.e., a second clutch gear, is formed integrally with a fifth shaft 170 at an one end, i.e., the inner end, of the latter. The fifth shaft 170 is put on the fourth shaft 168 and extends to the bottom wall 169a of the clutch drum 169. A clutch hub 171 of a predetermined length is mounted on the other end, i.e., the outer end, of the fifth shaft 170. A plurality of friction disks 172 are mounted alternately on the clutch drum 169 and the clutch hub 171 to form a first hydraulic multiple-disk clutch 173.

The sixth gear 167, i.e., a third clutch gear, is formed integrally with a sixth shaft 174 at an one end, i.e., the inner end, of the latter. The sixth shaft 174 is put on the fifth shaft 170 and extends to the inner side surface of the innermost friction disk 172 of the first hydraulic multiple-disk clutch 173. A clutch hub 175 of a predetermined length is formed at the other end, i.e., the outer end, of the sixth shaft 174. A plurality of friction disks 176 are mounted alternately on the clutch drum 169 and the clutch hub 175 to form a second hydraulic multiple-disk clutch 177.

The first hydraulic multiple-disk clutch 173 is engaged and disengaged by operating a first piston 178 extended through the bottom wall 169a of the clutch drum 169 and fitted in a first pressure chamber 179. A working fluid of a variable pressure controlled by the right/left driving torque distribution controller 32 is supplied into the first pressure chamber 179 through the first fluid pipe 36a to operate the first piston 178.

Similarly, the second hydraulic multiple-disk clutch 177 is engaged and disengaged by operating a second piston 180 extended through the bottom wall 169a of the clutch drum 169 and fitted in a second pressure chamber 181. A working fluid of a variable pressure controlled by the right/left driving torque distribution controller 32 is supplied into the second pressure chamber 181 through the second fluid pipe 36b to operate the second piston 180.

The hydraulic multiple-disk clutches 173 and 177 are combined to construct the clutch mechanism 146. Since the gear mechanism 145 has the gear trains of the foregoing gear ratios, a major part of the driving torque is distributed to the left drive shaft 14 connected to the carrier 153 when the first hydraulic multiple-disk clutch 173 is engaged, and a major part of the driving torque is distributed to the right drive shaft 17 when the second hydraulic multiple-disk clutch 177 is engaged. The pressures of the working fluid for engaging the hydraulic multiple-disk clutches 173 and 177 are calculated by the right/left driving power distribution controller 32. The torque distribution ratio in which the driving torque is distributed to the left drive shaft 14 and the right drive shaft 17 is controlled by varying the pressure of the working fluid.

A driving torque distributing operation to be carried out by the cooperative actions of the gear mechanism 145 and the clutch mechanism 146 will be described. Suppose that a major part of the driving torque is to be distributed to the right drive shaft 17 with an intention to improve the left-turning performance of the vehicle. The working fluid of a predetermined pressure is supplied to the second hydraulic multiple-disk clutch 177 associated with the right drive shaft 17 to engage the second hydraulic multiple-disk clutch 177. If the differential limiting mechanism 144 does not operate, a driving torque TR given to the rear right/left driving torque distributing device 7 is distributed equally, i.e., in a distribution ratio of 50:50, to the left drive shaft 14 and the right drive shaft 17, i.e., a driving torque TR/2 is distributed to the left drive shaft 14 and a drive torque TR/2 is distributed to the right drive shaft 17. A major part of the driving torque is transmitted through the second hydraulic multiple-disk clutch 177 and the third gear train to the right drive shaft 17. Therefore, if the slip torque of the second hydraulic multiple-disk clutch 177, which is dependent on the pressure of the working fluid supplied to the second pressure chamber 181, the coefficient of dynamic friction between the frictional surfaces (coefficient of dynamic friction dependent on the rotating speed of a frictional surface relative to the adjacent frictional surface), the number of the frictional surfaces equal to twice the number of the friction disks and the effective radius of the friction disks, is Tk2, a right driving torque to be distributed to the right drive shaft 17 and a left driving torque to be distributed to the left drive shaft 14 are expressed by the following expressions.

$$\text{Right driving torque} = TR/2 + (Tk2/2)(z3/z6)TR \quad (125)$$

$$\text{Left driving torque} = TR/2 - (Tk2/2)(z3/z6)TR \quad (126)$$

Since z3/z6=1, $$\text{Right driving torque} = TR/2 + Tk2(TR/2) \quad (125')$$

$$\text{Left driving torque} = TR/2 - Tk2(TR/2) \quad (126')$$

Suppose that a major part of the driving torque is to be distributed to the left drive shaft 14 with an intention to improve the right-turning performance of the vehicle. The working fluid of a set pressure is supplied to the first hydraulic multiple-disk clutch 173 to engage the first hydraulic multiple-disk clutch 137. A major part of the driving torque is transmitted through the first hydraulic multiple-disk clutch 173 and the second gear train to the carrier 153. Therefore, if the slip torque of the first hydraulic multiple-disk clutch 173, which is dependent on the pressure of the working fluid supplied to the first pressure chamber 179, the coefficient of dynamic friction between the frictional surfaces (coefficient of dynamic friction dependent on the rotating speed of a frictional surface relative to the adjacent frictional surface), the number of the frictional surfaces equal to twice the number of the friction disks and the effective radius of the friction disks, is Tk1, a left driving torque to be distributed to the left drive shaft 14 and a right driving torque to be distributed to the right drive shaft 17 are expressed by the following expressions.

$$\text{Right driving torque} = TR/2 - (Tk1/2)(z2/z5)TR \quad (127)$$

$$\text{Left driving torque} = TR/2 + (Tk1/2)(z2/z5)TR \quad (128)$$

Since z5/z2=1, $$\text{Right driving torque} = TR/2 + Tk1(TR/2) \quad (127')$$

$$\text{Left driving torque} = TR/2 - Tk1(TR/2) \quad (128')$$

The two hydraulic multiple-disk clutches 173 and 177 of the clutch mechanism 146 may be substituted by electromagnetic clutches or variable-capacity couplings.

A driving torque is transmitted to the front right/left driving torque distributing device 12 through the front drive shaft 10, the drive pinion 11 and the crown gear 152. The front right/left driving torque distributing device 12 is the same in construction as the rear right/left driving torque distributing device 7 and hence the description thereof will be omitted.

The rear fluid pressure controller 34 and the front fluid pressure controller 35 for controlling the pressure of the working fluid supplied to the hydraulic multiple-disk clutches dl73 and 177 are the same as those of the right/left driving torque distributing devices in the first embodiment and hence the description thereof will be omitted.

The operation of the power transmission system shown in FIG. 23 will be described hereinafter.

The output driving torque of the engine 1 is transmitted through the output shaft 2a of the automatic transmission 2 to the first sun gear 49 of the center differential gear 3.

Then, the input driving torque is distributed through the pinions 41 and 42 to the second sun gear 40 and to the carrier 38 supporting the pinions 41 and 42. A driving torque transmitted to the second sun gear 40 is transferred through the rear drive shaft 4 to the rear right/left driving torque distributing device 7, and a driving torque distributed to the carrier 38 is transferred through the transfer drive gear 8, the transfer driven gear 9 and the front drive shaft 10 to the front right/left driving torque distributing device 12 to drive the vehicle in a four-wheel driving mode.

When the carrier 38 and the second sun gear 40 of the center differential gear 3 rotate in the same direction at the same rotating speed, i.e., when the output rotating speed NF of the carrier 38 and the output rotating speed NR of the second sun gear 40 are equal to each other (NF=NR) and the vehicle is traveling straight, the first pinions 41 and the second pinions 42 do not make any planetary motion and revolve together with the carrier 38.

Since the first pinion 41 and the second pinion 42 revolve together with the carrier 38, any frictional torque does not act on either of the first pinion 41 and the second pinion 42. Consequently, the input torque Ti applied to the first sun gear 39 is distributed in an equal front-to-rear torque distribution ratio of 50:50 so that the front wheel driving torque TF, i.e., the torque of the carrier 38, is equal to the rear wheel driving torque TR, i.e., the torque of the second sun gear 40, if the gear geometry of the gears is determined so as to establish equal torque distribution or the input torque Ti is distributed in an unequal front-to-rear torque distribution ratio so that the front wheel driving torque TF and the rear wheel driving torque TR are unequal to each other if the gear geometry of the gears is determined so as to establish unequal torque distribution dependent on the gear geometry.

When the vehicle is turning with the front output rotating speed NF higher than the rear output rotating speed NR, i.e., NF>NR, or the front wheels slipping, the first pinions 41 and the second pinions 42 of the center differential gear 3 make a planetary motion for a differential motion. Consequently, the difference in rotating speed between the front wheels and the rear wheels during the turning of the vehicle is absorbed and the vehicle is able to turn smoothly.

As the first pinions 41 and the second pinion 42 make a planetary motion, a thrust acts on each set of the first pinion 41 and the second pinion 42 due to the difference in helix angle between the first pinion 41 and the second pinion 42, a frictional resistance acts on the end surface of either the first pinion 41 or the second pinion 42, and a composite force of a load radially acting on the first pinion 41 and the second pinion 42, and a tangential load acting on the first pinion 41 and the second pinion 42 acts on the circumference of each planet pin 43 to exert a frictional resistance against the rotation of the first pinion 41 and the second pinion 42. These frictional resistances produce a differential limiting torque.

Under such a condition, the differential limiting torque retards the rotation of the carrier 38, so that a major part of the input torque is distributed to the rear right/left driving torque distributing device 7. Consequently, the steering nature and the controllability of the vehicle during turning are improved, and the slip of the front wheels during straight traveling can be prevented.

When the rear wheels slip and NR>NF, the first pinions 41 and the second pinions 42 of the center differential gear 3 make a planetary motion due to the difference in rotating speed between the front wheels and the rear wheels, so that a frictional resistance is produced.

Under such a condition, a differential limiting torque promotes the rotation of the carrier 38, so that a major part of the input torque is distributed to the front right/left driving torque distributing device 12, so that the slip of the rear wheels is prevented.

Since the differential limiting torque of the center differential gear 3 is proportional to the input torque Ti, the differential limiting torque is proportional to the torques of the front and the rear wheels, and the differential limiting function is exercised always at a fixed rate.

The driving torque distributed by the center differential gear 3 to the rear right/left driving torque distributing device 7 is transmitted through the propeller shaft 5 and the drive pinion 6 to the rear right/left driving torque distributing device 7, and the driving torque is transmitted through the crown gear 152 to the differential gear case 151.

The operation of the differential limiting mechanism 144 will be described hereinafter. The driving torque applied to the differential gear case 151 rotates the first sun gear 156. Then, the driving torque is distributed through the first pinions 158 and the second pinions 159 to the second sun gear 157 and to the carrier 153 supporting the first pinions 158 and the second pinions 159. The driving torque transmitted to the second sun gear 157 is transferred through the right drive shaft 17 to the rear right wheel 19. The driving torque transmitted to the carrier 153 is transferred through the left drive shaft 14 to the rear left wheel 16.

While the vehicle is traveling straight and the rotating speed NR of the rear right wheel 19 is equal to the rotating speed NL of the rear left wheel 16, the second sun gear 157 and the carrier 153 rotate in the same direction at the same rotating speed, and the first pinions 158 and the second pinions 159 do not make any planetary motion and revolve together with the carrier 153.

Since the first pinion 158 and the second pinion 159 revolve together with the carrier 153, any frictional torque does not act on either of the first pinion 158 and the second pinion 159. Consequently, the input torque applied to the first sun gear 156 is distributed in an equal right-to-left torque distribution ratio of 50:50 so that the right wheel driving torque, i.e., the torque of the second sun gear 157, is equal to the left wheel driving torque, i.e., the torque of the carrier 153, if the gear geometry of the gears is determined so as to establish equal torque distribution.

When the rear left wheel 16 is slipping and NL>NR, the first pinions 158 and the second pinions 159 make a planetary motion for a differential motion. Consequently, the difference in rotating speed between the right rear wheel 19 and the left rear wheel 16 during the turning of the vehicle is absorbed and the vehicle is able to turn smoothly.

As the first pinions 158 and the second pinions 159 make a planetary motion, a thrust acts on each set of the first pinion 158 and the second pinion 159 due to the difference in helix angle between the first pinion 158 and the second pinion 159, a frictional resistance acts on the end surface of either the first pinion 158 or the second pinion 159, and a composite force of a load radially acting on the first pinion 158 and the second pinion 159, and a tangential load acting on the first pinion 158 and the second pinion 159 acts on the circumference of each planet pin 161 to exert a frictional resistance against the rotation of the first pinion 158 and the second pinion 159. These frictional resistances produce a differential limiting torque.

Under such a condition, the differential limiting torque retards the rotation of the carrier 153, so that the ratio of the torque distributed to the rear right wheel 19 is increased and a major part of the input torque is distributed to the rear right wheel 19. Consequently, the slip of the rear left wheel 16 during straight traveling is prevented.

When the rear right wheel 19 slips and NR>NL, the first pinions 158 and the second pinions 159 make a planetary motion due to the difference in rotating speed between the rear right wheel 19 and the rear left wheel 16, so that a frictional resistance is produced.

Under such a condition, a differential limiting torque promotes the rotation of the carrier 153, so that the ratio of the torque distributed to the rear left wheel 16 is increased and a major part of the input torque is distributed to the rear left wheel 16. Consequently, the slip of the rear right wheel 19 is prevented.

Since the differential limiting torque of the differential limiting mechanism 144 of the rear right/left driving torque distributing device 7 is proportional to the input torque, the differential limiting torque is proportional to the torques of the rear right wheel 19 and the rear left wheel 16, and the differential limiting function is exercised always at a fixed rate.

The operation of the gear mechanism 145 and the clutch mechanism 146 will be described hereinafter. When the differential gear case 151 is rotated, the rotation of the differential gear case 151 is transmitted through the first shaft 154 fixed to the differential gear case 151, the first gear 162 formed integrally with the first shaft 154, the fourth gear 165 engaged with the first gear 162, and the fourth shaft 168 formed integrally with the fourth gear 165 to the clutch drum 169 to rotate the clutch drum 169.

The rotation of the carrier 153 is transmitted through the second shaft 155 fixed to the cattier 153, the second gear 163 formed integrally with the second shaft 155, the fifth gear 166 engaged with the second gear 163 and the fifth shaft 170 formed integrally with the fifth gear 166 to the clutch hub 171 to rotate the clutch hub 171.

As the right drive shaft 17 is rotated, the third gear 164 rotates, the sixth gear 167 engaged with the third gear 164 rotates, whereby the sixth shaft 174 and the clutch hub 175 are rotated.

The right/left driving torque distribution controller 32 processes the output signals of the throttle opening sensor 26, the traveling speed sensor 27, the steering angle sensor 29, the longitudinal acceleration sensor 30 and the lateral acceleration sensor 31, and a gear position signal to calculate optimum driving torques to be distributed to the front wheels 21 and 29 and the rear wheels 16 and 19.

While the vehicle is making a right turn and a major part of the input driving torque is to be distributed to the rear left wheel 16, the right/left driving torque distribution controller 32 gives a control signal to the rear fluid pressure controller 34 to make the same supply the working fluid of a set pressure determined by calculation to the first pressure chamber 179.

Consequently, the working fluid of the set pressure is supplied through the fluid pipe 36a to the first pressure chamber 179, the first piston 178 is actuated, the first hydraulic multiple-disk clutch 173 is engaged at the set pressure, and the driving torque applied to the differential gear case 151 is distributed through the first hydraulic multiple-disk clutch 173, the second gear 163 and the carrier 153 to the left drive shaft 14.

While the vehicle is making a left turn and a major part of the input driving torque is to be distributed to the rear right wheel 19, the right/left driving torque distribution controller 32 gives a control signal to the rear fluid pressure controller 34 to make the same supply the working fluid of a set pressure to the second pressure chamber 181.

Consequently, the working fluid of the set pressure is supplied through the fluid pipe 36b to the second pressure chamber 181, the first piston 180 is actuated, the second hydraulic multiple-disk clutch 177 is engaged at the set pressure, and the driving torque applied to the differential gear case 151 is distributed through the second hydraulic multiple-disk clutch 177 and the third gear 164 to the right drive shaft 17.

The driving torque distributed through the front drive shaft 10 and the drive pinion 11 to the front right/rear driving torque distributing device 12 is transferred through the crown gear 152 to the differential gear case 151.

The front right/left driving torque distributing device 12, similarly to the rear right/left driving torque distributing device 7, exercises a differential function for the front wheels 21 and 23. When distributing a major part of the driving torque to the front left wheel 21 while the vehicle is making a right turn, the front fluid pressure controller 35 supplies the working fluid of a set pressure determined by calculation through the fluid pipe 37a to the first pressure chamber 179. When distributing a major part of the driving torque to the front right wheel 23 while the vehicle is making a left turn, the working fluid of a set pressure is supplied through the fluid pipe 37b to the second pressure chamber 181.

The right/left driving torque distributing device in the second embodiment has a relatively small lateral size, the universal joints joining the right and the left wheel to the right and the left axle can be disposed at a relatively small angle of bend, which is advantageous in respect of durability and reliability.

The right/left driving torque distributing device consists of a relatively small number of component parts, and many of the component parts may be those of conventional right/left driving torque distributing devices. The right/left driving torque distributing device has a compact construction and can be manufactured at a relatively low manufacturing cost.

Since the right/left driving torque distributing device has a compact construction and a relatively small lateral size, interference between the right/left driving torque distributing device, and the component parts of the suspensions or the exhaust system can be prevented, sufficient spaces can be secured around the right/left driving torque distributing device, which facilitates work for mounting the right/left driving torque distributing device on the vehicle and maintenance work.

Since the driving torque applied to the differential gear case is distributed to the right and the left output member, the right/left driving torque distributing device has a compact construction.

Since the right/left driving torque distributing device employs the driving torque distributing mechanism comprising the three gear trains, the driving torque distributing ratio can be properly determined according to the characteristics of the vehicle or desired performance of the vehicle by properly determining the gear ratios of the three gear trains.

The first and the second hydraulic multiple-disk clutch of the right/left driving torque distributing device are united together in a single, compact, lightweight structure.

Since the differential limiting mechanism has the gear geometry (helix angles and pressure angles), and torque-sensitive differential limiting function using frictional forces acting on the pinions, the carrier and the planet pins, the right/left driving torque distributing device has both the differential limiting function and the positive right/left driving torque distributing function.

The center differential gear comprises a relatively small number of component parts, and is simple in construction, compact and lightweight. Therefore, the center differential gear can be easily manufactured and assembled and is advantageous in respect of the vibration and the noise generation of the power transmission system.

Both the center differential gear and the right/left driving torque distributing device are compact and lightweight, and can be easily united together to construct a compact, lightweight, integrated unit.

The number of teeth of the gears of the center differential gear may be determined so that the reference front-to-rear driving torque distribution ratio is 50:50. An input-torque-proportional differential limiting torque is distributed to the front wheels or the rear wheels according to the traveling condition of the vehicle and the surface condition of the road. Consequently, the slip of the vehicle can be prevented, traction can be secured, the skidding of the rear wheels can be prevented and the running performance of the vehicle can be improved. Furthermore, the posture of the vehicle can be easily controlled by operating the accelerator pedal and the vehicle respond satisfactorily to control operations, which enables enjoyable sporty driving of the vehicle.

Right/left driving torque distributing devices in modifications of the right/left driving torque distributing device in the second embodiment will be described with reference to FIGS. 25 to 30.

Figure 25:
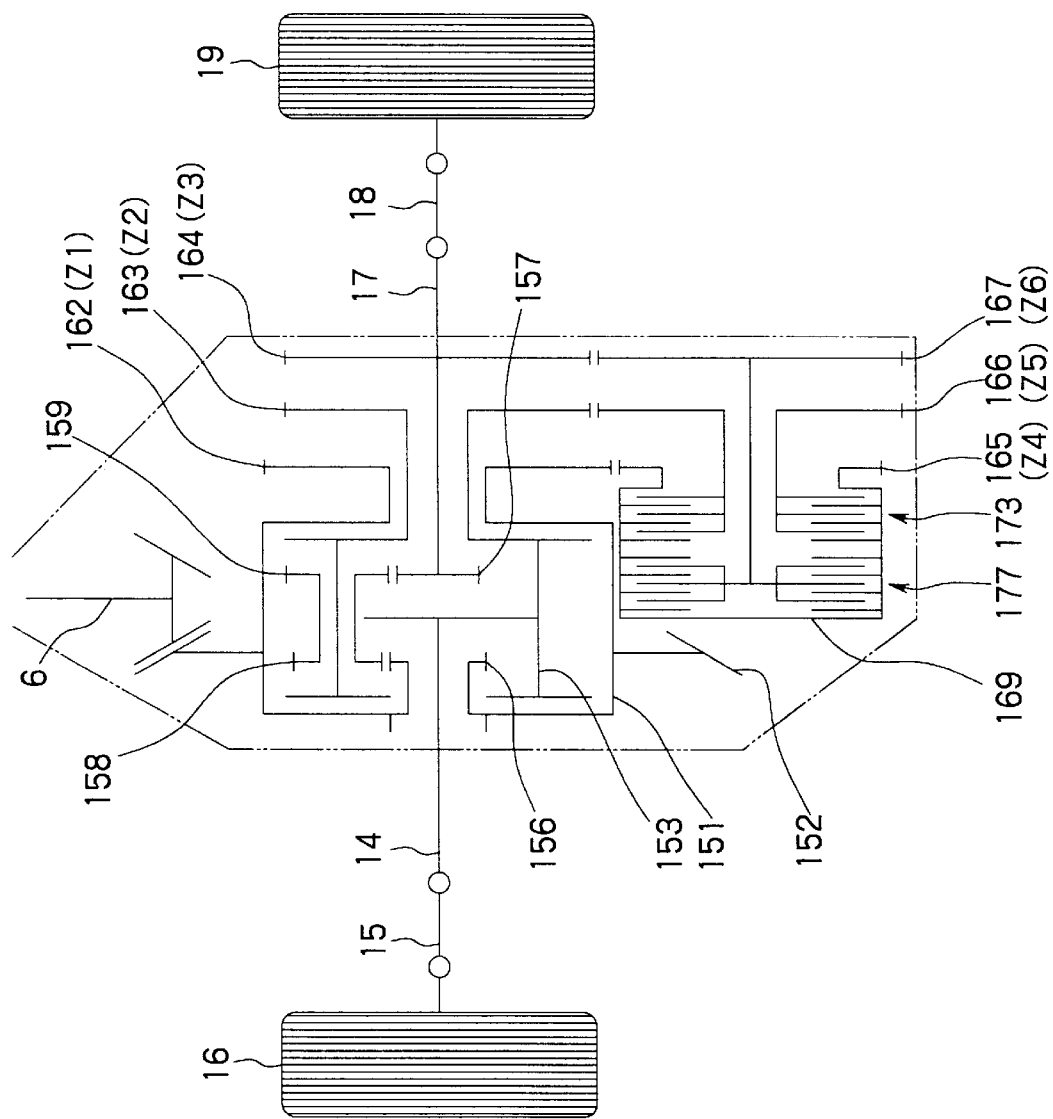
FIGS. 25 to 30 are enlarged diagrammatic views of rear differential gears in modifications of the right/left driving torque distributing device shown in FIG. 24.

A rear right/left driving torque distributing device in a first modification shown in FIG. 25 differs from the rear right/left driving torque distributing device 7 in the second embodiment shown in FIG. 23 inthe position of the clutch mechanism.

As shown in FIG. 25, a first hydraulic multiple-disk clutch 173 associated with the second gear 163 is disposed on the left side of the fourth gear 165, i.e., on the side of the differential gear case 151, and the second hydraulic multiple-disk clutch 177 associated with the third gear 164 is disposed on the left side of the first hydraulic multiple-disk clutch 173. This arrangement of the clutch mechanism enables the rear right/left driving torque distributing device to be formed in a lateral size smaller than that of the rear right/left driving torque distributing device 7 of FIG. 23.

Figure 26:
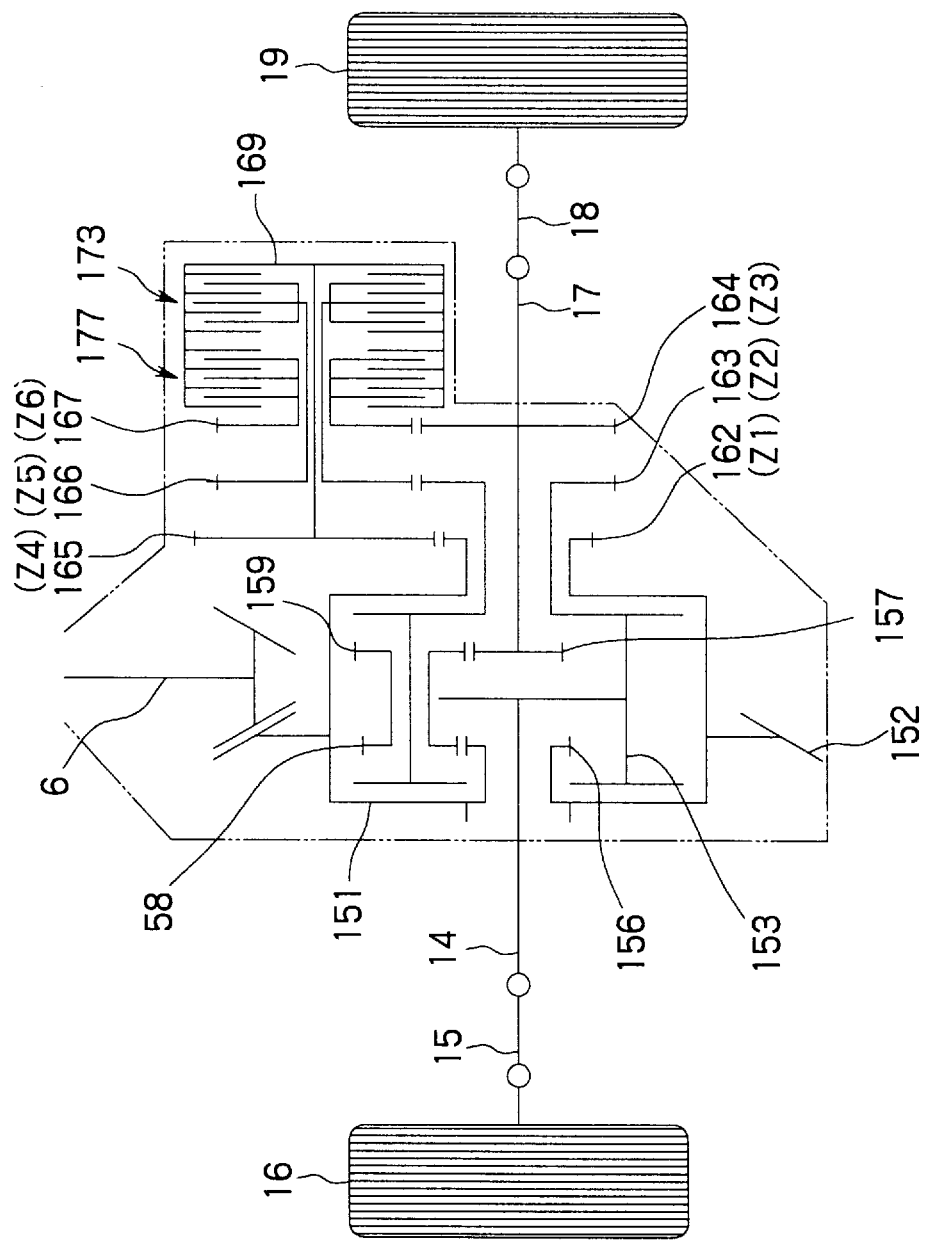

A rear right/left driving torque distributing device in a second modification shown in FIG. 26 differs from the rear right/left driving torque distributing device 7 in the second embodiment shown in FIG. 23 in the gear ratio of the first gear train of the gear mechanism.

In the rear right/left driving torque distributing device in the second modification, the first gear train has a gear ratio z4/z1=1/0.9, the second gear train has a gear ratio z5/z2=1/1 and the third gear train has a gear ratio z6/z3=1/1. Only the gear ratio of the second gear train is greater than 1. Accordingly, the operation of the rear right/left driving torque distributing device of FIG. 26 when either of the hydraulic multiple-disk clutches is engaged is reverse to that of the rear right/left driving torque distributing device 7 in the second embodiment.

While the vehicle is making a right turn and a major part of the driving torque is to be distributed to the rear left wheel, the right/left torque distribution controller 32 gives a signal to the rear fluid pressure controller 34 to make the rear fluid pressure controller 34 supply the working fluid of a set pressure determined by calculation to the second pressure chamber 181.

Consequently, the working fluid of the set pressure is supplied through the fluid pipe 36b to the second pressure chamber 181, the second piston 180 is actuated to compress the friction disks of the second hydraulic multiple-disk clutch 177 at the set pressure, whereby a major part of the driving torque of the differential gear case 151 is transferred to the carrier 153 and a minor part of the same is transferred to the right drive shaft 17.

While the vehicle is making a left turn and a major part of the driving torque is to be distributed to the rear right wheel, the right/left torque distribution controller 32 gives a signal to the rear fluid pressure controller 34 to make the rear fluid pressure controller 34 supply the working fluid of a set pressure determined by calculation to the first pressure chamber 179.

Consequently, the working fluid of the set pressure is supplied through the fluid pipe 36a to the first pressure chamber 179, the first piston 178 is actuated to compress the friction disks of the first hydraulic multiple-disk clutch 173 at the set pressure, whereby a major part of the driving torque of the differential gear case 151 is transferred to the right drive shaft 17 and a minor part of the same is transferred to the carrier 153.

Figure 27:
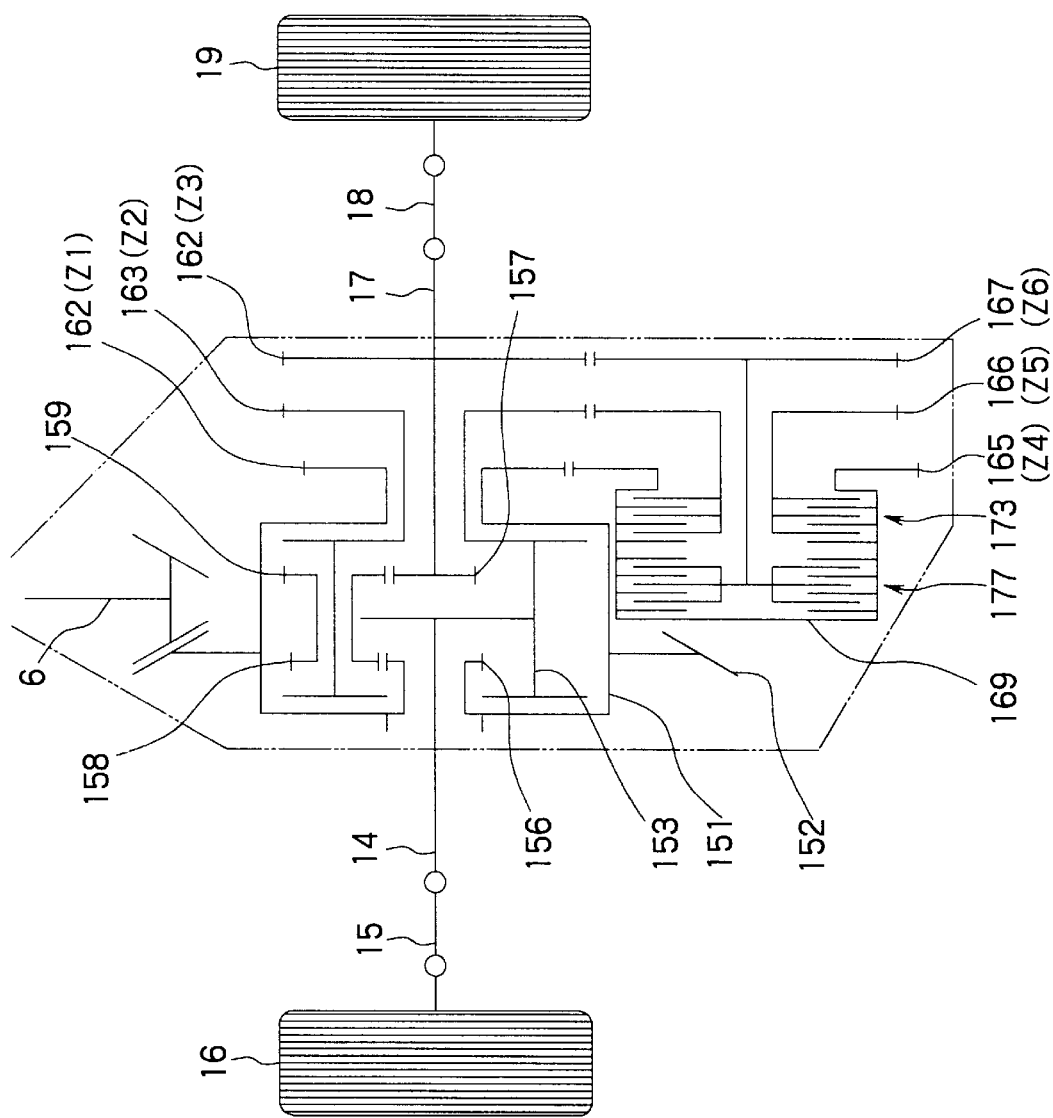

A rear right/left driving torque distributing device in a third modification shown in FIG. 27 differs from the rear right/left driving torque distributing device 7 in the second embodiment shown in FIG. 23 in the position of the clutch mechanism.

As shown in FIG. 27, the first hydraulic multiple-disk clutch 173 associated with the second gear 163 is disposed on the left side of the fourth gear 165, i.e., on the side of the differential gear case 151, the second hydraulic multiple-disk clutch 177 associated with the third gear 164 is disposed on the left side of the first hydraulic multiple-disk clutch 173, and the first hydraulic multiple-disk clutch 173 and the second hydraulic multiple-disk clutch 177 are united together to form the clutch mechanism. This arrangement of the clutch mechanism enables the rear right/left driving torque distributing device to be formed in a lateral size smaller than that of the rear right/left driving torque distributing device 7 in the second embodiment shown in FIG. 23.

Figure 28:
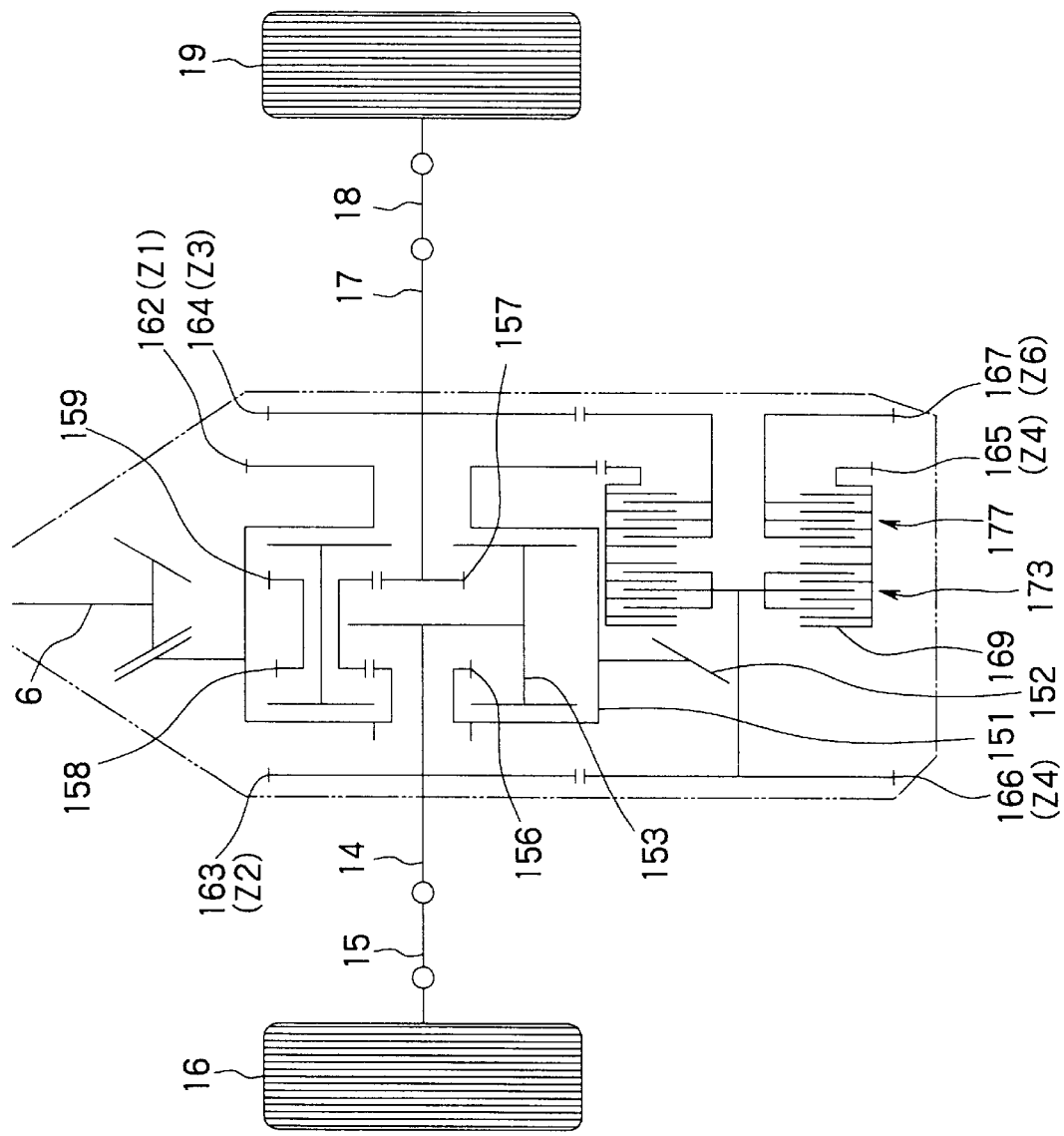

A rear right/left driving torque distributing device shown in FIG. 28 in a fourth modification of the rear right/left driving torque distributing device 7 in the second embodiment shown in FIG. 23 is similar to the rear right/left driving torque distributing device shown in FIG. 25 except that the second gear train of the gear mechanism is separated from the first and the third gear train of the same.

As shown in FIG. 28, the second gear 163 is fixed to the left drive shaft 14 instead of to the carrier 153. Therefore, the first and the third gear train are disposed on the right side of the differential gear case 151, and the second gear train is disposed on the left side of the differential gear case 151.

Figure 29:
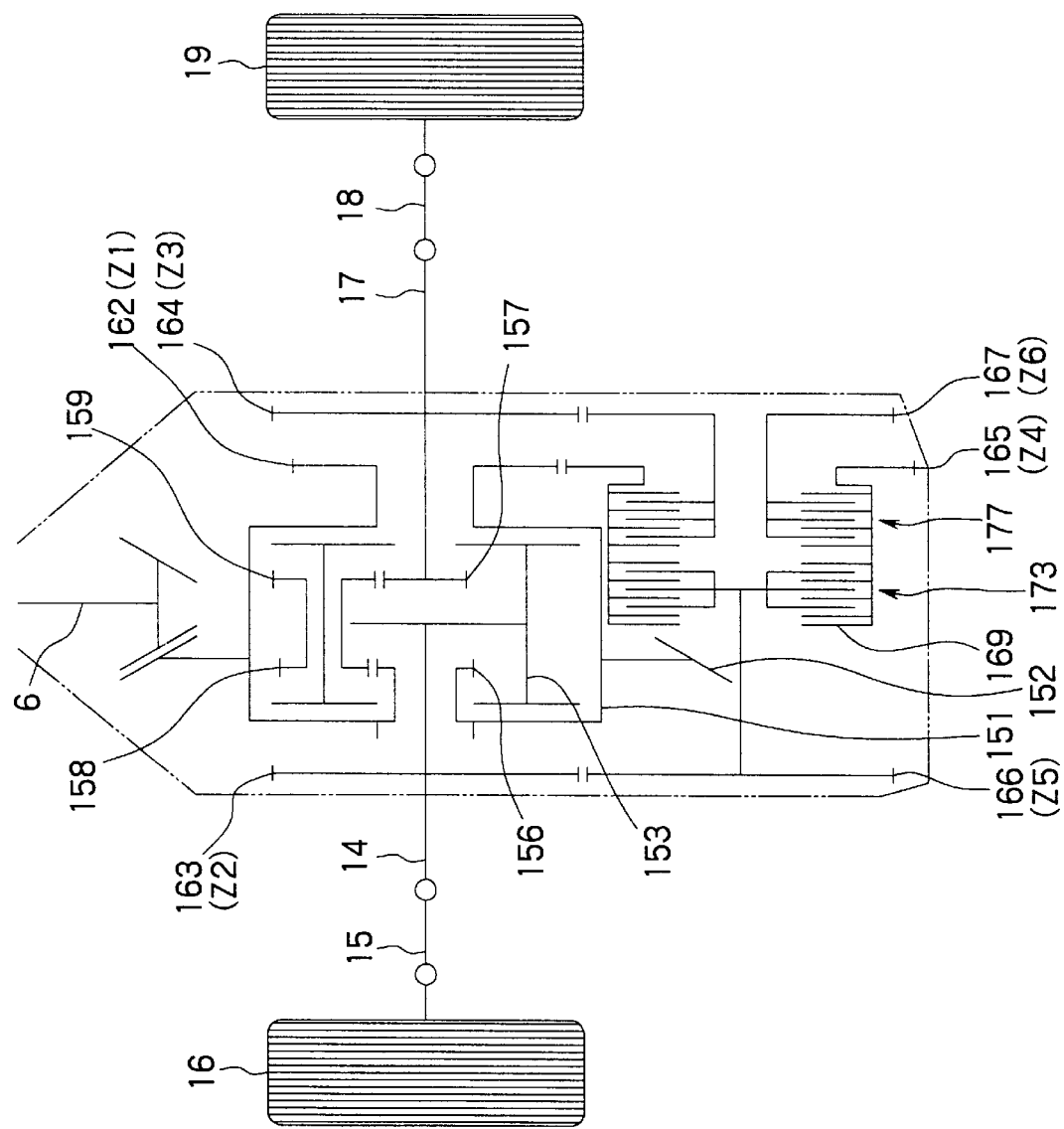

FIG. 29 shows a rear right/left driving torque distributing device in a fifth modification of the rear right/left driving torque distributing device 7 in the second embodiment shown in FIG. 23. The rear right/left driving torque distributing device in the fifth modification is similar to that shown in FIG. 27 except that the second gear train of the gear mechanism is separated from the first and the third gear train of the same.

As shown in FIG. 29, the second gear 163 is fixed to the left drive shaft 14 instead of to the carrier 153. Therefore, the first and the third gear train are disposed on the right side of the differential gear case 151, and the second gear train is disposed on the left side of the differential gear case 151.

Figure 30:
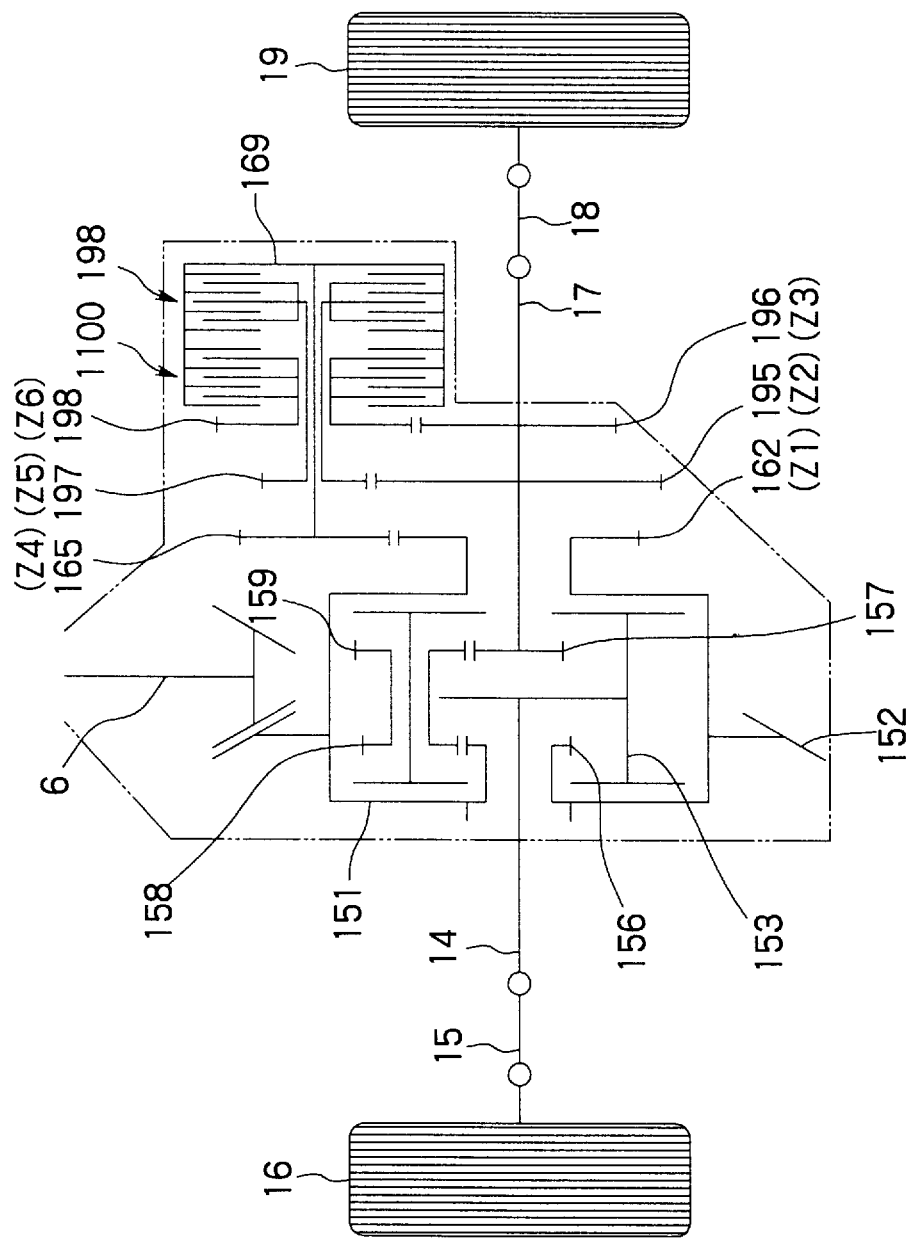

FIG. 30 shows a rear right/left driving torque distributing device in a sixth modification of the rear right/left driving torque distributing device 7 in the second embodiment shown in FIG. 23. In the rear right/left driving torque distributing device of FIG. 30, the driving torque is distributed to the right and the left wheel by two gear trains disposed on the side of one of the two output members.

As shown in FIG. 30, a first gear 162 is fixed to the differential gear case 151, a second gear 195 and a third gear 196 are fixed to the right drive shaft 17, and a fourth gear 165, a fifth gear 197 and a sixth gear 198 coaxially arranged on an axis are engaged with the first gear 162, the second gear 195 and the third gear 196, respectively.

The diameter of the second gear 195 is greater than that of the first gear 162, and the diameter of the third gear 196 is smaller than that of the first gear 162. The first gear 162 and the fourth gear 165 forms a first gear train of a gear ratio $z4/z1=0.9/1$, the second gear 195 and the fifth gear 197 form a second gear train of a gear ratio $z5/z2-0.9 \cdot 0.9/1$, and the third gear 196 and the sixth gear 198 form a gear train of a gear ratio $z6/z3=1/1$, where $z1, z2, z3, z4, z5$ and $z6$ are the numbers of teeth of the first gear 162, the second gear 195, the third gear 196, the fourth gear 165, the fifth gear 197 and the sixth gear 198, respectively. The gear ratios in decreasing order are 1 (the gear ratio of the third gear train), 0.9 (the gear ratio of the first gear train) and $0.9 \cdot 0.9$ (the gear ratio of the second gear train), and the step ratios between the gear ratios of the first gear train and the third gear train and between the second gear train and the first gear train are 0.9. The step ratios need not necessarily be 0.9.

The first and the second gear train are interlocked by a first hydraulic multiple-disk clutch 199 for power transmission, and the first and the third gear train are interlocked by a second hydraulic multiple-disk clutch 1100 for power transmission.

The capacities of the first hydraulic multiple-disk clutch 199 and the second hydraulic multiple-disk clutch 1100 may be different from each other, and either of the first hydraulic multiple-disk clutch 199 and the second hydraulic multiple-disk clutch 1100 may be smaller than the other.

While the vehicle is making a right turn and a major part of the input driving torque is to be distributed to the rear left wheel 16, the right/left driving torque distribution controller 32 gives a control signal to the rear fluid pressure controller 34 to make the same supply the working fluid of a set pressure determined by calculation to the first pressure chamber 179.

Consequently, the working fluid of the set pressure is supplied through the fluid pipe 36a to the first pressure chamber 179, the first piston 178 is actuated, the first hydraulic multiple-disk clutch 173 is engaged at the set pressure, and a major part of the driving torque applied to the differential gear case 151 is distributed to the carrier 153, and a minor part of the same is distributed to the right drive shaft 17.

While the vehicle is making a left turn and a major part of the input driving torque is to be distributed to the rear right wheel 19, the right/left driving torque distribution controller 32 gives a control signal to the rear fluid pressure controller 34 to make the same supply the working fluid of a set pressure to the second pressure chamber 181.

Consequently, the working fluid of the set pressure is supplied through the fluid pipe 36b to the second pressure chamber 181, the first piston 180 is actuated, the second hydraulic multiple-disk clutch 177 is engaged at the set pressure, and a major part of the driving torque applied to the differential gear case 151 is distributed to the right drive shaft 17.

The first and the second hydraulic multiple-disk clutch of the right/left driving torque distributing device in the second embodiment, similarly to those of the right/left driving torque distributing device in the first embodiment, can be controlled so that the slips between the drive friction disks and the driven friction disks of the first hydraulic multiple-disk clutch and between the drive friction disks and the driven friction disks of the second hydraulic multiple-disk clutch are equal to each other by determining the respective gear ratios of the three gear trains so as to meet a predetermined relation. Therefore, highly accurate torque distribution control can be achieved.

As is apparent from the configurations of the foregoing, modifications of the rear right/left driving torque distributing device in the second embodiment, the gear trains of the gear mechanism, and the clutch mechanism can be disposed at different positions in the different modifications, and the gear ratios of the gear trains may be other than thosereferred to in the foregoing description.

The right/left driving torque distributing device in the first embodiment is applicable also to front-engine front-drive vehicles and rear-engine rear-drive vehicles.

Four-wheel drive vehicles employing the right/left driving force distributing device of the present invention may be provided with a center differential gear other than that shown and described above.

Third Embodiment

A right/left driving torque distributing device in a third embodiment according to the present invention for a vehicle will be described with reference to FIGS. 31 to 45.

Figure 31:
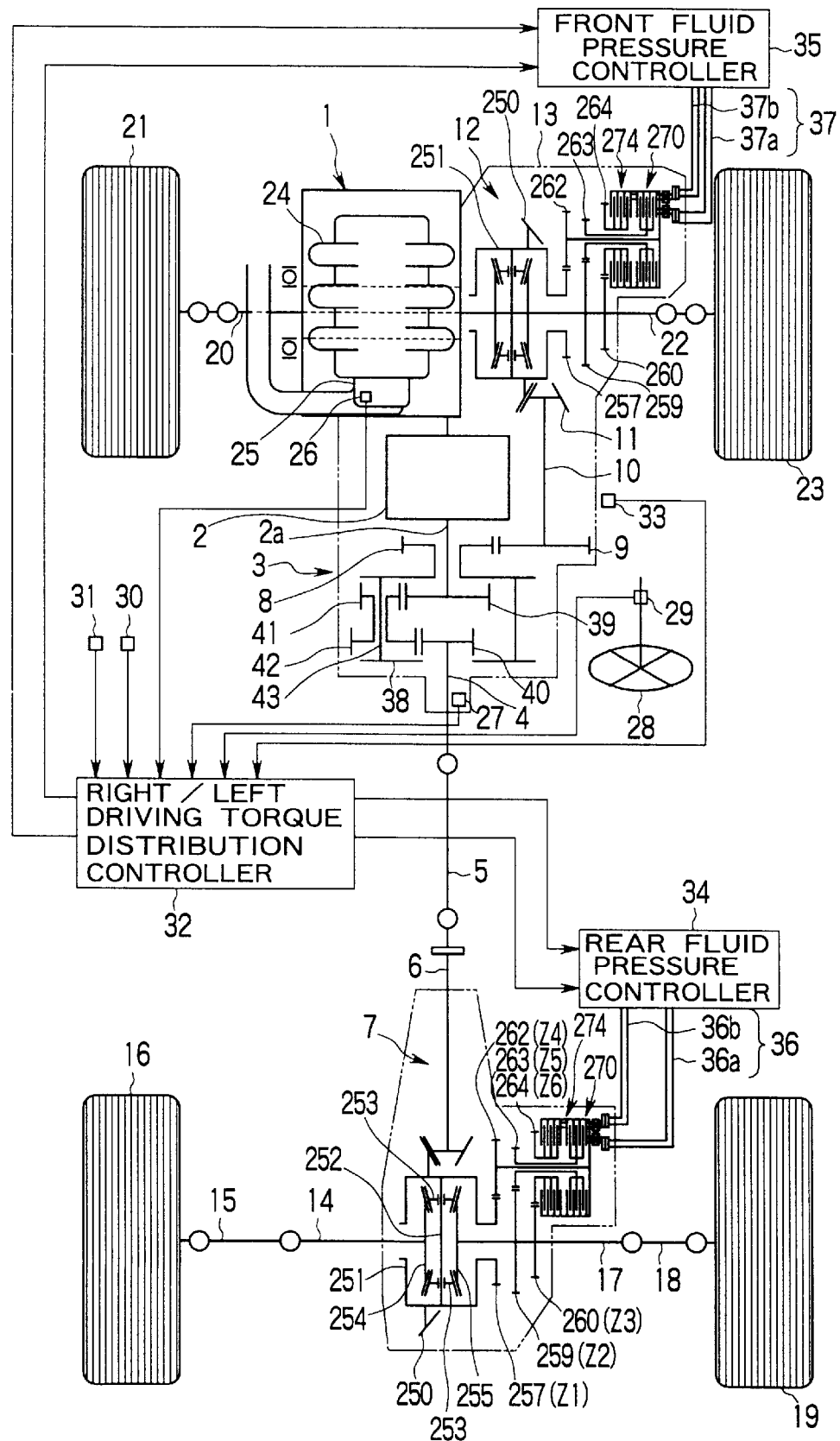
FIG. 31 is a diagrammatic view of a power transmission system for a four-wheel drive automobile, including a right/left driving torque distributing device in a third embodiment according to the present invention.

In a power transmission system shown in FIG. 31, the output driving torque of an engine 1 is transmitted through an automatic transmission 2 to a center differential gear 3. The center differential gear 3 distributes the driving torque through a rear drive shaft 4, a propeller shaft 5 and a drive pinion 6 to a rear right/left driving torque distributing device 7 in a third embodiment according to the present invention, and through a transfer drive gear 8, a transfer driven gear 9, a front drive shaft 10 and a drive pinion 11 to a front right/left driving torque distributing device 12 substantially identical with the rear right/left driving torque distributing device 7. The power transmission system including the center differential gear 3, the rear right/left driving torque distributing device 7 and the front right/left driving torque distributing device 12 is substantially the same in other respects as the power transmission system shown in FIG. 1 and hence the further description thereof will be omitted.

Figure 32:
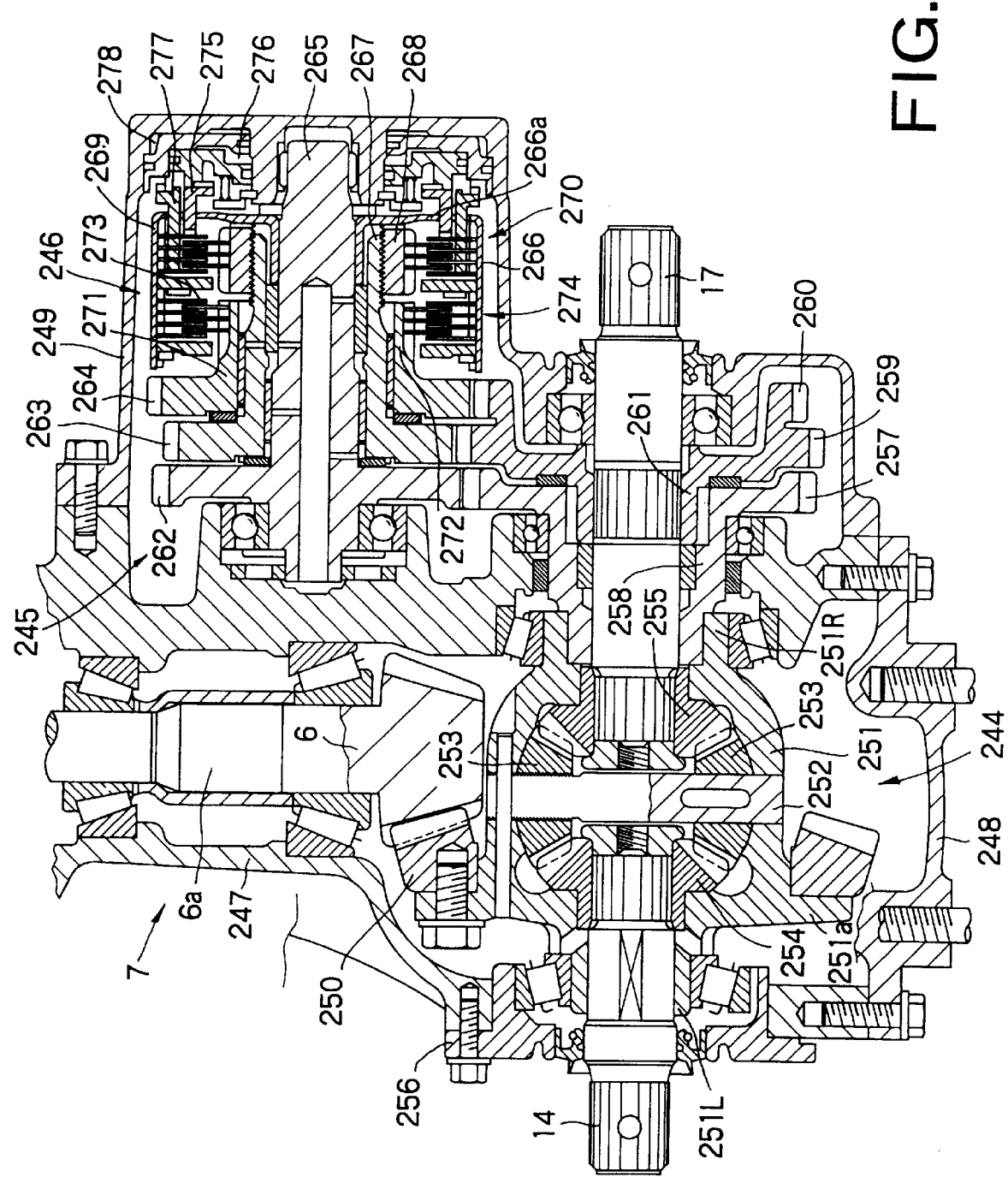
FIG. 32 is an enlarged sectional view of the rear righ/left driving force distributing device included in the power transmission system shown in FIG. 31.

The rear right/left driving torque distributing device 7 will be described in detail with reference to FIG. 32.

The rear right/left driving torque distributing device 7 comprises, as principal components, a differential mechanism 244, a gear mechanism 245 and a clutch mechanism 246. The drive pinion 6, i.e., a torque receiving member of the rear right/left driving torque distributing device 7, and the differential mechanism 244 are contained in a differential gear case 247. The clutch mechanism.246 is combined with the gear mechanism 245 joined to a side surface of the differential gear case 247. A cover 248 is attached to the rear end of the differential gear case 247, and the gear mechanism 245 and the clutch mechanism 246 are covered with a cover 249.

A shaft 6a formed integrally with the drive pinion 6 is connected to the propeller shaft 5 and is supported in bearings for rotation on the differential gear case 247. A final gear 250 engaged with the drive pinion 6 is fastened to a flange 251a formed on a differential gear case 251 included in the differential mechanism 244.

The differential mechanism 244 has the differential gear case 251, a pinion shaft 252 disposed within and fixedly supported on the differential gear case 251, differential pinions (bevel pinions) 253 rotatably supported on the pinion shaft 252, and side gears (bevel gears) 254 and 255 engaged with the differential pinions 253. Inner end portions of a left drive shaft 14 and a right drive shaft 17 are coupled with the side gears 254 and 255 by splines, respectively. The left drive shaft 14 and the right drive shaft 17 are supported rotatably in a left boss 251L and a right boss 251R formed on the differential gear case 251, respectively.

The left boss 251L of the differential gear case 251 is supported for rotation in a bearing on a side retainer 256 fastened to the differential gear case 247. The right boss 251R of the differential gear case 251 is supported for rotation in a bearing on the differential gear case 247.

The drive pinion 6 engaged with the final gear 205 drives the differential gear case 251 for rotation about an axis together with the side gears 254 and 255, and the differential gear mechanism contained in the differential gear case 251 operates for differential motions between the right wheel 19 and the left wheel 16

One end portion of a first shaft 258 formed integrally with a first gear 257 included in the gear mechanism 245 is inserted in and splined to the right boss 251R of the differential gear case 251.

The first shaft 258 is put on the right drive shaft 17 and is supported at an outer end portion thereof in a bearing on the differential gear case 247 so as to project from the differential gear case 247. The first gear 257 is formed integrally with the first shaft 258 at the outer end portion of the same.

A second gear 259 and a third gear 260 are disposed coaxially with the first gear 257 in that order on the outer side of the first gear 257. A shaft 261 is formed integrally with the second gear 259 and the third gear 260. The shaft 261 is put on and coupled with the right drive shaft 17 by splines. A fourth gear 262, a fifth gear 263 and a sixth gear 264 are arranged coaxially on an axis parallel to the common axis of the first gear 257, the second gear 259 and the third gear 260 and engaged with the first gear 257, the second gear 259 and the third gear 260, respectively.

The gear mechanism 245 has three gear trains, i.e., a first gear train of the first gear 257 and the fourth gear 262, a second gear train of the second gear 259 and the fifth gear 263, and a third gear train of the third gear 260 and the sixth gear 264.

The first gear train has a gear ratio z4/z1=0.9/1, the second gear train has a gear ratio z5/z2=0.9 0.9/1 and the third gear train has a gear ratio z6/z3=1/1, where, z1, z2, z3, z4, z5 and z6 are the numbers of teeth of the first gear 257, the second gear 259, the third gear 260, the fourth gear 262, the fifth gear 263 and the sixth gear 264, respectively. The gear ratios in decreasing order are 1 (the gear ratio of the third gear train), 0.9 (the gear ratio of the first gear train) and 0.9·0.9 (the gear ratio of the second gear train), and the step ratios between the gear ratios of the first, the second and the third gear train are 0.9. The step ratios need not necessarily be 0.9.

The fourth gear 262 is formed in an inner end portion of a fourth shaft 265 and serves as a first clutch gear. The fourth shaft 265 has an inner end supported for rotation in a bearing on the outer surface of a side wall of the differential gear case 247 and an outer end supported for rotation on the cover 249. A cylindrical clutch drum 266 opening toward the fourth gear 262 is fixed to the outer end of the fourth shaft 265.

The fifth gear 263 is formed integrally with a fifth shaft 267 at one end of the latter and serves as a second clutch gear. The fifth shaft 267 is put on the fourth shaft 265 and extends to the bottom wall 266a of the clutch drum 266. A clutch hub 268 of a predetermined length is mounted on the other end of the fifth shaft 267. A plurality of friction disks 269 are mounted alternately on the clutch hub 268 and the clutch drum 266 to form a first hydraulic multiple-disk clutch 270.

The sixth gear 264 is formed integrally with a sixth shaft 271 at one end of the latter and serves as a third clutch gear. The sixth shaft 271 is put on the fifth shaft 267 and extends to the inner side surface of the innermost friction disk of the first hydraulic multiple-disk clutch 270. A clutch hub 272 of a predetermined length is mounted on the other end of the sixth shaft 271. A plurality of friction disks 273 are mounted alternately on the clutch hub 272 and the clutch drum 266 to form a second hydraulic multiple-disk clutch 274.

The first hydraulic multiple-disk clutch 270 is engaged and disengaged by operating a first piston 275 extended through the bottom wall 266a of the clutch drum 266 and fitted in a first pressure chamber 276. A working fluid of a variable pressure controlled by a right/left driving torque distribution controller 32 is supplied into the first pressure chamber 276 through a first fluid pipe 36a to operate the first piston 275.

Similarly, the second hydraulic multiple-disk clutch 274 is engaged and disengaged by operating a second piston 277 extended through the bottom wall 266a of the clutch drum 266 and fitted in a second pressure chamber 278. A working fluid of a variable pressure controlled by the right/left driving torque distribution controller 32 is supplied into the second pressure chamber 278 through a second fluid pipe 36b to operate the second piston 277.

The hydraulic multiple-disk clutches 73 and 77 are combined to construct the clutch mechanism 246. Since the gear mechanism 245 has the gear trains of the foregoing gear ratios, a major part of the input driving torque applied to the differential gear case 251 is distributed to the left drive shaft 14 when the first hydraulic multiple-disk clutch 270 is engaged, and a major part of the input driving torque applied to the differential gear case 251 is distributed to the right drive shaft 17 when the second hydraulic multiple-disk clutch 274 is engaged. The pressures of the working fluid for engaging the hydraulic multiple-disk clutches 27- and 274 are calculated by the right/left driving power distribution controller 32. The torque distribution ratio in which the driving torque is distributed to the left drive shaft 14 and the right drive shaft 17 is controlled by varying the pressure of the working fluid.

The two hydraulic multiple-disk clutches 270 and 274 of the clutch mechanism 246 may be substituted by electromagnetic clutches or variable-capacity couplings. The respective torque transmission capacities of the hydraulic multiple-disk clutches 270 and 274 may be different from each other according to the gear ratios or the hydraulic multiple-disk clutches 270 and 274 may be different in size from each other.

A driving torque is transmitted to the front right/left driving torque distributing device 12 through the front drive shaft 10, the drive pinion 11 and a final gear 250. The front right/left driving torque distributing device 12 is substantially the same in construction as the rear right/left driving torque distributing device 7 and hence the description thereof will be omitted.

A rear fluid pressure controller 34 and a front fluid pressure controller 35 for supplying the working fluid of controlled pressures to the hydraulic multiple-disk clutches 270 and 274 are the same in construction and function as those included in the power transmission system employing the right/left driving torque distributing devices in the first embodiment and hence the description thereof will be omitted.

The operation of the power transmission system will be described hereinafter.

The output driving torque of the engine 1 is transmitted through the output shaft 2a of the automatic transmission 2 to the first sun gear 39 of the center differential gear 3.

Then, the input driving torque is distributed through the pinions 41 and 42 to the second sun gear 40 and to the carrier 38 supporting the pinions 41 and 42. A driving torque transmitted to the second sun gear 40 is transferred through the rear drive shaft 4 to the rear right/left driving torque distributing device 7, and a driving torque distributed to the carrier 38 is transferred through the transfer drive gear 8, the transfer driven gear 9 and the front drive shaft 10 to the front right/left driving torque distributing device 12 to drive the vehicle in a four-wheel driving mode.

When the carrier 38 and the second sun gear 40 of the center differential gear 3 rotate in the same direction at the same rotating speed, i.e., when the output rotating speed NF of the carrier 38 and the output rotating speed NR of the second sun gear 40 are equal to each other (NF=NR) and the vehicle is traveling straight, the first pinions 41 and the second pinions 42 do not make any planetary motion and revolve together with the carrier 38.

Since the first pinion 41 and the second pinion 42 revolve together with the carrier 38, any frictional torque does not act on either of the first pinion 41 and the second pinion 42. Consequently, the input torque Ti applied to the first sun gear 39 is distributed in an equal front-to-rear torque distribution ratio of 50:50 so that the front wheel driving torque TF, i.e., the torque of the carrier 38, is equal to the rear wheel driving torque TR, i.e., the torque of the second sun gear 40, if the gear geometry of the gears is determined so as to establish equal torque distribution or the input torque Ti is distributed in an unequal front-to-rear torque distribution ratio so that the front wheel driving torque TF and the rear wheel driving torque TR are unequal to each other if the gear geometry of the gears is determined so as to establish unequal torque distribution dependent on the gear geometry.

When the vehicle is turning with the front output rotating speed higher than the rear output rotating speed, i.e., NF>NR, or the front wheels slipping, the first pinions 41 and the second pinions 42 of the center differential gear 3 make a planetary motion for a differential motion. Consequently, the difference in rotating speed between the front wheels and the rear wheels during the turning of the vehicle is absorbed and the vehicle is able to turn smoothly.

As the first pinions 41 and the second pinion 42 make a planetary motion, a thrust acts on each set of the first pinion 41 and the second pinion 42 due to the difference in helix angle between the first pinion 41 and the second pinion 42, a frictional resistance acts on the end surface of either the first pinion 41 or the second pinion 42, and a composite force of a load radially acting on the first pinion 41 and the second pinion 42, and a tangential load acting on the first pinion 41 and the second pinion 42 acts on the circumference of each planet pin 43 to exert a frictional resistance against the rotation of the first pinion 41 and the second pinion 42. These frictional resistances produce a differential limiting torque.

Under such a condition, the differential limiting torque retards the rotation of the carrier 38, so that a major part of the input torque is distributed to the rear right/left driving torque distributing device 7. Consequently, the steering nature and the controllability of the vehicle during turning are improved, and the slip of the front wheels during straight traveling can be prevented.

When the rear wheels slip and NR>NF, the first pinions 41 and the second pinions 42 of the center differential gear 3 make a planetary motion due to the difference in rotating speed between the front wheels and the rear wheels, so that a frictional resistance is produced.

Under such a condition, a differential limiting torque promotes the rotation of the carrier 38, so that a major part of the input torque is distributed to the front right/left driving torque distributing device 12, so that the slip of the rear wheels is prevented.

Since the differential limiting torque of the center differential gear 3 is proportional to the input torque Ti, the differential limiting torque is proportional to the torques of the front and the rear wheels, and the differential limiting function is exercised always at a fixed rate.

The driving torque distributed by the center differential gear 3 to the rear right/left driving torque distributing device 7 is transmitted through the propeller shaft 5 and the drive pinion 6 to the rear right/left driving torque distributing device 7, and the driving torque is transmitted through the final gear 250 to the differential gear case 251.

The differential operation of the differential mechanism 244 will be described hereinafter. The driving torque rotates the differential gear case 251 together with the pinion shaft 252. If the left wheel 16 and the right wheel 19 rotate at the same rotating speed, the differential pinions 253 rotatably supported on the pinion shaft 252 do not rotate relative to the pinion shaft 252 and revolve together with the pinion shaft 252, so that the left side gear 254 and the right side gear 255 rotates at the same rotating speed to transmit the driving torque to the left drive shaft 14 and the right drive shaft 17.

If the left wheel 16 and the right wheel 19 rotate at different rotating speeds, respectively, the differential pinions 253 rotates relative to the pinion shaft 252 to permit the left wheel 16 and the right wheel 19 to rotate at different rotating speeds, respectively, and transmits driving torques to the left wheel 16 and the right wheel 19.

The operation of the gear mechanism 245 and the clutch mechanism 246 will be described hereinafter. When the differential gear case 251 is rotated, the first shaft 258 integrally provided with the first gear 257 and splined to the differential gear case 251 rotates. The rotation of the first gear 257 is transmitted through the fourth gear 262 engaged with the first gear 257, and the fourth shaft 265 to rotate the clutch drum 266.

The shaft 261 rotates together with the right drive shaft 17, so that the second gear 259 and the third gear 260 rotate.

The rotation of the second gear 259 is transmitted through the fifth gear 263 engaged with the second gear 259, and the fifth shaft 267 to rotate the clutch hub 268. The rotation of the third gear 260 is transmitted through the sixth gear 264 engaged with the third gear 260, and the sixth shaft 271 rotates the clutch hub 272.

In the right/left driving torque distribution controller 32, the output signals of the throttle opening sensor 26, the traveling speed sensor 27, the steering angle sensor 29, the longitudinal acceleration sensor 30 and the lateral acceleration sensor 31, and the gear position signal are processed to calculate optimum driving torques to be distributed to the front right wheel 23, the front left wheel 21, the rear right wheel 19 and the rear left wheel 16.

When distributing a major part of the driving torque to the rear left wheel 16 while the vehicle is making a right turn, the right/left driving torque distribution controller 32 gives a signal requesting the supply of the working fluid of a set pressure determined by calculation to the first pressure chamber 276 to the rear fluid pressure controller 34.

Then, the working fluid of the set pressure is supplied through the fluid pipe 36a to the first pressure chamber 276, the first piston 275 is actuated to compress the friction disks of the first hydraulic multiple-disk clutch 270 at a set pressure. Consequently, the driving torque of the differential gear case 251 is distributed through the second gear 259, the first hydraulic multiple-disk clutch 270 to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the second pressure chamber 278 to the rear fluid pressure controller 34.

Then, the working fluid of the set pressure is supplied through the fluid pipe 36b to the second pressure chamber 278, the second piston 277 is actuated to compress the friction disks of the second hydraulic multiple-disk clutch 273 at a set pressure. Consequently, the driving torque of the differential gear case 251 is distributed through the second hydraulic multiple-disk clutch 273 and the third gear 260 to the right drive shaft 17.

The driving torque distributed to the front right/left driving torque distributing device 12 by the center differential gear 3 is transmitted through the front drive shaft 10 and the drive pinion 11 to the front right/left driving torque distributing device 12. The driving torque is transmitted through the final gear 250 to the differential gear case 251.

The front right/left driving torque distributing device 12, similarly to the rear right/left driving torque distributing device 7, exercises a differential function for the front wheels 21 and 23. When distributing a major part of the driving torque to the front left wheel 21 while the vehicle is making a right turn, the front fluid pressure controller 35 supplies the working fluid of a set pressure determined by calculation through the fluid pipe 37a to the first pressure chamber 276. When distributing a major part of the driving torque to the front right wheel 23 while the vehicle is making a left turn, the working fluid of a set pressure is supplied through the fluid pipe 37b to the second pressure chamber 278.

The right/left driving torque distributing device in the third embodiment has a relatively small lateral size, the universal joints joining the right and the left wheel to the right and the left axle can be disposed at a relatively small angle of bend, which is advantageous in respect of durability and reliability.

The right/left driving torque distributing device consists of a relatively small number of component parts, and many of the component parts may be those of conventional right/left driving torque distributing devices. The right/left driving torque distributing device has a compact construction and can be manufactured at a relatively low manufacturing cost.

Since the right/left driving torque distributing device has a compact construction and a relatively small lateral size, interference between the right/left driving torque distributing device, and the suspensions or the exhaust system can be prevented, sufficient spaces can be secured around the right/left driving torque distributing device, which facilitates work for mounting the right/left driving torque distributing device on the vehicle and maintenance work.

Since the right/left driving torque distributing device employs the driving torque distributing mechanism comprising the three gear trains, the driving torque distributing ratio can be properly determined according to the characteristics of the vehicle or desired performance of the vehicle by properly determining the gear ratios of the three gear trains.

The first and the second hydraulic multiple-disk clutch of the right/left driving torque distributing device can be controlled so that the slips between the drive friction disks and the driven friction disks of the first hydraulic multiple-disk clutch and between the drive friction disks and the driven friction disks of the second hydraulic multiple-disk clutch are equal to each other by determining the respective gear ratios of the three gear trains so as to meet a predetermined relation. Therefore, a range in which the same friction characteristics (the relation between speed and coefficient of dynamic friction) is usable can be used and highly accurate control can be achieved.

The first and the second hydraulic multiple-disk clutch of the right/left driving torque distributing device are united together in a single, compact, lightweight structure. The capacities of the first and the second hydraulic multiple-disk clutch may be different from each other, and either of the first and the second hydraulic multiple-disk clutch may be smaller than the other.

The center differential gear comprises a relatively small number of component parts, and is simple in construction, compact and lightweight. Therefore, the center differential gear can be easily manufactured and assembled and is advantageous in respect of the vibration and the noise generation of the power transmission system.

Both the center differential gear and the right/left driving torque distributing device are compact and lightweight, and can be easily united together to construct a compact, lightweight, integrated unit.

The number of teeth of the gears of the center differential gear may be determined so that the reference front-to-rear driving torque distribution ratio is 50:50. An input-torque-proportional differential limiting torque is distributed to the front wheels or the rear wheels according to the traveling condition of the vehicle and the surface condition of the road. Consequently, the slip of the vehicle can be prevented, traction can be secured, the skidding of the rear wheels can be prevented and the running performance of the vehicle can be improved. Furthermore, the posture of the vehicle can be easily controlled by operating the accelerator pedal and the vehicle respond satisfactorily to control operations, which enables enjoyable sporty driving of the vehicle.

Rear right/left driving torque distributing devices in modifications of the rear right/left driving torque distributing device in the third embodiment will be described with reference to FIGS. 33 to 45.

Figure 33:
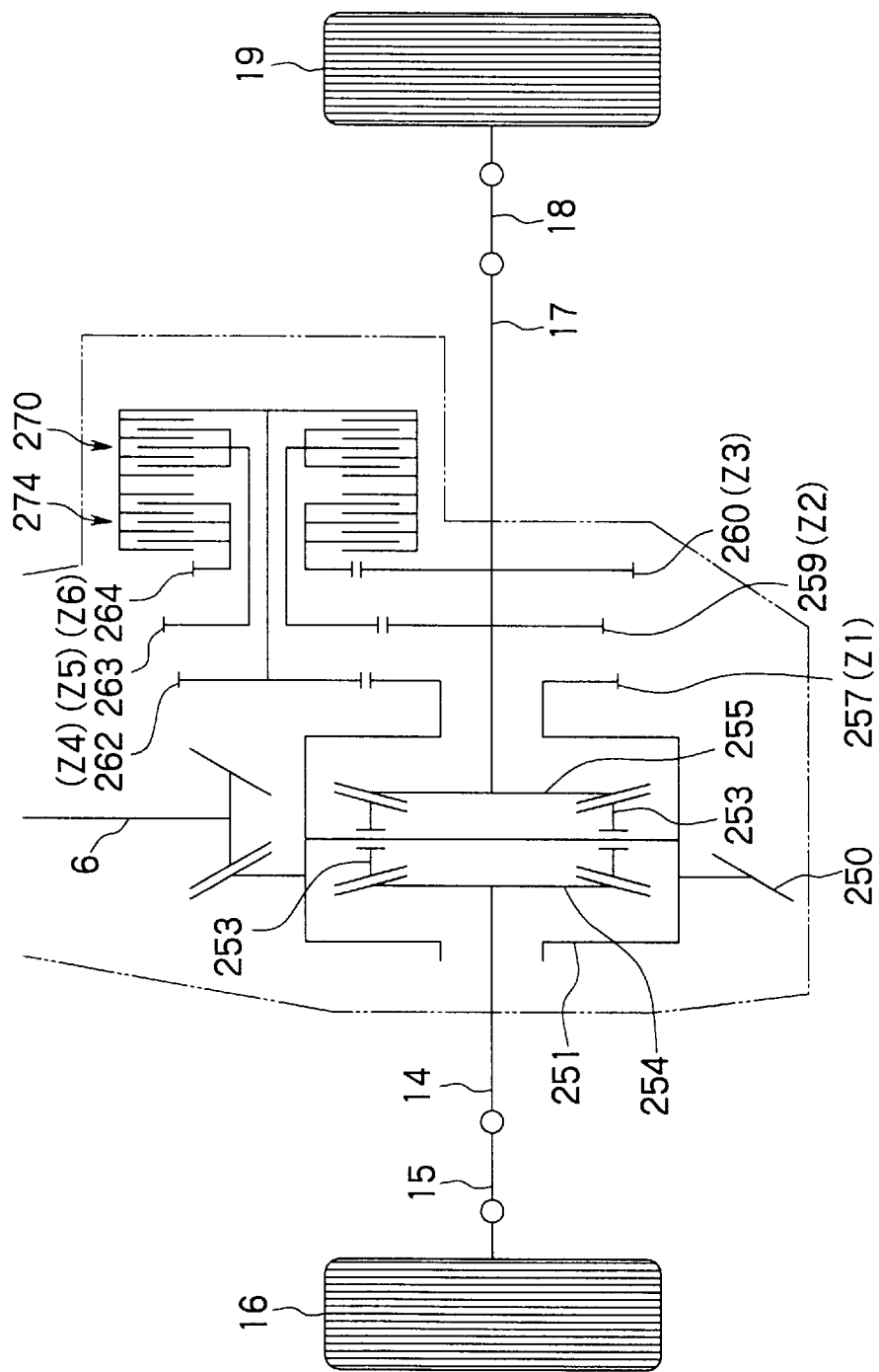
FIGS. 33 to 45 are enlarged diagrammatic views of rear right/left driving torque distributing devices in modifications of the rear right/left driving torque distributing device shown in FIG. 32.

Referring to FIG. 33, a rear right/left driving torque distributing device in a first modification of the rear right/left driving torque distributing device 7 in the third embodiment shown in FIG. 31 is provided with gear trains of gear ratios different from those of the gear trains of the rear right/left driving torque distributing device of FIG. 31, and is the same in other respects as the rear right/left driving torque distributing device 7 in the third embodiment.

In the first modification shown in FIG. 33, the first gear train has a gear ratio z4/z1=0.9/1, the second gear train has a gear ratio z5/z2=1/1, and the third gear train has a gear ratio z6/z3=0.9·0.9/1, in which z1, z2, z3, z4, z5 and z6 are the numbers of teeth of a first gear 257, a second gear 259, a third gear 260, a fourth gear 262, a fifth gear 263 and a sixth gear 264. Therefore, the rotating speed of a fourth gear 262 is higher than that of a first gear 257, the respective rotating speeds of a second gear 259 and a fifth gear 263 are equal to each other, and the rotating speed of a sixth gear 264 is higher than that of a third gear 260.

In the first modification, when distributing a major part of the driving torque to the rear left wheel 16 while the vehicle is making a right turn, the right/left driving torque distribution controller 32 gives a signal requesting the supply of the working fluid of a set pressure determined by calculation to a second pressure chamber 278 to the rear fluid pressure controller 34.

Then, the working fluid of the set pressure is supplied through the fluid pipe 36b to the second pressure chamber 278, the second piston 277 is actuated to compress the friction disks of the second hydraulic multiple-disk clutch 274 at a set pressure. Consequently, the driving torque of the differential gear case 251 is distributed through the third gear 260, the second hydraulic multiple-disk clutch 274 to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the first pressure chamber 276 to the rear fluid pressure controller 34.

Then, the working fluid of the set pressure is supplied through the fluid pipe 36a to the first pressure chamber 276, the first piston 275 is actuated to compress the friction disks of the first hydraulic multiple-disk clutch 270 at a set pressure. Consequently, the driving torque of the differential gear case 251 is distributed through the first hydraulic multiple-disk clutch 270 and the second gear 259 to the right drive shaft 17.

Figure 34:
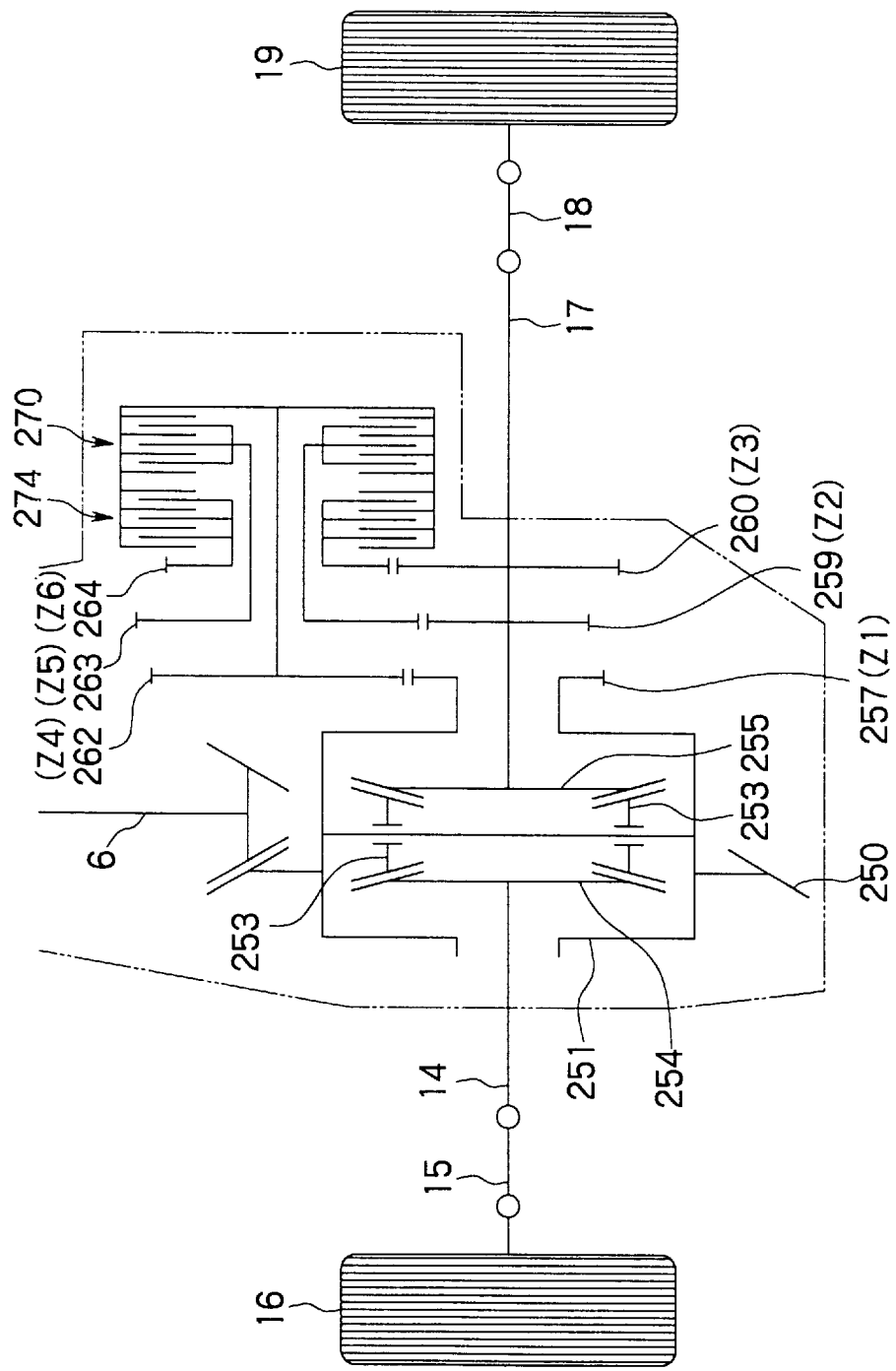

Referring to FIG. 34, a rear right/left driving torque distributing device in a second modification of the rear right/left driving torque distributing device 7 in the third embodiment shown in FIG. 31 is provided with gear trains of gear ratios different from those of the gear trains of the rear right/left driving torque distributing device of FIG. 31, and is the same in other respects as the rear right/left driving torque distributing device 7 in the third embodiment.

In the second modification shown in FIG. 34, the first gear train has a gear ratio z4/z1=0.9/1, the second gear train has a gear ratio z5/z2=1/0.9·0.9, and the third gear train has a gear ratio z6/z3=1/1, in which z1, z2, z3, z4, z5 and z6 are the numbers of teeth of a first gear 257, a second gear 259, a third gear 260, a fourth gear 262, a fifth gear 263 and a sixth gear 264. Therefore, the rotating speed of a fourth gear 262 is higher than that of a first gear 257, the rotating speed of a fifth gear 263 is lower than that of a second gear 259, and the respective rotating speeds of a sixth gear 264 and a third gear 260 are equal to each other.

Accordingly, in the second modification, when distributing a major part of the driving torque to the rear left wheel 16 while the vehicle is making a right turn, the right/left driving torque distribution controller 32 gives a signal requesting the supply of the working fluid of a set pressure determined by calculation to the second pressure chamber 278 to the rear fluid pressure controller 34.

Then, the working fluid of the set pressure is supplied through the fluid pipe 36b to the second pressure chamber 278, the second piston 277 is actuated to compress the friction disks of the second hydraulic multiple-disk clutch 274 at a set pressure. Consequently, the driving torque of the differential gear case 251 is distributed through the third gear 260, the second hydraulic multiple-disk clutch 274 to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the first pressure chamber 276 to the rear fluid pressure controller 34.

Then, the working fluid of the set pressure is supplied through the fluid pipe 36a to the first pressure chamber 276, the first piston 275 is actuated to compress the friction disks of the first hydraulic multiple-disk clutch 270 at a set pressure. Consequently, the driving torque of the differential gear case 251 is distributed through the first hydraulic multiple-disk clutch 270 and the second gear 259 to the right drive shaft 17.

Figure 35:
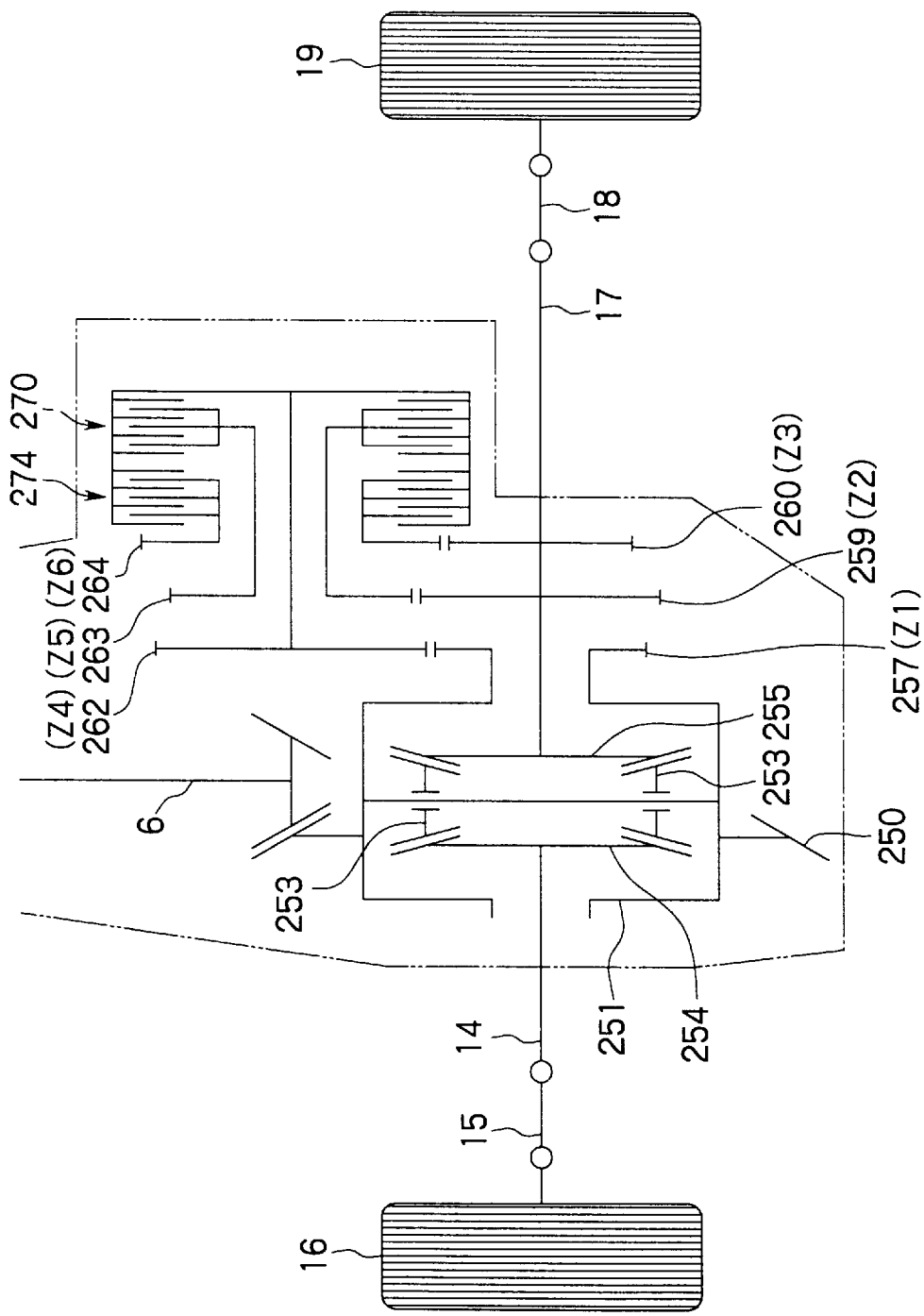

Referring to FIG. 35, a rear right/left driving torque distributing device in a third modification of the rear right/left driving torque distributing device 7 in the third embodiment shown in FIG. 31 is provided with gear trains of gear ratios different from those of the gear trains of the rear right/left driving torque distributing device of FIG. 31, and is the same in other respects as the rear right/left driving torque distributing device 7 in the third embodiment.

In the first modification shown in FIG. 35, the first gear train has a gear ratio z4/z1=1/0.9, the second gear train has a gear ratio z5/z2=1/1, and the third gear train has a gear ratio z6/z3=1/0.9·0.9, in which z1, z2, z3, z4, z5 and z6 are the numbers of teeth of a first gear 257, a second gear 259, a third gear 260, a fourth gear 262, a fifth gear 263 and a sixth gear 264. Therefore, the rotating speed of a fourth gear 262 is lower than that of a first gear 257, the respective rotating speeds of a fifth gear 263 and a second gear 259 are equal to each other, and the rotating speed of a sixth gear 264 is lower than that of the a third gear 260.

Accordingly, in the third modification, when distributing a major part of the driving torque to the rear left wheel 16 while the vehicle is making a right turn, the right/left driving torque distribution controller 32 gives a signal requesting the supply of the working fluid of a set pressure determined by calculation to the first pressure chamber 276 to the rear fluid pressure controller 34.

Then, the working fluid of the set pressure is supplied through the fluid pipe 36a to the first pressure chamber 276, the first piston 275 is actuated to compress the friction disks of the first hydraulic multiple-disk clutch 270 at a set pressure. Consequently, the driving torque of the differential gear case 251 is distributed through the second gear 259, the first hydraulic multiple-disk clutch 270 to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the second pressure chamber 278 to the rear fluid pressure controller 34.

Then, the working fluid of the set pressure is supplied through the fluid pipe 36b to the second pressure chamber 278, the second piston 277 is actuated to compress the friction disks of the second hydraulic multiple-disk clutch 274 at a set pressure. Consequently, the driving torque of the differential gear case 251 is distributed through the second hydraulic multiple-disk clutch 274 and the third gear 260 to the right drive shaft 17.

Figure 36:
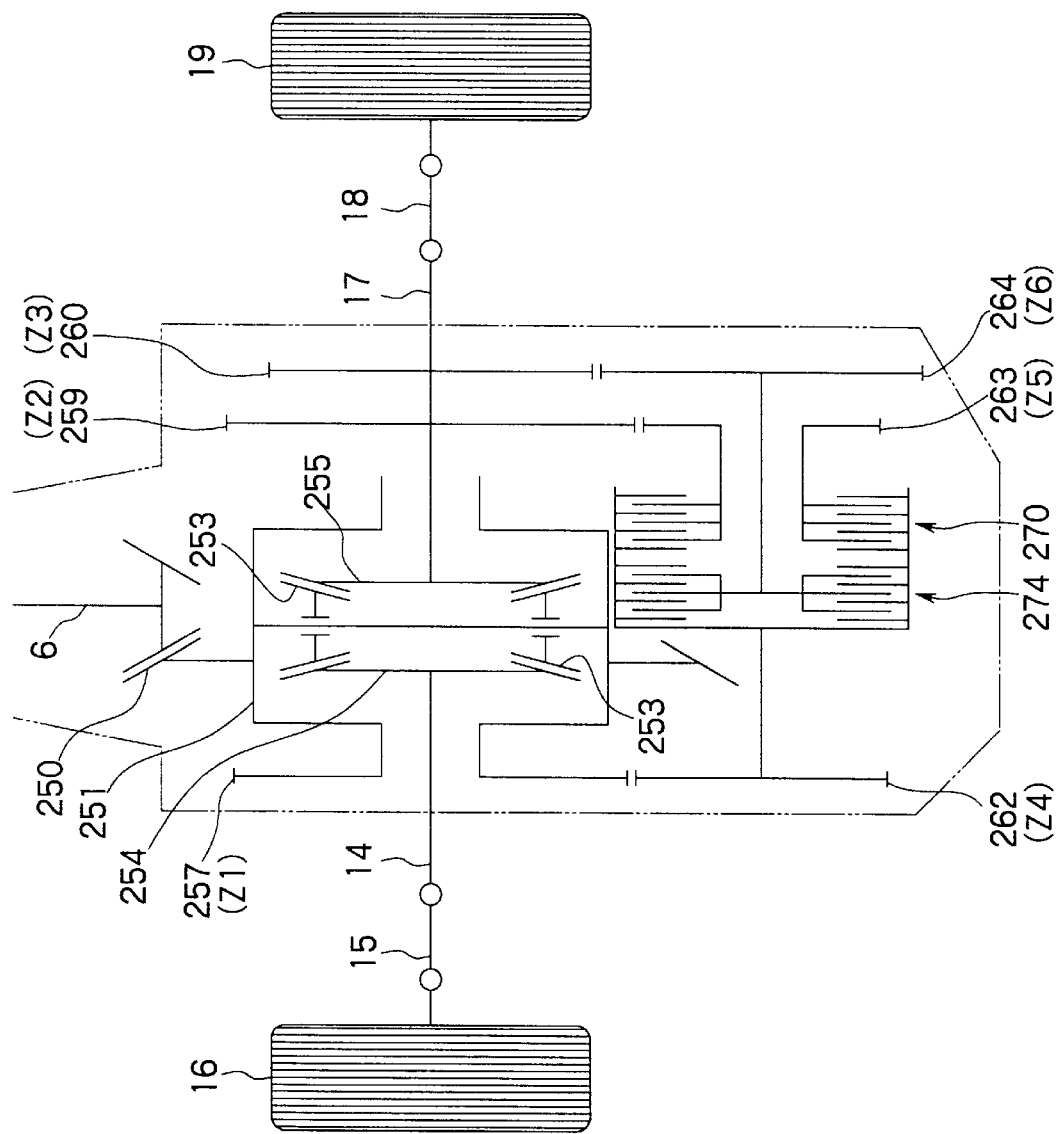
Figure 37:
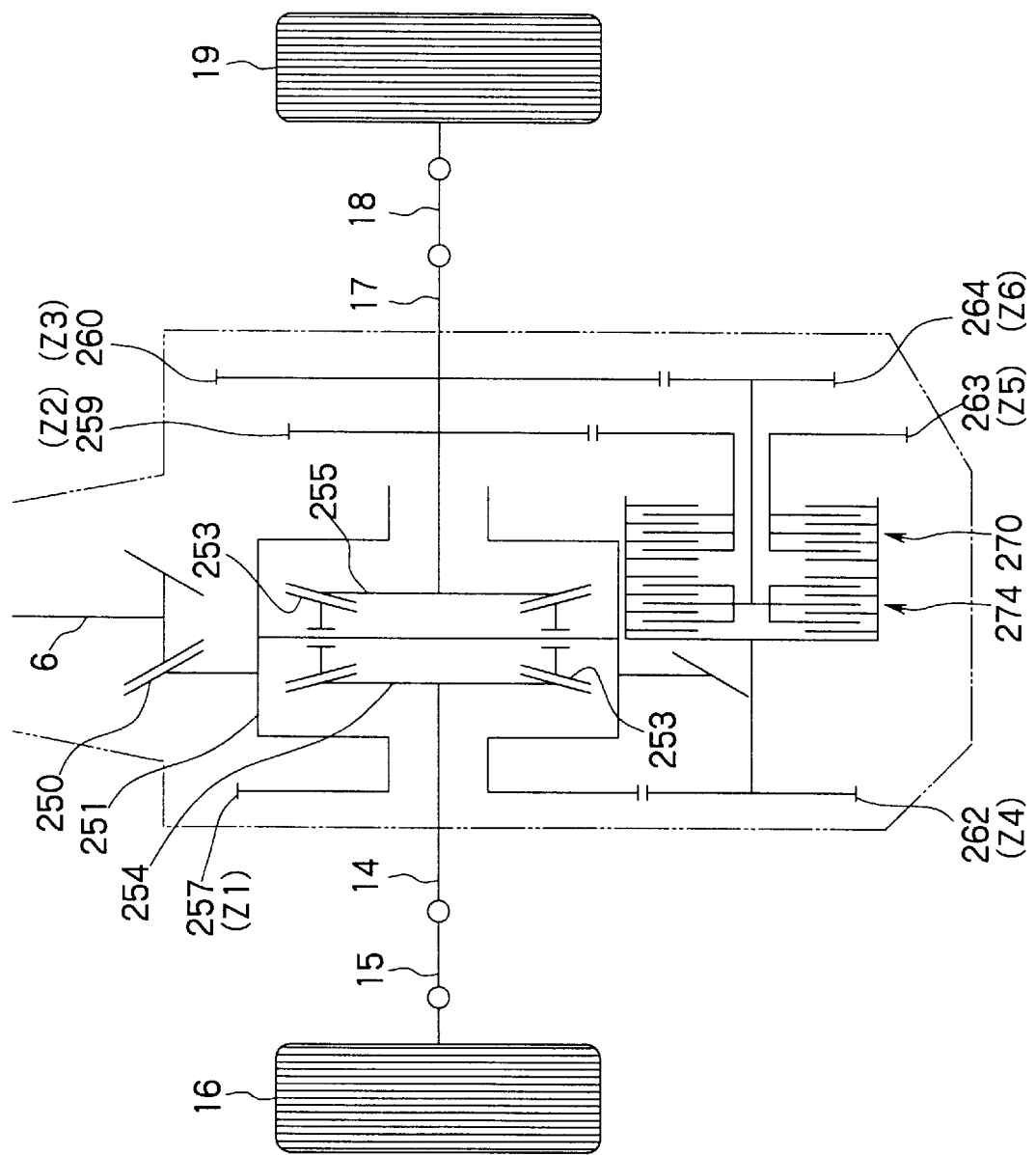

Referring to FIG. 36, a rear right/left driving torque distributing device in a fourth modification of the rear right/left driving torque distributing device 7 in the third embodiment shown in FIG. 31 is provided with a gear mechanism including a first gear train corresponding to the first gear train of the rear right/left driving torque distributing device 7 in the third embodiment and disposed on the side of the left wheel 16 and second and third gear trains corresponding to the second and the third gear train of the rear right/left driving torque distributing device 7 in the third embodiment and disposed on the side of the right wheel 19, and a clutch mechanism consisting of two hydraulic multiple-disk clutches 270 and 274 and disposed behind the differential gear case 251. The rear right/left driving torque distributing device in the fourth modification is the same in other respects as the rear right/left driving torque distributing device 7 in the third embodiment.

As shown in FIG. 36, a first gear 257 is fixed to the left side wall of the differential gear case 251, and a second gear 259 and a third gear 260, similarly to those of the rear right/left driving torque distributing device 7 in the third embodiment, fixedly mounted on the right drive shaft 17.

A fourth gear 262, a fifth gear 263 and a sixth gear 264 engaged with the first gear 257, the second gear 259 and the third gear 260, respectively, are arranged coaxially on an axis parallel to the axis of the differential gear case 251 aligned with the axes of the left drive shaft 14 and the right drive shaft 17. The clutch mechanism consisting of the two hydraulic multiple-disk clutches 270 and 274 is disposed between the fourth gear 262, and the fifth gear 263 and the sixth gear 264, and behind the differential gear case 251.

The first gear train has a gear ratio z4/z1=0.9/1, the second gear train has a gear ratio z5/z2=0.9 0.9/1, and the third gear train has a gear ratio z6/z3=1/1, in which z1, z2, z3, z4, z5 and z6 are the numbers of teeth of a first gear 257, a second gear 259, a third gear 260, a fourth gear 262, a fifth gear 263 and a sixth gear 264.. Therefore, the rotating speed of the fourth gear 262 is higher than that of the first gear 257, the rotating speed of the fifth gear 263 is higher than that of the second gear 259, and the respective rotating speeds of the sixth gear 264 and the third gear 260 are equal to each other.

Accordingly, in the fourth modification, when distributing a major part of the driving torque to the rear left wheel 16 while the vehicle is making a right turn, the right/left driving torque distribution controller 32 executes a control operation to engage the first hydraulic multiple-disk clutch 270.

When distributing a major part of the driving torque to the rear right wheel 19 while the vehicle is making a left turn, the right/left driving torque distribution controller 32 executes a control operation to engage second hydraulic multiple-disk clutch 274.

The rear right/left driving torque distributing device in the fourth modification can be formed in a further reduced lateral size.

A rear right/left driving torque distributing device in a fifth modification of the rear right/left driving torque distributing device 7 in the third embodiment shown in FIG. 31 is provided with gear trains of gear ratios different from those of the gear trains of the rear right/left driving torque distributing device in the fourth modification shown in FIG. 36. The rear right/left driving torque distributing device in the fifth modification is the same in other respects as the rear right/left driving torque distributing device in the fourth modification. In the fifth modification shown in FIG. 37, the first gear train has a gear ratio z4/z1=1/0.9, the second gear train has a gear ratio z5/z2=1/1, and the third gear train has a gear ratio z6/z3–0.9·0.9/1, in which z1, z2, z3, z4, z5 and z6 are the numbers of teeth of a first gear 257, a second gear 259, a third gear 260, a fourth gear 262, a fifth gear 263 and a sixth gear 264. Therefore, the rotating speed of a fourth gear 262 is lower than that of a first gear 257, the respective rotating speeds of a fifth gear 263 and a second gear 259 are equal to each other, and the rotating speed of a sixth gear 264 is higher than that of a third gear 260.

Accordingly, in the fifth modification, when distributing a major part of the driving torque to the rear left wheel 16 while the vehicle is making a right turn, the right/left driving torque distribution controller 32 executes a control operation to engage the second hydraulic multiple-disk clutch 274.

When distributing a major part of the driving torque to the rear right wheel 19 while the vehicle is making a left turn, the right/left driving torque distribution controller 32 executes a control operation to engage the first hydraulic multiple-disk clutch 270.

Figure 38:
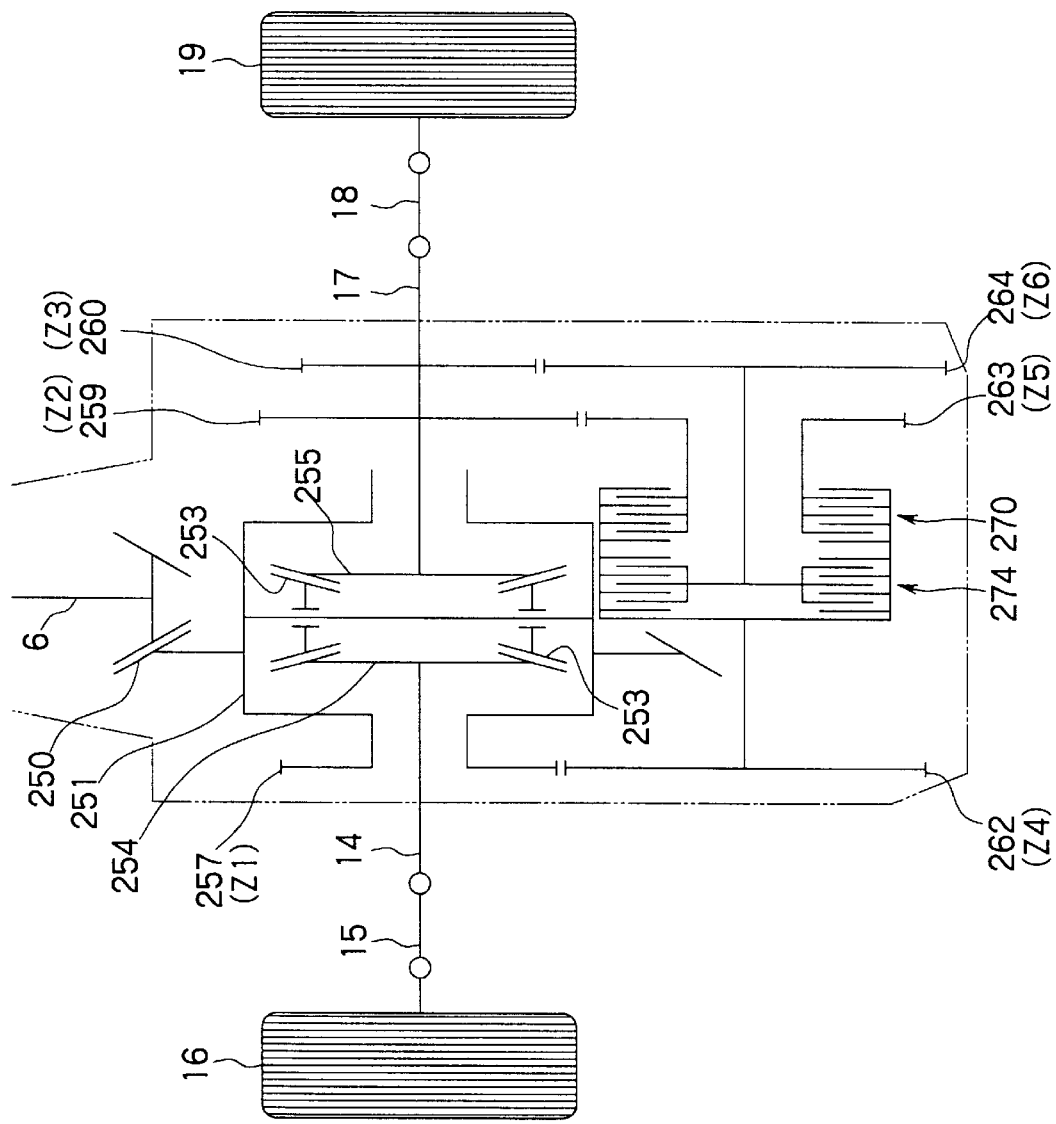

FIG. 38 shows a rear right/left driving torque distributing device in a sixth modification of the rear right/left driving torque distributing device 7 in the third embodiment shown in FIG. 31, provided with gear trains of gear ratios different from those of the gear trains of the rear right/left driving torque distributing device in the fourth modification shown in FIG. 36. The rear right/left driving torque distributing device in the sixth modification is the same in other respects as the rear right/left driving torque distributing device in the fourth modification.

In the sixth modification shown in FIG. 38, the first gear train has a gear ratio z4/z1=1/0.9, the second gear train has a gear ratio z5/z2=1/1, and the third gear train has a gear ratio z6/z3=1/0.9·0.9, in which z1, z2, z3, z4, z5 and z6 are the numbers of teeth of a first gear 257, a second gear 259, a third gear 260, a fourth gear 262, a fifth gear 263 and a sixth gear 264. Therefore, the rotating speed of a fourth gear 262 is lower than that of a first gear 257, the respective rotating speeds of a fifth gear 263 and a second gear 259 are equal to each other, and the rotating speed of a sixth gear 264 is lower than that of the a third gear 260.

Accordingly, in the sixth modification, when distributing a major part of the driving torque to the rear left wheel 16 while the vehicle is making a right turn, the right/left driving torque distribution controller 32 executes a control operation to engage the first hydraulic multiple-disk clutch 270.

When distributing a major part of the driving torque to the rear right wheel 19 while the vehicle is making a left turn, the right/left driving torque distribution controller 32 executes a control operation to engage the second hydraulic multiple-disk clutch 274.

Figure 39:
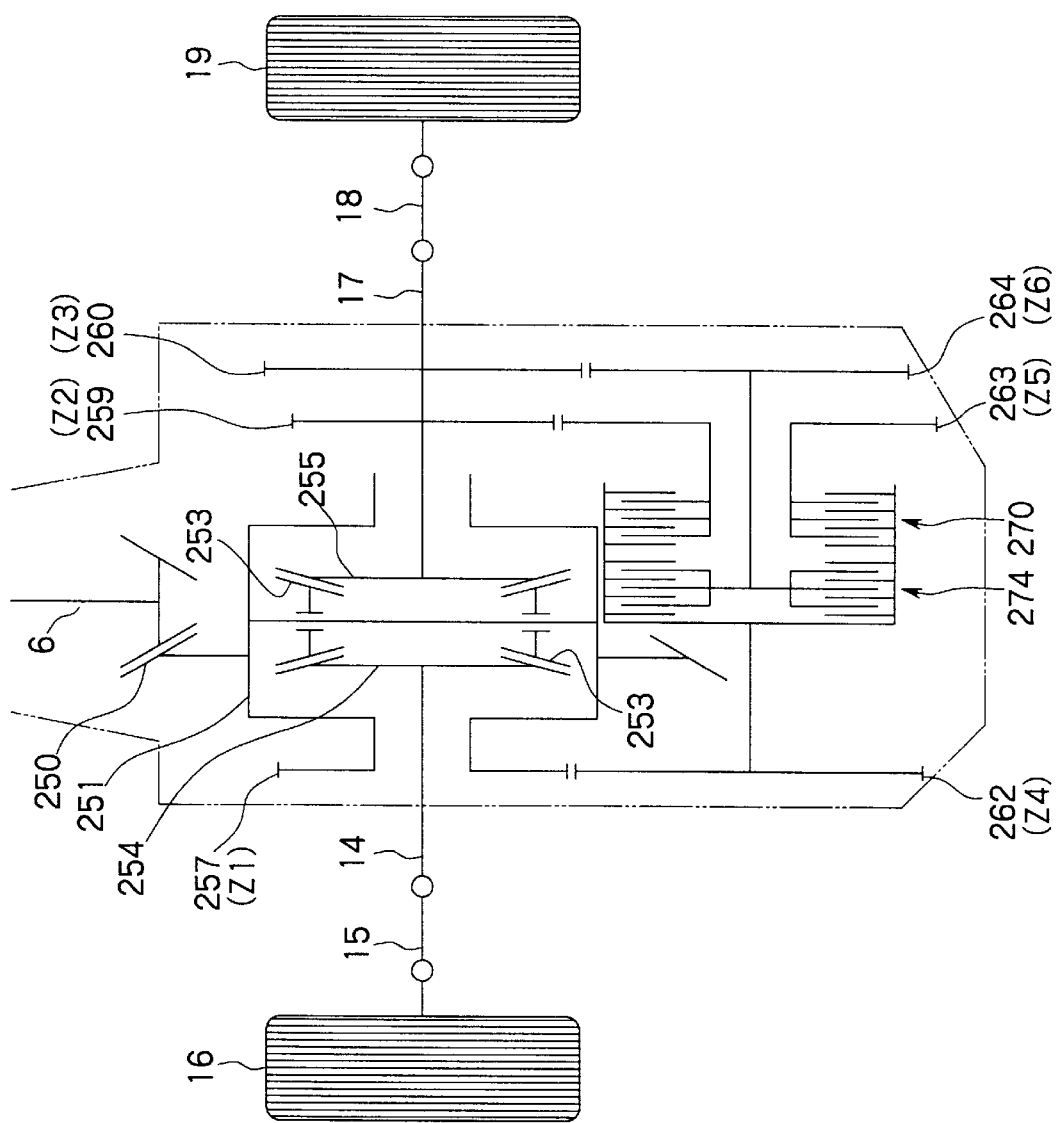

FIG. 39 shows a rear right/left driving torque distributing device in a seventh modification of the rear right/left driving torque distributing device 7 in the third embodiment shown in FIG. 31, provided with gear trains of gear ratios different from those of the gear trains of the rear right/left driving torque distributing device in the fourth modification shown in FIG. 36. The rear right/left driving torque distributing device in the seventh modification is the same in other respects as the rear right/left driving torque distributing device in the fourth modification.

In the seventh modification shown in FIG. 38, the first gear train has a gear ratio z4/z1=1/0.9, the second gear train has a gear ratio z5/z2=1/0.9·0.9, and the third gear train has a gear ratio z6/z3=1/1, in which z1, z2, z3, z4, z5 and z6 are the numbers of teeth of a first gear 257, a second gear 259, a third gear 260, a fourth gear 262, a fifth gear 263 and a sixth gear 264. Therefore, the rotating speed of a fourth gear 262 is lower than that of a first gear 257, the rotating speed of a fifth gear 263 is lower than that of a second gear 259, and the respective rotating speeds of a sixth gear 264 and a third gear 260 are equal to each other.

Accordingly, in the seventh modification, when distributing a major part of the driving torque to the rear left wheel 16 while the vehicle is making a right turn, the right/left driving torque distribution controller 32 executes a control operation to engage the second hydraulic multiple-disk clutch 274.

When distributing a major part of the driving torque to the rear right wheel 19 while the vehicle is making a left turn, the right/left driving torque distribution controller 32 executes a control operation to engage the first hydraulic multiple-disk clutch 270.

Figure 40:
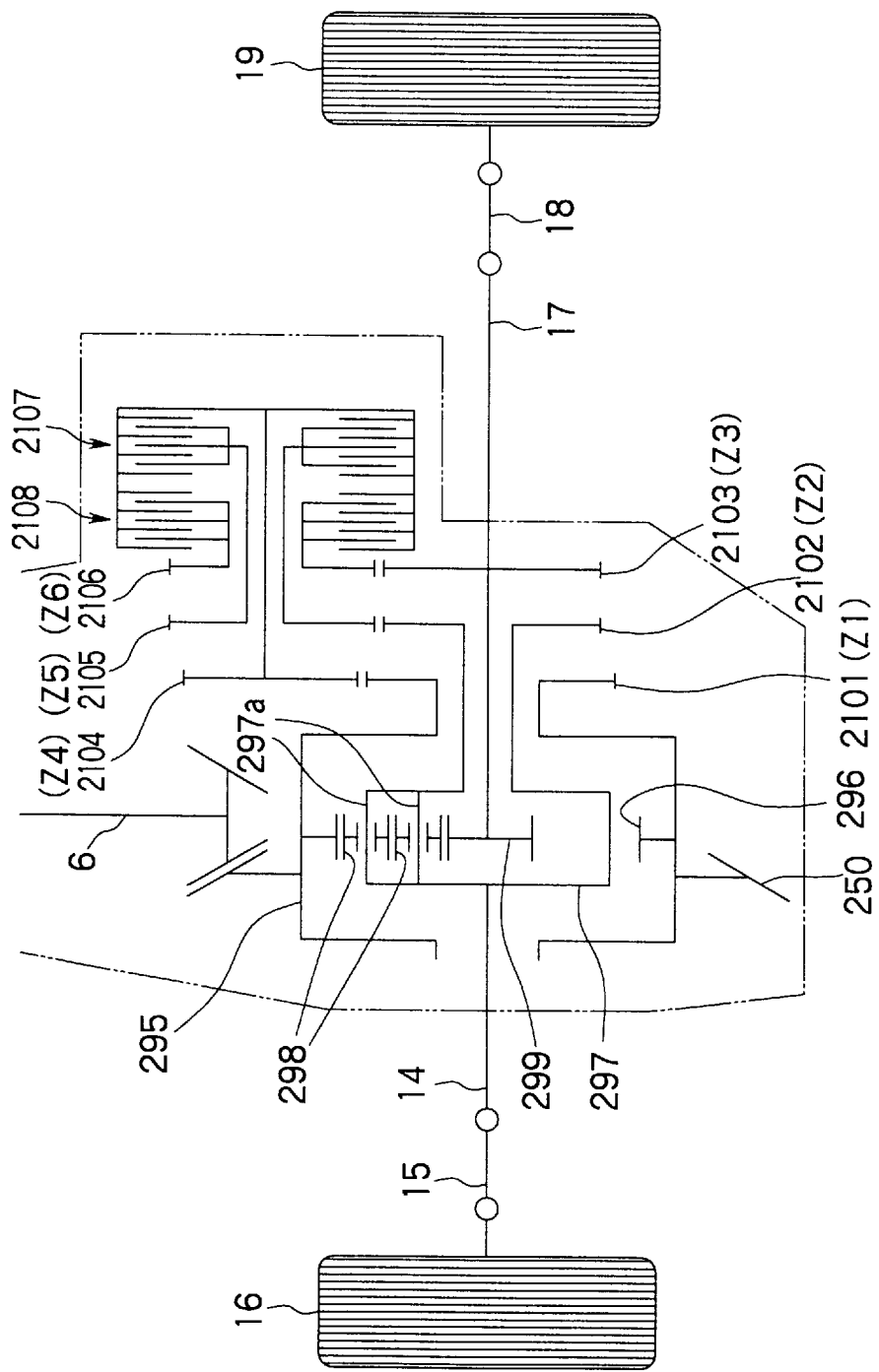

FIG. 40 shows a rear right/left driving torque distributing device in an eighth modification of the rear right/left driving torque distributing device 7 in the third embodiment shown in FIG. 31, provided with a double-pinion planetary gear mechanism corresponding to the differential mechanism 244 of the third embodiment. In the rear right/left driving torque distributing device in the eighth modification, a first gear train is combined with the differential gear case, a second gear train is combined with a left output member for the left wheel 16, a third gear train is combined with a right output member for the right wheel 19, and the respective gear ratios of the second gear train and the third gear train are equal to each other.

The differential mechanism of the rear right/left driving torque distributing device in the eighth modification comprises a differential gear case 295 fixedly provided with a final gear 250 engaged with the drive pinion 6, a ring gear 296 formed on the inner surface of the differential gear case 295, a planet carrier 297 fixedly joined to the left drive shaft 14, sets each of a pair of planet pinions 298 rotatably supported on planet shafts 297a,respectively, and a sun gear 299 fixedly joined to the right drive shaft 17.

When the differential gear case 295 is driven for rotation by the drive pinion 6, the ring gear 296 formed integrally with the differential gear case 295 drives the planet pinions 298 for rotation on the planet pins 297a and revolution around the sun gear 299. Consequently, a driving torque is transmitted through the planet carrier 297 to the left drive shaft 14 by the revolution of the planet pinions 298 around the sun gear, and a driving torque is transmitted to the right drive shaft 17 through the sun gear 299 which makes rotation corresponding to the balance of the rotation and the revolution of the planet pinions 298. The balance of the rotation and the revolution of the planet pinions 298 is controlled optionally to exercise a differential function.

A first gear 2101 is fastened to the right side wall of the differential gear case 295, a second gear 2102 fixed to the planet carrier 297 is disposed on the outer side, i.e., the right side, of the first gear 2101, a third gear 2103 fixed to the right drive shaft 17 is disposed on the outer side, i.e., the right side, of the second gear 2102. The first gear 2101, the second gear 2102 and the third gear 2103 are arranged coaxially.

A fourth gear 2104, a fifth gear 2105 and a sixth gear 2106 are arranged coaxially on an axis parallel to the common axis of the first gear 2101, the second gear 2102 and the third gear 2103 so as to be engaged with the first gear 2101, the second gear 2102 and the third gear 2103, respectively. The first gear 2101 and the fourth gear 2104, the second gear 2102 and the fifth gear 2105, and the third gear 2103 and the sixth gear 2106 form a first gear train, a second gear train and a third gear train, respectively.

The first and the second gear train are interlocked by a first hydraulic multiple-disk clutch 2107, and the first and the third gear train are interlocked by a second hydraulic multiple-disk clutch 2108. The hydraulic multiple-disk clutches 2107 and 2108 are united together to form a clutch mechanism and the clutch mechanism is disposed on the outer side, i.e., the right side, of the sixth gear 2106. The hydraulic multiple-disk clutches 2107 and 2108 are engaged by operating pistons, not shown, by a working fluid of a controlled pressure.

The first gear train has a gear ratio z4/z1=0.9/1, the second gear train has a gear ratio z5/z2=1/1, and the third gear train has a gear ratio z6/z3=1/1, in which z1, z2, z3, z4, z5 and z6 are the numbers of teeth of a first to gear 2101, a second gear 2102, a third gear 2103, a fourth gear 2104, a fifth gear 2105 and a sixth gear 2106. Therefore, the rotating speed of the fourth gear 2104 is higher than that of the first gear 2101, the respective rotating speeds of the fifth gear 2105 and the second gear 2102 are equal to each other, and the respective rotating speeds of the sixth gear 2106 and the third gear 2103 are equal to each other.

Accordingly, in the eighth modification, when distributing a major part of the driving torque to the rear left wheel 16 while the vehicle is making a right turn, the right/left driving torque distribution controller 32 executes a control operation to engage the first hydraulic multiple-disk clutch 2107.

When distributing a major part of the driving torque to the rear right wheel 19 while the vehicle is making a left turn, the right/left driving torque distribution controller 32 executes a control operation to engage the second hydraulic multiple-disk clutch 2108.

Figure 41:
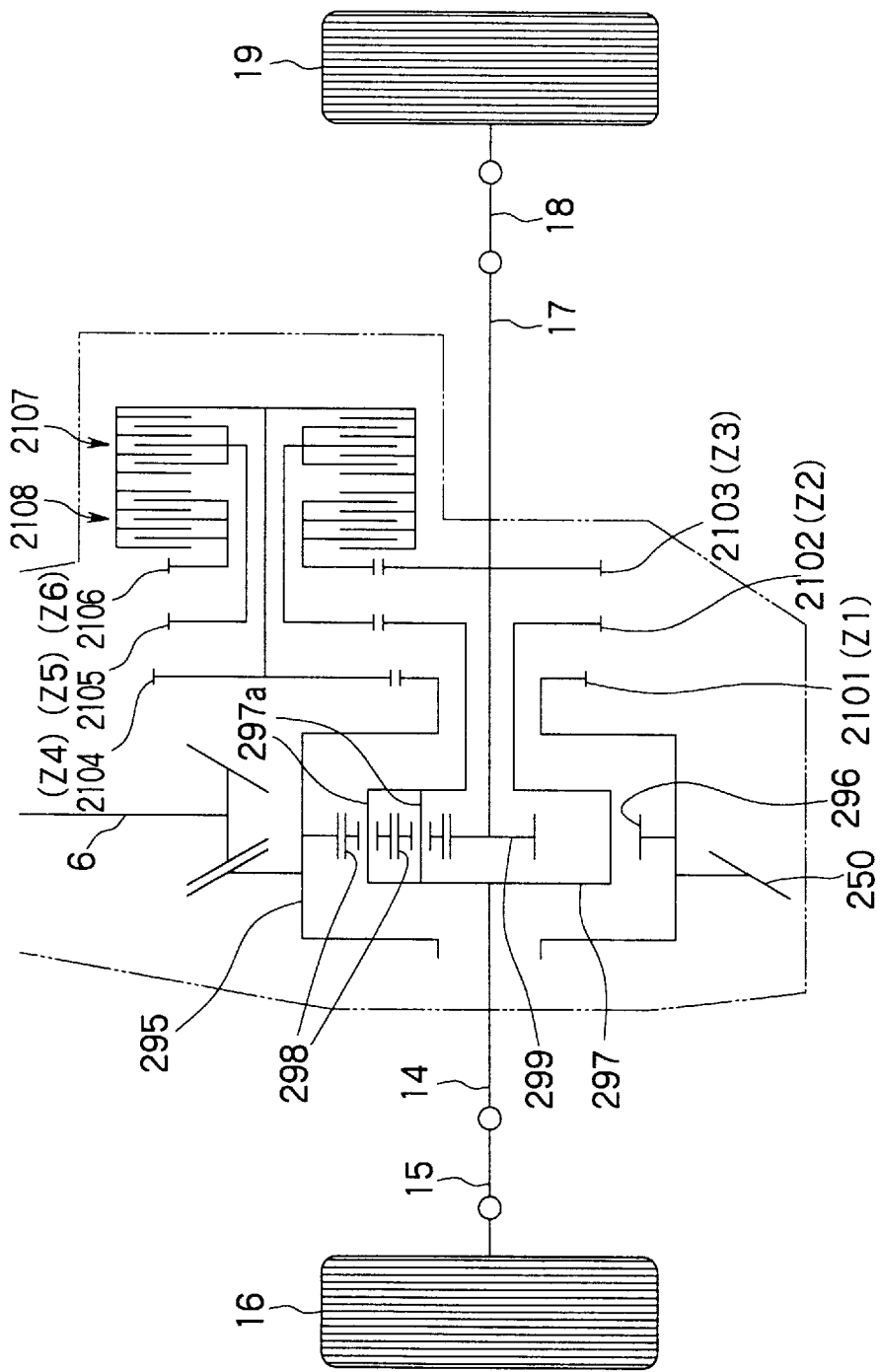

FIG. 41 shows a rear right/left driving torque distributing device in a ninth modification of the rear right/left driving torque distributing device 7 in the third embodiment shown in FIG. 31. The rear right/left driving torque distributing device in the ninth modification differs from the rear right/left driving torque distributing device in the eighth modification in the gear ratio of the first gear train, and is the same in other respects as the rear right/left driving torque distributing device in the eighth modification.

In the rear right/left driving torque distributing device in the ninth modification shown in FIG. 41, the first gear train has a gear ratio z4/z1=1/0.9, the second gear train has a gear ratio z5/z2=1/1, and the third gear train has a gear ratio z6/z3=1/1, in which z1, z2, z3, z4, z5 and z6 are the numbers of teeth of a first gear 2101, a second gear 2102, a third gear 2103, a fourth gear 2104, a fifth gear 2105 and a sixth gear 2106. Therefore, the rotating speed of a fourth gear 2104 is lower than that of a first gear 2101, the respective rotating speeds of the fifth gear 2105 and the second gear 2102 are equal to each other, and the respective rotating speeds of the sixth gear 2106 and the third gear 2103 are equal to each other.

Accordingly, in the ninth modification, when distributing a major part of the driving torque to the rear left wheel 16 while the vehicle is making a right turn, the right/left driving torque distribution controller 32 executes a control operation to engage the second hydraulic multiple-disk clutch 2108.

When distributing a major part of the driving torque to the rear right wheel 19 while the vehicle is making a left turn, the right/left driving torque distribution controller 32 executes a control operation to engage the first hydraulic multiple-disk clutch 2107.

Figure 42:
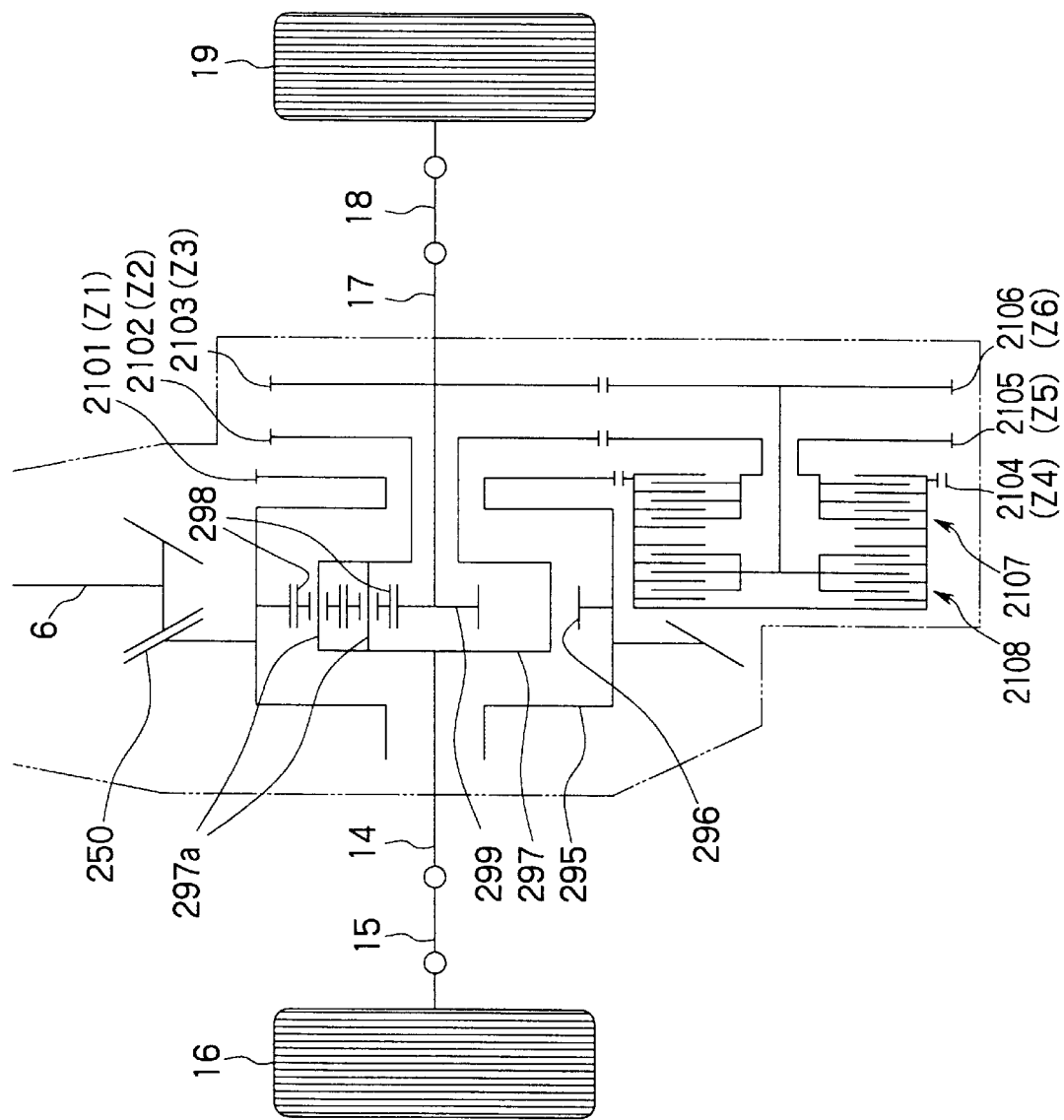

FIG. 42 shows a rear right/left driving torque distributing device in a tenth modification of the rear right/left driving torque distributing device 7 in the third embodiment shown in FIG. 31. In this rear right/left driving torque distributing device, a clutch mechanism consisting of hydraulic multiple-disk clutches 2107 and 2108 corresponding to those of the rear right/left driving torque distributing device shown in FIG. 40 is disposed behind the differential gear case 295, and the gear ratios of gear trains are different from those of the gear trains of the rear right/left driving torque distributing device 7 in the third embodiment. The rear right/left driving torque distributing device in the tenth modification is the same in other respects as the rear right/left driving torque distributing device 7 in the third embodiment.

As shown in FIG. 42, the clutch mechanism consisting of the hydraulic multiple-disk clutches 2107 and 2108 is disposed behind the differential gear case 295 and on the left side of a first gear 2101, a second gear 2102 and a third gear 2103.

In the rear right/left driving torque distributing device in the tenth modification shown in FIG. 42, the first gear train has a gear ratio z4/z1=0.9/1, the second gear train has a gear ratio z5/z2=1/1, and the third gear train has a gear ratio z6/z3=1/1, in which z1, z2, z3, z4, z5 and z6 are the numbers of teeth of a first gear 2101, a second gear 2102, a third gear 2103, a fourth gear 2104, a fifth gear 2105 and a sixth gear 2106. Therefore, the rotating speed of a fourth gear 2104 is higher than that of a first gear 2101, the respective rotating speeds of a fifth gear 2105 and a second gear 2102 are equal to each other, and the respective rotating speeds of a sixth gear 2106 and a third gear 2103 are equal to each other.

Accordingly, in the tenth modification, when distributing a major part of the driving torque to the rear left wheel 16 while the vehicle is making a right turn, the right/left driving torque distribution controller 32 executes a control operation to engage the first hydraulic multiple-disk clutch 2107.

When distributing a major part of the driving torque to the rear right wheel 19 while the vehicle is making a left turn, the right/left driving torque distribution controller 32 executes a control operation to engage the second hydraulic multiple-disk clutch 2108.

Figure 43:
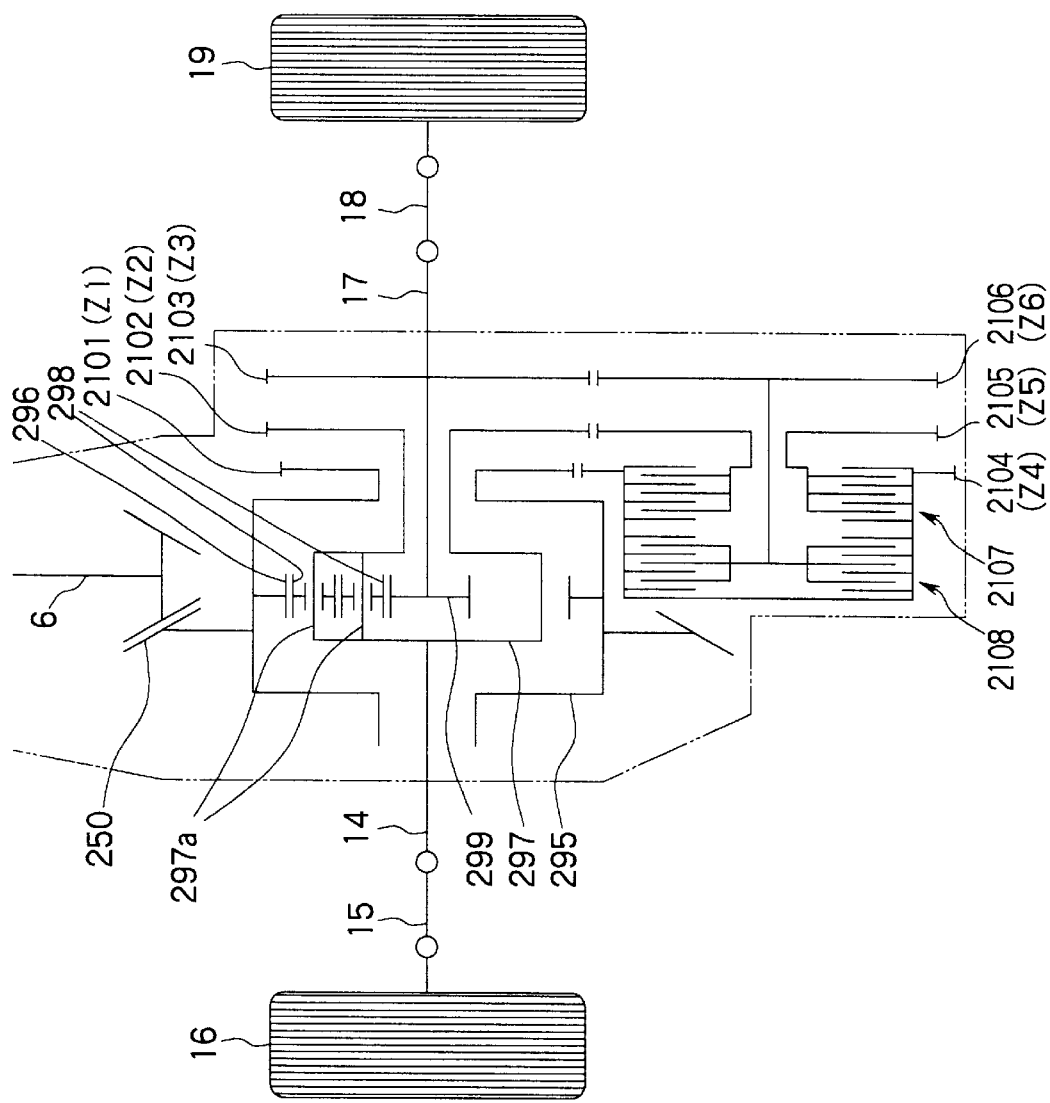

FIG. 43 shows a rear right/left driving torque distributing device in an eleventh modification of the rear right/left driving torque distributing device 7 in the third embodiment shown in FIG. 31. The rear right/left driving torque distributing device in the eleventh modification differs from the rear right/left driving torque distributing device in the tenth modification in the gear ratio of a first gear train corresponding to that of the rear right/left driving torque distributing device in the tenth modification and is the same in other respects as the latter.

In the rear right/left driving torque distributing device in the eleventh modification shown in FIG. 43, the first gear train has a gear ratio z4/z1=1/0.9, the second gear train has a gear ratio z5/z2=1/1, and the third gear train has a gear ratio z6/z3=1/1, in which z1, z2, z3, z4, z5 and z6 are the numbers of teeth of a first gear 2101, a second gear 2102, a third gear 2103, a fourth gear 2104, a fifth gear 2105 and a sixth gear 2106. Therefore, the rotating speed of a fourth gear 2104 is lower than that of a first gear 2101, the respective rotating speeds of a fifth gear 2105 and a second gear 2102 are equal to each other, and the respective rotating speeds of a sixth gear 2106 and a third gear 2103 are equal to each other.

Accordingly, in the eleventh modification, when distributing a major part of the driving torque to the rear left wheel 16 while the vehicle is making a right turn, the right/left driving torque distribution controller 32 executes a control operation to engage the second hydraulic multiple-disk clutch 2108.

When distributing a major part of the driving torque to the rear right wheel 19 while the vehicle is making a left turn, the right/left driving torque distribution controller 32 executes a control operation to engage the first hydraulic multiple-disk clutch 2107.

Figure 44:
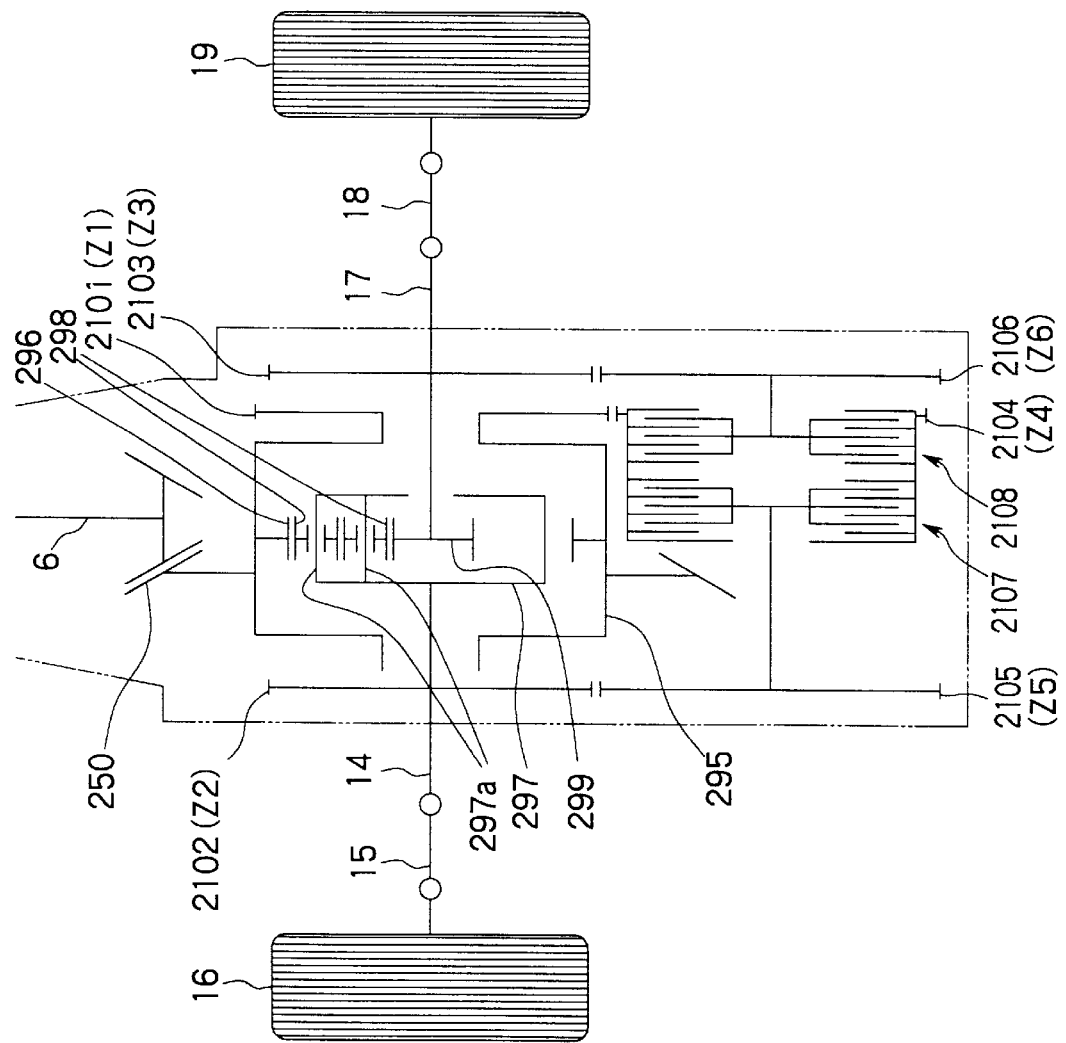

FIG. 44 shows a rear right/left driving torque distributing device in a twelfth modification of the rear right/left driving torque distributing device 7 in the third embodiment shown in FIG. 31. The rear right/left driving torque distributing device in the twelfth modification differs from the rear right/left driving torque distributing device in the eleventh modification in the position of a first gear train corresponding to that of the rear right/left driving torque distributing device in the eleventh modification and is the same in other respects as the latter. The first gear train of the rear right/left driving torque distributing device in the twelfth modification is disposed on the left side of the differential gear case 295.

As shown in FIG. 44, the second gear 2102 is fixedly mounted on the left drive shaft 14, and the fifth gear 2105 engaged with the second gear 2102 is interlocked with the sixth gear 22106 by the clutch mechanism consisting of the two hydraulic multiple disk clutches 2107 and 2108.

In the rear right/left driving torque distributing device in the twelfth modification shown in FIG. 44, the first gear train has a gear ratio z4/z1=0.9/1, the second gear train has a gear ratio z5/z2=1/1, and the third gear train has a gear ratio z6/z3=1/1, in which z1, z2, z3, z4, z5 and z6 are the numbers of teeth of a first gear 2101, a second gear 2102, a third gear 2103, a fourth gear 2104, a fifth gear 2105 and a sixth gear 2106. Therefore, the rotating speed of the fourth gear 2104 is higher than that of a first gear 2101, the respective rotating speeds of the fifth gear 2105 and the second gear 2102 are equal to each other, and the respective rotating speeds of the sixth gear 2106 and the third gear 2103 are equal to each other.

Accordingly, in the twelfth modification, when distributing a major part of the driving torque to the rear left wheel 16 while the vehicle is making a right turn, the right/left driving torque distribution controller 32 executes a control operation to engage the first hydraulic multiple-disk clutch 2107.

When distributing a major part of the driving torque to the rear right wheel 19 while the vehicle is making a left turn, the right/left driving torque distribution controller 32 executes a control operation to engage the second hydraulic multiple-disk clutch 2108.

Figure 45:
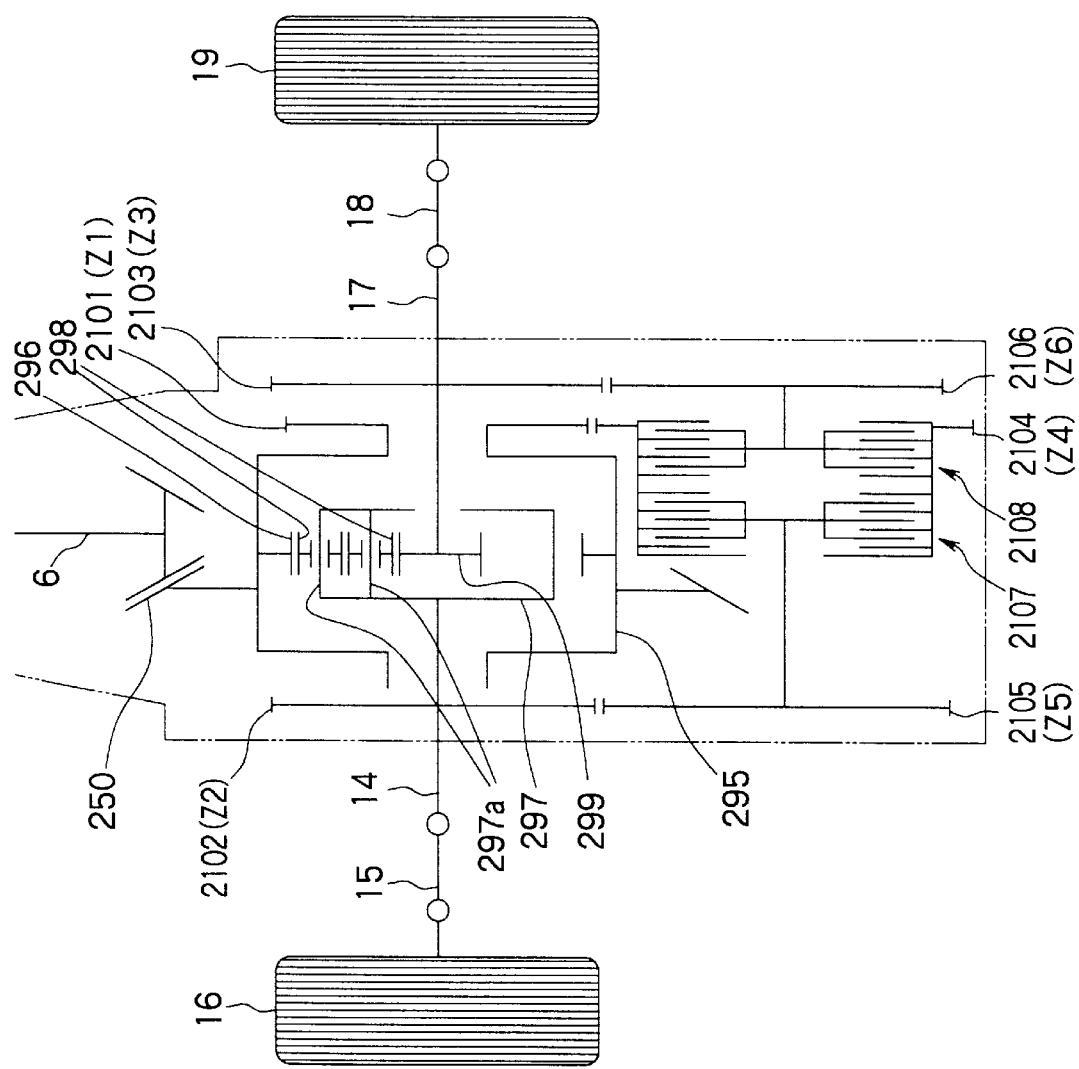

FIG. 45 shows a rear right/left driving torque distributing device in a thirteenth modification of the rear right/left driving torque distributing device 7 in the third embodiment shown in FIG. 31. The rear right/left driving torque distributing device in the thirteenth modification differs from the rear right/left driving torque distributing device in the twelfth modification in the gear ratio of a first gear train corresponding to that of the rear right/left driving torque distributing device in the twelfth modification and is the same in other respects as the latter.

In the rear right/left driving torque distributing device in the thirteenth modification shown in FIG. 45, the first gear train has a gear ratio z4/z1=1/0.9, the second gear train has a gear ratio z5/z2=1/1, and the third gear train has a gear ratio z6/z3=1/1, in which z1, z2, z3, z4, z5 and z6 are the numbers of teeth of a first gear 2101, a second gear 2102, a third gear 2103, a fourth gear 2104, a fifth gear 2105 and a sixth gear 2106. Therefore, the rotating speed of a fourth gear 2104 is lower than that of a first gear 2101, the respective rotating speeds of a fifth gear 2105 and a second gear 2102 are equal to each other, and the respective rotating speeds of a sixth gear 2106 and a third gear 2103 are equal to each other.

Accordingly, in the eleventh modification, when distributing a major part of the driving torque to the rear left wheel 16 while the vehicle is making a right turn, the right/left driving torque distribution controller 32 executes a control operation to engage the second hydraulic multiple-disk clutch 2108.

When distributing a major part of the driving torque to the rear right wheel 19 while the vehicle is making a left turn, the right/left driving torque distribution controller 32 executes a control operation to engage the first hydraulic multiple-disk clutch 2107.

As is apparent from the configurations of the foregoing, modifications of the rear right/left driving torque distributing device in the third embodiment, the gear trains of the gear mechanism, and the clutch mechanism can be disposed at different positions in the different modifications, and the gear ratios of the gear trains may be other than those referred to in the foregoing description.

The right/left driving torque distributing device of the present invention may be provided with a differential mechanism other than those mentioned above.

The right/left driving torque distributing device in the third embodiment is applicable also to front-engine front-drive vehicles and rear-engine rear-drive vehicles.

Four-wheel drive vehicles employing the right/left driving force distributing device of the present invention may be provided with a center differential gear other than that shown and described above.

Fourth Embodiment

A right/left driving torque distributing device in a fourth embodiment according to the present invention for a vehicle will be described hereinafter with reference to FIGS. 46 to 56.

Figure 46:
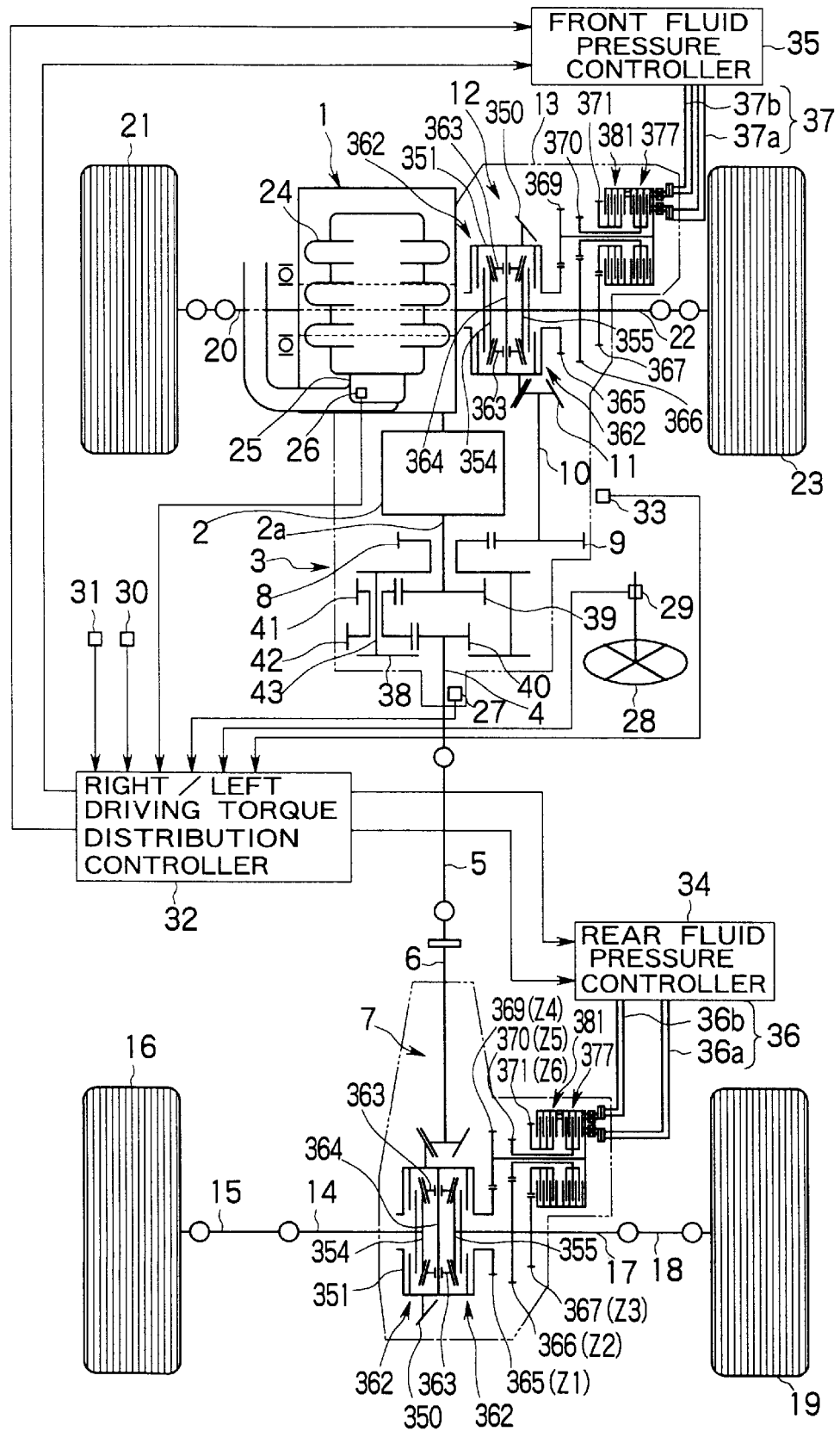
FIG. 46 is a diagrammatic view of a power transmission system for a four-wheel drive automobile, including a right/left driving torque distributing device in a fourth embodiment according to the present invention.

In a power transmission system shown in FIG. 46, the output driving torque of an engine 1 included in a vehicle is applied to an input member of an automatic transmission 2 disposed behind the engine 1. The output driving torque of the automatic transmission 2 is transmitted through a rear drive shaft 4, a propeller shaft 5 and a drive pinion 6 to a rear right/left driving torque distributing device 7 in a fourth embodiment according to the present invention, and to a front right/left driving torque distributing device 12 substantially identical with the rear right/left driving torque distributing device 7 through a transfer drive gear 8, a transfer driven gear 9, a front drive shaft 10 and a drive pinion 11. A power transmission method by which the power transmission system shown in FIG. 46 transmits the output driving torque of the engine 1 to the right/left driving torque distributing devices 7 and 12 is the same as that in which the power transmission system shown in FIG. 1 transmits the output driving torque of the engine to the right/left driving torque distributing devices 7 and 12, and hence the further description thereof will be omitted.

The rear right/left driving torque distributing device 7 will be described in detail with reference to FIG. 47.

The rear right/left driving torque distributing device 7 comprises, as principal units, a differential limiting mechanism 344, a gear mechanism 345, and a clutch mechanism 346. The drive pinion 6 for driving the rear right/left driving torque distributing device 7, and the differential limiting mechanism 344 are contained in a differential gear case 347. The clutch mechanism 346 is combined with the gear mechanism 345 joined to a side surface of the differential gear case 347. A cover 348 is attached to the rear end of the differential gear case 347, and the gear mechanism 345 and the clutch mechanism 346 are covered with a cover 349.

A shaft 6a formed integrally with the drive pinion 6 is connected to the propeller shaft 5 and is supported in bearings for rotation on the differential gear case 347. A final gear 350 engaged with the drive pinion 6 is fastened to a flange 351a formed on the outer circumference of a differential gear case 351 included in the differential limiting mechanism 344.

The differential gear case 351 consists of a left differential gear case 351L and a cylindrical right differential gear case 351R. The left differential gear case 351L and the right differential gear case 351R are provided with cylindrical bosses 351La and 351Ra projecting outward therefrom, respectively.

The left drive shaft 14 is rotatably fitted in the boss 351La of the left differential gear case 351L, and the boss 351La is supported for rotation in a bearing on a side retainer 352 fastened to the differential gear case 347.

A first shaft 353 included in the gear mechanism 345 is inserted in and splined to the boss 351Ra of the right differential gear case 351, the right drive shaft is rotatably fitted in the first shaft 353, and the boss 351Ra is supported in a bearing on the differential gear case 347.

The respective inner ends of the left drive shaft 14 and the right drive shaft 17 are inserted in the differential gear case 351 so as to extend opposite to each other. A left side gear (bevel gear) 354 and a right side gear (bevel gear) 355 are mounted on and coupled by splines with the respective inner ends of the left drive shaft 14 and the right drive shaft 17, respectively.

A plurality of disks 356 are mounted on the boss 354a of the left side gear 354, and a plurality of disks 357 are fitted in the differential gear case 351. The disks 256 and the disks 357 are arranged alternately to form a differential limiting multiple-disk clutch 362. A pressure is applied to the disks 356 and 357 by an axially movable left pressure ring 358 to engage the differential limiting multiple-disk clutch 362. A plurality of disks 359 are mounted on the boss 355a of the right side gear 355, and a plurality of disks 360 are fitted in the differential gear case 351. The disks 259 and the disks 360 are arranged alternately to form a differential limiting multiple-disk clutch 362. A pressure is applied to the disks 359 and 360 by an axially movable right pressure ring 361 to engage the differential limiting multiple-disk clutch 362.

The left pressure ring 358 and the right pressure ring 361 are fitted in the differential gear case 351 with their open ends facing each other. Differential pinions (bevel gears) 363 engaged with the left side gear 354 and the right side gear 355, respectively, are supported rotatably on a pinion shaft 364. V-grooves are formed in the opposite inner end surfaces of the left pressure ring 358 and the right pressure ring 361, and the substantially square opposite end portions of the pinion shaft 364 are fitted in spaces defined by the V-grooves.

The left pressure ring 358 and the right pressure ring 361 provided with the V-grooves, and the opposite end portions of the pinion shaft 364 constitute a cam mechanism. If a force acts on the pinion shaft 364 to turn the pinion shaft 364 toward the left drive shaft 14 and the right drive shaft 17, the left pressure ring 358 is pressed toward the disks 356 and 357, and the right pressure ring 361 is pressed toward the disks 359 and 360.

When the drive pinion 6 drives the differential gear case 351 for rotation, the differential pinions 363 rotate to enable differential motion between the left wheel 16 and the right wheel 19. The differential limiting multiple-disk clutches 362 generate a differential limiting torque when there is a difference between the respective rotating speeds of the left side gear 354 and the right side gear 355 relative to the differential gear case 351.

The first shaft 353 put on the right drive shaft 17 projects from the differential gear case 347, and is supported in a bearing on a side wall of the differential gear case 347. A first gear is formed integrally with the first shaft 353 at the outer end of the latter.

A second gear 366 and a third gear 367 are formed integrally with a shaft 368, the shaft 368 is mounted on and coupled by splines with the right drive shaft 17 so that the second gear 366 and the third gear 367 are on the outer side, i.e., on the right-hand side, of the first gear 365. The shaft 368 is inserted in and supported for rotation in a bearing on the first shaft 365.

The first gear 365, the second gear 366 and the third gear 367 are coaxial with each other. A fourth gear 369, a fifth gear 370 and a sixth gear 371, which are coaxial with each other, are engaged with the first gear 365, the second gear 367 and the third gear 368, respectively.

The gear mechanism 345 has a first gear train consisting of the first gear 365 and the fourth gear 369, a second gear train consisting of the second gear 366 and the fifth gear 370, and a third gear train consisting of the third gear 367 and the sixth gear 371.

The gear ratios of the first, the second and the third gear train are $z4/z1=0.9/1$, $z5/z2=0.9 \cdot 0.9/1$ and $z6/z3=1/1$, respectively, in which z1, z2, z3, z4, z5 and z6 are the numbers of teeth of the first gear 365, the second gear 366, the third gear 367, the fourth gear 369, the fifth gear 370 and the sixth gear 371, respectively. The gear ratios in decreasing order are 1/1 (the gear ratio of the third gear train), 0.9/1 (the gear ratio of the first gear train) and $0.9 \cdot 0.9/1$ (the gear ratio of the second gear train), and the step ratios between the gear ratios of the first gear train and the third gear train and between the second gear train and the first gear train are 0.9. The step ratios need not necessarily be 0.9.

The fourth gear 369, i.e., a first clutch gear, is formed integrally with a fourth shaft 372 at one end of the latter. The fourth shaft 372 has one end, i.e., the inner end, supported in a bearing on an outer surface of the differential gear case 347, and the other end, i.e., the outer end, rotatably supported on the cover 349. A cylindrical clutch drum 373 opening toward the fourth gear 369 is fixedly mounted on the outer end of the fourth shaft 372.

The fifth gear 370, i.e., a second clutch gear, is formed integrally with a fifth shaft 374 at an one end, i.e., the inner end, of the latter. The fifth shaft 374 is put on the fourth shaft 372 and extends to the bottom wall 373a of the clutch drum 373. A clutch hub 375 of a predetermined length is mounted on the other end, i.e., the outer end, of the fifth shaft 374. A plurality of friction disks 376 are mounted alternately on the clutch drum 373 and the clutch hub 375 to form a first hydraulic multiple-disk clutch 377.

The sixth gear 371, i.e., a third clutch gear, is formed integrally with a sixth shaft 378 at an one end, i.e., the inner end, of the latter. The sixth shaft 378 is put on the fifth shaft 374 and extends to the inner side surface of the innermost friction disk 376 of the first hydraulic multiple-disk clutch 377. A clutch hub 379 of a predetermined length is formed at the other end, i.e., the outer end, of the sixth shaft 378. A plurality of friction disks 380 are mounted alternately on the clutch drum 373 and the clutch hub 379 to form a second hydraulic multiple-disk clutch 381.

The first hydraulic multiple-disk clutch 377 is engaged and disengaged by operating a first piston 382 extended through the bottom wall 373a of the clutch drum 373 and fitted in a first pressure chamber 383. A working fluid of a variable pressure controlled by the right/left driving torque distribution controller 32 is supplied into the first pressure chamber 383 through the first fluid pipe 36a to operate the first piston 382.

Similarly, the second hydraulic multiple-disk clutch 381 is engaged and disengaged by operating a second piston 384 extended through the bottom wall 373a of the clutch drum 373 and fitted in a second pressure chamber 385. A working fluid of a variable pressure controlled by the right/left driving torque distribution controller 32 is supplied into the second pressure chamber 385 through the second fluid pipe 36b to operate the second piston 384.

The hydraulic multiple-disk clutches 377 and 381 are combined to construct the clutch mechanism 346. Since the gear mechanism 345 has the gear trains of the foregoing gear ratios, a major part of the driving torque applied to the differential gear case 351 is distributed to the left drive shaft 14 when the first hydraulic multiple-disk clutch 377 is engaged, and a major part of the driving torque is distributed to the right drive shaft 17 when the second hydraulic multiple-disk clutch 381 is engaged. The pressures of the working fluid for engaging the hydraulic multiple-disk clutches 377 and 381 are calculated by the right/left driving power distribution controller 32. The torque distribution ratio in which the driving torque is distributed to the left drive shaft 14 and the right drive shaft 17 is controlled by varying the pressure of the working fluid.

The two hydraulic multiple-disk clutches 377 and 381 of the clutch mechanism 346 may be substituted by electromagnetic clutches or variable-capacity couplings. The respective torque transmission capacities of the hydraulic multiple-disk clutches 377 and 381 may be different from each other according to the gear ratios or the hydraulic multiple-disk clutches 377 and 381 may be different in size from each other.

The front right/left driving torque distributing device 12 receives a driving torque through the front drive shaft 10, a drive pinion 11 and a final gear 350. The front right/left driving torque distributing device 12 is substantially the same in construction as the rear right/left driving torque distributing device 7 and hence the description thereof will be omitted.

A rear fluid pressure controller 34 for supplying the working fluid of a controlled pressure to the hydraulic multiple-disk clutches 377 and 381, and a front fluid pressure controller 35 are the same as those previously described in connection with the right/left driving torque distributing device in the first embodiment, and hence the description thereof will be omitted.

The output driving torque of the engine 1 is transmitted through the output shaft 2a of the automatic transmission 2 to the first sun gear 39 of the center differential gear 3.

The driving torque transmitted from the first sun gear 39 through the first pinion 41 to the second pinion 42 is distributed to the second sun gear 40 and the carrier 38 supporting the first pinion 41 and the second pinion 42. A driving torque distributed to the second sun gear 40 is transmitted through the rear drive shaft 4 to the rear right/left driving power distributing device 7, and a driving torque distributed to the carrier 38 is transmitted through the transfer drive gear 8, the transfer driven gear 9 and the front drive shaft 10 to the front right/left driving torque distributing device 12.

When the vehicle is traveling straight, i.e., NF=NR, the second sun gear 40 and the carrier 38 of the center differential gear 3 rotate in the same direction at the same rotating speed, and the first pinions 41 and the second pinions 42 do not make any planetary motion and revolve together with the carrier 38.

Since the first pinion 41 and the second pinion 42 revolve together with the carrier 38, any frictional torque does not act on either of the first pinion 41 and the second pinion 42. Consequently, the input torque Ti applied to the first sun gear 39 is distributed in an equal front-to-rear torque distribution ratio of 50:50 so that the front wheel driving torque TF, i.e., the torque of the carrier 38, is equal to the rear wheel driving torque TR, i.e., the torque of the second sun gear 40, if the gear geometry of the gears is determined so as to establish equal torque distribution or the input torque Ti is distributed in an unequal front-to-rear torque distribution ratio so that the front wheel driving torque TF and the rear wheel driving torque TR are unequal to each other if the gear geometry of the gears is determined so as to establish unequal torque distribution dependent on the gear geometry.

When the vehicle is turning with the front output rotating speed higher than the rear output rotating speed, i.e., NF>NR, or the front wheels slipping, the first pinions 41 and the second pinions 42 of the center differential gear 3 make a planetary motion for a differential motion. Consequently, the difference in rotating speed between the front wheels and the rear wheels during the turning of the vehicle is absorbed and the vehicle is able to turn smoothly.

As the first pinions 41 and the second pinion 42 make a planetary motion, a thrust acts on each set of the first pinion 41 and the second pinion 42 due to the difference in helix angle between the first pinion 41 and the second pinion 42, a frictional resistance acts on the end surface of either the first pinion 41 or the second pinion 42, and a composite force of a load radially acting on the first pinion 41 and the second pinion 42, and a tangential load acting on the first pinion 41 and the second pinion 42 acts on the circumference of each planet pin 43 to exert a frictional resistance against the rotation of the first pinion 41 and the second pinion 42. These frictional resistances produce a differential limiting torque.

Under such a condition, the differential limiting torque retards the rotation of the carrier 38, so that a major part of the input torque is distributed to the rear right/left driving torque distributing device 7. Consequently, the steering nature and the controllability of the vehicle during turning are improved, and the slip of the front wheels during straight traveling can be prevented.

When the rear wheels slip and NR>NF, the first pinions 41 and the second pinions 42 of the center differential gear 3 make a planetary motion due to the difference in rotating speed between the front wheels and the rear wheels, so that a frictional resistance is produced.

Under such a condition, a differential limiting torque promotes the rotation of the carrier 38, so that a major part of the input torque is distributed to the front right/left driving torque distributing device 12, so that the slip of the rear wheels is prevented.

Since the differential limiting torque of the center differential gear 3 is proportional to the input torque Ti, the differential limiting torque is proportional to the torques of the front and the rear wheels, and the differential limiting function is exercised always at a fixed rate.

The driving torque distributed by the center differential gear 3 to the rear right/left driving torque distributing device 7 is transmitted through the propeller shaft 5 and the drive pinion 6 to the rear right/left driving torque distributing device 7, and the driving torque is transmitted through the final gear 350 to the differential gear case 351.

The operation of the differential limiting mechanism 344 will be described hereinafter. As the differential gear case 351 rotates together with the final gear 350, the left pressure ring 358 and the right pressure ring 361 fitted in the differential gear case 351 rotates together with the differential gear case 351, so that the pinion shaft 364 fitted in the spaces defined by the V-grooves of the pressure rings 358 and 361 rotates in the rotating direction of the left drive shaft 14 and the right drive shaft 17.

The driving torque is transmitted through the differential pinions 363 rotatably mounted on the pinion shaft 364, the left side gear 354, the right side gear 355 to the left drive shaft 14 and the right drive shaft 17.

When the pinion shaft 364 rotates in the rotating direction of the left drive shaft 14 and the right drive shaft 17, the left pressure ring 358 is pressed toward the disks 356 and 357, and the right pressure ring 361 is pressed toward the disks 359 and 360 by cam actions between the flat surfaces of the square end portions of the pinion shaft 364 and portions of the left pressure ring 358 and the right pressure ring 361 provided with the V-grooves.

When the vehicle is traveling straight with the rear right wheel 19 and the rear left wheel 16 rotating at the same rotating speed, the differential pinions 363 do not rotate on the pinion shaft 364, and revolve together with the revolving left side gear 354 and the right side gear 355.

When the rear right wheel 19 and the rear left wheel 16 rotate at different rotating speeds, respectively, the differential pinions 363 rotate on the pinion shaft 364 to enable differential motion between the left wheel 16 and the right wheel 19. If the rotating speed of the rear left wheel 16 is higher than that of the rear right wheel 19, the rotating speed of the left side gear 354 relative to the differential gear case 351 and that of the right side gear 355 relative to the differential gear case 351 are different from each other. Consequently, the differential limiting multiple-disk clutches 362 generate frictional resistance, so that part of the driving torque distributed to the left side gear 354 is transferred to the right side gear 355 for a differential limiting operation. Part of the driving torque distributed to the right side gear 355 is transferred to the left side gear 354 when the rotating speed of the rear right wheel 19 is higher than that of the rear left wheel 16.

The operation of the gear mechanism 345 and the clutch mechanism 346 will be described hereinafter. When the differential gear case 351 is driven for rotation, the first gear 353 splined to the differential gear case 351 rotates. Consequently, the first gear 365 drives the fourth gear 369 engaged with the first gear 353 and the fourth shaft 372 and the clutch drum 373 rotate.

As the right drive shaft 17 rotates, the shaft 368 provided with the second gear 366 and the third gear 367 rotates. The second gear 366 drives the fifth gear 370 for rotation, so that the fifth shaft 374 and the clutch hub 375 rotate. The third gear 367 drives the sixth gear 371 for rotation, so that the sixth shaft 378 and the clutch hub 379 rotate.

In the rear fluid pressure controller 34, a motor 386 drives an oil pump 387, and the working fluid of a pressure regulated by a pressure regulator valve 388 is supplied to a duty solenoid valve 393 and a clutch control valve 390.

In the right/left driving torque distribution controller 32, the output signals of the throttle opening sensor 26, the traveling speed sensor 27, the steering angle sensor 29, the longitudinal acceleration sensor 30 and the lateral acceleration sensor 31, and the gear position signal are processed to calculate optimum driving torques to be distributed to the front right wheel 23, the front left wheel 21, the rear right wheel 19 and the rear left wheel 16.

When distributing a major part of the driving torque to the rear left wheel 16 while the vehicle is making a right turn, the right/left driving torque distribution controller 32 gives a signal requesting the supply of the working fluid of a set pressure determined by calculation to the first pressure chamber 383 to the rear fluid pressure controller 34.

Then, the working fluid of the set pressure is supplied through the fluid pipe 36a to the first pressure chamber 383, the first piston 382 is actuated to compress the friction disks of the first hydraulic multiple-disk clutch 377 at a set pressure. Consequently, the driving torque of the differential gear case 351 is distributed through the second gear 366 and the first hydraulic multiple-disk clutch 377 to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the second pressure chamber 385.

Then, the working fluid of the set pressure is supplied through the fluid pipe 36b to the second pressure chamber 385, the second piston 384 is actuated to compress the friction disks of the second hydraulic multiple-disk clutch 381 at a set pressure. Consequently, the driving torque of the differential gear case 351 is distributed through the second hydraulic multiple-disk clutch 381 and the third gear 367 to the right drive shaft 17.

The driving torque distributed to the front right/left driving torque distributing device 12 by the center differential gear 3 is transmitted through the front drive shaft 10 and the drive pinion 11 to the front right/left driving torque distributing device 12. The driving torque is transmitted through the final gear 350 to the differential gear case 351.

The front right/left driving torque distributing device 12, similarly to the rear right/left driving torque distributing device 7, exercises a differential function for the front wheels 21 and 23. When distributing a major part of the driving torque to the front left wheel 21 while the vehicle is making a right turn, the front fluid pressure controller 35 supplies the working fluid of a set pressure determined by calculation through the fluid pipe 37a to the first pressure chamber 383. When distributing a major part of the driving torque to the front right wheel 23 while the vehicle is making a left turn, the working fluid of a set pressure is supplied through the fluid pipe 37b to the second pressure chamber 385.

The right/left driving torque distributing device in the fourth embodiment has a relatively small lateral size, and hence the universal joints joining the right and the left wheel to the right and the left axle can be disposed at a relatively small angle of bend, which is advantageous in respect of durability and reliability.

The right/left driving torque distributing device consists of a relatively small number of component parts, and many of the component parts may be those of conventional right/left driving torque distributing devices. The right/left driving torque distributing device has a compact construction and can be manufactured at a relatively low manufacturing cost.

Since the right/left driving torque distributing device has a compact construction and a relatively small lateral size, interference between the right/left driving torque distributing device, and the suspensions or the exhaust system can be prevented, sufficient spaces can be secured around the right/left driving torque distributing device, which facilitates work for mounting the right/left driving torque distributing device on the vehicle and maintenance work.

Since the right/left driving torque distributing device employs the driving torque distributing mechanism comprising the three gear trains, the driving torque distributing ratio can be properly determined according to the characteristics of the vehicle or desired performance of the vehicle by properly determining the gear ratios of the three gear trains.

The first and the second hydraulic multiple-disk clutch of the right/left driving torque distributing device can be controlled so that the slips between the drive friction disks and the driven friction disks of the first hydraulic multiple-disk clutch and between the drive friction disks and the driven friction disks of the second hydraulic multiple-disk clutch are equal to each other by determining the respective gear ratios of the three gear trains so as to meet a predetermined relation. Therefore, a range in which the same friction characteristics (the relation between speed and coefficient of dynamic friction) is usable can be used and highly accurate control can be achieved.

The first and the second hydraulic multiple-disk clutch of the right/left driving torque distributing device are united together in a single, compact, lightweight structure. The capacities of the first and the second hydraulic multiple-disk clutch may be different from each other, and either of the first and the second hydraulic multiple-disk clutch may be smaller than the other.

The right/left driving torque distributing device is capable of positive right/left driving force distribution and of the differential limiting function. Therefore, the right/left driving torque distributing device is capable of generating a sufficiently high differential limiting torque in quick response to the variation of the frictional characteristics of the road surface and the rapid variation of the driving torque.

In the right/left driving torque distributing device, the pressure rings of the differential limiting mechanism apply pressure to the disks for a differential limiting operation. Therefore, the lost motion of the parts including gears can be surely suppressed and noise generation attributable to backlash between the teeth of the gears can be suppressed.

The center differential gear comprises a relatively small number of component parts, and is simple in construction, compact and lightweight. Therefore, the center differential gear can be easily manufactured and assembled and is advantageous in respect of the vibration and the noise generation of the power transmission system.

Both the center differential gear and the right/left driving torque distributing device are compact and lightweight, and can be easily united together to construct a compact, lightweight, integrated unit.

The number of teeth of the gears of the center differential gear may be determined so that the reference front-to-rear driving torque distribution ratio is 50:50. An input-torque-proportional differential limiting torque is distributed to the front wheels or the rear wheels according to the traveling condition of the vehicle and the surface condition of the road. Consequently, the slip of the vehicle can be prevented, traction can be secured, the skidding of the rear wheels can be prevented and the running performance of the vehicle can be improved. Furthermore, the posture of the vehicle can be easily controlled by operating the accelerator pedal and the vehicle respond satisfactorily to control operations, which enables enjoyable sporty driving of the vehicle.

Figure 47:
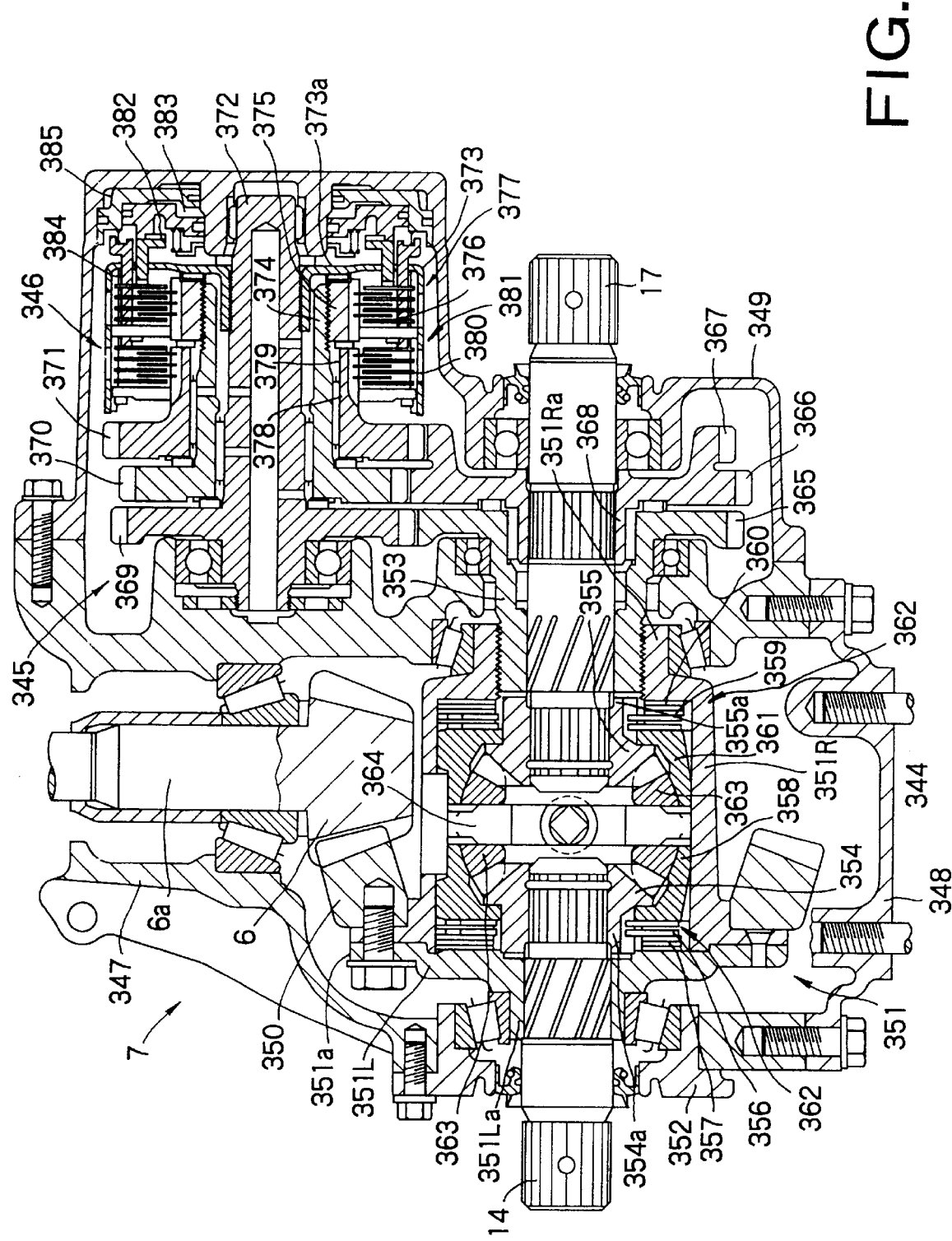
FIG. 47 is an enlarged sectional view of the rear right/left driving torque distributing device included in the power transmission system shown in FIG. 46.
Figure 48:
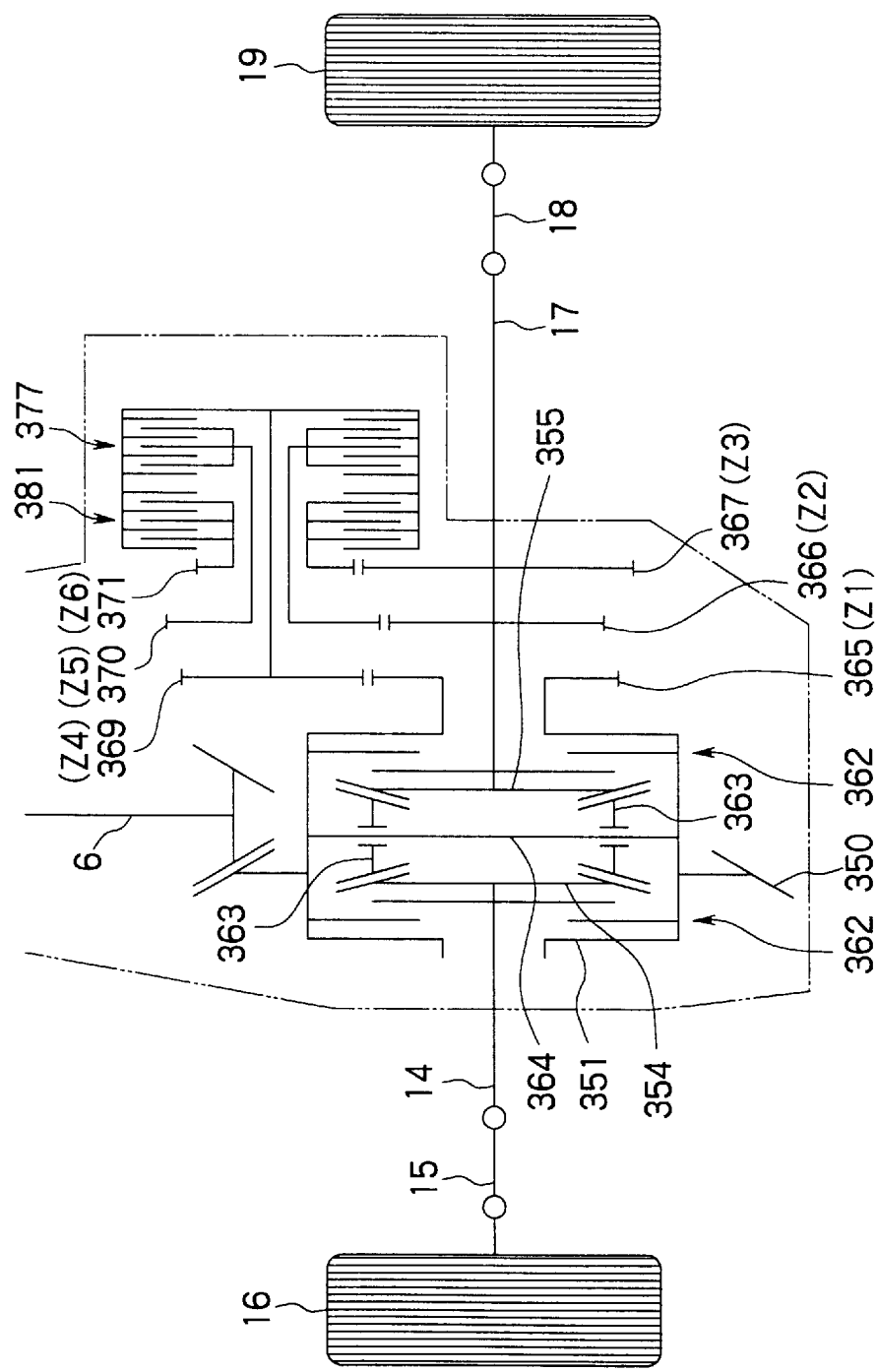
FIGS. 48 to 56 are enlarged diagrammatic views of rear right/left driving torque distributing devices in modifications of the right/left driving torque distributing device shown in FIG. 47.

FIG. 48 shows a rear right/left driving torque distributing device in a first modification of the rear right/left driving torque distributing device 7 in the fourth embodiment shown in FIG. 47. The rear right/left driving torque distributing device in the first modification is provided with gear trains of gear ratios different from those of the gear trains of the rear right/left driving torque distributing device 7 of FIG. 47, and is the same in other respects as the rear right/left driving torque distributing device 7 shown in FIG. 47.

In the first modification shown in FIG. 48, the first gear train has a gear ratio $z4/z1=0.9/1$, the second gear train has a gear ratio $z5/z2=1/1$, and the third gear train has a gear ratio $z6/z3=0.9/1$, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of the fourth gear 262 is higher than that of the first gear 257, the respective rotating speeds of the second gear 259 and the fifth gear 263 are equal to each other, and the rotating speed of the sixth gear 264 is higher than that of the third gear 260.

In the first modification, when distributing a major part of the driving torque to the rear left wheel 16 while the vehicle is making a right turn, the right/left driving torque distribution controller 32 gives a signal requesting the supply of the working fluid of a set pressure determined by calculation to the second pressure chamber 385 to the rear fluid pressure controller 34.

Then, the working fluid of the set pressure is supplied through the fluid pipe 36b to the second pressure chamber 385, the second piston 384 is actuated to compress the friction disks of the second hydraulic multiple-disk clutch 381 at a set pressure. Consequently, the driving torque of the differential gear case 351 is distributed through the third gear 367, the second hydraulic multiple-disk clutch 381 to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the first pressure chamber 383 to the rear fluid pressure controller 34.

Then, the working fluid of the set pressure is supplied through the fluid pipe 36a to the first pressure chamber 383, the first piston 382 is actuated to compress the friction disks of the first hydraulic multiple-disk clutch 377 at a set pressure. Consequently, the driving torque of the differential gear case 351 is distributed through the first hydraulic multiple-disk clutch 377 and the second gear 366 to the right drive shaft 17.

Figure 49:
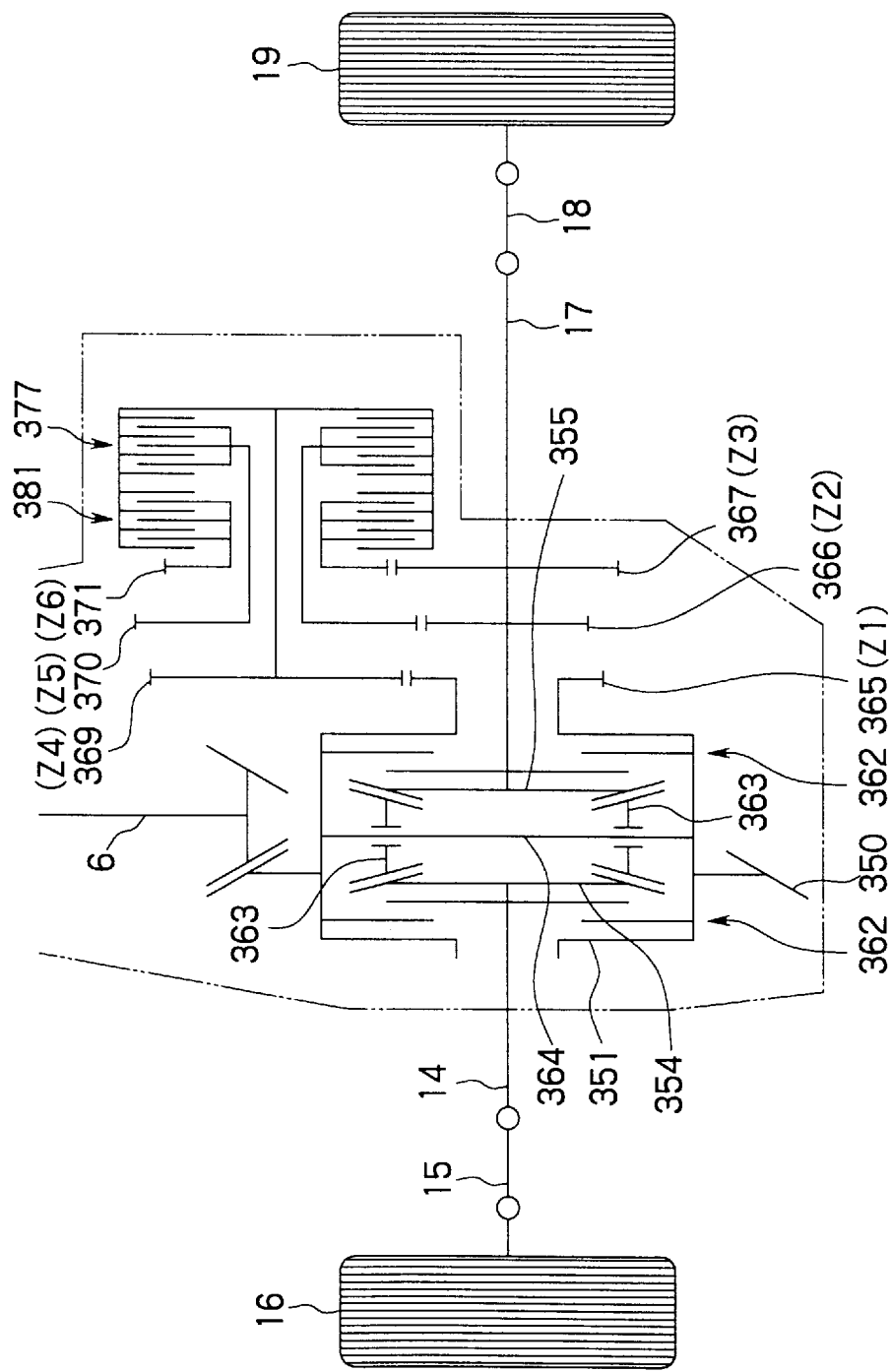

Referring to FIG. 49, a rear right/left driving torque distributing device in a second modification of the rear right/left driving torque distributing device 7 in the fourth embodiment shown in FIG. 47 is provided with gear trains of gear ratios different from those of the gear trains of the rear right/left driving torque distributing device 7 of FIG. 47, and is the same in other respects as the rear right/left driving torque distributing device 7 in the fourth embodiment.

In the second modification shown in FIG. 49, the first gear train has a gear ratio $z4/z1=1/0.9$, the second gear train has a gear ratio $z5/z2=1/0.9 \cdot 0.9$, and the third gear train has a gear ratio $z6/z3=1/1$, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of the fourth gear 262 is lower than that of the first gear 257, the rotating speed of the fifth gear 263 is lower than that of the second gear 259, and the respective rotating speeds of the sixth gear 264 and the third gear 260 are equal to each other.

Accordingly, in the second modification, when distributing a major part of the driving torque to the rear left wheel 16 while the vehicle is making a right turn, the right/left driving torque distribution controller 32 gives a signal requesting the supply of the working fluid of a set pressure determined by calculation to the second pressure chamber 385 to the rear fluid pressure controller 34.

Then, the working fluid of the set pressure is supplied through the fluid pipe 36b to the second pressure chamber 385, the second piston 384 is actuated to compress the friction disks of the second hydraulic multiple-disk clutch 381 at a set pressure. Consequently, the driving torque of the differential gear case 351 is distributed through the third gear 367, the second hydraulic multiple-disk clutch 381 to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the first pressure chamber 383 to the rear fluid pressure controller 34.

Then, the working fluid of the set pressure is supplied through the fluid pipe 36a to the first pressure chamber 383, the first piston 382 is actuated to compress the friction disks of the first hydraulic multiple-disk clutch 377 at a set pressure. Consequently, the driving torque of the differential gear case 351 is distributed through the first hydraulic multiple-disk clutch 377 and the second gear 366 to the right drive shaft 17.

Figure 50:
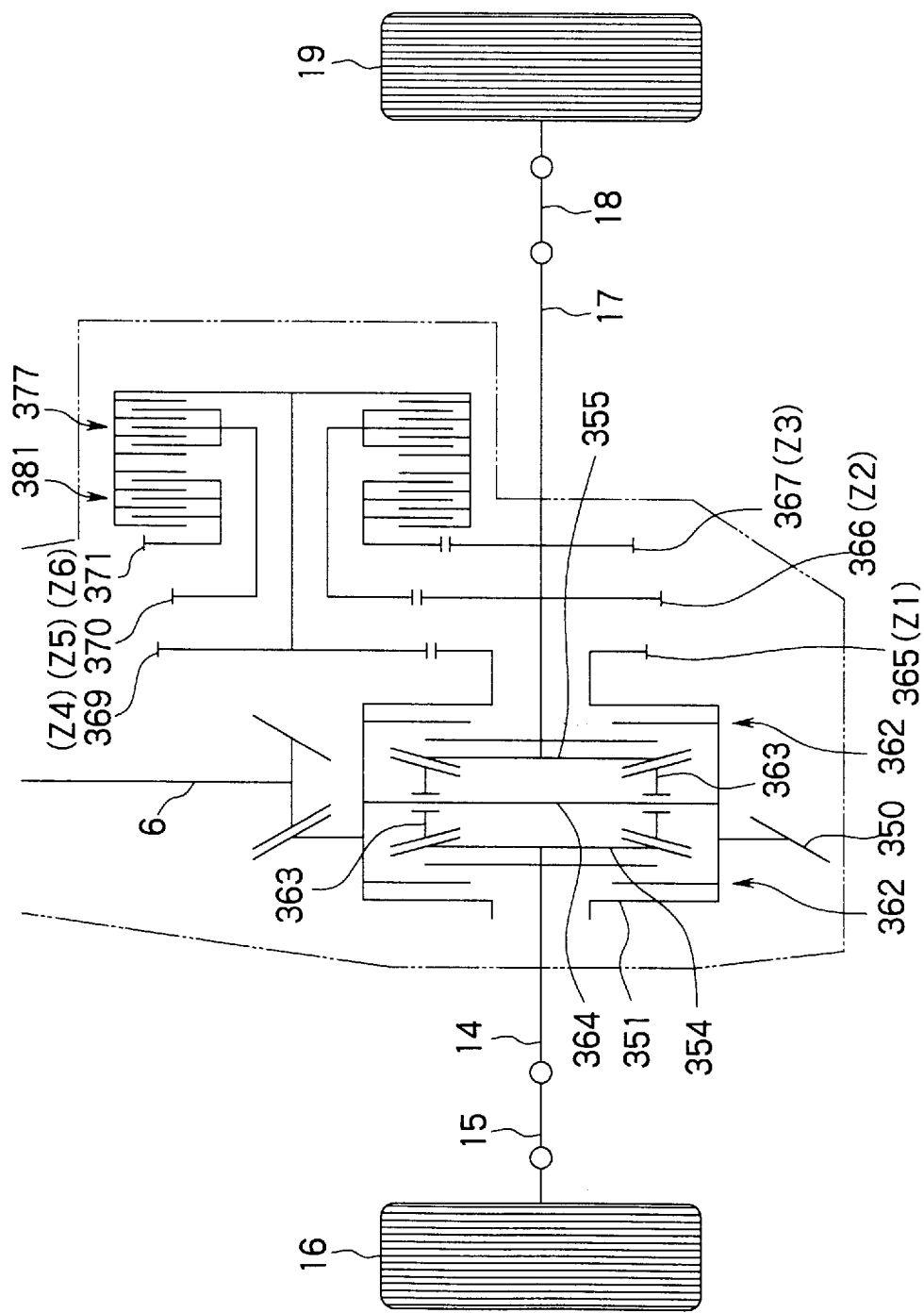

Referring to FIG. 50, a rear right/left driving torque distributing device in a third modification of the rear right/left driving torque distributing device 7 in the fourth embodiment shown in FIG. 47 is provided with gear trains of gear ratios different from those of the gear trains of the rear right/left driving torque distributing device 7 of FIG. 47, and is the same in other respects as the rear right/left driving torque distributing device 7 in the fourth embodiment.

In the third modification shown in FIG. 50, the first gear train has a gear ratio $z4/z1=1/0.9$, the second gear train has a gear ratio $z5/z2=1/1$, and the third gear train has a gear ratio $z6/z3=1/0.9 \cdot 0.9$, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of a fourth gear 262 is lower than that of a first gear 257, the respective rotating speeds of a fifth gear 263 and a second gear 259 are equal to each other, and the rotating speed of a sixth gear 264 is lower than that of the a third gear 260.

Accordingly, in the third modification, when distributing a major part of the driving torque to the rear left wheel 16 while the vehicle is making a right turn, the right/left driving torque distribution controller 32 gives a signal requesting the supply of the working fluid of a set pressure determined by calculation to the first pressure chamber 383 to the rear fluid pressure controller 34.

Then, the working fluid of the set pressure is supplied through the fluid pipe 36a to the first pressure chamber 383, the first piston 382 is actuated to compress the friction disks of the first hydraulic multiple-disk clutch 377 at a set pressure. Consequently, the driving torque of the differential gear case 351 is distributed through the second gear 366, the first hydraulic multiple-disk clutch 377 to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the second pressure chamber 385 to the rear fluid pressure controller 34.

Then, the working fluid of the set pressure is supplied through the fluid pipe 36b to the second pressure chamber 385, the second piston 384 is actuated to compress the friction disks of the second hydraulic multiple-disk clutch 381 at a set pressure. Consequently, the driving torque of the differential gear case 351 is distributed through the second hydraulic multiple-disk clutch 381 and the third gear 367 to the right drive shaft 17.

Figure 51:
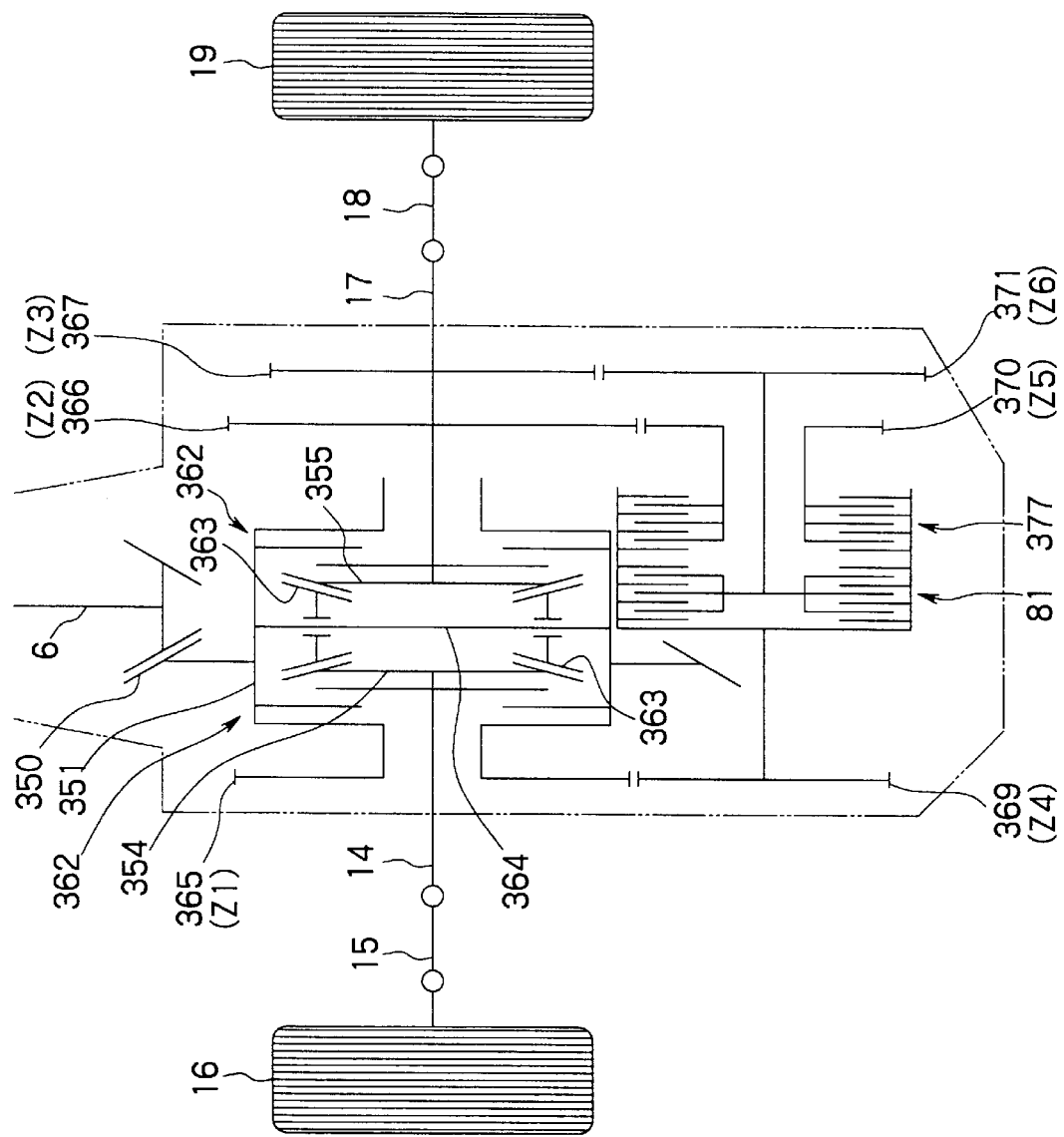

Referring to FIG. 51, a rear right/left driving torque distributing device in a fourth modification of the rear right/left driving torque distributing device 7 in the fourth embodiment shown in FIG. 47 is provided with a gear mechanism including a first gear train corresponding to the first gear train of the rear right/left driving torque distributing device 7 in the fourth embodiment and disposed on the side of the left wheel 16, and second and third gear trains corresponding to the second and the third gear train of the rear right/left driving torque distributing device 7 in the fourth embodiment and disposed on the side of the right wheel 19, and a clutch mechanism consisting of two hydraulic multiple-disk clutches 377 and 381 and disposed behind the differential gear case 351. The rear right/left driving torque distributing device in the fourth modification is the same in other respects as the rear right/left driving torque distributing device 7 in the fourth embodiment.

As shown in FIG. 51, a first gear 365 is fixed to the left side wall of the differential gear case 351, and a second gear 366 and a third gear 367, similarly to those of the rear right/left driving torque distributing device 7 in the fourth embodiment, fixedly mounted on the right drive shaft 17.

A fourth gear 369, a fifth gear 370 and a sixth gear 371 engaged with the first gear 365, the second gear 366 and the third gear 367, respectively, are arranged coaxially on an axis parallel to the axis of the differential gear case 351 aligned with the axes of the left drive shaft 14 and the right drive shaft 17. The clutch mechanism consisting of the two hydraulic multiple-disk clutches 377 and 381 is disposed between the fourth gear 369, and the fifth gear 370 and the sixth gear 371, and behind the differential gear case 351.

The first gear train has a gear ratio $z4/z1=0.9/1$, the second gear train has a gear ratio $z5/z2=0.9 \cdot 0.9/1$, and the third gear train has a gear ratio $z6/z3=1/1$, in which $z1$, $z2$, $z3$, $z4$, $z5$ and $z6$ are the numbers of teeth of a first gear 365, a second gear 366, a third gear 367, a fourth gear 369, a fifth gear 370 and a sixth gear 371, respectively. Therefore, the rotating speed of the fourth gear 369 is higher than that of the first gear 365, the rotating speed of the fifth gear 370 is higher than that of the second gear 366, and the respective rotating speeds of the sixth gear 371 and the third gear 367 are equal to each other.

Accordingly, in the fourth modification, when distributing a major part of the driving torque to the rear left wheel 16 while the vehicle is making a right turn, the right/left driving torque distribution controller 32 executes a control operation to engage the first hydraulic multiple-disk clutch 377.

When distributing a major part of the driving torque to the rear right wheel 19 while the vehicle is making a left turn, the right/left driving torque distribution controller 32 executes a control operation to engage second hydraulic multiple-disk clutch 381.

The rear right/left driving torque distributing device in the fourth modification can be formed in a further reduced lateral size.

Figure 52:
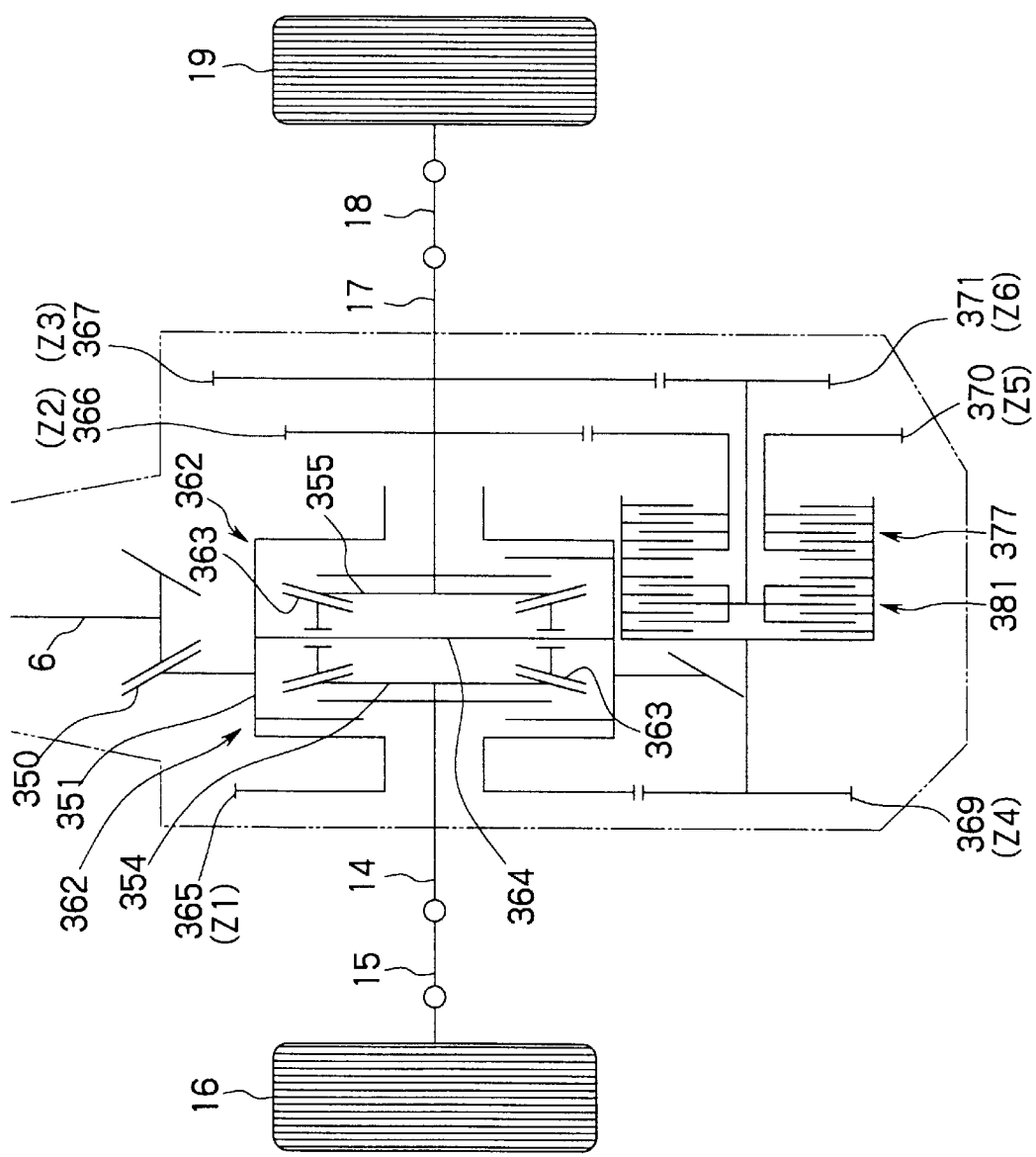

FIG. 52 shows a rear right/left driving torque distributing device in a fifth modification of the rear right/left driving torque distributing device 7 in the fourth embodiment shown in FIG. 47 is provided with gear trains of gear ratios different from those of the gear trains of the rear right/left driving torque distributing device in the fourth modification shown in FIG. 51. The rear right/left driving torque distributing device in the fifth modification is the same in other respects as the rear right/left driving torque distributing device in the fourth modification.

In the fifth modification shown in FIG. 52, the first gear train has a gear ratio $z4/z1=0.9/1$, the second gear train has a gear ratio $z5/z2=1/1$, and the third gear train has a gear ratio $z6/z3-0.9 \cdot 0.9/1$, in which $z1$, $z2$, $z3$, $z4$, $z5$ and $z6$ are the numbers of teeth of a first gear 365, a second gear 366, a third gear 367, a fourth gear 369, a fifth gear 370 and a sixth gear 371. Therefore, the rotating speed of the fourth gear 369 is higher than that of the first gear 365, the respective rotating speeds of the fifth gear 370 and the second gear 366 are equal to each other, and the rotating speed of the sixth gear 371 is higher than that of the third gear 367.

Accordingly, in the fifth modification, when distributing a major part of the driving torque to the rear left wheel 16 while the vehicle is making a right turn, the right/left driving torque distribution controller 32 executes a control operation to engage the second hydraulic multiple-disk clutch 381.

When distributing a major part of the driving torque to the rear right wheel 19 while the vehicle is making a left turn, the right/left driving torque distribution controller 32 executes a control operation to engage the first hydraulic multiple-disk clutch 377.

Figure 53:
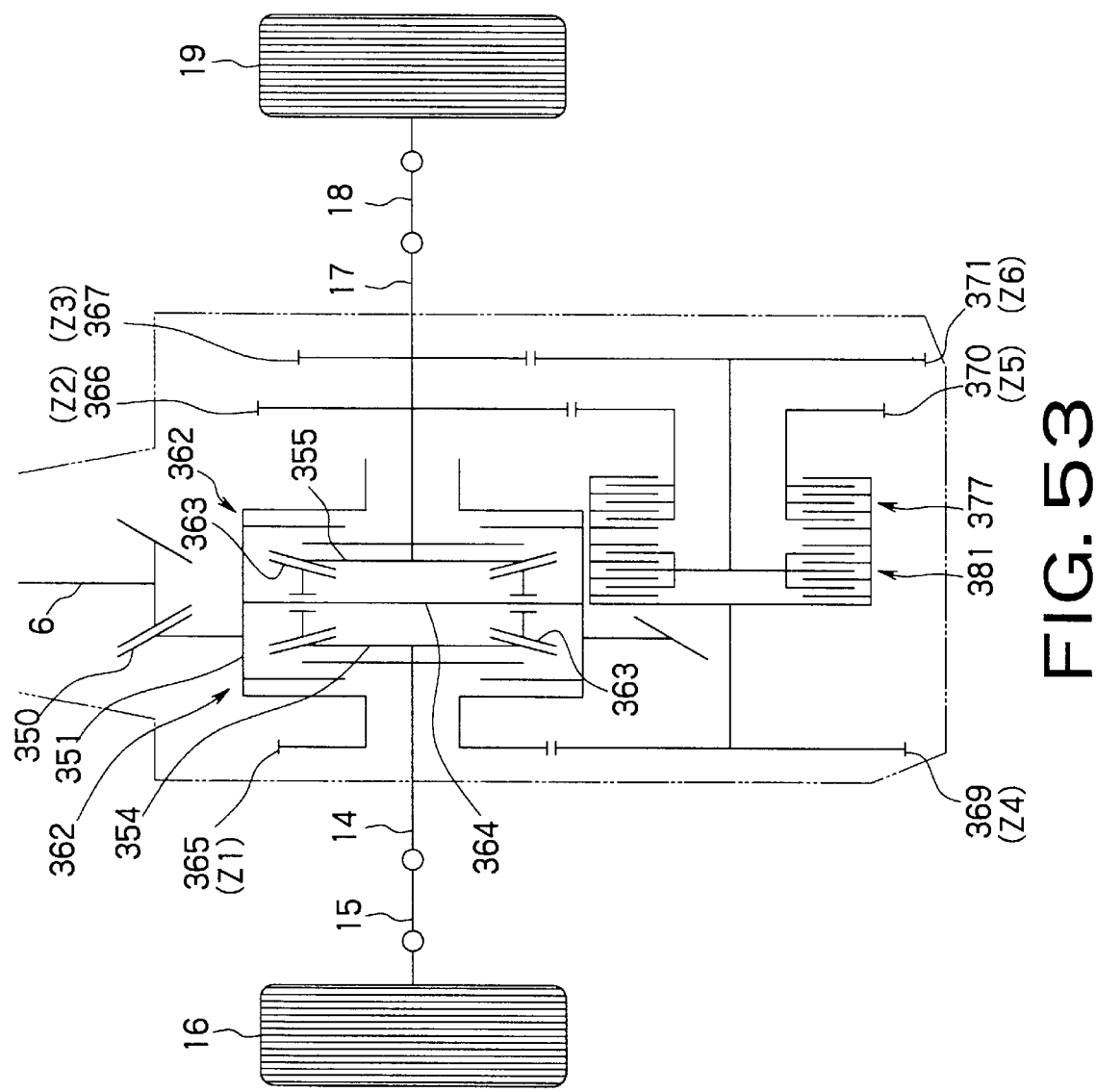

FIG. 53 shows a rear right/left driving torque distributing device in a sixth modification of the rear right/left driving torque distributing device 7 in the fourth embodiment shown in FIG. 47, provided with gear trains of gear ratios different from those of the gear trains of the rear right/left driving torque distributing device in the fourth modification shown in FIG. 51. The rear right/left driving torque distributing device in the sixth modification is the same in other respects as the rear right/left driving torque distributing device in the fourth modification.

In the sixth modification shown in FIG. 53, the first gear train has a gear ratio $z4/z1=1/0.9$, the second gear train has a gear ratio z5/z2=1/1, and the third gear train has a gear ratio z6/z3=1/0.9·0.9, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of the fourth gear 262 is lower than that of a first gear 257, the respective rotating speeds of the fifth gear 263 and the second gear 259 are equal to each other, and the rotating speed of the sixth gear 264 is lower than that of the third gear 260.

Accordingly, in the sixth modification, when distributing a major part of the driving torque to the rear left wheel 16 while the vehicle is making a right turn, the right/left driving torque distribution controller 32 executes a control operation to engage the first hydraulic multiple-disk clutch 377.

When distributing a major part of the driving torque to the rear right wheel 19 while the vehicle is making a left turn, the right/left driving torque distribution controller 32 executes a control operation to engage the second hydraulic multiple-disk clutch 381.

Figure 54:
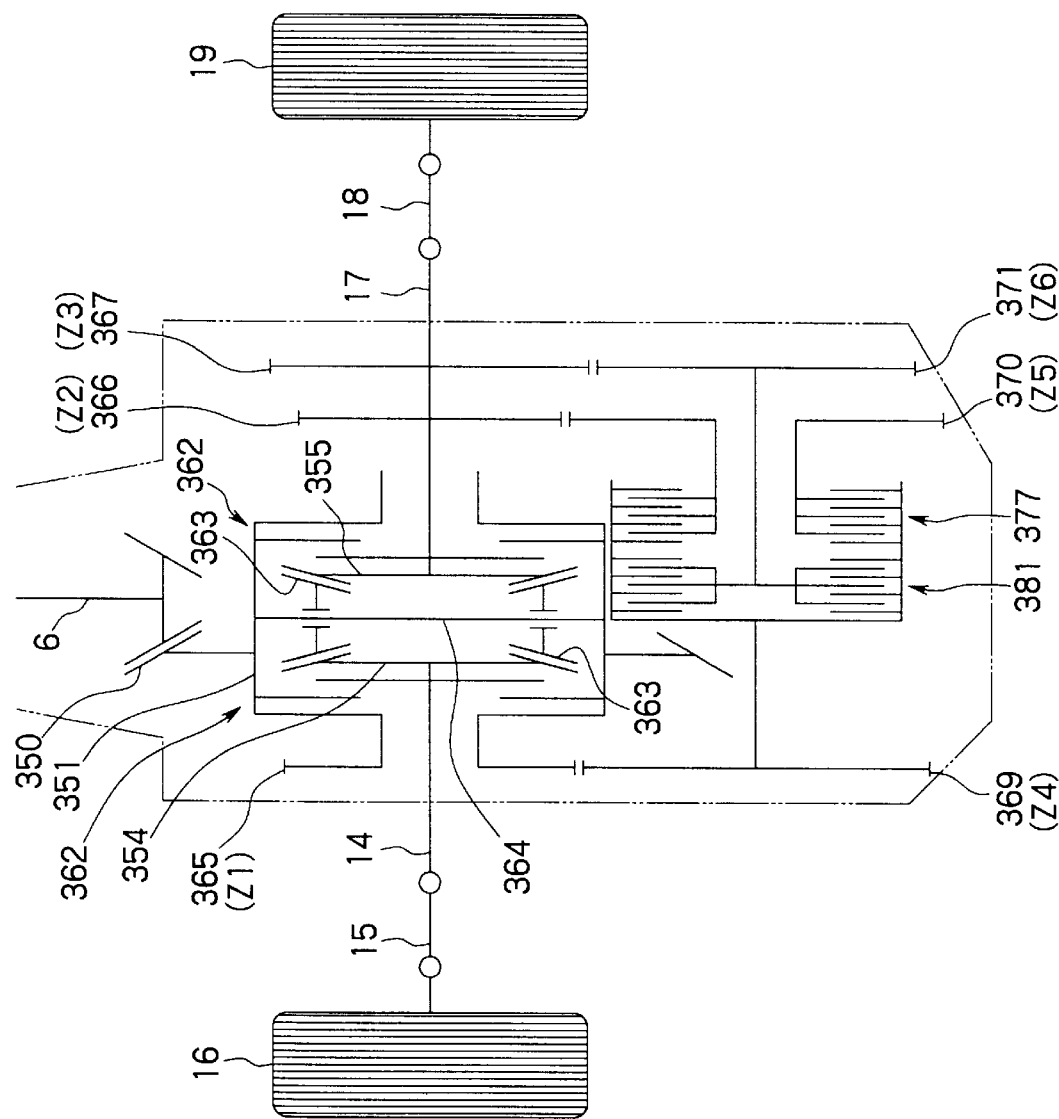

FIG. 54 shows a rear right/left driving torque distributing device in a seventh modification of the rear right/left driving torque distributing device 7 in the fourth embodiment shown in FIG. 47, provided with gear trains of gear ratios different from those of the gear trains of the rear right/left driving torque distributing device in the fourth modification shown in FIG. 51. The rear right/left driving torque distributing device in the seventh modification is the same in other respects as the rear right/left driving torque distributing device in the fourth modification.

In the seventh modification shown in FIG. 54, the first gear train has a gear ratio z4/z1=1/0.9, the second gear train has a gear ratio z5/z2=1/0.9·0.9, and the third gear train has a gear ratio z6/z3=1/1, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of the fourth gear 262 is lower than that of the first gear 257, the rotating speed of the fifth gear 263 is lower than that of the second gear 259, and the respective rotating speeds of the sixth gear 264 and the third gear 260 are equal to each other.

Accordingly, in the seventh modification, when distributing a major part of the driving torque to the rear left wheel 16 while the vehicle is making a right turn, the right/left driving torque distribution controller 32 executes a control operation to engage the second hydraulic multiple-disk clutch 381.

When distributing a major part of the driving torque to the rear right wheel 19 while the vehicle is making a left turn, the right/left driving torque distribution controller 32 executes a control operation to engage the first hydraulic multiple-disk clutch 377.

Figure 55:
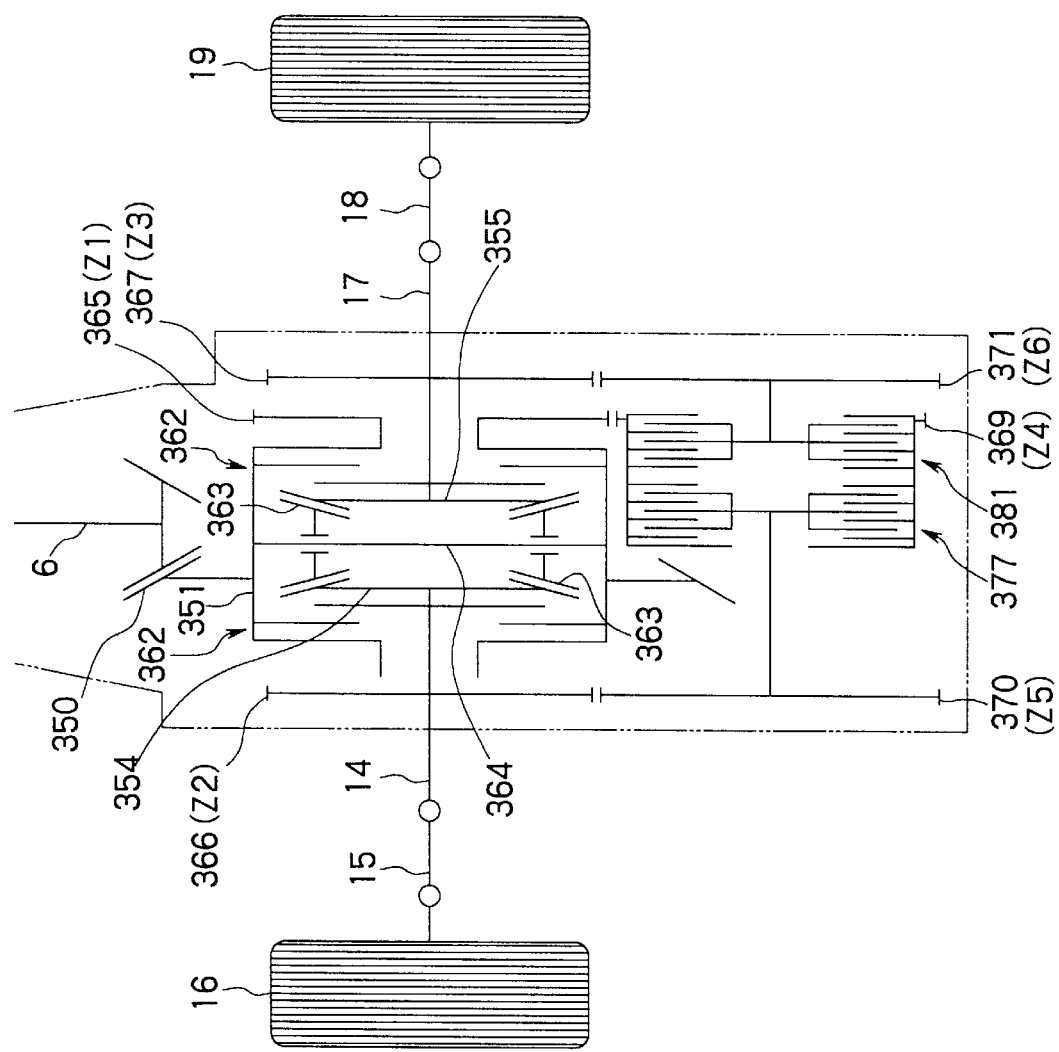

FIG. 55 shows a rear right/left driving torque distributing device in an eighth modification of the rear right/left driving torque distributing device 7 in the fourth embodiment shown in FIG. 47, provided with a second gear train disposed on the side of the rear left wheel 16, and a first gear train and a third gear train disposed on the side of the rear right wheel 19. The respective gear ratios of the second gear train and the third gear train are equal to each other.

As shown in FIG. 55, a first gear 365 is fastened to the right side wall of the differential gear case 351, a third gear 367 is disposed on the outer side, i.e., the right side, of the first gear 365 and fixedly mounted on the right drive shaft 17, and a second gear 366 is fixedly mounted on the left drive shaft 14.

A fourth gear 369, a fifth gear 370 and a sixth gear 371 are arranged coaxially on an axis parallel to the common axis of the first gear 365, the second gear 366 and the third gear 367, and are engaged with the first gear 365, the second gear 366 and the third gear 367, respectively. A clutch mechanism formed by uniting together a first hydraulic multiple-disk clutch 377 and a second hydraulic multiple-disk clutch 381 is interposed between the fifth gear 370 and the sixth gear 371.

In the eighth modification shown in FIG. 55, the first gear train has a gear ratio z4/z1=0.9/1, the second gear train has a gear ratio z5/z2=1/1, and the third gear train has a gear ratio z6/z3=1/1, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of the fourth gear 369 is higher than that of the first gear 365, the respective rotating speeds of the fifth gear 370 and the second gear 366 are equal to each other, and the respective rotating speeds of the sixth gear 371 and the third gear 367 are equal to each other.

Accordingly, in the eighth modification, when distributing a major part of the driving torque to the rear left wheel 16 while the vehicle is making a right turn, the right/left driving torque distribution controller 32 executes a control operation to engage the first hydraulic multiple-disk clutch 377.

When distributing a major part of the driving torque to the rear right wheel 19 while the vehicle is making a left turn, the right/left driving torque distribution controller 32 executes a control operation to engage the second hydraulic multiple-disk clutch 381.

Figure 56:
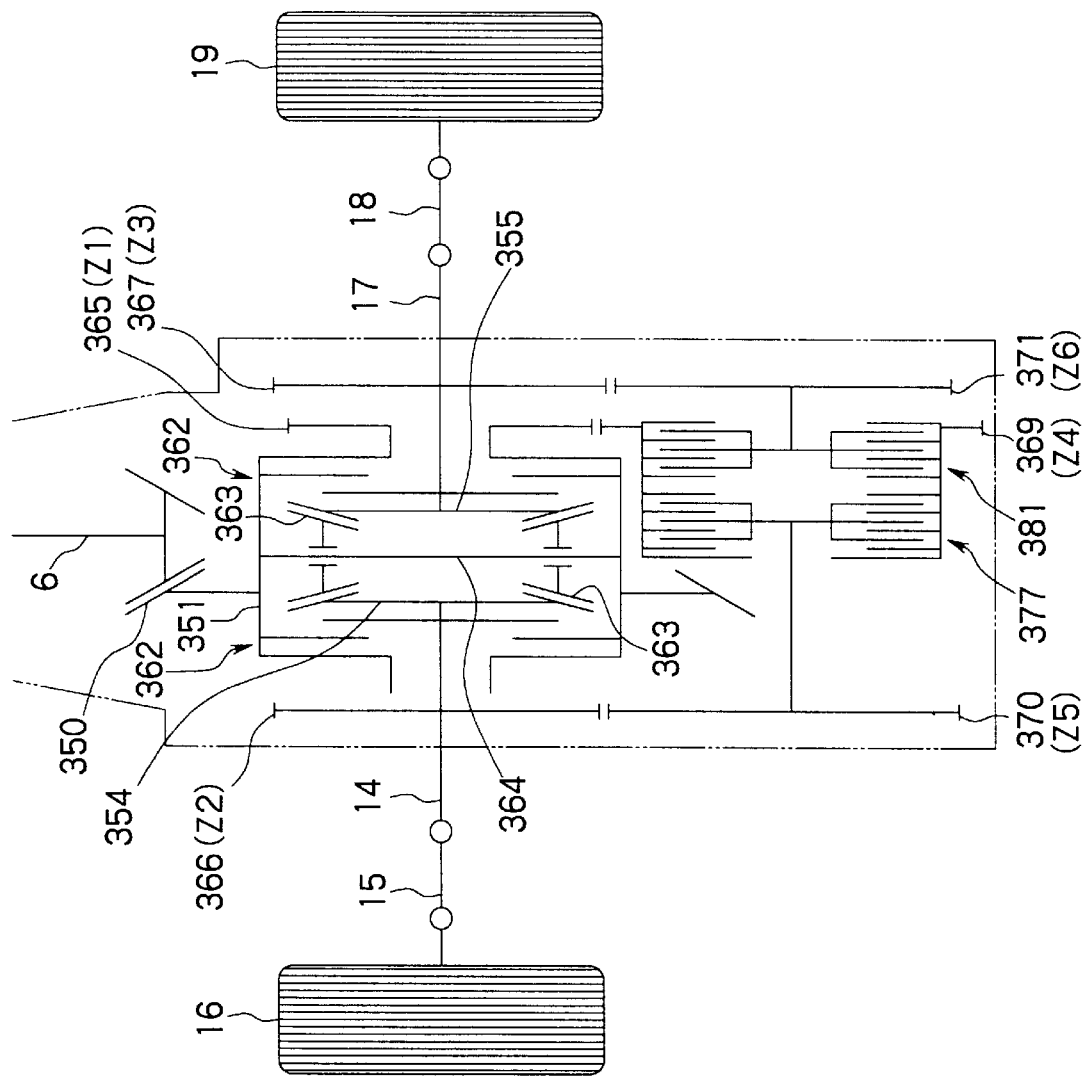

FIG. 56 shows a rear right/left driving torque distributing device in a ninth modification of the rear right/left driving torque distributing device 7 in the fourth embodiment shown in FIG. 47, provided with a first gear train having a gear ratio different from that of the first gear train of the rear right/left driving torque distributing device in the eight modification. The rear right/left driving torque distributing device is the same in other respects as the rear right/left driving torque distributing device in the eighth modification In the rear right/left driving torque distributing device shown in FIG. 56, the first gear train has a gear ratio z4/z1=1/0.9, the second gear train has a gear ratio z5/z2=1/1, and the third gear train has a gear ratio z6/z3=1/1, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of the fourth gear 369 is lower than that of the first gear 365, the respective rotating speeds of the fifth gear 370 and the second gear 366 are equal to each other, and the respective rotating speeds of the sixth gear 371 and the third gear 367 are equal to each other.

Accordingly, in the eighth modification, when distributing a major part of the driving torque to the rear left wheel 16 while the vehicle is making a right turn, the right/left driving torque distribution controller 32 executes a control operation to engage the first hydraulic multiple-disk clutch 381.

When distributing a major part of the driving torque to the rear right wheel 19 while the vehicle is making a left turn, the right/left driving torque distribution controller 32 executes a control operation to engage the second hydraulic multiple-disk clutch 377.

As is apparent from the configurations of the foregoing, modifications of the rear right/left driving torque distributing device in the fourth embodiment, the gear trains of the gear mechanism, and the clutch mechanism can be disposed at different positions in the different modifications, and the gear ratios of the gear trains may be other than those referred to in the foregoing description. Any suitable differential limiting mechanism other than those employed in the foregoing modifications may be employed.

The right/left driving torque distributing device in the fourth embodiment is applicable also to a vehicle other than the vehicle described in connection with the foregoing embodiments, such as a front-engine front-drive vehicle, a rear-engine rear-drive vehicle or a four-wheel drive vehicle in which the distribution of the driving force to the front right wheel and the front left wheel or to the rear right wheel or the rear left wheel is controlled.

Four-wheel drive vehicles incorporating the right/left driving force distributing device of the present invention may be provided with a center differential gear other than that shown and described above.

Fifth Embodiment

A right/left driving torque distributing device in a fifth embodiment according to the present invention for a vehicle will be described hereinafter with reference to FIGS. 57 to 69.

Figure 57:
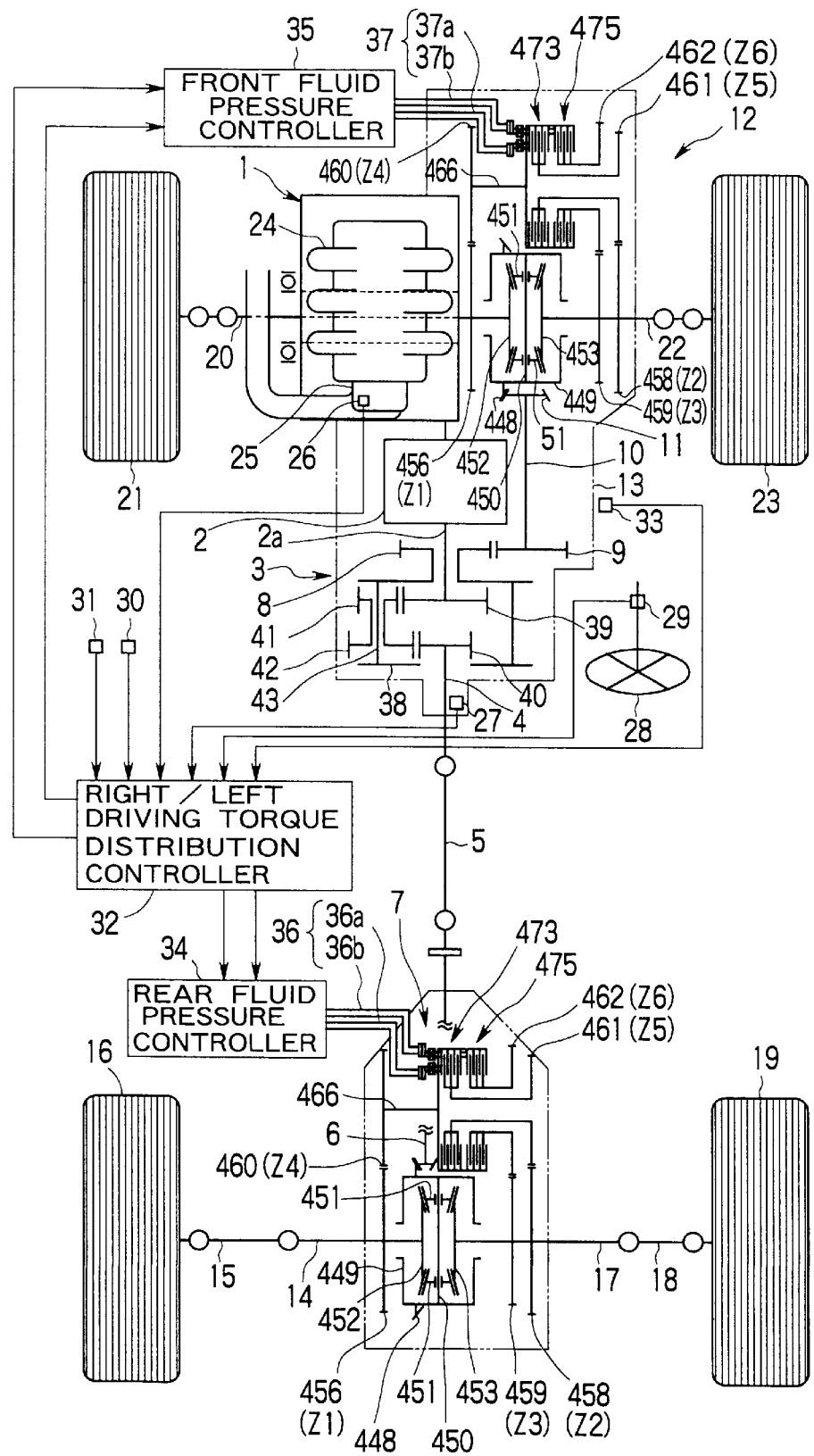
FIG. 57 is a diagrammatic view of a power transmission system for a four-wheel drive automobile, including a right/left driving torque distributing device in a fifth embodiment according to the present invention.

In a power transmission system shown in FIG. 57, the output driving torque of an engine 1 included in a vehicle is transmitted through an automatic transmission 2, a center differential gear 3, a rear drive shaft 4, a propeller shaft 5 and a drive pinion 6 to a rear right/left driving torque distributing device 7 in a fifth embodiment according to the present invention, and to a front right/left driving torque distributing device 12 substantially identical with the rear right/left driving torque distributing device 7 through a transfer drive gear 8, a transfer driven gear 9, a front drive shaft 10 and a drive pinion 11. A power transmission method by which the power transmission system shown in FIG. 57 transmits the output driving torque of the engine 1 to the right/left driving torque distributing devices 7 and 12 is the same as that in which the power transmission system shown in FIG. 1 transmits the output driving torque of the engine to the right/left driving torque distributing devices 7 and 12, and hence the further description thereof will be omitted.

The rear right/left driving torque distributing device 7 will be described in detail with reference to FIG. 58.

The rear right/left driving torque distributing device 7 comprises, as principal units, a differential gear mechanism 444, a gear mechanism 445, and a clutch mechanism 446. The drive pinion 6 for driving the rear right/left driving torque distributing device 7, and the differential gear mechanism 444 are contained in a differential gear case 447.

A shaft 6a formed integrally with the drive pinion 6 is connected to the propeller shaft 5 and is supported in bearings for rotation on the differential gear case 447. A final gear 448 engaged with the drive pinion 6 is fastened to a flange 449a formed on the outer circumference of a differential gear case 449 included in the differential gear mechanism 444.

The differential gear mechanism 444 is provided with a pinion shaft fixedly supported on the differential gear case 449, differential pinions (bevel gears) 451 rotatably mounted on the pinion shaft 450, and side gears (bevel gear) 452 and 453 disposed within the differential gear case 449 and engaged with the differential pinions 451. Inner end portions of a left drive shaft 14 and a right drive shaft 17 are rotatably fitted in cylindrical bosses 449L and 449R of the differential gear case 449, and the left side gear 452 and the right side gear 553 are splined to the inner end portions of the left drive shaft 14 and the right drive shaft 17, respectively.

The left boss 449L of the differential gear case 449 is supported in a bearing on a side retainer 454 attached to the left side wall of the differential gear case 447. The right boss 449R of the differential gear case 449 is supported in a bearing on the differential gear case 447.

The drive pinion 6 drives the differential gear case 449 for rotation on the common axis of the differential gear case 449 and the side gears 452 and 453, and the gear mechanism formed within the differential gear case 449 permits differential motion between the left wheel 16 and the right wheel 19.

The components of the gear mechanism 445 are disposed on the opposite sides of the differential gear case 447.

A first gear 456 is disposed on the left side of the side retainer 454, and a first shaft 455 formed integrally with the first gear 456 is splined to the left drive shaft 14. A second gear 458 of a diameter greater than that of the first gear 456, and a third gear 459 of a diameter smaller than that of the first gear 456 are formed integrally with an axis 457 and disposed on the right side of the right boss 449R of the differential gear case 449, and the shaft 457 is splined to the right drive shaft 17.

A fourth gear 460, a fifth gear 461 and a sixth gear 462 are arranged coaxially on an axis parallel to the common axis of the first gear 456, the second gear 458 and the third gear 459 and are engaged with the first gear 456, the second gear 458 and the third gear 459, respectively. The first gear 456 and the fourth gear 460 form a first gear train, the second gear 458 and the fifth gear 461 form a second gear train, and the third gear 459 and the sixth gear 462 form a third gear train.

The first gear train is covered with a left side cover 463, the second and the third gear train are covered with a right side cover 464, and the rear end of the differential gear case 447 is covered with a rear cover 465.

The first shaft 455 are supported at its opposite ends in bearings for rotation together with the left drive shaft 14 on the side retainer 454 and the left side cover 463.

The shaft 457 of the second gear 458 and the third gear 459 is supported at its opposite ends in bearings for rotation together with the right drive shaft 17 on the differential gear case 447 and the right side cover 464.

An inner shaft 466 is extended through and coaxially with the fourth gear 460, the fifth gear 461 and the sixth gear 462, and is supported for rotation at its opposite ends in bearings on the left side cover 463 and the right side cover 464. A fourth shaft 467 formed integrally with the fourth gear 460 is splined to the left end portion of the inner shaft 466. The fourth shaft 467 is supported for rotation in a bearing together with the inner shaft 466 on the differential gear case 447.

A fifth shaft 468 formed integrally with the fifth gear 461 is mounted rotatably on the right end portion of the inner shaft 466, and a sixth shaft 469 formed integrally with the sixth gear 462 is put on the fifth shaft 468 for rotation on the fifth shaft 468.

The gear mechanism has the three gear trains. The fourth gear 460, the fourth shaft 467 and the inner shaft 466 serve as a first clutch gear, the fifth gear 461 and the fifth shaft 468 serve as a second clutch gear, and the sixth gear 462 and the sixth shaft 469 serve as a third clutch gear.

The first gear train has a gear ratio $z4/z1=0.9/1$, the second gear train has a gear ratio $z5/z2=0.9 \cdot 0.9/1$, and the third gear train has a gear ratio $z6/z3=1/1$, where $z1$, $z2$, $z3$, $z4$, $z5$ and $z6$ are the numbers of teeth of the first gear 456, the second gear 458, the third gear 459, the fourth gear 460, the fifth gear 461 and the sixth gear 462, respectively. The gear ratios in decreasing order are 1 (the gear ratio of the third gear train), 0.9 (the gear ratio of the first gear train) and 0.9·0.9 (the gear ratio of the second gear train), and the step ratios between the gear ratios of the first gear train and the third gear train and between the second gear train and the first gear train are 0.9. The step ratios need not necessarily be 0.9.

A cylindrical clutch drum 470 included in the clutch mechanism 446 is disposed between the fourth gear 460 mounted on the inner shaft 466, and the sixth gear 462 with its open end directed toward the sixth gear 462.

The fifth shaft 468 is put on the inner shaft 466 and extends to the bottom wall 470a of the clutch drum 470.

A clutch hub 471 of a predetermined length is mounted on one end, i.e., the inner end on the side of the bottom wall 470a of the clutch drum 470, of the fifth shaft 468. A plurality of friction disks 472 are mounted alternately on the clutch drum 470 and the clutch hub 471 to form a first hydraulic multiple-disk clutch 473.

The sixth shaft 469 is put on the fifth shaft 468 and extends to the outer side surface of the outermost friction disk 472 of the first hydraulic multiple-disk clutch 473. A clutch hub 474 of a predetermined length is formed at one end, i.e., the inner end, of the sixth shaft 469. A plurality of friction disks 488 are mounted alternately on the clutch drum 470 and the clutch hub 474 to form a second hydraulic multiple-disk clutch 475.

The first hydraulic multiple-disk clutch 473 is engaged and disengaged by operating a first piston 476 extended through the bottom wall 470a of the clutch drum 470 and fitted in a first pressure chamber 477 connected to the first fluid pipe 36a. A working fluid of a variable pressure controlled by the right/left driving torque distribution controller 32 is supplied into the first pressure chamber 477 through the first fluid pipe 36a to operate the first piston 476.

Similarly, the second hydraulic multiple-disk clutch 475 is engaged and disengaged by operating a second piston 478 extended through the bottom wall 470a of the clutch drum 470 and fitted in a second pressure chamber 479. A working fluid of a variable pressure controlled by the right/left driving torque distribution controller 32 is supplied into the second pressure chamber 479 through the second fluid pipe 36b to operate the second piston 478.

The hydraulic multiple-disk clutches 473 and 475 are combined to construct the clutch mechanism 446. Since the gear mechanism 345 has the gear trains of the foregoing gear ratios, a major part of the driving torque is distributed to the left drive shaft 14 when the first hydraulic multiple-disk clutch 473 is engaged, and a major part of the driving torque is distributed to the right drive shaft 17 when the second hydraulic multiple-disk clutch 475 is engaged. The pressures of the working fluid for engaging the hydraulic multiple-disk clutches 473 and 475 are calculated by the right/left driving power distribution controller 32. The torque distribution ratio in which the driving torque is distributed to the left drive shaft 14 and the right drive shaft 17 is controlled by varying the pressure of the working fluid.

The two hydraulic multiple-disk clutches 473 and 475 of the clutch mechanism 446 may be substituted by electromagnetic clutches or variable-capacity couplings. The respective torque transmission capacities of the hydraulic multiple-disk clutches 473 and 475 may be different from each other according to the gear ratios or the hydraulic multiple-disk clutches 473 and 475 may be different in size from each other.

The front right/left driving torque distributing device 12 receives a driving torque through the front drive shaft 10, a drive pinion 11 and a final gear 448. The front right/left driving torque distributing device 12 is substantially the same in construction as the rear right/left driving torque distributing device 7 and hence the description thereof will be omitted.

A rear fluid pressure controller 34 for supplying the working fluid of a controlled pressure to the hydraulic multiple-disk clutches 473 and 475, and a front fluid pressure controller 35 are the same as those previously described in connection with the right/left driving torque distributing device in the first embodiment, and hence the description thereof will be omitted.

A fluid pressure setting unit 492 transfers a signal provided by a fluid pressure calculating unit 491 to the fluid pressure controllers 34 and 35.

The output driving torque of the engine 1 is transmitted through the output shaft 2a of the automatic transmission 2 to the first sun gear 39 of the center differential gear 3.

The driving torque transmitted from the first sun gear 39 through the first pinion 41 to the second pinion 42 is distributed to the second sun gear 40 and the carrier 38 supporting the first pinion 41 and the second pinion 42. A driving torque distributed to the second sun gear 40 is transmitted through the rear drive shaft 4 to the rear right/left driving power distributing device 7, and a driving torque distributed to the carrier 38 is transmitted through the transfer drive gear 8, the transfer driven gear 9 and the front drive shaft 10 to the front right/left driving torque distributing device 12 to drive the vehicle in a four-wheel driving mode.

When the vehicle is traveling straight, i.e., NF=NR, the second sun gear 40 and the carrier 38 of the center differential gear 3 rotate in the same direction at the same rotating speed, and the first pinions 41 and the second pinions 42 do not make any planetary motion and revolve together with the carrier 38.

Since the first pinion 41 and the second pinion 42 revolve together with the carrier 38, any frictional torque does not act on either of the first pinion 41 and the second pinion 42. Consequently, the input torque Ti applied to the first sun gear 39 is distributed in an equal front-to-rear torque distribution ratio of 50:50 so that the front wheel driving torque TF, i.e., the torque of the carrier 38, is equal to the rear wheel driving torque TR, i.e., the torque of the second sun gear 40, if the gear geometry of the gears is determined so as to establish equal torque distribution or the input torque Ti is distributed in an unequal front-to-rear torque distribution ratio so that the front wheel driving torque TF and the rear wheel driving torque TR are unequal to each other if the gear geometry of the gears is determined so as to establish unequal torque distribution dependent on the gear geometry.

When the vehicle is turning with the front output rotating speed higher than the rear output rotating speed, i.e., NF>NR, or the front wheels slipping, the first pinions 41 and the second pinions 42 of the center differential gear 3 make a planetary motion for a differential motion. Consequently, the difference in rotating speed between the front wheels and the rear wheels during the turning of the vehicle is absorbed and the vehicle is able to turn smoothly.

As the first pinions 41 and the second pinion 42 make a planetary motion, a thrust acts on each set of the first pinion 41 and the second pinion 42 due to the difference in helix angle between the first pinion 41 and the second pinion 42, a frictional resistance acts on the end surface of either the first pinion 41 or the second pinion 42, and a composite force of a load radially acting on the first pinion 41 and the second pinion 42, and a tangential load acting on the first pinion 41 and the second pinion 42 acts on the circumference of each planet pin 43 to exert a frictional resistance against the rotation of the first pinion 41 and the second pinion 42. These frictional resistances produce a differential limiting torque.

Under such a condition, the differential limiting torque retards the rotation of the carrier 38, so that a major part of the input torque is distributed to the rear right/left driving torque distributing device 7. Consequently, the steering nature and the controllability of the vehicle during turning are improved, and the slip of the front wheels during straight traveling can be prevented.

When the rear wheels slip and NR>NF, the first pinions 41 and the second pinions 42 of the center differential gear 3 make a planetary motion due to the difference in rotating speed between the front wheels and the rear wheels, so that a frictional resistance is produced.

Under such a condition, a differential limiting torque promotes the rotation of the carrier 38, so that a major part of the input torque is distributed to the front right/left driving torque distributing device 12, so that the slip of the rear wheels is prevented.

Since the differential limiting torque of the center differential gear 3 is proportional to the input torque Ti, the differential limiting torque is proportional to the torques of the front and the rear wheels, and the differential limiting function is exercised always at a fixed rate.

The driving torque distributed by the center differential gear 3 to the rear right/left driving torque distributing device 7 is transmitted through the propeller shaft 5 and the drive pinion 6 to the rear right/left driving torque distributing device 7, and the driving torque is transmitted through the final gear 448 to the differential gear case 449.

The operation of the differential limiting mechanism 444 will be described hereinafter. As the differential gear case 449 rotates together with the pinion shaft 450, the differential pinions 451 rotatably mounted on the pinion shaft 450 do not rotate relative to the pinion shaft 450 and revolve about the common axis of the side gears 452 and 453, so that driving torques are transmitted to the left drive shaft 14 and the right drive shaft 17 by rotating the side gears 452 and 453 at the same rotating speed if the rear left wheel 16 and the rear right wheel 19 are rotating at the same rotating speed.

When the rear right wheel 19 and the rear left wheel 16 rotate at different rotating speeds, respectively, the differential pinions 451 rotate on the pinion shaft 450 to enable differential motion between the left wheel 16 and the right wheel 19.

The operation of the gear mechanism 445 and the clutch mechanism 446 will be described hereinafter. Driving torque is transmitted through the differential mechanism 444 to the left drive shaft 14 to rotate the left drive shaft 14. The rotation of the left drive shaft 14 is transmitted through the first gear 456 having the first shaft 455 fixed to the left drive shaft 14 and the fourth gear 460 to the inner shaft 466 coupled with the fourth shaft 467 by splines to rotate the clutch drum 470 fixed to the inner shaft 4667.

Driving torque is transmitted through the differential mechanism 444 to the right drive shaft 17 to rotate the right drive shaft 17. The rotation of the right drive shaft is transmitted through the second gear 458 and the third gear 459 formed integrally with the shaft 457 fixedly coupled with the right drive shaft 17 to the fifth gear 461 and the sixth gear 462. Then, the clutch hub 471 of the first hydraulic multiple-disk clutch 473 mounted on the fifth shaft 468 formed integrally with the fifth gear 461 is rotated, and the clutch hub 474 of the second hydraulic multiple-disk clutch 475 mounted on the sixth shaft 469 formed integrally with the sixth gear 462.

In the rear fluid pressure controller 34, a motor 480 drives an oil pump 481, and the working fluid of a pressure regulated by a pressure regulator valve 482 is supplied to a duty solenoid valve 487 and a clutch control valve 484.

In the right/left driving torque distribution controller 32, the output signals of the throttle opening sensor 26, the traveling speed sensor 27, the steering angle sensor 29, the longitudinal acceleration sensor 30 and the lateral acceleration sensor 31, and the gear position signal are processed to calculate optimum driving torques to be distributed to the front right wheel 23, the front left wheel 21, the rear right wheel 19 and the rear left wheel 16.

When distributing a major part of the driving torque to the rear left wheel 16 while the vehicle is making a right turn, the right/left driving torque distribution controller 32 gives a signal requesting the supply of the working fluid of a set pressure determined by calculation to the first pressure chamber 477 to the rear fluid pressure controller 34.

Then, the working fluid of the set pressure is supplied through the fluid pipe 36a to the first pressure chamber 477, the first piston 476 is actuated to compress the friction disks of the first hydraulic multiple-disk clutch 473 at a set pressure. Consequently, part of the driving torque to be transmitted to the right drive shaft 17 is transferred to the left drive shaft 14.

When distributing a major part of the driving torque to the rear right wheel 19 while the vehicle is making a left turn, the right/left driving torque distribution controller 32 gives a signal requesting the supply of the working fluid of a set pressure determined by calculation to the second pressure chamber 479.

Then, the working fluid of the set pressure is supplied through the fluid pipe 36b to the second pressure chamber 479, the second piston 478 is actuated to compress the friction disks of the second hydraulic multiple-disk clutch 475 at a set pressure. Consequently, part of the driving torque to be transmitted to the left drive shaft 14 is transferred to the right drive shaft 17.

The driving torque distributed to the front right/left driving torque distributing device 12 by the center differential gear 3 is transmitted through the front drive shaft 10 and the drive pinion 11 to the front right/left driving torque distributing device 12. The driving torque is transmitted through the final gear 448 to the differential gear case 451.

The front right/left driving torque distributing device 12, similarly to the rear right/left driving torque distributing device 7, exercises a differential function for the front wheels 21 and 23. The right-left driving torque distribution ratio controller 32 gives a signal to the front fluid pressure controller 35 to supply the working fluid through the fluid pipe 37a to the first pressure chamber 477 when distributing a major part of the driving torque to the front left wheel 21 while the vehicle is making a right turn, and the right-left driving torque distribution ratio controller 32 gives a signal to the front fluid pressure controller 35 to supply the working fluid through the fluid pipe 37b to the second pressure chamber 479 when distributing a major part of the driving torque to the front right wheel 23 while the vehicle is making a left turn.

The right/left driving torque distributing device in the fifth embodiment has a relatively small lateral size, and hence the universal joints joining the right and the left wheel to the right and the left axle can be disposed at a relatively small angle of bend, which is advantageous in respect of durability and reliability.

The right/left driving torque distributing device consists of a relatively small number of component parts, and many of the component parts may be those of conventional right/left driving torque distributing devices. The right/left driving torque distributing device has a compact construction and can be manufactured at a relatively low manufacturing cost.

Since the right/left driving torque distributing device has a compact construction and a relatively small lateral size, interference between the right/left driving torque distributing device, and the suspensions or the exhaust system can be prevented, sufficient spaces can be secured around the right/left driving torque distributing device, which facilitates work for mounting the right/left driving torque distributing device on the vehicle and maintenance work.

Since the right/left driving torque distributing device employs the driving torque distributing mechanism comprising the three gear trains, the driving torque distributing ratio can be properly determined according to the characteristics of the vehicle or desired performance of the vehicle by properly determining the gear ratios of the three gear trains.

The first and the second hydraulic multiple-disk clutch of the right/left driving torque distributing device can be controlled so that the slips between the drive friction disks and the driven friction disks of the first hydraulic multiple-disk clutch and between the drive friction disks and the driven friction disks of the second hydraulic multiple-disk clutch are equal to each other by determining the respective gear ratios of the three gear trains so as to meet a predetermined relation. Therefore, a range in which the same friction characteristics (the relation between speed and coefficient of dynamic friction) is usable can be used and highly accurate control can be achieved.

The first and the second hydraulic multiple-disk clutch of the right/left driving torque distributing device are united together in a single, compact, lightweight structure. The capacities of the first and the second hydraulic multiple-disk clutch may be different from each other, and either of the first and the second hydraulic multiple-disk clutch may be smaller than the other.

In the right/left driving torque distributing device of the present invention, the driving torque is divided directly between the two output ends thereof instead of being distributed through the differential gear case (input end), and the frictional torque transmitting characteristics of the hydraulic multiple-disk clutches can be effectively utilized.

The center differential gear comprises a relatively small number of component parts, and is simple in construction, compact and lightweight. Therefore, the center differential gear can be easily manufactured and assembled and is advantageous in respect of the vibration and the noise generation of the power transmission system.

Both the center differential gear and the right/left driving torque distributing device are compact and lightweight, and can be easily united together to construct a compact, lightweight, integrated unit.

The number of teeth of the gears of the center differential gear may be determined so that the reference front-to-rear driving torque distribution ratio is 50:50. An input-torque-proportional differential limiting torque is distributed to the front wheels or the rear wheels according to the traveling condition of the vehicle and the surface condition of the road. Consequently, the slip of the vehicle can be prevented, traction can be secured, the skidding of the rear wheels can be prevented and the running performance of the vehicle can be improved. Furthermore, the posture of the vehicle can be easily controlled by operating the accelerator pedal and the vehicle respond satisfactorily to control operations, which enables enjoyable sporty driving of the vehicle.

Figure 58:
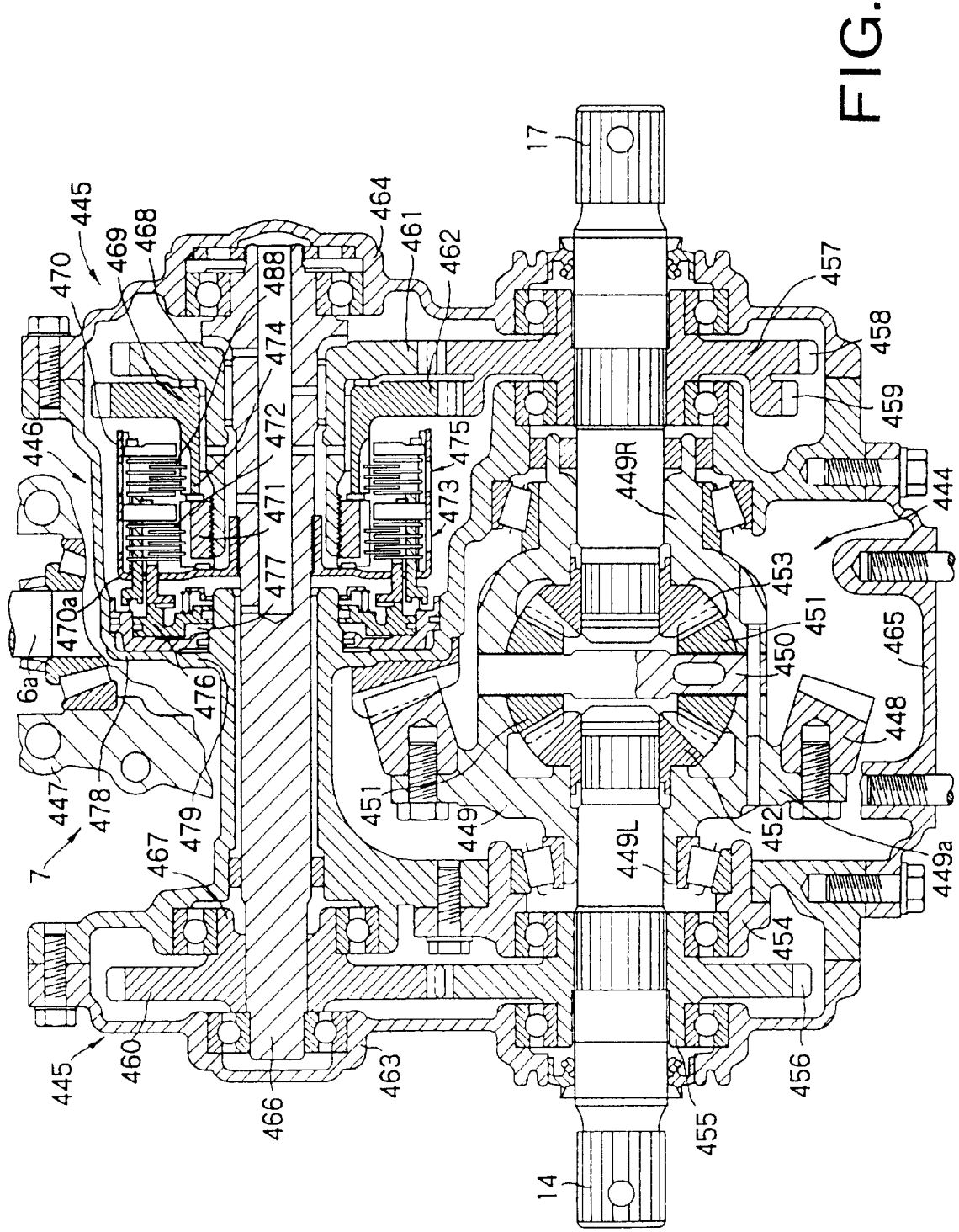
FIG. 58 is an enlarged sectional view of the right/left driving torque distributing device shown in FIG. 57.
Figure 59:
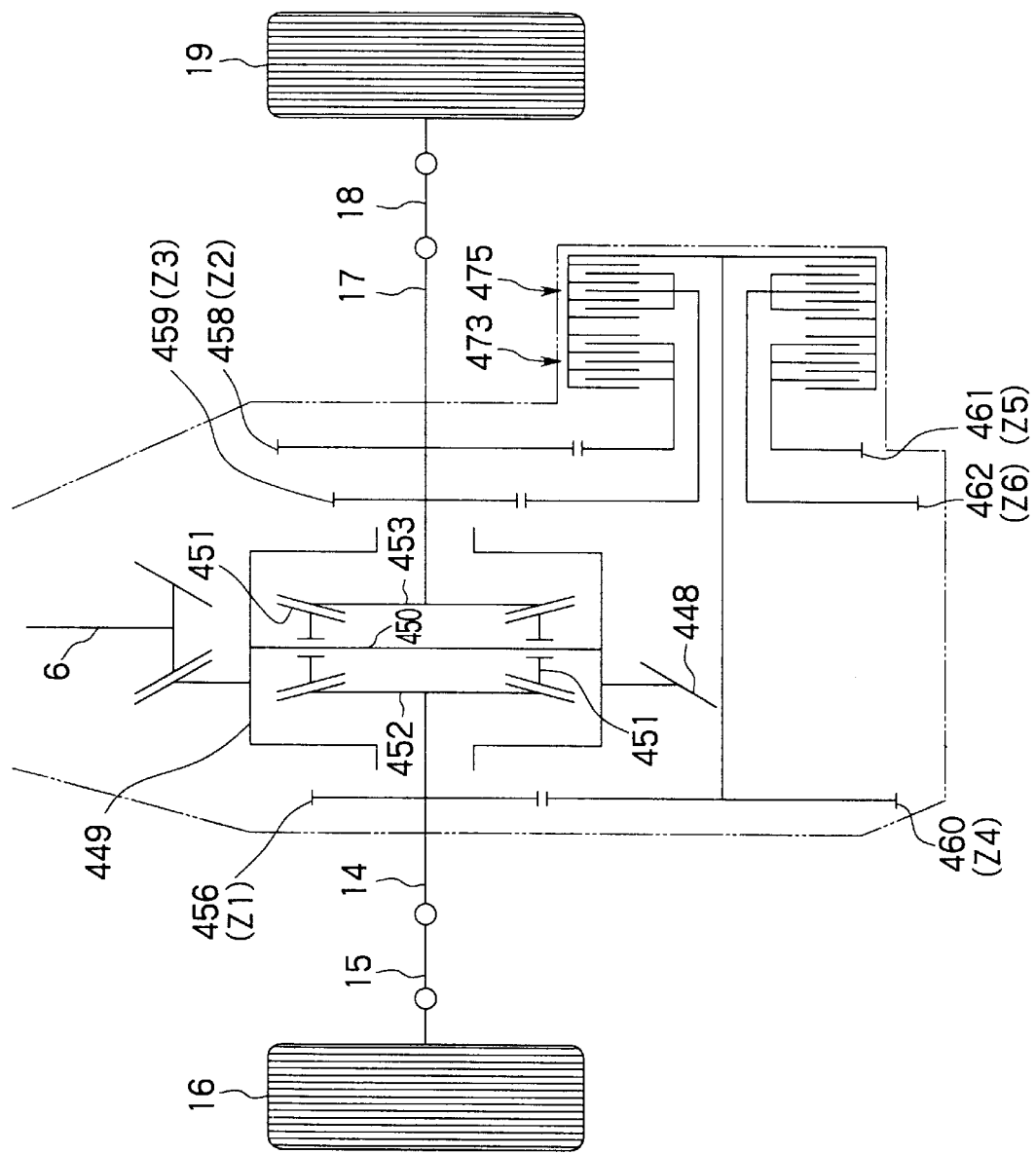
FIGS. 59 to 69 are enlarged diagrammatic views of rear right/left driving torque distributing devices in modifications of the right/left driving torque distributing device shown in FIG. 58.

FIG. 59 shows a rear right/left driving torque distributing device in a first modification of the rear right/left driving torque distributing device 7 in the fifth embodiment shown in FIG. 58. The rear right/left driving torque distributing device in the first modification shown in FIG. 59 is provided with gear trains of gear ratios different from those of the gear trains of the rear right/left driving torque distributing device 7 of FIG. 58, has a clutch mechanism disposed on the outer side of the second gear train, i.e., on the side of the rear right wheel 19, and is the same in other respects as the rear right/left driving torque distributing device 7 shown in FIG. 58.

In the rear right/left driving torque distributing device in the first modification shown in FIG. 59, a first hydraulic multiple-disk clutch 473 is disposed on the outer side of the fifth gear 461, i.e., on the side of the rear right wheel 19, and a second hydraulic multiple-disk clutch 475 is disposed on the outer side of the first hydraulic multiple-disk clutch 473, i.e., on the side of the rear right wheel 19, to form a clutch mechanism.

In the first modification shown in FIG. 59, the first gear train has a gear ratio $z4/z1=1/0.9$, the second gear train has a gear ratio $z5/z2=1/1$, and the third gear train has a gear ratio $z6/z3=1/0.9 \cdot 0.9$, in which $z1$, $z2$, $z3$, $z4$, $z5$ and $z6$ are the numbers of teeth of a first gear 456, a second gear 458, a third gear 459, a fourth gear 460, a fifth gear 461 and a sixth gear 462. Therefore, the rotating speed of the fourth gear 460 is lower than that of the first gear 456, the respective rotating speeds of the second gear 458 and the fifth gear 461 are equal to each other, and the rotating speed of the sixth gear 462 is lower than that of the third gear 459.

In the first modification, when distributing a major part of the driving torque to the rear left wheel 16 while the vehicle is making a right turn, the right/left driving torque distribution controller 32 executes a control operation to engage the first hydraulic multiple-disk clutch 473.

When distributing a major part of the driving torque to the rear right wheel 19 while the vehicle is making a left turn, the right/left driving torque distribution controller 32 the right/left driving torque distribution controller 32 executes a control operation to engage the second hydraulic multiple-disk clutch 475.

Figure 60:
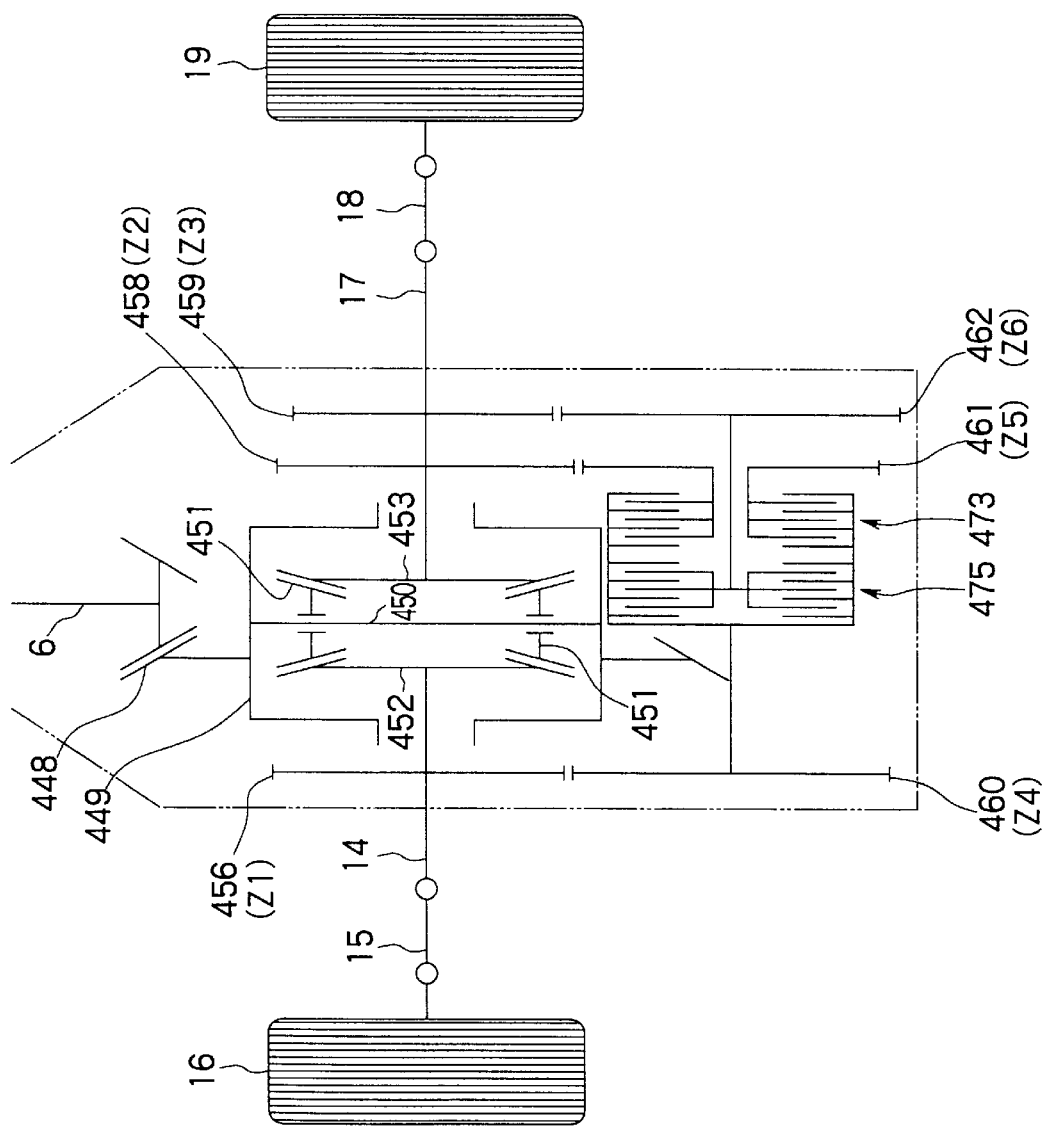

Referring to FIG. 60, a rear right/left driving torque distributing device in a second modification of the rear right/left driving torque distributing device 7 in the fifth embodiment shown in FIG. 58 is provided with gear trains of gear ratios different from those of the gear trains of the rear right/left driving torque distributing device 7 of FIG. 58. In the rear right/left driving torque distributing device in the second modification, the respective positions of the second and the third gear train of the gear mechanism correspond to the respective positions of the third and the second gear train of the rear right/left driving torque distributing device 7 in the fifth embodiment, respectively, and the respective positions of the first hydraulic multiple-disk clutch 473 and the second hydraulic multiple-disk clutch 475 correspond to the respective positions of the second hydraulic multiple-disk clutch 475 and the first hydraulic multiple-disk clutch 473 of the rear right/left driving torque distributing device 7 in the fifth embodiment, respectively. The rear right/left driving torque distributing device in the second modification is the same in other respects as the rear right/left driving torque distributing device 7 in the fifth embodiment.

As shown in FIG. 60, a second gear 458 having a diameter greater than that of a first gear 456 is disposed on the side of the differential gear case 449, a third gear 459 having a diameter smaller than that of the first gear 456 is disposed on the side of the rear right wheel 19, the first hydraulic multiple-disk clutch 473 is disposed on the side of the rear right wheel 19, and the second hydraulic multiple-disk clutch 475 is disposed on the side of the differential gear case 449. The two hydraulic multiple-disk clutches 473 and 475 are united together to form the clutch mechanism.

In the second modification shown in FIG. 60, the first gear train has a gear ratio z4/z1=1/0.9, the second gear train has a gear ratio z5/z2=1/0.9·0.9, and the third gear train has a gear ratio z6/z3=1/1, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of the fourth gear 262 is lower than that of the first gear 257, the rotating speed of the fifth gear 263 is lower than that of the second gear 259, and the respective rotating speeds of the sixth gear 264 and the third gear 260 are equal to each other.

Accordingly, in the second modification, when distributing a major part of the driving torque to the rear left wheel 16 while the vehicle is making a right turn, the right/left driving torque distribution controller 32 executes a control operation to engage the first hydraulic multiple-disk clutch 473.

When distributing a major part of the driving torque to the rear right wheel 19 while the vehicle is making a left turn, the right/left driving torque distribution controller 32 executes a control operation to engage the second hydraulic multiple-disk clutch 475.

Figure 61:
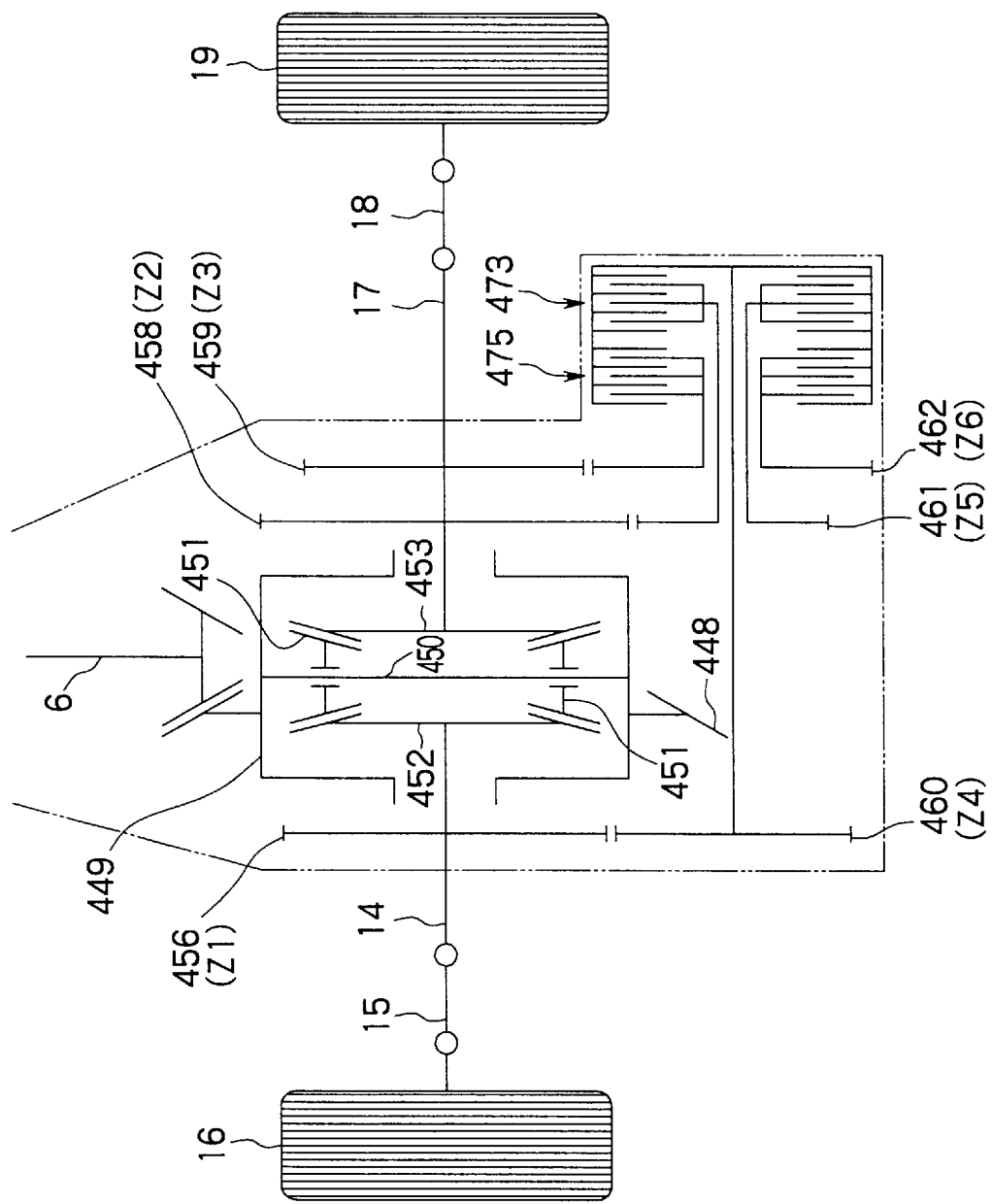

FIG. 61 shows a rear right/left driving torque distributing device in a third modification of the rear right/left driving torque distributing device 7 in the fifth embodiment shown in FIG. 58. In the rear right/left driving torque distributing device in the third modification, the respective positions of the second and the third gear train of the gear mechanism correspond to the respective positions of the third and the second gear train of the rear right/left driving torque distributing device 7 in the fifth embodiment, respectively, and the clutch mechanism is disposed on the outer side of the third gear train, i.e., on the side of the rear right wheel 19. The rear right/left driving torque distributing device in the second modification is the same in other respects as the rear right/left driving torque distributing device 7 in the fifth embodiment.

As shown in FIG. 61, a second gear 458 having a diameter greater than that of a first gear 456 is disposed on the side of the differential gear case 449, a third gear 459 having a diameter smaller than that of the first gear 456 is disposed on the side of the rear right wheel 19, the second hydraulic multiple-disk clutch 475 is on the outer side of a sixth gear 462 engaged with the third gear 459, i.e., on the side of the rear right wheel 19, and the first hydraulic multiple-disk clutch 473 is disposed on the outer side of the second hydraulic multiple-disk clutch 473. The two hydraulic multiple-disk clutches 473 and 475 are united together to form the clutch mechanism.

In the third modification shown in FIG. 61, the first gear train has a gear ratio z4/z1=0.9/1, the second gear train has a gear ratio z5/z2−0.9·0.9/1, and the third gear train has a gear ratio z6/z3=1/1, in which z1, z2, z3, z4, z5 and z6 are the numbers of teeth of a first gear 365, a second gear 366, a third gear 367, a fourth gear 369, a fifth gear 370 and a sixth gear 371. Therefore, the rotating speed of the fourth gear 262 is higher than that of the first gear 257, the rotating speed of the fifth gear 263 is higher than that of the second gear 259, and the respective rotating speeds of the sixth gear 264 and the third gear 260 are equal to each other.

Accordingly, in the third modification, when distributing a major part of the driving torque to the rear left wheel 16 while the vehicle is making a right turn, the right/left driving torque distribution controller 32 executes a control operation to engage the first hydraulic multiple-disk clutch 473.

When distributing a major part of the driving torque to the rear right wheel 19 while the vehicle is making a left turn, the right/left driving torque distribution controller 32 executes a control operation to engage the second hydraulic multiple-disk clutch 475.

FIG. 62 to 65 shows rear right/left driving torque distributing devices in fourth fifth, sixth and seventh modifications of the rear right/left driving torque distributing device 7 in the fifth embodiment shown in FIG. 58. Each of these rear right/left driving torque distributing devices in modifications is provided with a double-pinion planetary gear mechanism instead of the differential gear mechanism employed in each of the rear right/left driving torque distributing devices in the first, the second and the third modifications of the rear right/left driving torque distributing device 7 in the fifth embodiment.

Figure 62:
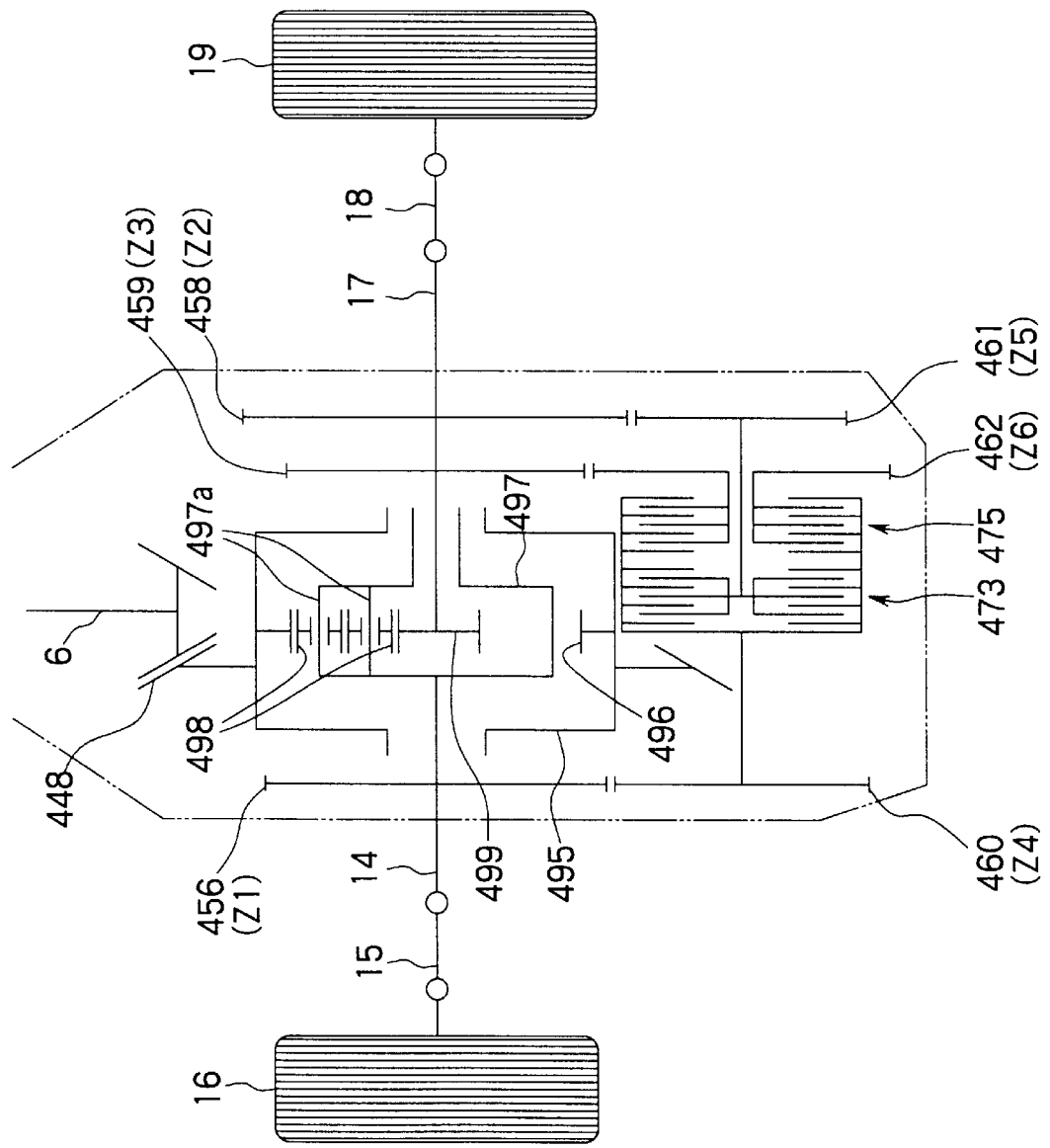

FIG. 62 shows a rear right/left driving torque distributing device in the fourth modification of the rear right/left driving torque distributing device 7 in the fifth embodiment shown in FIG. 58, provided with a double-pinion planetary gear mechanism corresponding to the differential mechanism 444 of the fifth embodiment. The double-pinion planetary gear mechanism comprises, as principal components, a differential gear case 495 provided with a final gear 448 engaged with the drive pinion 6, a ring gear 496 formed on the inner surface of the differential gear case 495, a planet carrier 497 fixedly joined to the left drive shaft 14, sets each of a pair of planet pinions 498 rotatably supported on planet shafts 497a,respectively, on the planet carrier 497, and a sun gear 499 fixedly joined to the right drive shaft 17.

When the differential gear case 495 is driven for rotation by the drive pinion 6, the ring gear 496 formed integrally with the differential gear case 495 drives the planet pinions 498 for rotation on the planet pins 497a and revolution around the sun gear 499. Consequently, a driving torque is transmitted through the planet carrier 497 to the left drive shaft 14 by the revolution of the planet pinions 498 around the sun gear, and a driving torque is transmitted to the right drive shaft 17 through the sun gear 499 which makes rotation corresponding to the balance of the rotation and the revolution of the planet pinions 498. The balance of the rotation and the revolution of the planet pinions 498 is controlled optionally to exercise a differential function.

A first gear 456 is mounted on the left drive shaft 14 at a position on the left side of the differential gear case 495, and a second gear 458 and a third gear 459 are mounted on the right drive shaft 17 at positions on the right side of the differential gear case 495. the second gear 458 is disposed on the right side of the third gear 459.

A fourth gear 460, a fifth gear 461 and a sixth gear 462 are arranged coaxially on an axis parallel to the common axis of the first gear 456, the second gear 458 and the third gear 459 so as to be engaged with the first gear 456, the second gear 458 and the third gear 459, respectively. The first gear 456 and the fourth gear 460, the second gear 458 and the fifth gear 461, and the third gear 459 and the sixth gear 462 form a first gear train, a second gear train and a third gear train, respectively, having the same gear ratios as those of the first, the second and the third gear train of the rear right/left driving torque distributing device 7 in the fifth embodiment.

A clutch mechanism formed by uniting a first hydraulic multiple-disk clutch 473 and a second hydraulic multiple-disk clutch 475 is disposed between the fourth gear 460 and the sixth gear 462. The first hydraulic multiple-disk clutches 473 is disposed on the side of the fourth gear 460 and the second hydraulic multiple-disk clutches 475 is disposed on the side of the sixth gear 462.

The operation and the effect of the rear right/left driving torque distributing device shown in FIG. 62 are the same as those of the rear right/left driving torque distributing device 7 in the fifth embodiment.

Figure 63:
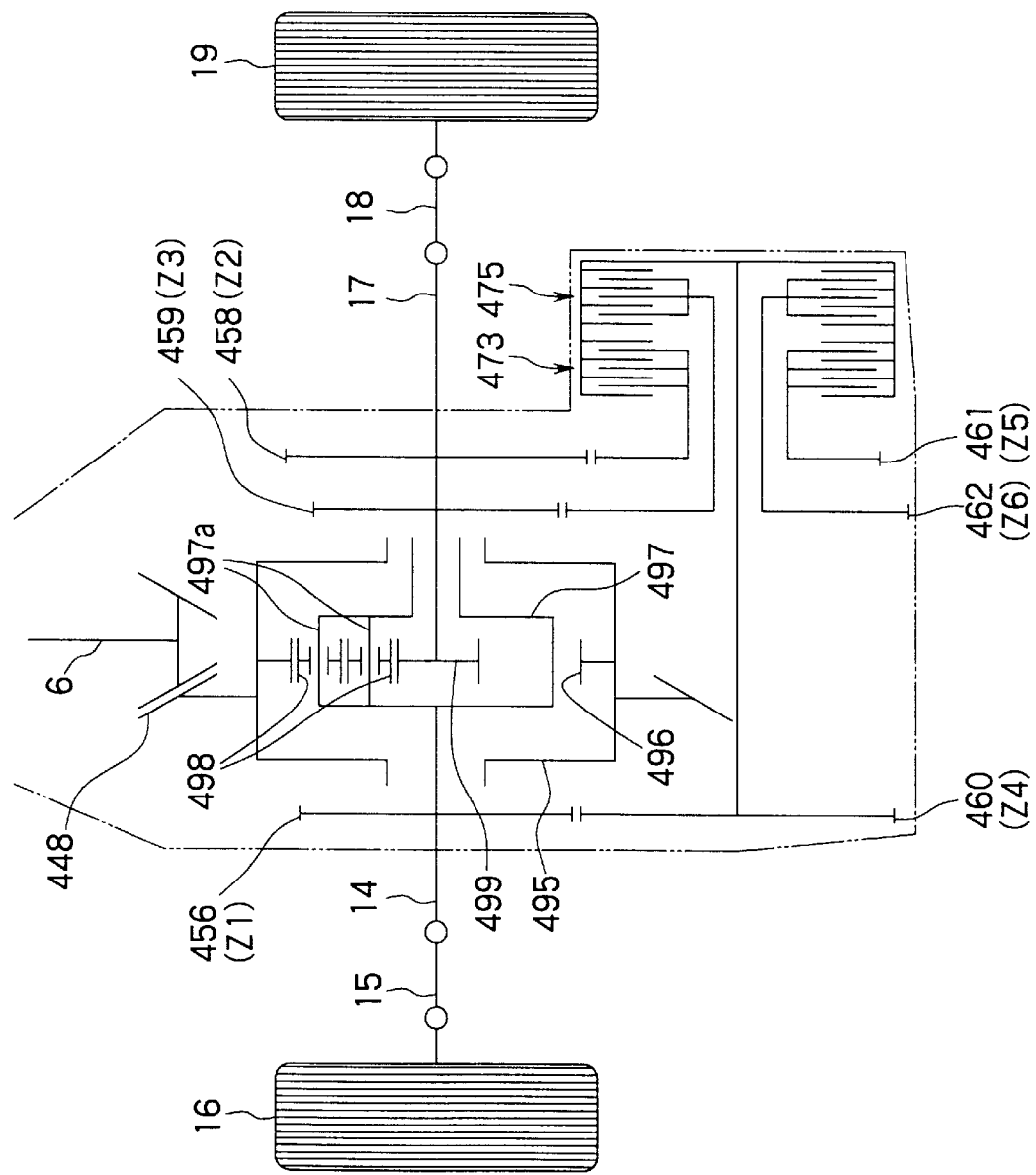

FIG. 63 shows a rear right/left driving torque distributing device in a fifth modification of the rear right/left driving torque distributing device 7 in the fifth embodiment shown in FIG. 58. In the rear right/left driving torque distributing device in the fifth modification, the first gear 456 is mounted on the left drive shaft 14 at a position on the left side of the differential gear case to 495, and the second gear 458 is mounted on the right drive shaft at a position on the right side of the differential gear case 495.

A fourth gear 460, a fifth gear 461 and a sixth gear 462 are arranged coaxially on an axis parallel to the common axis of the first gear 456, the second gear 458 and the third gear 459 so as to be engaged with the first gear 456, the second gear 458 and the third gear 459, respectively. The first gear 456 and the fourth gear 460, the second gear 458 and the fifth gear 461, and the third gear 459 and the sixth gear 462 form a first gear train, a second gear train and a third gear train, respectively, having the same gear ratios as those of the first, the second and the third gear train of the rear right/left driving torque distributing device in the first modification.

A first hydraulic multiple-disk clutch 473 is disposed on the outer side of the fifth gear 461, i.e., on the side of the rear right wheel 19, and a second hydraulic multiple-disk clutch 475 is disposed on the outer side of the first hydraulic multiple-disk clutch 473. The hydraulic multiple-disk clutches 473 and 475 are united together to form a clutch mechanism.

The operation and the effect of the rear right/left driving force distributing device shown in FIG. 63 are the same as those of the rear right/left driving force distributing device in the first modification.

Figure 64:
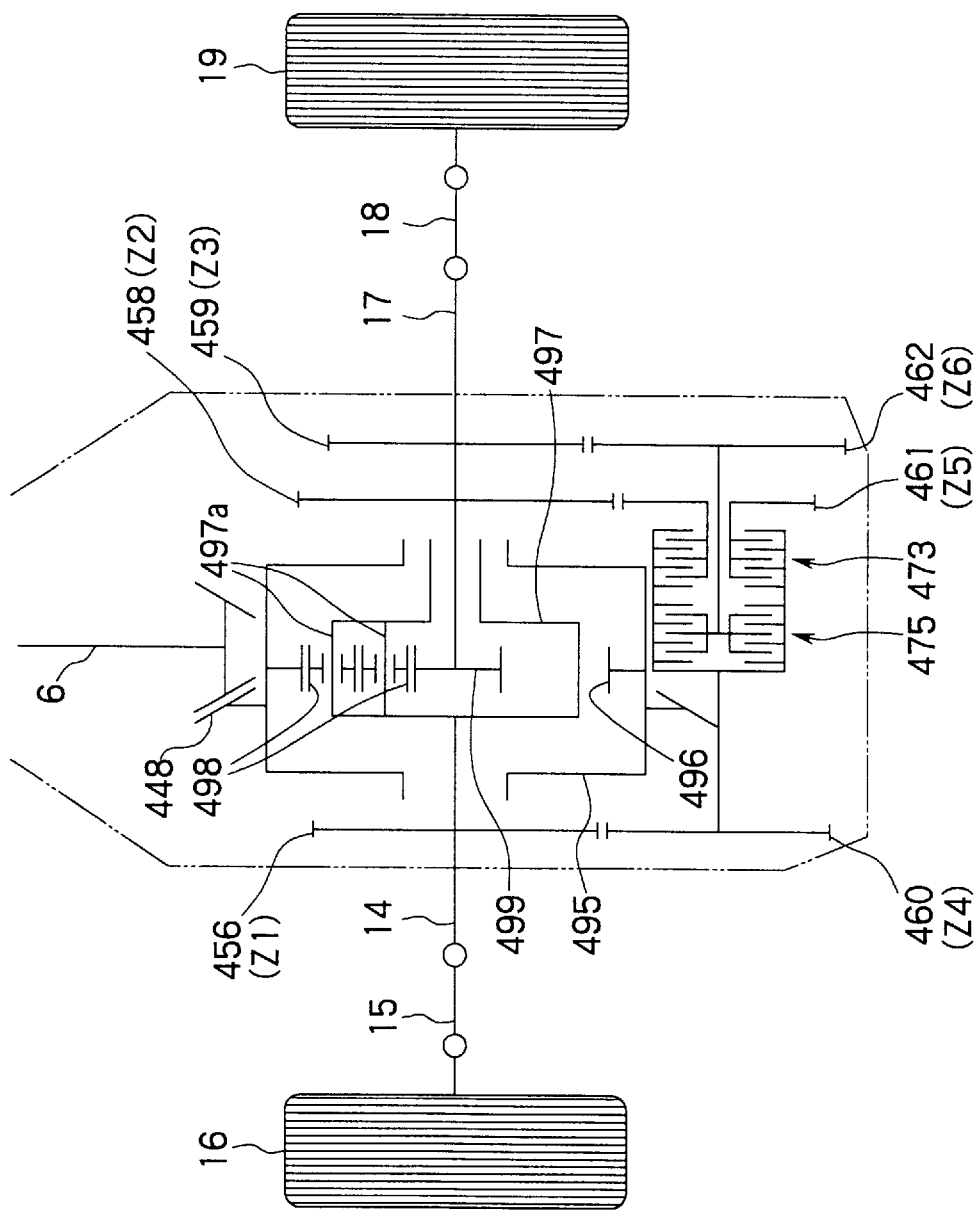

FIG. 64 shows a rear right/left driving torque distributing device in the sixth modification of the rear right/left driving torque distributing device 7 in the fifth embodiment shown in FIG. 58. In the rear right/left driving torque distributing device in the sixth embodiment, a first gear 456 is mounted on the left drive shaft 14 at a position on the left side of the differential case 495, a second gear 458 is mounted on the right drive shaft 17 on the right side of the differential gear case 495, and a third gear is mounted on the right drive shaft 17 at a position on the right side of the second gear 458.

A fourth gear 460, a fifth gear 461 and a sixth gear 462 are arranged coaxially on an axis parallel to the common axis of the first gear 456, the second gear 458 and the third gear 459 so as to be engaged with the first gear 456, the second gear 458 and the third gear 459, respectively. The first gear 456 and the fourth gear 460, the second gear 458 and the fifth gear 461, and the third gear 459 and the sixth gear 462 form a first gear train, a second gear train and a third gear train, respectively, having the same gear ratios as those of the first, the second and the third gear train of the rear right/left driving torque distributing device in the second modification.

A clutch mechanism formed by uniting a first hydraulic multiple-disk clutch 473 and a second hydraulic multiple-disk clutch 475 is disposed between the fourth gear 460 and the fifth gear 461. The first hydraulic multiple-disk clutches 473 is disposed on the side of the fifth gear 461 and the second hydraulic multiple-disk clutches 475 is disposed on the side of the fourth gear 460.

The operation and the effect of the rear right/left driving torque distributing device shown in FIG. 64 are the same as those of the rear right/left driving torque distributing device in the second modification.

Figure 65:
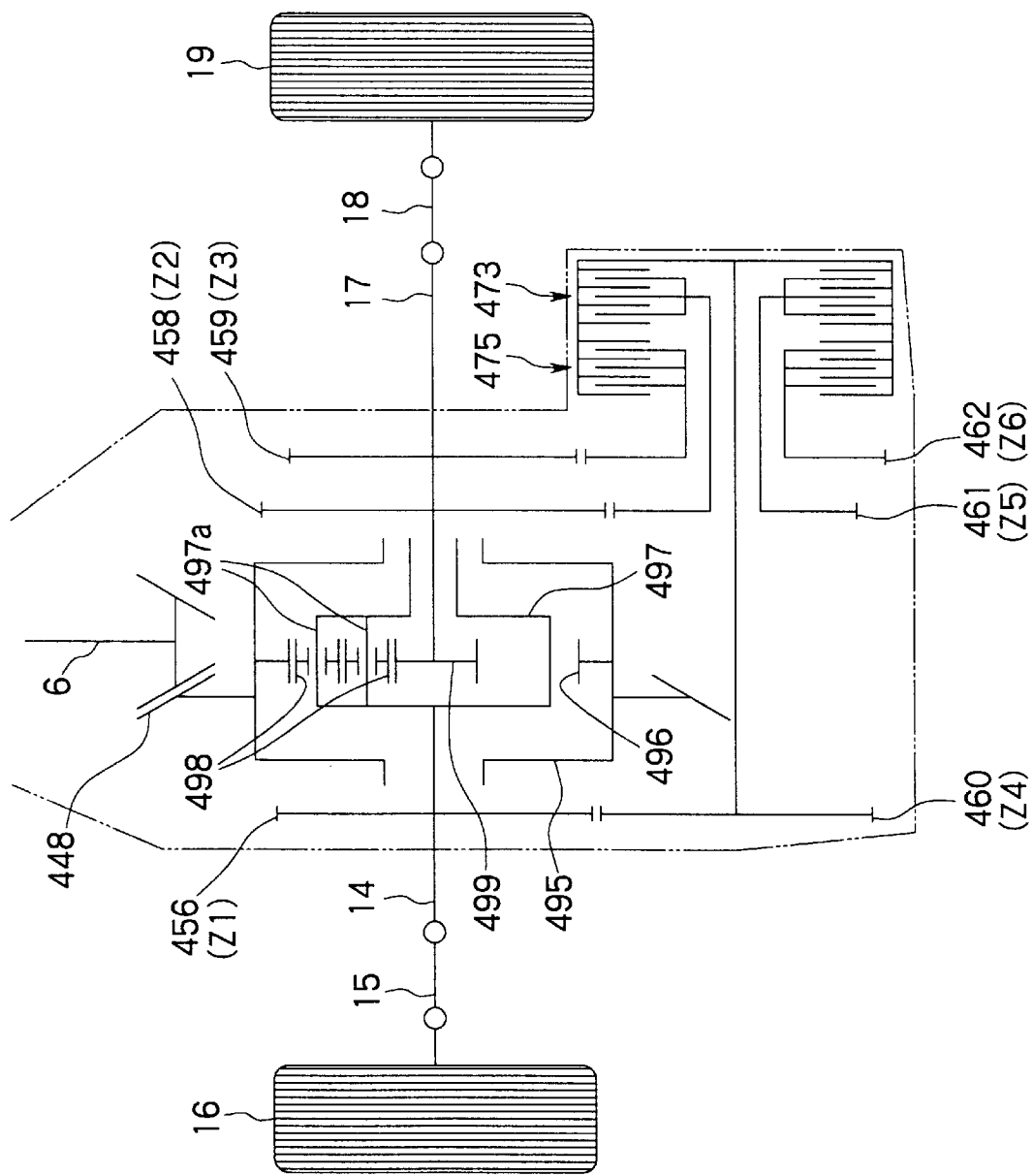

FIG. 65 shows a rear right/left driving torque distributing device in the seventh modification of the rear right/left driving torque distributing device in the fifth embodiment shown in FIG. 58. In the rear right/left driving torque distributing device shown in FIG. 65, the first gear 456 is mounted on the left drive shaft 14 at a position on the left side of the differential gear case 495, the second gear 458 is mounted on the right drive shaft at a position on the right side of the differential gear case 495, and the third gear 459 is mounted on the right drive shaft 17 at a position on the right side of the second gear 458. A fourth gear 460, a fifth gear 461 and a sixth gear 462 are arranged coaxially on an axis parallel to the common axis of the first gear 456, the second gear 458 and the third gear 459 so as to be engaged with the first gear 456, the second gear 458 and the third gear 459, respectively. The first gear 456 and the fourth gear 460, the second gear 458 and the fifth gear 461, and the third gear 459 and the sixth gear 462 form a first gear train, a second gear train and a third gear train, respectively, having the same gear ratios as those of the first, the second and the third gear train of the rear right/left driving torque distributing device in the third modification.

A second hydraulic multiple-disk clutch 475 is disposed on the outer side of the sixth gear 462, i.e., on the side of the rear right wheel 19, and a first hydraulic multiple-disk clutch 473 is disposed on the outer side of the second hydraulic multiple-disk clutch 475. The hydraulic multiple-disk clutches 473 and 475 are united together to form a clutch mechanism.

The operation and the effect of the rear right/left driving force distributing device shown in FIG. 65 are the same as those of the rear right/left driving force distributing device in the third modification.

Figure 66:
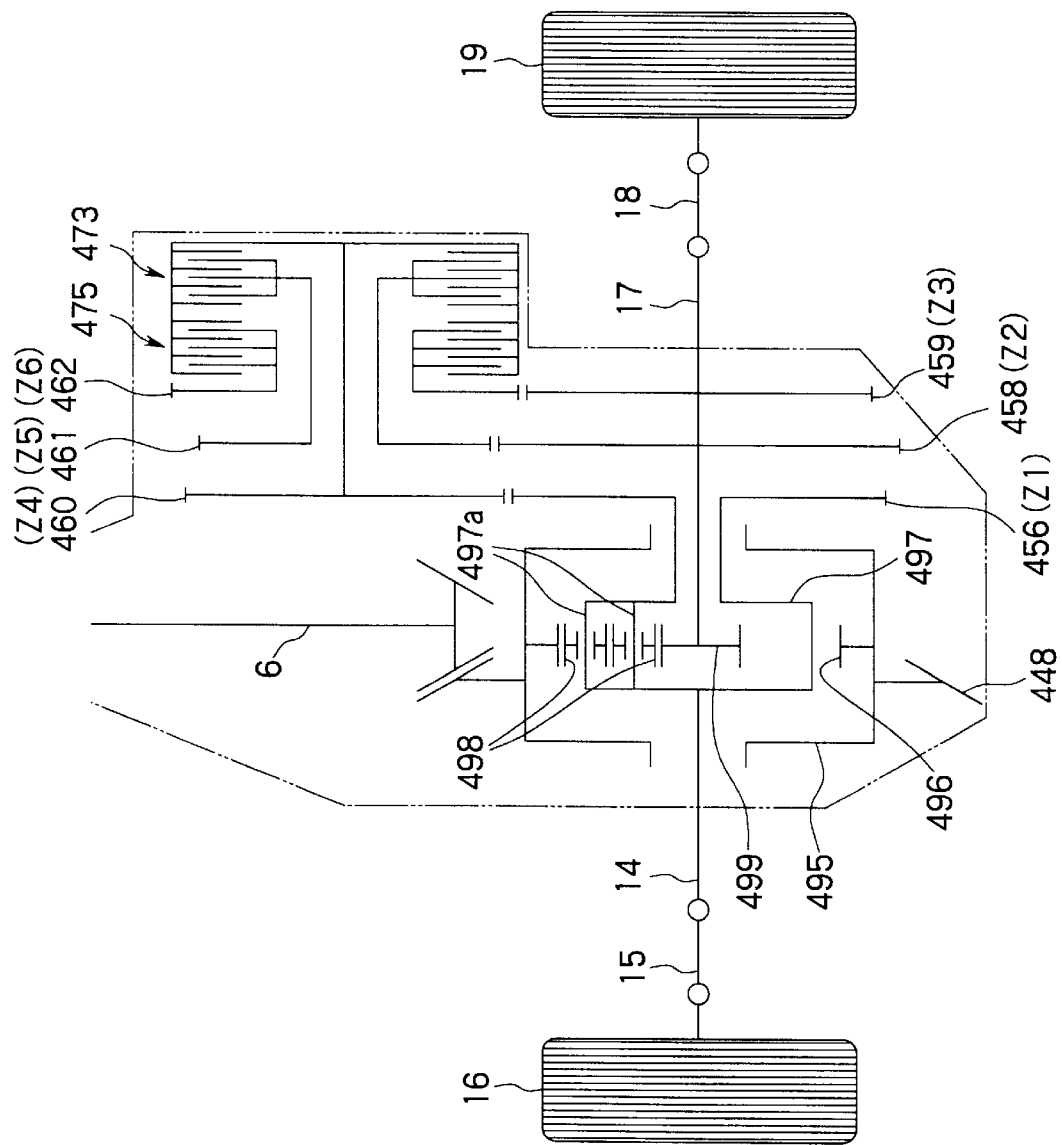

FIG. 66 shows a rear right/left driving torque distributing device in an eighth modification of the rear right/left driving torque distributing device 7 in the fifth embodiment. The rear right/left driving torque distributing device in the eight modification is similar to that in the fourth modification, except that, in the eighth modification, the first gear train is disposed on the right side of the differential gear case 495, i.e., on the side of the rear right wheel 19.

In the rear right/left driving torque distributing device shown in FIG. 66, the first gear 456 fixed to the planet carrier 497, i.e., a left output member, is disposed coaxially with the right drive shaft 17 on the right side of the differential gear case 495. The second gear 458 is fixedly mounted on the right drive shaft 17 on the right side of the first gear 456, and the third gear 459 is fixedly mounted on the right drive shaft 17 on the right side of the second gear 458.

A fourth gear 460, a fifth gear 461 and a sixth gear 462 are arranged coaxially on an axis parallel to the common axis of the first gear 456, the second gear 458 and the third gear 459 so as to be engaged with the first gear 456, the second gear 458 and the third gear 459, respectively. The first gear 456 and the fourth gear 460, the second gear 458 and the fifth gear 461, and the third gear 459 and the sixth gear 462 form a first gear train, a second gear train and a third gear train, respectively. A clutch mechanism formed by uniting together a first hydraulic multiple-disk clutch 473 and a second hydraulic multiple-disk clutch 475 is disposed on the outer side of the sixth gear 462, i.e., on the side of the rear right wheel 19.

The first gear train has a gear ratio z4/z1=0.9/1, the second gear train has a gear ratio z5/z2=0.9(0.9/1, and the third gear train has a gear ratio z6/z3=1/1, in which z1, z2, z3, z4, z5 and z6 are the numbers of teeth of the first gear 456, the second gear 458, third gear 459, the fourth gear 460, the fifth gear 461 and the sixth gear 462. Therefore, the rotating speed of a fourth gear 460 is higher than that of a first gear 456, the rotating speed of the fifth gear 461 is higher than that of the second gear 458, and the respective rotating speeds of the sixth gear 462 and the third gear 459 are equal to each other.

Accordingly, in the eighth modification, when distributing a major part of the driving torque to the rear left wheel 16 while the vehicle is making a right turn, the right/left driving torque distribution controller 32 executes a control operation to engage the first hydraulic multiple-disk clutch 473.

When distributing a major part of the driving torque to the rear right wheel 19 while the vehicle is making a left turn, the right/left driving torque distribution controller 32 executes a control operation to engage the second hydraulic multiple-disk clutch 475.

In the rear right/left driving force distributing device in the eighth modification, the gear mechanism can be disposed on either the right side or the left side of the differential gear case 495. Therefore, the rear right/left driving force distributing device can be formed in a relatively small lateral size, the gears can be satisfactorily lubricated and maintenance work is facilitated.

Figure 67:
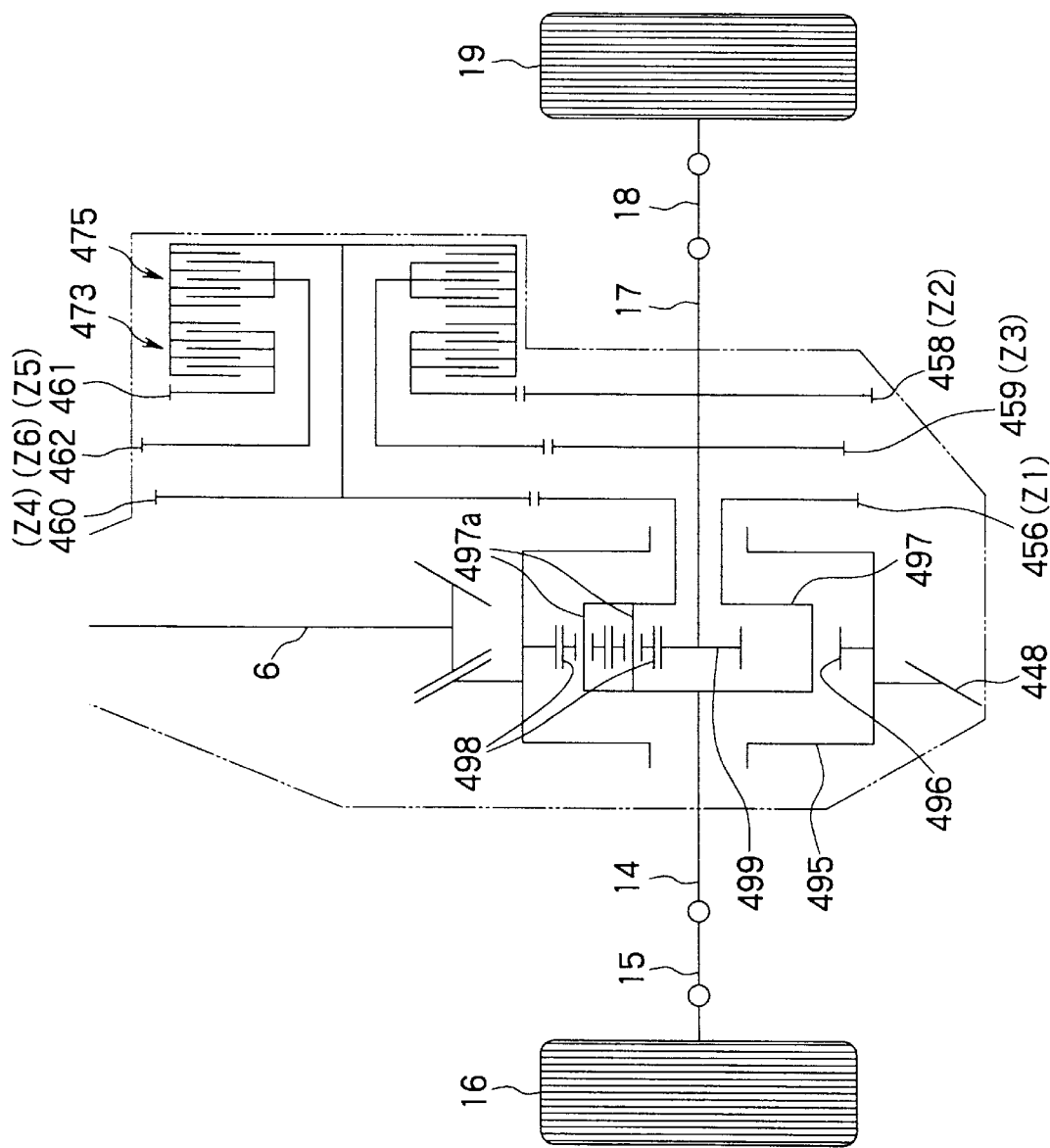

FIG. 67 shows a rear right/left driving torque distributing device in a ninth modification of the rear right/left driving torque distributing device 7 in the fifth embodiment shown in FIG. 58. In this rear right/left driving torque distributing device, a second gear train and a third gear train are disposed at positions corresponding to those of the third gear train and the second gear train, respectively, of the rear right/left driving torque distributing device in the eighth modification, and the gear ratios of the gear trains of the former are different from those of the latter.

In the rear right/left driving torque distributing device shown in FIG. 67, a first gear 456 is fixed to a planet carrier 497, i.e., an output member through which a driving torque is transferred to the rear left wheel 16, coaxially with the right drive shaft 17 on the right side of the differential gear case 495. A third gear 459 is fixedly mounted on the right drive shaft 17 on the right side of the first gear 456, and a second gear 458 is mounted on the right drive shaft 17 on the right side of the third gear 459.

A fourth gear 460, a fifth gear 461 and a sixth gear 462 are arranged coaxially on an axis parallel to the common axis of the first gear 456, the second gear 458 and the third gear 459 so as to be engaged with the first gear 456, the second gear 458 and the third gear 459, respectively, from left to right in order of the fourth gear 460, the sixth gear 462 and the fifth gear 461. The first gear 456 and the fourth gear 460, the second gear 458 and the fifth gear 461, and the third gear 459 and the sixth gear 462 form a first gear train, a second gear train and a third gear train, respectively. A clutch mechanism consisting of a first hydraulic multiple-disk clutch 473 and a second hydraulic multiple-disk clutch 475 is disposed on the outer side, i.e., on the right side, of the fifth gear 461.

The first gear train has a gear ratio z4/z1=1/0.9, the second gear train has a gear ratio z5/z2=1/0.9·0.9, and the third gear train has a gear ratio z6/z3=1/1, in which z1, z2, z3, z4, z5 and z6 are the numbers of teeth of the first gear 456, the second gear 458, third gear 459, the fourth gear 460, the fifth gear 461 and the sixth gear 462. Therefore, the rotating speed of a fourth gear 460 is lower than that of a first gear 456, the rotating speed of the fifth gear 461 is higher than that of the second gear 458, and the respective rotating speeds of the sixth gear 462 and the third gear 459 are equal to each other.

Accordingly, in the eighth modification, when distributing a major part of the driving torque to the rear left wheel 16 while the vehicle is making a right turn, the right/left driving torque distribution controller 32 executes a control operation to engage the first hydraulic multiple-disk clutch 473.

When distributing a major part of the driving torque to the rear right wheel 19 while the vehicle is making a left turn, the right/left driving torque distribution controller 32 executes a control operation to engage the second hydraulic multiple-disk clutch 475.

Figure 68:
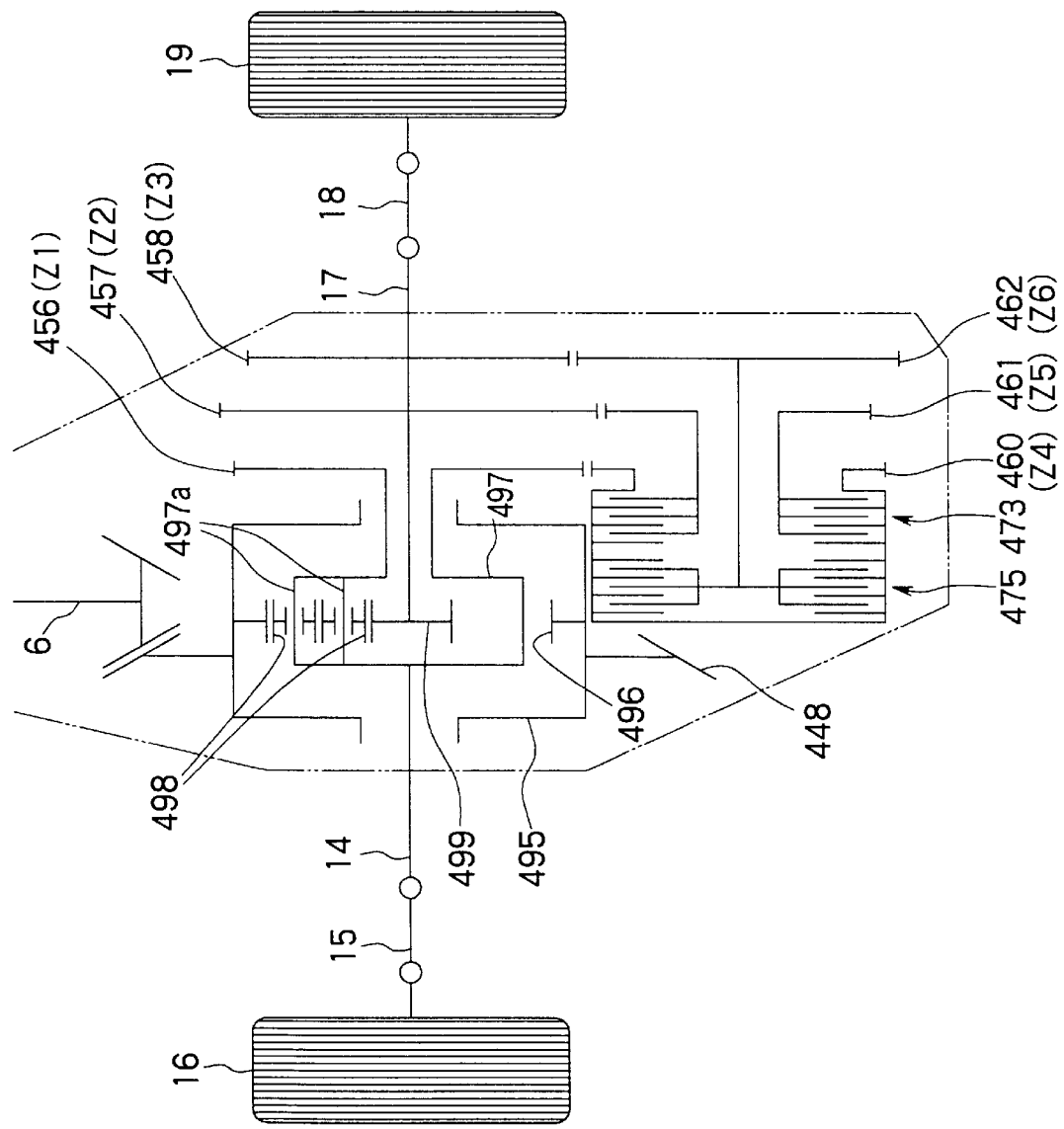

FIG. 68 shows a rear right/left driving torque distributing device in a tenth modification of the rear right/left driving torque distributing device 7 in the fifth embodiment. In the rear right/left driving torque distributing device in the tenth modification, a clutch mechanism corresponding to that of the rear right/left driving torque distributing device in the fifth embodiment is disposed behind the differential gear case 495.

As shown in FIG. 68, the clutch mechanism formed by If uniting together a first hydraulic multiple-disk clutch 473 and a second hydraulic multiple-disk clutch 475 is disposed behind the differential gear case 495 and on the left side of a fourth gear 460.

In the rear right/left driving torque distributing device in the tenth modification shown in FIG. 68, the first gear train has a gear ratio z4/z1=0.9/1, the second gear train has a gear ratio z5/z2–0.9·0.9/1, and the third gear train has a gear ratio z6/z3=1/1, in which z1, z2, z3, z4, z5 and z6 are the numbers of teeth of a first gear 456, a second gear 458, a third gear 459, the fourth gear 460, a fifth gear 461 and a sixth gear 462. Therefore, the rotating speed of the fourth gear 460 is higher than that of the first gear 456, the rotating speed of the fifth gear 461 is higher than that of the second gear 458, and the respective rotating speeds of the sixth gear 462 and the third gear 459 are equal to each other.

Accordingly, in the tenth modification, when distributing a major part of the driving torque to the rear left wheel 16 while the vehicle is making a right turn, the right/left driving torque distribution controller 32 executes a control operation to engage the first hydraulic multiple-disk clutch 473.

When distributing a major part of the driving torque to the rear right wheel 19 while the vehicle is making a left turn, the right/left driving torque distribution controller 32 executes a control operation to engage the second hydraulic multiple-disk clutch 475.

Figure 69:
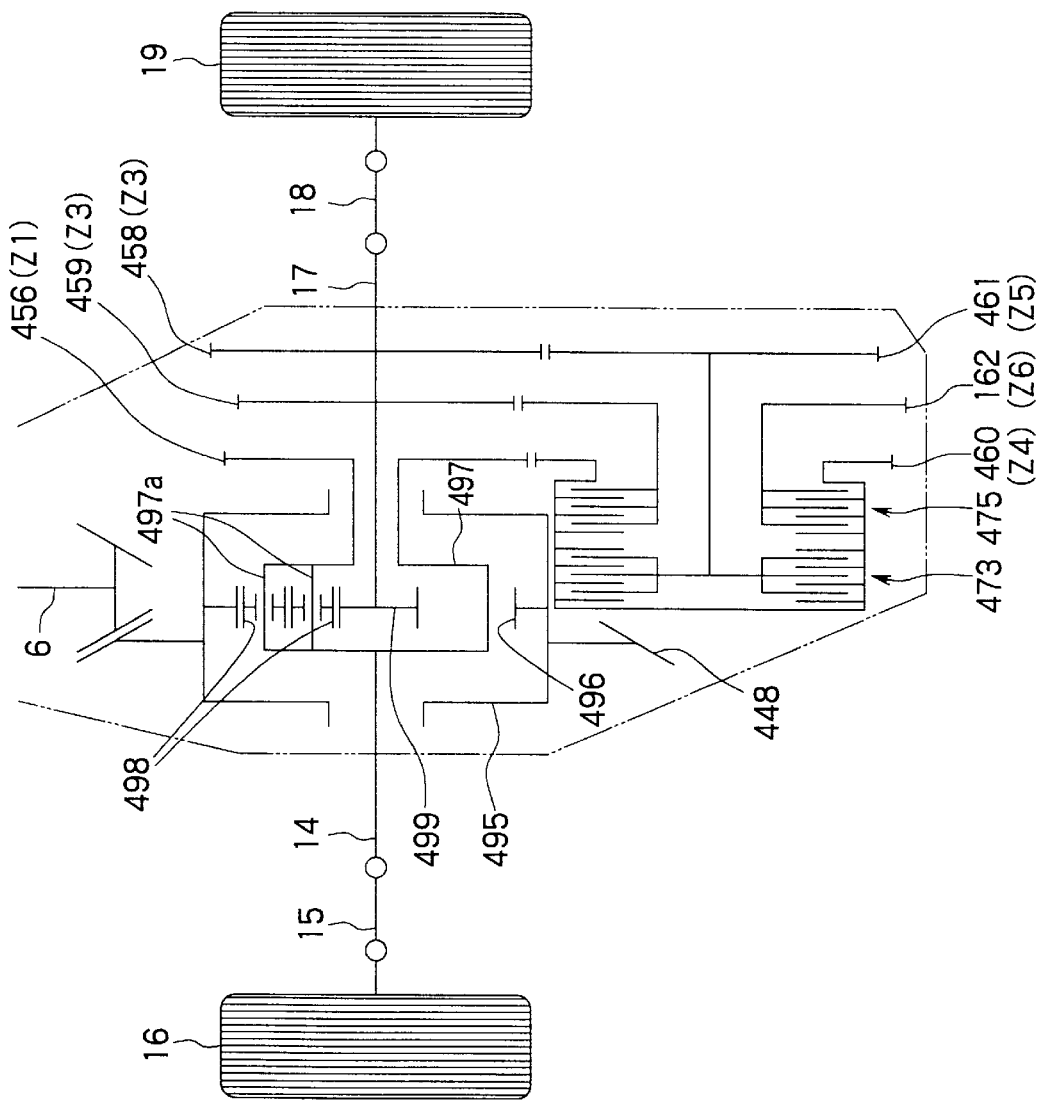

FIG. 69 shows a rear right/left driving torque distributing device in an eleventh modification of the rear right/left driving torque distributing device 7 in the fifth embodiment shown in FIG. 58. In the rear right/left driving torque distributing device in the eleventh modification, a clutch mechanism corresponding to that of the rear right/left driving torque distributing device in the ninth modification is disposed behind the differential gear case 495.

As shown in FIG. 69, the clutch mechanism formed by uniting together a first hydraulic multiple-disk clutch 473 and a second hydraulic multiple-disk clutch 475 is disposed behind the differential gear case 495 and on the left side of a fourth gear 460.

In the rear right/left driving torque distributing device in the eleventh modification shown in FIG. 69, the first gear train has a gear ratio z4/z1=1/0.9, the second gear train has a gear ratio z5/z2=1/0.9·0.9, and the third gear train has a gear ratio z6/z3=1/1, in which z1, z2, z3, z4, z5 and z6 are the numbers of teeth of a first gear 456, a second gear 458, a third gear 459, the fourth gear 460, a fifth gear 461 and a sixth gear 462. Therefore, the rotating speed of the fourth gear 460 is lower than that of the first gear 456, the rotating speed of the fifth gear 461 is lower than that of the second gear 458, and the respective rotating speeds of the sixth gear 462 and the third gear 459 are equal to each other.

Accordingly, in the eleventh modification, when distributing a major part of the driving torque to the rear left wheel 16 while the vehicle is making a right turn, the right/left driving torque distribution controller 32 executes a control operation to engage the first hydraulic multiple-disk clutch 473.

When distributing a major part of the driving torque to the rear right wheel 19 while the vehicle is making a left turn, the right/left driving torque distribution controller 32 executes a control operation to engage the second hydraulic multiple-disk clutch 475.

As is apparent from the configurations of the foregoing, modifications of the rear right/left driving torque distributing device in the fifth embodiment, the gear trains of the gear mechanism, and the clutch mechanism can be disposed at different positions in the different modifications, and the gear ratios of the gear trains may be other than those referred to in the foregoing description.

The right/left driving torque distributing device of the present invention may be provided with a differential mechanism other than those mentioned above.

The right/left driving torque distributing device in the third embodiment is applicable also to front-engine front-drive vehicles and rear-engine rear-drive vehicles.

Four-wheel drive vehicles employing the right/left driving force distributing device of the present invention may be provided with a center differential gear other than that shown and described above.

Sixth Embodiment

A right/left driving torque distributing device in a fifth embodiment according to the present invention for a vehicle will be described hereinafter with reference to FIGS. 70 to 74.

Figure 70:
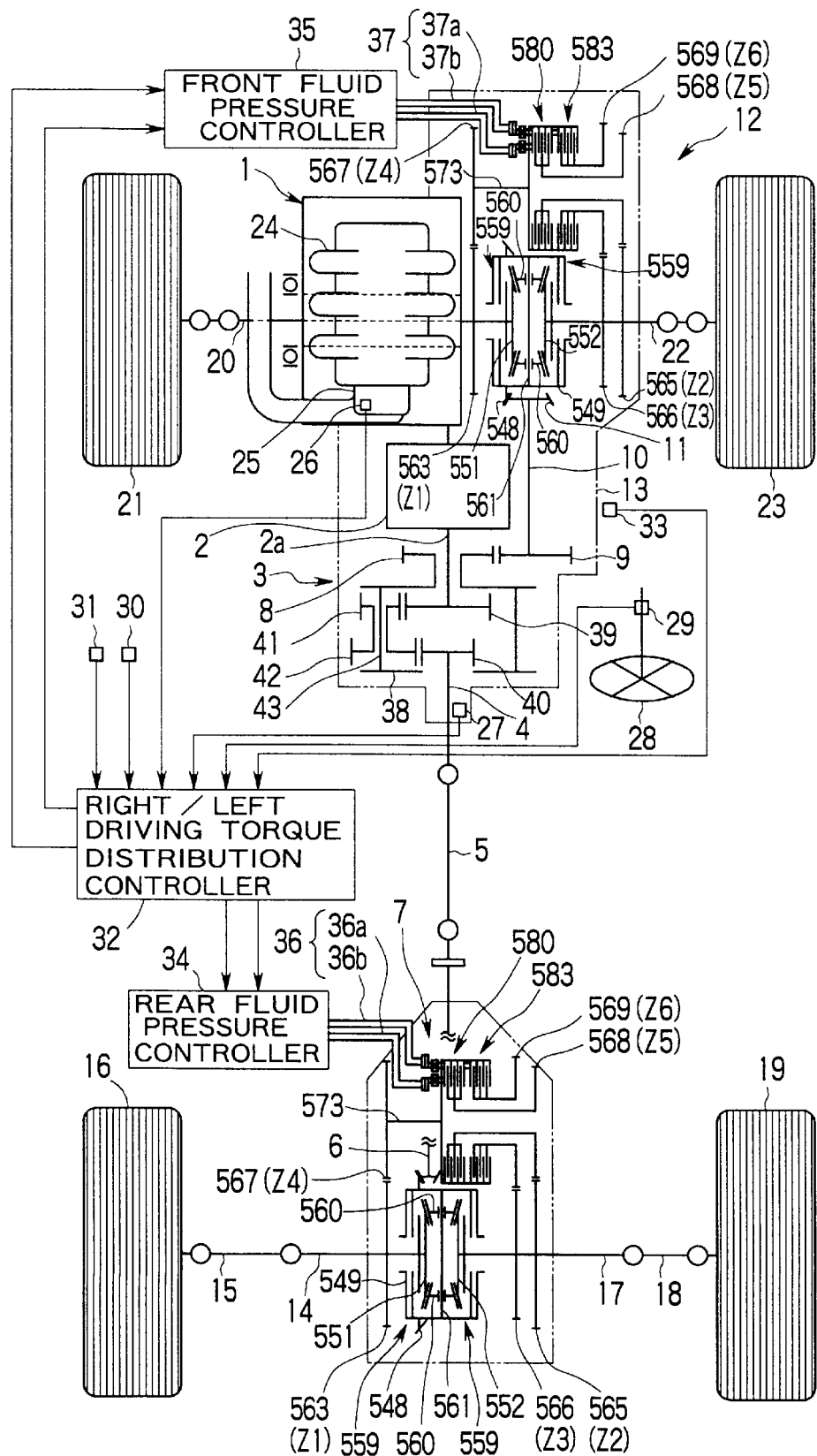
FIG. 70 is a diagrammatic view of a power transmission system for a four-wheel drive automobile, including a right/ left driving torque distributing device in a sixth embodiment according to the present invention.

In a power transmission system shown in FIG. 70, the output driving torque of an engine 1 included in a vehicle is transmitted through an automatic transmission 2, a center differential gear 3, a rear drive shaft 4, a propeller shaft 5 and a drive pinion 6 to a rear right/left driving torque distributing device 7 in a sixth embodiment according to the present invention, and to a front right/left driving torque distributing device 12 substantially identical with the rear right/left driving torque distributing device 7 through a transfer drive gear 8, a transfer driven gear 9, a front drive shaft 10 and a drive pinion 11. A power transmission method by which the power transmission system shown in FIG. 70 transmits the output driving torque of the engine 1 to the right/left driving torque distributing devices 7 and 12 is the same as that in which the power transmission system shown in FIG. 1 transmits the output driving torque of the engine to the right/left driving torque distributing devices 7 and 12, and hence the further description thereof will be omitted.

The rear right/left driving torque distributing device 7 will be described in detail with reference to FIG. 71.

The rear right/left driving torque distributing device 7 comprises, as principal units, a differential limiting mechanism 544, a gear mechanism 545, and a clutch mechanism 546. The drive pinion 6 for driving the rear right/left driving torque distributing device 7, and the differential gear mechanism 544 are contained in a differential gear case 547.

A shaft 6a formed integrally with the drive pinion 6 is connected to the propeller shaft 5 and is supported in bearings for rotation on the differential gear case 547. A final gear 548 engaged with the drive pinion 6 is fastened to a flange 549a formed on the outer circumference of a differential gear case 549 included in the differential gear mechanism 544.

The differential gear case 549 is provided at its left end and its right end with a cylindrical left boss 549L and a cylindrical right boss 549R formed coaxially with the axis of rotation of the differential gear case 549. Inner end portions of a left drive shaft 14 and a right drive shaft 17 are rotatably fitted in cylindrical bosses 549L and 549R of the differential gear case 549, respectively. The left drive shaft 14 is supported for rotation in a bearing on a side retainer 550 fixed to the differential gear case 547. The right drive shaft 17 is supported for rotation in a bearing on the differential gear case 547.

The respective inner ends of the left drive shaft 14 and the right drive shaft 17 are inserted in the differential gear case 549 so as to extend opposite to each other. A left side gear (bevel gear) 551 and a right side gear (bevel gear) 552 are mounted on and coupled by splines with the inner ends of the left drive shaft 14 and the right drive shaft 17, respectively.

A plurality of disks 553 are mounted on the boss 551a of the left side gear 551, and a plurality of disks 546 are fitted in the differential gear case 549. The disks 553 and the disks 546 are arranged alternately to form a differential limiting multiple-disk clutch 559. A pressure is applied to the disks 553 and 554 by an axially movable left pressure ring 555 to engage the differential limiting multiple-disk clutch 559. A plurality of disks 556 are mounted on the boss 552a of the right side gear 552, and a plurality of disks 557 are fitted in the differential gear case 549. The disks 556 and the disks 557 are arranged alternately to form a differential limiting multiple-disk clutch 559. A pressure is applied to the disks 556 and 557 by an axially movable right pressure ring 558 to engage the differential limiting multiple-disk clutch 559.

The left pressure ring 555 and the right pressure ring 558 are fitted in the differential gear case 549 with their open ends facing each other. V-grooves are formed in the opposite inner end surfaces of the left pressure ring 555 and the right pressure ring 558. Differential pinions (bevel gears) 560 engaged with the left side gear 551 and the right side gear 552 respectively, are supported rotatably on a pinion shaft 561. The substantially square opposite end portions of the pinion shaft 561 are fitted in spaces defined by the V-grooves.

The left pressure ring 555 and the right pressure ring 558 provided with the V-grooves, and the opposite end portions of the pinion shaft 561 constitute a cam mechanism. If a force acts on the pinion shaft 364 to turn the pinion shaft 364 toward the left drive shaft 14 and the right drive shaft 17, the left pressure ring 555 is pressed toward the disks 553 and 554, and the right pressure ring 558 is pressed toward the disks 556 and 557.

When the drive pinion 6 drives the differential gear case 551 for rotation, the differential pinions 560 rotate to enable differential motion between the left wheel 16 and the right wheel 19. The differential limiting multiple-disk clutches 559 generate a differential limiting torque when there is a difference between the respective rotating speeds of the left side gear 551 and the right side gear 552 relative to the differential gear case 549.

The gear mechanism 545 has gears disposed on both sides of the differential gear case 547.

A first gear 563 formed integrally with a first shaft 562 put on the left drive shaft 14 projects from the side retainer 550 attached to the left side wall of the differential gear case 549. The first shaft 562 is mounted on and coupled by splines with the left drive shaft 14. A second gear 565 of a diameter greater than that of the first gear 563, and a third gear 566 of a diameter smaller than that of the first gear 563 are formed integrally with a shaft 564, the shaft 564 is mounted on and coupled by splines with the right drive shaft 17 so that the second gear 565 and the third gear 566 are on the outer side, i.e., on the right-hand side, of the cylindrical right boss 549R.

The first gear 563, the second gear 565 and the third gear 566 are coaxial with each other. A fourth gear 567, a fifth gear 568 and a sixth gear 569 coaxially arranged on an axis parallel to the common axis of the first gear 563, the second gear 565 and the third gear 566 are engaged with the first gear 563, the second gear 565 and the third gear 566, respectively. The gear mechanism 545 has a first gear train consisting of the first gear 563 and the fourth gear 567, a second gear train consisting of the second gear 565 and the fifth gear 568, and a third gear train consisting of the third gear 566 and the sixth gear 569.

The first gear train is covered with a left cover 570, the second and the third gear train are covered with a right cover 571, and the rear end of the differential gear case 547 is covered with a rear cover 572.

Bearings are put on the opposite ends of the first shaft 562, and the first shaft 562 is supported together with the left drive shaft 14 for rotation on the side retainer 550 and the left cover 570.

Bearings are put on the opposite ends of the shaft 564, and the shaft 564 is supported together with the right drive shaft 17 for rotation on the differential gear case 547 and the right cover 571.

An inner shaft 573 is extended through and coaxially with the fourth gear 567, the fifth gear 568 and the sixth gear 4569 and is supported for rotation at its opposite ends in bearings on the left side cover 570 and the right side cover 571. A fourth shaft 574 formed integrally with the fourth gear 567 is splined to the left end portion of the inner shaft 573. The fourth shaft 574 is supported for rotation in a bearing together with the inner shaft 573 on the differential gear case 547.

A fifth shaft 575 formed integrally with the fifth gear 568 is mounted rotatably on the right end portion of the inner shaft 573, and a sixth shaft 576 formed integrally with the sixth gear 569 is put on the fifth shaft 575 for rotation on the fifth shaft 575.

The gear mechanism has three gear trains. The fourth gear 567, the fourth shaft 574 and the inner shaft 573 serve as a first clutch gear, the fifth gear 568 and the fifth shaft 575 serve as a second clutch gear, and the sixth gear 569 and the sixth shaft 576 serve as a third clutch gear. The first gear train has a gear ratio z4/z1=0.9/1, the second gear train has a gear ratio z5/z2=0.9·0.9/1, and the third gear train has a gear ratio z6/z3=1/1, where z1, z2, z3, z4, z5 and z6 are the numbers of teeth of the first gear 563, the second gear 565, the third gear 566, the fourth gear 567, the fifth gear 568 and the sixth gear 569, respectively. The gear ratios in decreasing order are 1 (the gear ratio of the third gear train), 0.9 (the gear ratio of the first gear train) and 0.9·0.9 (the gear ratio of the second gear train), and the step ratios between the gear ratios of the first gear train and the third gear train and between the second gear train and the first gear train are 0.9. The step ratios need not necessarily be 0.9.

A cylindrical clutch drum 470 included in the clutch mechanism 546 is disposed between the fourth gear 567 mounted on the inner shaft 573, and the sixth gear 569 with its open end directed toward the sixth gear 569.

The fifth shaft 575 is put on the inner shaft 573 and extends to the bottom wall 577a of a clutch drum 577. A clutch hub 578 of a predetermined length is mounted on one end, i.e., the inner end on the side of the bottom wall 577a of the clutch drum 577, of the fifth shaft 575. A plurality of friction disks 579 are mounted alternately on the clutch drum 577 and the clutch hub 578 to form a first hydraulic multiple-disk clutch 580.

The sixth shaft 576 is put on the fifth shaft 575 and extends to the outer side surface of the outermost friction disk 579 of the first hydraulic multiple-disk clutch 580. A clutch hub 581 of a predetermined length is formed at one end, i.e., the inner end, of the sixth shaft 576. A plurality of friction disks 582 are mounted alternately on the clutch drum 577 and the clutch hub 581 to form a second hydraulic multiple-disk clutch 583.

The first hydraulic multiple-disk clutch 580 is engaged and disengaged by operating a first piston 584 extended through the bottom wall 577a of the clutch drum 577 and fitted in a first pressure chamber 585 connected to the first fluid pipe 36a. A working fluid of a variable pressure controlled by the right/left driving torque distribution controller 32 is supplied into the first pressure chamber 585 through the first fluid pipe 36a to operate the first piston 584.

Similarly, the second hydraulic multiple-disk clutch 583 is engaged and disengaged by operating a second piston 586 extended through the bottom wall 577a of the clutch drum 577 and fitted in a second pressure chamber 587. A working fluid of a variable pressure controlled by the right/left driving torque distribution controller 32 is supplied into the second pressure chamber 587 through the second fluid pipe 36b to operate the second piston 586.

The hydraulic multiple-disk clutches 580 and 583 are combined to construct the clutch mechanism 546. Since the gear mechanism 545 has the gear trains of the foregoing gear ratios, a major part of the driving torque is distributed to the left drive shaft 14 when the first hydraulic multiple-disk clutch 580 is engaged, and a major part of the driving torque is distributed to the right drive shaft 17 when the second hydraulic multiple-disk clutch 583 is engaged. The pressures of the working fluid for engaging the hydraulic multiple-disk clutches 580 and 583 are calculated by the right/left driving power distribution controller 32. The torque distribution ratio in which the driving torque is distributed to the left drive shaft 14 and the right drive shaft 17 is controlled by varying the pressure of the working fluid.

The two hydraulic multiple-disk clutches 580 and 583 of the clutch mechanism 546 may be substituted by electromagnetic clutches or variable-capacity couplings. The respective torque transmission capacities of the hydraulic multiple-disk clutches 580 and 583 may be different from each other according to the gear ratios or the hydraulic multiple-disk clutches 580 and 583 may be different in size from each other.

The front right/left driving torque distributing device 12 receives a driving torque through the front drive shaft 10, a drive pinion 11 and a final gear 548. The front right/left driving torque distributing device 12 is substantially the same in construction as the rear right/left driving torque distributing device 7 and hence the description thereof will be omitted.

A rear fluid pressure controller 34 for supplying the working fluid of a controlled pressure to the hydraulic multiple-disk clutches 580 and 583, and a front fluid pressure controller 35 are the same as those previously described in connection with the right/left driving torque distributing device in the first embodiment, and hence the description thereof will be omitted.

The output driving torque of the engine 1 is transmitted through the output shaft 2a of the automatic transmission 2 to the first sun gear 39 of the center differential gear 3.

The driving torque transmitted from the first sun gear 39 through the first pinion 41 to the second pinion 42 is distributed to the second sun gear 40 and the carrier 38 supporting the first pinion 41 and the second pinion 42. A driving torque distributed to the second sun gear 40 is transmitted through the rear drive shaft 4 to the rear right/left driving power distributing device 7, and a driving torque distributed to the carrier 38 is transmitted through the transfer drive gear 8, the transfer driven gear 9 and the front drive shaft 10 to the front right/left driving torque distributing device 12 to drive the vehicle in a four-wheel driving mode.

When the vehicle is traveling straight, i.e., NF=NR, the second sun gear 40 and the carrier 38 of the center differential gear 3 rotate in the same direction at the same rotating speed, and the first pinions 41 and the second pinions 42 do not make any planetary motion and revolve together with the carrier 38.

Since the first pinion 41 and the second pinion 42 revolve together with the carrier 38, any frictional torque does not act on either of the first pinion 41 and the second pinion 42. Consequently, the input torque Ti applied to the first sun gear 39 is distributed in an equal front-to-rear torque distribution ratio of 50:50so that the front wheel driving torque TF, i.e., the torque of the carrier 38, is equal to the rear wheel driving torque TR, i.e., the torque of the second sun gear 40, if the gear geometry of the gears is determined so as to establish equal torque distribution or the input torque Ti is distributed in an unequal front-to-rear torque distribution ratio so that the front wheel driving torque TF and the rear wheel driving torque TR are unequal to each other if the gear geometry of the gears is determined so as to establish unequal torque distribution dependent on the gear geometry.

When the vehicle is turning with the front output rotating speed higher than the rear output rotating speed, i.e., NF>NR, or the front wheels slipping, the first pinions 41 and the second pinions 42 of the center differential gear 3 make a planetary motion for a differential motion. Consequently, the difference in rotating speed between the front wheels and the rear wheels during the turning of the vehicle is absorbed and the vehicle is able to turn smoothly.

As the first pinions 41 and the second pinion 42 make a planetary motion, a thrust acts on each set of the first pinion 41 and the second pinion 42 due to the difference in helix angle between the first pinion 41 and the second pinion 42, a frictional resistance acts on the end surface of either the first pinion 41 or the second pinion 42, and a composite force of a load radially acting on the first pinion 41 and the second pinion 42, and a tangential load acting on the first pinion 41 and the second pinion 42 acts on the circumference of each planet pin 43 to exert a frictional resistance against the rotation of the first pinion 41 and the second pinion 42. These frictional resistances produce a differential limiting torque.

Under such a condition, the differential limiting torque retards the rotation of the carrier 38, so that a major part of the input torque is distributed to the rear right/left driving torque distributing device 7. Consequently, the steering nature and the controllability of the vehicle during turning are improved, and the slip of the front wheels during straight traveling can be prevented.

When the rear wheels slip and NR>NF, the first pinions 41 and the second pinions 42 of the center differential gear 3 make a planetary motion due to the difference in rotating speed between the front wheels and the rear wheels, so that a frictional resistance is produced.

Under such a condition, a differential limiting torque promotes the rotation of the carrier 38, so that a major part of the input torque is distributed to the front right/left driving torque distributing device 12, so that the slip of the rear wheels is prevented.

Since the differential limiting torque of the center differential gear 3 is proportional to the input torque Ti, the differential limiting torque is proportional to the torques of the front and the rear wheels, and the differential limiting function is exercised always at a fixed rate.

The driving torque distributed by the center differential gear 3 to the rear right/left driving torque distributing device 7 is transmitted through the propeller shaft 5 and the drive pinion 6 to the rear right/left driving torque distributing device 7, and the driving torque is transmitted through the final gear 548 to the differential gear case 549.

The operation of the differential limiting mechanism 544 will be described hereinafter. As the differential gear case 549 rotates together with the final gear 548, the pressure rings 555 and 558 rotate and the pinion shaft 561 supported at the opposite ends thereof in the spaces defined by the V-grooves formed in the pressure rings 555 and 558 is rotated in the rotating direction of the left drive shaft 14 and the right drive shaft 17.

The driving torque is transmitted through the differential pinions 560 rotatably supported on the pinion shaft 561, and the side gears 551 and 552 to the left drive shaft 14 and the right drive shaft 17.

When the pinion shaft 561 rotates in the rotating direction of the left drive shaft 14 and the right drive shaft 17, the left pressure ring 555 is pressed toward the disks 553 and 554, and the right pressure ring 558 is pressed toward the disks 556 and 557 by cam actions between the flat surfaces of the square end portions of the pinion shaft 561 and portions of the left pressure ring 555 and the right pressure ring 558 provided with the V-grooves.

When the vehicle is traveling straight with the rear right wheel 19 and the rear left wheel 16 rotating at the same rotating speed, the differential pinions 560 do not rotate on the pinion shaft 561, and revolve together with the revolving left side gear 551 and the right side gear 552.

When the rear right wheel 19 and the rear left wheel 16 rotate at different rotating speeds, respectively, the differential pinions 560 rotate on the pinion shaft 561 to enable differential motion between the left wheel 16 and the right wheel 19. If the rotating speed of the rear left wheel 16 is higher than that of the rear right wheel 19, the rotating speed of the left side gear 551 relative to the differential gear case 549 and that of the right side gear 552 relative to the differential gear case 549 are different from each other. Consequently, the differential limiting multiple-disk clutches 559 generate frictional resistance, so that part of the driving torque distributed to the left side gear 551 is transferred to the right side gear 552 for a differential limiting operation. Part of the driving torque distributed to the right side gear 552 is transferred to the left side gear 551 when the rotating speed of the rear right wheel 19 is higher than that of the rear left wheel 16.

The operation of the gear mechanism 545 and the clutch mechanism 546 will be described hereinafter. When the left drive shaft 14 is rotated by a driving torque transmitted thereto through the differential limiting mechanism 544, the first gear 563 formed integrally with the first shaft 562 splined to the left drive shaft 14 rotates. Consequently, the first gear 563 drives the fourth gear 567, and the inner shaft 573 coupled by splines with the fourth shaft 574 rotates, and the clutch drum 577 fixed to the inner shaft 573 rotates.

As the right drive shaft 17 is driven for rotation by a driving torque transmitted thereto through the differential limiting mechanism 544, the shaft 564 provided with the second gear 565 and the third gear 566 rotates. The second gear 565 drives the fifth gear 568 for rotation, so that the clutch hub 578 of the first hydraulic multiple-disk clutch 580, fixed to the fifth shaft 575 rotates. The third gear 566 drives the sixth gear 569 for rotation, so that the clutch hub 581 of the second hydraulic multiple-disk clutch 583, fixed to the sixth shaft 576 rotates.

In the rear fluid pressure controller 34, a motor 88 drives an oil pump 89, and the working fluid of a pressure regulated by a pressure regulator valve 590 is supplied to a duty solenoid valve 595 and a clutch control valve 592.

In the right/left driving torque distribution controller 32, the output signals of the throttle opening sensor 26, the traveling speed sensor 27, the steering angle sensor 29, the longitudinal acceleration sensor 30 and the lateral acceleration sensor 31, and the gear position signal are processed to calculate optimum driving torques to be distributed to the front right wheel 23, the front left wheel 21, the rear right wheel 19 and the rear left wheel 16.

When distributing a major part of the driving torque to the rear left wheel 16 while the vehicle is making a right turn, the right/left driving torque distribution controller 32 gives a signal requesting the supply of the working fluid of a set pressure determined by calculation to the first pressure chamber 585 to the rear fluid pressure controller 34.

Then, the working fluid of the set pressure is supplied through the fluid pipe 36a to the first pressure chamber 585, the first piston 584 is actuated to engage the first hydraulic multiple-disk clutch 377 at a set pressure. Consequently, part of the driving torque distributed to the rear right wheel 19 is transferred to the rear left wheel 16.

When distributing a major part of the driving torque to the rear right wheel 19 while the vehicle is making a left turn, the right/left driving torque distribution controller 32 gives a signal requesting the supply of the working fluid of a set pressure determined by calculation to the second pressure chamber 587.

Then, the working fluid of the set pressure is supplied through the fluid pipe 36b to the second pressure chamber 587, the second piston 586 is actuated to engage the second hydraulic multiple-disk clutch 583 at a set pressure. Consequently, part of the driving torque distributed to the rear left wheel 16 is transferred to the rear right wheel 19.

The driving torque distributed to the front right/left driving torque distributing device 12 by the center differential gear 3 is transmitted through the front drive shaft 10 and the drive pinion 11 to the front right/left driving torque distributing device 12. The driving torque is transmitted through the final gear 548 to the differential gear case 549.

The front right/left driving torque distributing device 12, similarly to the rear right/left driving torque distributing device 7, exercises a differential function for the front wheels 21 and 23. When distributing a major part of the driving torque to the front left wheel 21 while the vehicle is making a right turn, the front fluid pressure controller 35 supplies the working fluid of a set pressure determined by calculation through the fluid pipe 37a to the first pressure chamber 585. When distributing a major part of the driving torque to the front right wheel 23 while the vehicle is making a left turn, the working fluid of a set pressure is supplied through the fluid pipe 37b to the second pressure chamber 587.

The right/left driving torque distributing device in the sixth embodiment has a relatively small lateral size, and hence the universal joints joining the right and the left wheel to the right and the left axle can be disposed at a relatively small angle of bend, which is advantageous in respect of durability and reliability.

The right/left driving torque distributing device consists of a relatively small number of component parts, and many of the component parts may be those of conventional right/left driving torque distributing devices. The right/left driving torque distributing device has a compact construction and can be manufactured at a relatively low manufacturing cost.

Since the right/left driving torque distributing device has a compact construction and a relatively small lateral size, interference between the right/left driving torque distributing device, and the suspensions or the exhaust system can be prevented, sufficient spaces can be secured around the right/left driving torque distributing device, which facilitates work for mounting the right/left driving torque distributing device on the vehicle and maintenance work.

Since the right/left driving torque distributing device employs the driving torque distributing mechanism comprising the three gear trains, the driving torque distributing ratio can be properly determined according to the characteristics of the vehicle or desired performance of the vehicle by properly determining the gear ratios of the three gear trains.

The first and the second hydraulic multiple-disk clutch of the right/left driving torque distributing device can be controlled so that the slips between the drive friction disks and the driven friction disks of the first hydraulic multiple-disk clutch and between the drive friction disks and the driven friction disks of the second hydraulic multiple-disk clutch are equal to each other by determining the respective gear ratios of the three gear trains so as to meet a predetermined relation. Therefore, a range in which the same friction characteristics (the relation between speed and coefficient of dynamic friction) is usable can be used and highly accurate control can be achieved.

The first and the second hydraulic multiple-disk clutch of the right/left driving torque distributing device are united together in a single, compact, lightweight structure. The capacities of the first and the second hydraulic multiple-disk clutch may be different from each other, and either of the first and the second hydraulic multiple-disk clutch may be smaller than the other.

In the right/left driving torque distributing device of the present invention, the driving torque is divided directly between the two output ends thereof instead of being distributed through the differential gear case (input end), and the frictional torque transmitting characteristics of the hydraulic multiple-disk clutches can be effectively utilized.

The right/left driving torque distributing device is capable of positive right/left driving force distribution and of the differential limiting function. Therefore, the right/left driving torque distributing device is capable of generating a sufficiently high differential limiting torque in quick response to the variation of the frictional characteristics of the road surface and the rapid variation of the driving torque.

In the right/left driving torque distributing device, the pressure rings of the differential limiting mechanism apply pressure to the disks for a differential limiting operation. Therefore, the lost motion of the parts including gears can be surely suppressed and noise generation attributable to backlash between the teeth of the gears can be suppressed.

The center differential gear comprises a relatively small number of component parts, and is simple in construction, compact and lightweight. Therefore, the center differential gear can be easily manufactured and assembled and is advantageous in respect of the vibration and the noise generation of the power transmission system.

Both the center differential gear and the right/left driving torque distributing device are compact and lightweight, and can be easily united together to construct a compact, lightweight, integrated unit.

The number of teeth of the gears of the center differential gear may be determined so that the reference front-to-rear driving torque distribution ratio is 50:50. An input-torque-proportional differential limiting torque is distributed to the front wheels or the rear wheels according to the traveling condition of the vehicle and the surface condition of the road. Consequently, the slip of the vehicle can be prevented, traction can be secured, the skidding of the rear wheels can be prevented and the running performance of the vehicle can be improved. Furthermore, the posture of the vehicle can be easily controlled by operating the accelerator pedal and the vehicle respond satisfactorily to control operations, which enables enjoyable sporty driving of the vehicle.

Figure 71:
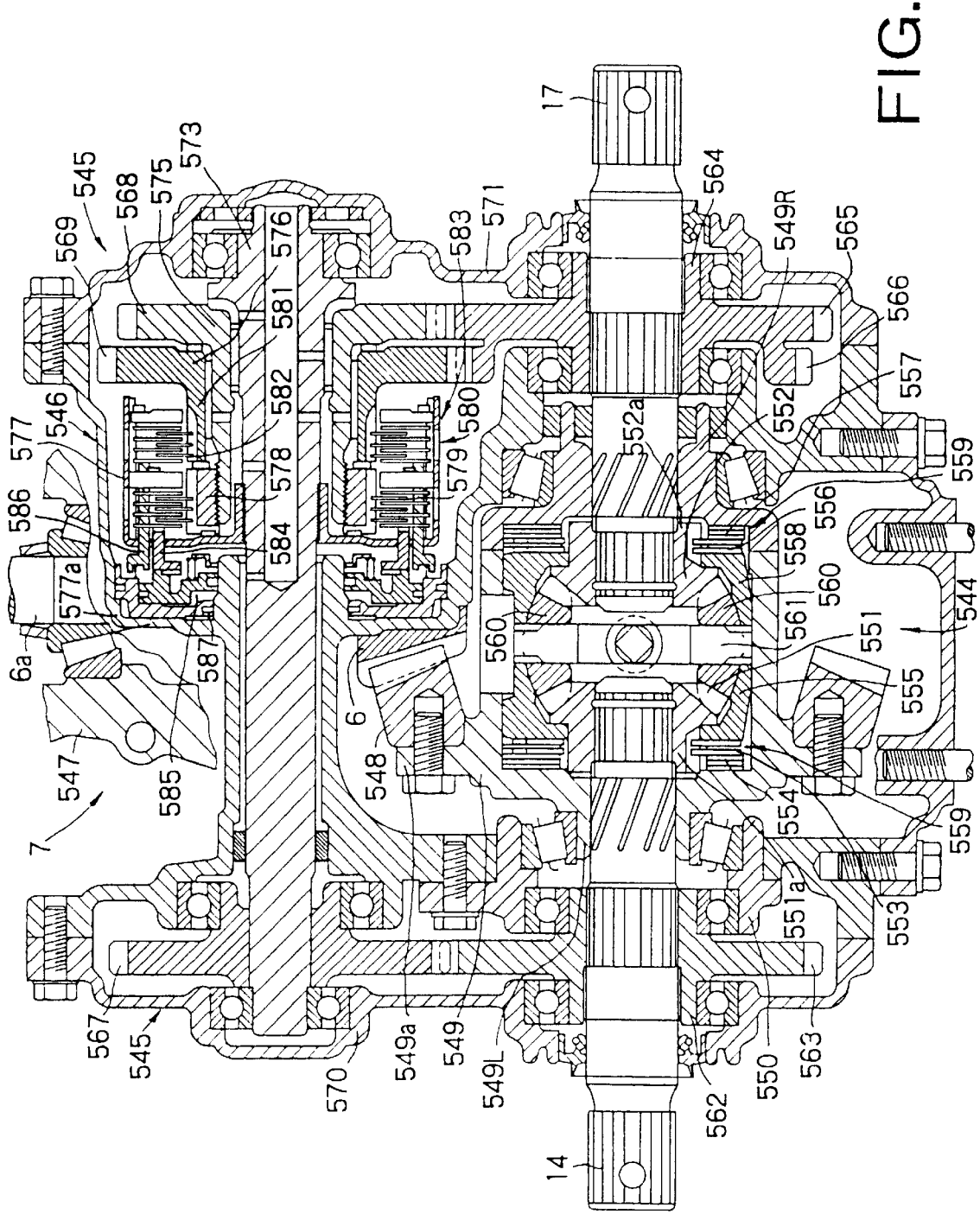
FIG. 71 is an enlarged sectional view of the rear right/left driving torque distributing device included in the power transmission system shown in FIG. 70.
Figure 72:
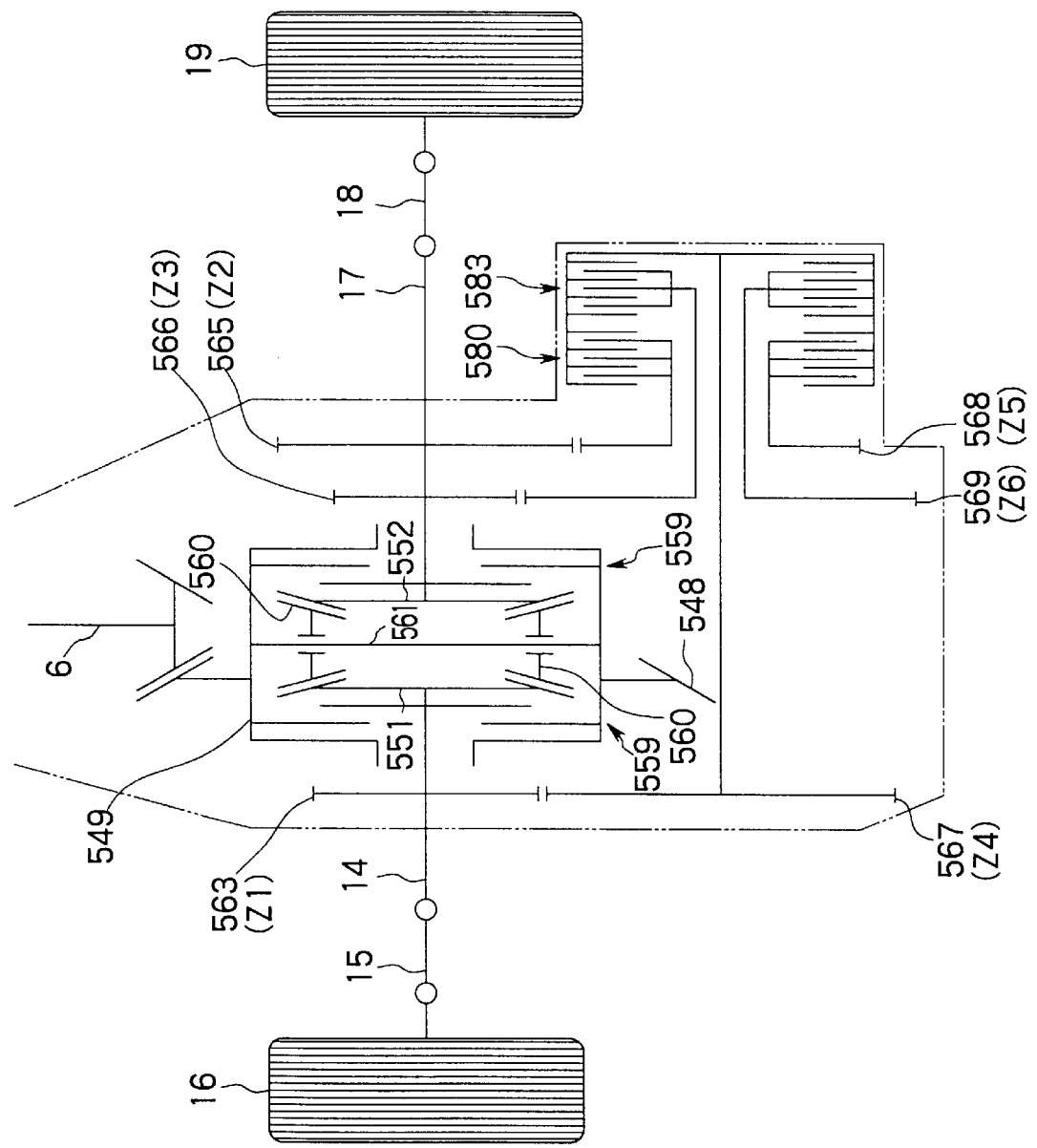
FIGS. 72 to 74 are enlarged diagrammatic views of rear right/left driving torque distributing devices in modifications of the right/left driving torque distributing device shown in FIG. 71.

FIG. 72 shows a rear right/left driving torque distributing device in a first modification of the rear right/left driving torque distributing device 7 in the sixth embodiment shown in FIG. 71. The rear right/left driving torque distributing device in the first modification is provided with gear trains of gear ratios different from those of the gear trains of the rear right/left driving torque distributing device 7 of FIG. 71 and a clutch mechanism disposed on the outer side of the second gear train, i.e., on the side of the rear right wheel 19, and is the same in other respects as the rear right/left driving torque distributing device 7 shown in FIG. 71.

In the first modification shown in FIG. 72, the first hydraulic multiple-disk clutch 580 is disposed on the outer side of the fifth gear 568, i.e., on the side of the rear right wheel 19, and the second hydraulic multiple-disk clutch 583 is disposed on the outer side of the first hydraulic multiple-disk clutch 580, i.e., on the side of the rear right wheel 19. The hydraulic multiple-disk clutches 580 and 583 are united together to form a clutch mechanism.

In the first modification shown in FIG. 72, the first gear train has a gear ratio $z4/z1=1/0.9$, the second gear train has a gear ratio $z5/z2=1/1$, and the third gear train has a gear ratio $z6/z3=1/0.9 \cdot 0.9$, in which z1, z2, z3, z4, z5 and z6 are the numbers of teeth of a first gear 563, a second gear 565, a third gear 566 a fourth gear 567, a fifth gear 568 and a sixth gear 569. Therefore, the rotating speed of the fourth gear 567 is lower than that of the first gear 563, the respective rotating speeds of the second gear 565 and the fifth gear 568 are equal to each other, and the rotating speed of the sixth gear 569 is lower than that of the third gear 566.

In the first modification, when distributing a major part of the driving torque to the rear left wheel 16 while the vehicle is making a right turn, the right/left driving torque distribution controller 32 executes a control operation to engage the first hydraulic multiple-disk clutch 580.

When distributing a major part of the driving torque to the rear right wheel 19 while the vehicle is making a left turn, the right/left driving torque distribution controller 32 executes a control operation to engage the second hydraulic multiple-disk clutch 583.

Figure 73:
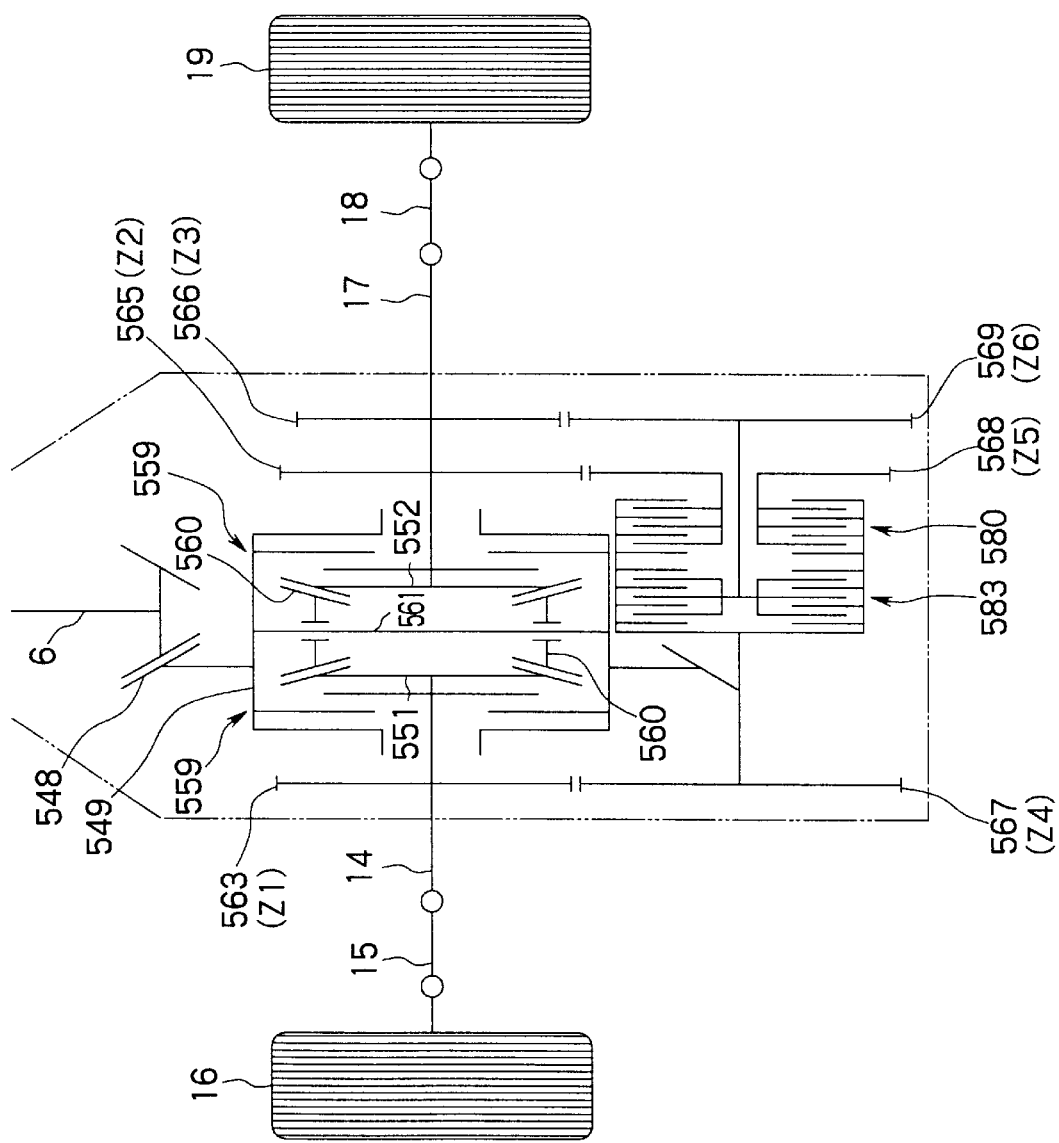

Referring to FIG. 73, a rear right/left driving torque distributing device in a second modification of the rear right/left driving torque distributing device 7 in the sixth embodiment shown in FIG. 71 is provided with gear trains of gear ratios different from those of the gear trains of the rear right/left driving torque distributing device 7 of FIG. 71. In the rear right/left driving torque distributing device in the second modification, the respective positions of the second and the third gear train of the gear mechanism correspond to the respective positions of the third and the second gear train of the rear right/left driving torque distributing device 7 in the sixth embodiment, respectively, and the respective positions of the first hydraulic multiple-disk clutch 580 and the second hydraulic multiple-disk clutch 583 correspond to the respective positions of the second hydraulic multiple-disk clutch 583 and the first hydraulic multiple-disk clutch 580 of the rear right/left driving torque distributing device 7 in the sixth embodiment, respectively. The rear right/left driving torque distributing device in the second modification is the same in other respects as the rear right/left driving torque distributing device 7 in the sixth embodiment.

As shown in FIG. 73, a second gear 565 having a diameter greater than that of a first gear 563 is disposed on the side of the differential gear case 549, a third gear 566 having a diameter smaller than that of the first gear 563 is disposed on the side of the rear right wheel 19, the first hydraulic multiple-disk clutch 580 is disposed on the side of the rear right wheel 19, and the second hydraulic multiple-disk clutch 583 is disposed on the side of the differential gear case 549. The two hydraulic multiple-disk clutches 580 and 583 are united together to form the clutch mechanism.

In the second modification shown in FIG. 73, the first gear train has a gear ratio $z4/z1=1/0.9$, the second gear train has a gear ratio $z5/z2=1/1$, and the third gear train has a gear ratio $z6/z3=1/0.9 \cdot 0.9$, in which z1, z2, z3, z4, z5 and z6 are the numbers of teeth of the first gear 563, the second gear 565, the third gear 566, a fourth gear 567, the fifth gear 568 and the sixth gear 569. Therefore, the rotating speed of the fourth gear 262 is lower than that of the first gear 257, the respective rotating speeds of the fifth gear 568 and the second gear 565 are equal to each other, and the respective rotating speed of the sixth gear 569 is lower than that of the third gear 566.

Accordingly, in the second modification, when distributing a major part of the driving torque to the rear left wheel 16 while the vehicle is making a right turn, the right/left driving torque distribution controller 32 executes a control operation to engage the first hydraulic multiple-disk clutch 580.

When distributing a major part of the driving torque to the rear right wheel 19 while the vehicle is making a left turn, the right/left driving torque distribution controller 32 executes a control operation to engage the second hydraulic multiple-disk clutch 583.

Figure 74:
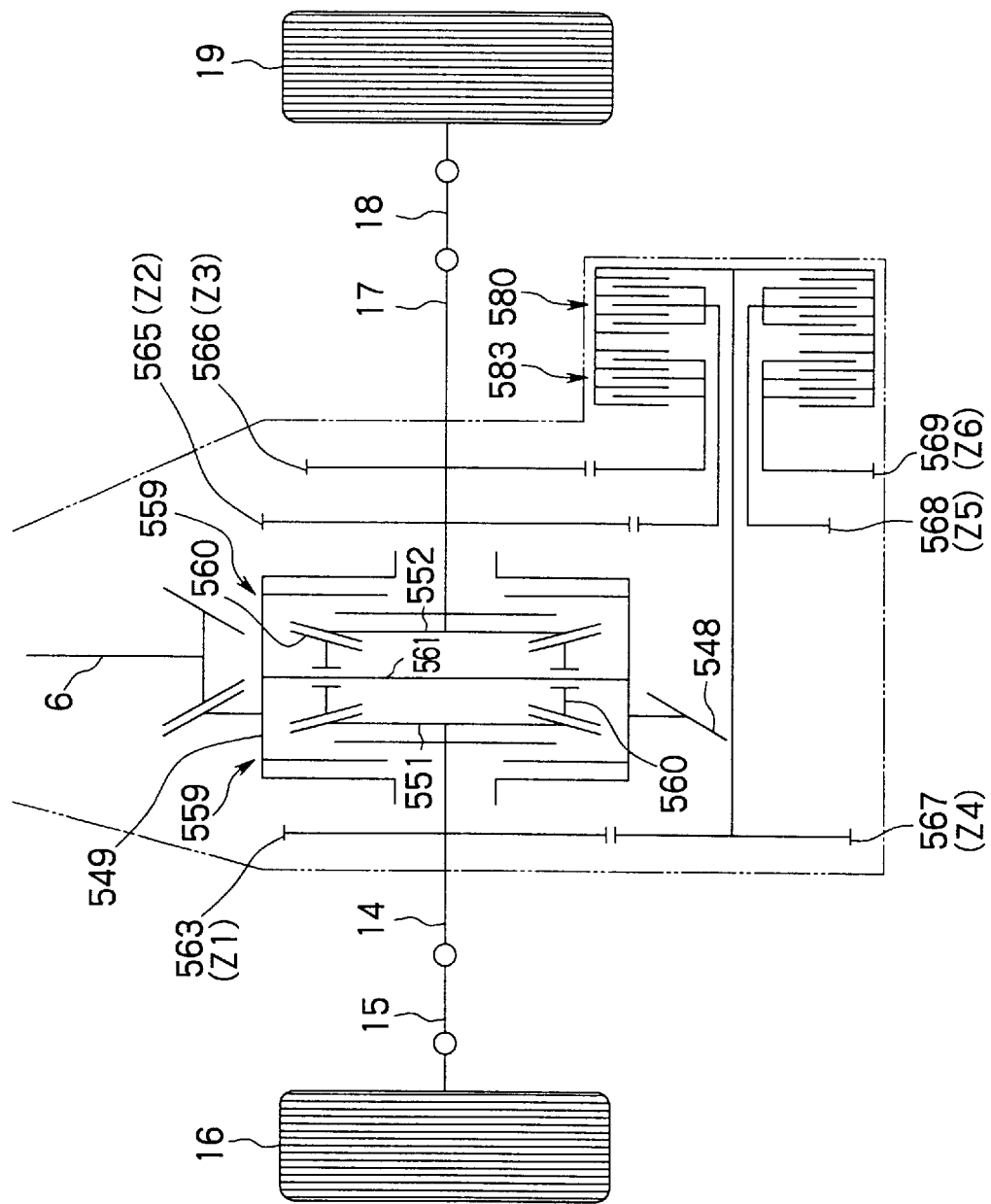

FIG. 74 shows a rear right/left driving torque distributing device in a third modification of the rear right/left driving torque distributing device 7 in the sixth embodiment shown in FIG. 71. In the rear right/left driving torque distributing device in the third modification, the respective positions of the second and the third gear train of the gear mechanism correspond to the respective positions of the third and the second gear train of the rear right/left driving torque distributing device 7 in the sixth embodiment, respectively, and the clutch mechanism is disposed on the outer side of the third gear train, i.e., on the side of the rear right wheel 19. The rear right/left driving torque distributing device in the third modification is the same in other respects as the rear right/left driving torque distributing device 7 in the sixth embodiment.

As shown in FIG. 74, a second gear 565 having a diameter greater than that of a first gear 563 is disposed on the side of the differential gear case 49, a third gear 566 having a diameter smaller than that of the first gear 563 is disposed on the side of the rear right wheel 19, the second hydraulic multiple-disk clutch 583 is disposed on the outer side of a sixth gear 569 engaged with the third gear 566, i.e., on the side of the rear right wheel 19, and the first hydraulic multiple-disk clutch 580 is disposed on the outer side of the second hydraulic multiple-disk clutch 583. The two hydraulic multiple-disk clutches 580 and 583 are united together to form the clutch mechanism.

In the third modification shown in FIG. 74, the first gear train has a gear ratio $z4/z1=0.9/1$, the second gear train has a gear ratio $z5/z2-0.9 \cdot 0.9/1$, and the third gear train has a gear ratio $z6/z3=1/1$, in which $z1$, $z2$, $z3$, $z4$, $z5$ and $z6$ are the numbers of teeth of the first gear 563, a second gear 565, a third gear 566 a fourth gear 567, a fifth gear 568 and a sixth gear 569. Therefore, the rotating speed of the fourth gear 567 is higher than that of the first gear 563, the rotating speed of the fifth gear 568 is higher than that of the second gear 565, and the respective rotating speeds of the sixth gear 569 and the third gear 566 are equal to each other.

Accordingly, in the third modification, when distributing a major part of the driving torque to the rear left wheel 16 while the vehicle is making a right turn, the right/left driving torque distribution controller 32 executes a control operation to engage the first hydraulic multiple-disk clutch 580.

When distributing a major part of the driving torque to the rear right wheel 19 while the vehicle is making a left turn, the right/left driving torque distribution controller 32 executes a control operation to engage the second hydraulic multiple-disk clutch 583.

As is apparent from the configurations of the foregoing, modifications of the rear right/left driving torque distributing device in the sixth embodiment, the gear trains of the gear mechanism, and the clutch mechanism can be disposed at different positions in the different modifications, and the gear ratios of the gear trains may be other than those referred to in the foregoing description.

The right/left driving torque distributing device of the present invention may be provided with a differential limiting mechanism other than those mentioned above.

The right/left driving torque distributing device in the third embodiment is applicable also to front-engine front-drive vehicles and rear-engine rear-drive vehicles.

Four-wheel drive vehicles employing the right/left driving force distributing device of the present invention may be provided with a center differential gear other than that shown and described above.

What is claimed is:

1. A right/left driving torque distributing device for a vehicle, comprising:

a differential gear mechanism for distributing a driving torque provided by a power unit mounted on the vehicle to a pair of lateral drive shafts extended coaxially with each other in opposite directions, respectively;

a gear mechanism comprising:

first, second and third clutch gears coaxially arranged in alignment with a second axis parallel to the common axis of the pair of lateral drive shafts, and capable of individually rotating about the second axis, a first gear engaged with the first clutch gear and supported for rotation together with one of the pair of lateral drive shafts to drive the first clutch gear at a reference rotating speed when the pair of lateral drive shafts rotate at the same rotating speed, a second gear engaged with the second clutch gear and supported for rotation together with the other lateral drive shaft to drive the second clutch gear at a rotating speed higher than the reference rotating speed when the pair of lateral drive shafts rotate at the same rotating speed, and a third gear engaged with the third clutch gear and supported for rotation together with the latter lateral drive shaft to drive the third clutch gear at a rotating speed lower than the reference rotating speed when the pair of lateral drive shafts rotate at the same rotating speed; and a clutch mechanism comprising:

a first clutch means interposed between the first and the second clutch gear and capable of interlocking the first and the second clutch gear for rotation together with each other, and a second clutch means interposed between the first and the third clutch gear and capable of interlocking the first and the third clutch gear for rotation together with each other;

wherein the first and the second clutch means of the clutch mechanism are disposed coaxially in alignment with the second axis and united together in a single unit.

2. The right/left driving torque distributing device according to claim 1, wherein the respective numbers of teeth of the first, the second and the third gear and the first, the second and the third clutch gear are $z1$, $z2$, $z3$, $z4$, $z5$ and $z6$. a first gear ratio $G1=z4/z1$, a second gear ratio $G2=z5/z2$ and a third gear ratio $G3=z6/z3$, and $G2>G1>G3$.

3. The right/left driving torque distributing device according to claim 1, wherein the respective numbers of teeth of the first, the second and the third gear and the first, the second and the third clutch gear are $z1$, $z2$, $z3$, $z4$, $z5$ and $z6$. a first gear ratio $G1=z4/z1$, a second gear ratio $G2 =z5/z2$ and a third gear ratio $G3 =z6/z3$, and $G2/G1=G1/G3$.

4. The right/left driving torque distributing device according to claim 1, wherein the respective numbers of teeth of the second and the third gear and the second and the third clutch gear are $z2$, $z3$, $z5$ and $z6$. a second gear ratio $G2 =z5/z2$, a third gear ratio $G3=z6/z3$, and $G2=G3$.

5. The right/left driving torque distributing device according to claim 1, wherein the first gear and the first clutch gear are disposed on the side of one of the pair of lateral drive shafts with respect to the differential gear mechanism, and the second gear, the second clutch gear, the third gear and the third clutch gear are disposed on the side of the other lateral drive shaft with respect to the differential gear mechanism.

6. The right/left driving torque distributing device according to claims 1, wherein the first, the second and the third gear, and the first, the second and the third clutch bear are disposed on the side of one of the pair of lateral drive shafts with respect to the differential gear mechanism.

7. The right/left driving torque distributing device according to claims 1, wherein the differential bear mechanism is a composite planetary gear mechanism comprising:

a differential gear case to be driven for rotation by the output driving torque of the power unit, a first sun gear to be rotated together with the differential gear case;

a plurality of first pinions engaged with the first sun gear;

a plurality of second pinions formed integrally with the first pinions, respectively, a second sun gear engaged with the second sun gear, said second sun gear being interlocked with one of the pair of lateral drive shafts to drive the same for rotation, plurality of planet pins rotatably supporting gear sets each of one of the plurality of first pinions and one of the plurality of second pinions, respectively, and a planet pinion carrier supporting the planet pins, said planet pinion carrier being used for driving one of the pair of lateral drive shafts, said planet pinion carrier being interlocked with the other lateral drive shaft to drive the same fore rotation.

8. The right/left driving torque distributing device according to claim 7 further comprising:

a first differential limiting means for limiting differential motion between the planet pin carrier and the second sun gear by using a thrust produced by the interaction between the first sun gear and each first pinion and acting on the first pinion in a direction parallel to the corresponding planet pin, and a thrust produced by the interaction between the second sun gear and each second pinion and acting on the second pinion in a direction parallel to the corresponding planet pin; and a second differential limiting means for limiting differential motion between the planet pin carrier and the second sun gear by using a frictional resistance of each planet pin against the rotation of each first pinion supported on the same planet pin and engaged with the first sun gear, and a frictional resistance of each planet pin against the rotation of each second pinion supported on the same planet pin and engaged with the second sun gear.

9. The right/left driving torque distributing device according to claims 1, wherein the differential gear mechanism comprises:

a differential gear case driven for rotation by the output driving torque of the power unit, a pinion shaft supported on the differential gear case for rotation together with the differential gear case, a pair of pinions rotatably supported on the pinion shaft, and a pair of side gears engaged with the pinions, respectively;

the pair of side gears are coupled with the pair of lateral drive shafts to drive the same, respectively; and the differential gear case and the pair of side gears are interlocked by a differential limiting means for limiting differential motion between the pair of side gears.

10. The right/left driving torque distributing device according to claims 1 further comprising a clutch control means for varying the torque transmitting capacities of the first and the second clutch means according to the traveling condition of the vehicle and the surface condition of a road on which the vehicle is traveling.

11. The right/left driving torque distributing device according to claims 1, wherein there is a predetermined difference in torque transmitting capacity between the first and the second clutch means.

12. The right/left driving torque distributing device according to claims 1, wherein the first and the second clutch means of the clutch mechanism are hydraulic multiple-disk clutches.

13. The right/left driving torque distributing device according to claims 1, wherein the first and the second clutch means of the clutch mechanism are electromagnetic clutches.

14. The right/left driving torque distributing device according to claims 1, wherein the first and the second clutch means of the clutch mechanism are variable-capacity couplings.

15. A right/left driving torque distributing device for a vehicle, comprising:

a differential gear mechanism for distributing a driving torque provided by a power unit mounted on the vehicle to a pair of lateral drive shafts extended coaxially with each other in opposite directions;

a gear mechanism comprising:

first, second and third clutch gears coaxially arranged in alignment with a second axis parallel to the common axis of the pair of lateral drive shafts, and capable of individually rotating about the second axis, a first gear engaged with the first clutch gear and supported for rotation together with a member of the differential gear mechanism, driven for rotation by the power unit to drive the first clutch gear at a reference rotating speed when the pair of lateral drive shafts rotate at the same rotating speed, a second gear engaged with the second clutch gear and supported for rotation together with one of the lateral drive shafts to drive the second clutch gear at a rotating speed different from the reference rotating speed when the pair of transverse drive shafts rotate at the same rotating speed, and a third gear engaged with the third clutch gear and supported for rotation together with the foregoing one of the pair of lateral drive shafts to drive the third clutch gear at a rotating speed different from the reference rotating speed when the right and the left drive shaft rotate at the same rotating speed; and a clutch mechanism comprising:

a first clutch means interposed between the first and the second clutch gear and capable of interlocking the first and the second clutch gear for rotation together with each other, and a second clutch means interposed between the first and the third clutch gear and capable of interlocking the first and the third clutch gear for rotation together with each other;

wherein the first and the second clutch means of the clutch mechanism are disposed coaxially in alignment with the second axis and united together in a single unit.

16. The right/left driving torque distributing device according to claim 15, wherein the respective numbers of teeth of the first, the second and the third gear and the first, the second and the third clutch gear are z1, z2, z3, z4, z5 and z6. a first gear ratio G1=z4/z1, a second gear ratio G2 =z5/z2 and a third gear ratio G3=z6/z3, and G2>G1>G3.

17. The right/left driving torque distributing device according to claim 15, wherein the respective numbers of teeth of the first, the second and the third gear and the first, the second and the third clutch gear are z1, z2, z3, z4, z5 and z6. a first gear ratio G1=z4/z1, a second gear ratio G2 =z5/z2 and a third gear ratio G3=z6/z3, and G2/G1=G1/G3.

18. The right/left driving torque distributing device according to claim 15, wherein the respective numbers of teeth of the second and the third gear and the second and the third clutch gear are z2, z3, z5 and z6. a second gear ratio G2=z5/z2, a third gear ratio G3=z6/z3, and G2=G3.

19. The right/left driving torque distributing device according to claim 15, wherein the first gear and the first clutch gear are disposed on the side of one of the pair of lateral drive shafts with respect to the differential gear mechanism, and the second gear, the second clutch gear, the third gear and the third clutch gear are disposed on the side of the other lateral drive shaft with respect to the differential gear mechanism.

20. The right/left driving torque distributing device according to claims 15, wherein the first, the second and the third gear, and the first, the second and the third clutch bear are disposed on the side of one of the pair of lateral drive shafts with respect to the differential gear mechanism.

21. The right/left driving torque distributing device according to claims 15, wherein the differential bear mechanism is a composite planetary gear mechanism comprising:

a differential gear case to be driven for rotation by the output driving torque of the power unit, a first sun gear to be rotated together with the differential gear case;

a plurality of first pinions engaged with the first sun gear;

a plurality of second pinions formed integrally with the first pinions, respectively, a second sun gear engaged with the second sun gear, said second sun gear being interlocked with one of the pair of lateral drive shafts to drive the same for rotation, plurality of planet pins rotatably supporting gear sets each of one of the plurality of first pinions and one of the plurality of second pinions, respectively, and a planet pinion carrier supporting the planet pins, said planet pinion carrier being used for driving one of the pair of lateral drive shafts, said planet pinion carrier being interlocked with the other lateral drive shaft to drive the same fore rotation.

22. The right/left driving torque distributing device according to claim 21 further comprising:

a first differential limiting means for limiting differential motion between the planet pin carrier and the second sun gear by using a thrust produced by the interaction between the first sun gear and each first pinion and acting on the first pinion in a direction parallel to the corresponding planet pin, and a thrust produced by the interaction between the second sun gear and each second pinion and acting on the second pinion in a direction parallel to the corresponding planet pin; and a second differential limiting means for limiting differential motion between the planet pin carrier and the second sun gear by using a frictional resistance of each planet pin against the rotation of each first pinion supported on the same planet pin and engaged with the first sun gear, and a frictional resistance of each planet pin against the rotation of each second pinion supported on the same planet pin and engaged with the second sun gear.

23. The right/left driving torque distributing device according to claims 15, wherein the differential gear mechanism comprises:

a differential gear case driven for rotation by the output driving torque of the power unit, a pinion shaft supported on the differential gear case for rotation together with the differential gear case, a pair of pinions rotatably supported on the pinion shaft, and a pair of side gears engaged with the pinions, respectively;

the pair of side gears are coupled with the pair of lateral drive shafts to drive the same, respectively; and the differential gear case and the pair of side gears are interlocked by a differential limiting means for limiting differential motion between the pair of side gears.

24. The right/left driving torque distributing device according to claims 15 further comprising a clutch control means for varying the torque transmitting capacities of the first and the second clutch means according to the traveling condition of the vehicle and the surface condition of a road on which the vehicle is traveling.

25. The right/left driving torque distributing device according to claims 15, wherein there is a predetermined difference in torque transmitting capacity between the first and the second clutch means.

26. The right/left driving torque distributing device according to claims 15, wherein the first and the second clutch means of the clutch mechanism are hydraulic multiple-disk clutches.

27. The right/left driving torque distributing device according to claims 15, wherein the first and the second clutch means of the clutch mechanism are electromagnetic clutches.

28. The right/left driving torque distributing device according to claims 15, wherein the first and the second clutch means of the clutch mechanism are variable-capacity couplings.

29. A right/left driving torque distributing device for a vehicle, comprising:

a differential gear mechanism for distributing a driving torque provided by a power unit mounted on the vehicle to a pair of lateral drive shafts extended coaxially with each other;

a gear mechanism comprising:

first, second and third clutch gears coaxially arranged in alignment with a second axis parallel to the common axis of the pair of lateral drive shafts, and capable of individually rotating about the second axis, a first gear engaged with the first clutch gear and supported for rotation together with a member of the differential gear mechanism, driven for rotation by the power unit to rotate the first clutch gear at a reference rotating speed when the pair of lateral drive shafts rotate at the same rotating speed, a second gear engaged with the second clutch gear and supported for rotation together with one of the pair of lateral drive shafts to drive the second clutch gear at a rotating speed different from the reference rotating speed when the pair of lateral drive shafts rotate at the same rotating speed, and a third gear engaged with the third clutch gear and supported for rotation together with the other lateral drive shaft to drive the third clutch gear at a rotating speed different from the reference rotating speed when the pair of lateral drive shafts rotate at the same rotating speed; and a clutch mechanism comprising:
  a first clutch means interposed between the first and the second clutch gear and capable of interlocking the first and the second clutch gear for rotation together with each other, and
  a second clutch means interposed between the first and the third clutch gear and capable of interlocking the first and the third clutch gear for rotation together with each other;
wherein the first and the second clutch means of the clutch mechanism are disposed coaxially in alignment with the second axis and united together in a single unit.

30. The right/left driving torque distributing device according to claims 29, wherein the first, the second and the third gear, and the first, the second and the third clutch bear are disposed on the side of one of the pair of lateral drive shafts with respect to the differential gear mechanism.

31. The right/left driving torque distributing device according to claim 29, wherein the second gear and the second clutch gear are disposed on the side of one of the pair of lateral drive shafts with respect to the differential gear mechanism, and the third gear and the third clutch gear are disposed on the side of the other lateral drive shaft with respect to the differential gear mechanism.

32. The right/left driving torque distributing device according to claims 29, wherein the differential bear mechanism is a composite planetary gear mechanism comprising:
  a differential gear case to be driven for rotation by the output driving torque of the power unit,
  a first sun gear to be rotated together with the differential gear case;
  a plurality of first pinions engaged with the first sun gear;
  a plurality of second pinions formed integrally with the first pinions, respectively,
  a second sun gear engaged with the second sun gear, said second sun gear being interlocked with one of the pair of lateral drive shafts to drive the same for rotation,
  plurality of planet pins rotatably supporting gear sets each of one of the plurality of first pinions and one of the plurality of second pinions, respectively, and
  a planet pinion carrier supporting the planet pins, said planet pinion carrier being used for driving one of the pair of lateral drive shafts, said planet pinion carrier being interlocked with the other lateral drive shaft to drive the same fore rotation.

33. The right/left driving torque distributing device according to claim 32 further comprising:
  a first differential limiting means for limiting differential motion between the planet pin carrier and the second sun gear by using a thrust produced by the interaction between the first sun gear and each first pinion and acting on the first pinion in a direction parallel to the corresponding planet pin, and a thrust produced by the interaction between the second sun gear and each second pinion and acting on the second pinion in a direction parallel to the corresponding planet pin; and
  a second differential limiting means for limiting differential motion between the planet pin carrier and the second sun gear by using a frictional resistance of each planet pin against the rotation of each first pinion supported on the same planet pin and engaged with the first sun gear, and a frictional resistance of each planet pin against the rotation of each second pinion supported on the same planet pin and engaged with the second sun gear.

34. The right/left driving torque distributing device according to claims 29, wherein the differential gear mechanism comprises:
  a differential gear case driven for rotation by the output driving torque of the power unit,
  a pinion shaft supported on the differential gear case for rotation together with the differential gear case,
  a pair of pinions rotatably supported on the pinion shaft, and
  a pair of side gears engaged with the pinions, respectively;
  the pair of side gears are coupled with the pair of lateral drive shafts to drive the same, respectively; and
  the differential gear case and the pair of side gears are interlocked by a differential limiting means for limiting differential motion between the pair of side gears.

35. The right/left dr-ving torque distributing device according to claims 29 further comprising a clutch control means for varying the torque transmitting capacities of the first and the second clutch means according to the traveling condition of the vehicle and the surface condition of a road on which the vehicle is traveling.

36. The right/left driving torque distributing device according to claims 29, wherein there is a predetermined difference in torque transmitting capacity between the first and the second clutch means.

37. The right/left driving torque distributing device according to claims 29, wherein the first and the second clutch means of the clutch mechanism are hydraulic multiple-disk clutches.

38. The right/left driving torque distributing device according to claims 29, wherein the first and the second clutch means of the clutch mechanism are electromagnetic clutches.

39. The right/left driving torque distributing device according to claims 29, wherein the first and the second clutch means of the clutch mechanism are variable-capacity couplings.

* * * * *